June 3, 1952

C. O. PARKS 2,599,409

SENDER TEST CIRCUIT

Filed Aug. 16, 1950

INVENTOR
C. O. PARKS
BY
C. Mattice
ATTORNEY

June 3, 1952  C. O. PARKS  2,599,409
SENDER TEST CIRCUIT
Filed Aug. 16, 1950  58 Sheets-Sheet 4

INVENTOR
C. O. PARKS
BY
C. Mattice
ATTORNEY

June 3, 1952  C. O. PARKS  2,599,409
SENDER TEST CIRCUIT
Filed Aug. 16, 1950  58 Sheets-Sheet 5

INVENTOR
C. O. PARKS
BY C. Matthie
ATTORNEY

June 3, 1952  C. O. PARKS  2,599,409
SENDER TEST CIRCUIT
Filed Aug. 16, 1950  58 Sheets-Sheet 6

INVENTOR
C. O. PARKS
BY
C. Mathieu
ATTORNEY

INVENTOR
C. O. PARKS
BY
C. Mattice
ATTORNEY

June 3, 1952  C. O. PARKS  2,599,409
SENDER TEST CIRCUIT
Filed Aug. 16, 1950  58 Sheets-Sheet 10

INVENTOR
C. O. PARKS
BY C. Mathie
ATTORNEY

INVENTOR
C. O. PARKS
BY
C. Mattice
ATTORNEY

June 3, 1952  C. O. PARKS  2,599,409
SENDER TEST CIRCUIT
Filed Aug. 16, 1950  58 Sheets-Sheet 18

INVENTOR
C. O. PARKS
BY C. Mattice
ATTORNEY

INVENTOR
C. O. PARKS
BY
C. Mattice
ATTORNEY

INVENTOR
C. O. PARKS
BY C. Mattie
ATTORNEY

June 3, 1952   C. O. PARKS   2,599,409
SENDER TEST CIRCUIT
Filed Aug. 16, 1950   58 Sheets-Sheet 29

INVENTOR
C. O. PARKS
BY C. Mattice
ATTORNEY

June 3, 1952 — C. O. PARKS — 2,599,409
SENDER TEST CIRCUIT
Filed Aug. 16, 1950 — 58 Sheets-Sheet 31

INVENTOR
C. O. PARKS
BY C. Mattice
ATTORNEY

June 3, 1952 C. O. PARKS 2,599,409
SENDER TEST CIRCUIT
Filed Aug. 16, 1950 58 Sheets-Sheet 33

INVENTOR
C. O. PARKS
BY C. Mattice
ATTORNEY

INVENTOR
C. O. PARKS
BY
C. Mathie
ATTORNEY

June 3, 1952 — C. O. PARKS — 2,599,409
SENDER TEST CIRCUIT
Filed Aug. 16, 1950 — 58 Sheets-Sheet 38

INVENTOR
C. O. PARKS
BY
C. Mattice
ATTORNEY

June 3, 1952 C. O. PARKS 2,599,409
SENDER TEST CIRCUIT
Filed Aug. 16, 1950 58 Sheets-Sheet 39

INVENTOR
C. O. PARKS
BY
C. Mattice
ATTORNEY

June 3, 1952

C. O. PARKS 2,599,409

SENDER TEST CIRCUIT

Filed Aug. 16, 1950

INVENTOR
C. O. PARKS
BY
C. Mattice
ATTORNEY

June 3, 1952     C. O. PARKS     2,599,409
SENDER TEST CIRCUIT
Filed Aug. 16, 1950     58 Sheets-Sheet 44

INVENTOR
C. O. PARKS
BY
C. Mattice
ATTORNEY

June 3, 1952

C. O. PARKS 2,599,409

SENDER TEST CIRCUIT

Filed Aug. 16, 1950

INVENTOR
C. O. PARKS
BY
C. Mattice
ATTORNEY

INVENTOR
C. O. PARKS
BY
C. Mattice
ATTORNEY

INVENTOR
C. O. PARKS
BY
C. Mattice
ATTORNEY

June 3, 1952 — C. O. PARKS — 2,599,409
SENDER TEST CIRCUIT
Filed Aug. 16, 1950 — 58 Sheets-Sheet 50

INVENTOR
C. O. PARKS
BY
C. Mattice
ATTORNEY

June 3, 1952

C. O. PARKS 2,599,409

SENDER TEST CIRCUIT

Filed Aug. 16, 1950

INVENTOR
C.O. PARKS
BY C. Mathis
ATTORNEY

June 3, 1952 C. O. PARKS 2,599,409
SENDER TEST CIRCUIT
Filed Aug. 16, 1950 58 Sheets-Sheet 56

INVENTOR
C. O. PARKS
BY
C. Mattice
ATTORNEY

June 3, 1952

C. O. PARKS 2,599,409

SENDER TEST CIRCUIT

Filed Aug. 16, 1950

INVENTOR
C. O. PARKS
BY
C. Mattice

ATTORNEY

June 3, 1952     C. O. PARKS     2,599,409
SENDER TEST CIRCUIT

Filed Aug. 16, 1950     58 Sheets-Sheet 58

FIG. 58

| FIG. 1 | FIG. 9 | FIG. 17 | FIG. 25 | FIG. 33 | FIG. 45 |
| FIG. 2 | FIG. 10 | FIG. 18 | FIG. 26 | FIG. 34 | FIG. 46 |
| FIG. 3 | FIG. 11 | FIG. 19 | FIG. 27 | FIG. 35 | FIG. 47 |
| FIG. 4 | FIG. 12 | FIG. 20 | FIG. 28 | FIG. 36 | FIG. 48 |
| FIG. 5 | FIG. 13 | FIG. 21 | FIG. 29 | FIG. 37 | FIG. 49 |
| FIG. 6 | FIG. 14 | FIG. 22 | FIG. 30 | FIG. 38 | FIG. 50 |
| FIG. 7 | FIG. 15 | FIG. 23 | FIG. 31 | FIG. 39 | FIG. 51 |
| FIG. 8 | FIG. 16 | FIG. 24 | FIG. 32 | FIG. 40 | FIG. 52 |
| | | | | FIG. 41 | FIG. 53 |
| | | | | FIG. 42 | FIG. 54 |
| | | | | FIG. 43 | FIG. 55 |
| | | | | FIG. 44 | FIG. 56 |
| | | | | | FIG. 57 |

INVENTOR
C. O. PARKS
BY
C. Mattice
ATTORNEY

Patented June 3, 1952

2,599,409

UNITED STATES PATENT OFFICE 2,599,409

SENDER TEST CIRCUIT

Charles O. Parks, East Norwalk, Conn., assignor to Bell Telephone Laboratories, Incorporated, New York, N. Y., a corporation of New York Application August 16, 1950, Serial No. 179,771

17 Claims. (Cl. 179—175.23)

This invention relates to routine testing equipment for dial telephone systems and has for its object to facilitate the testing of control circuits used in toll dial systems.

The testing equipment to which the present invention relates is particularly designed for the testing of incoming senders of the type disclosed in Patent 2,564,441, granted to McKim-Strickler, August 14, 1951.

These incoming senders are arranged to register subscriber designations having a maximum of eleven digits which include a three-digit area code, a three-digit office code and a four or five-digit numerical designation. In addition they may register three or four-digit operator codes. Under instruction from a marker, these senders may send out the complete designation as recorded, or may be instructed to omit the area code (skip 3), to omit both codes (skip 6) or to substitute an arbitrary code for either or both of the registered codes.

In accordance with the present invention the testing circuit, which is equipped with a set of keys for each digit which may be transmitted to a sender, distributor switches for controlling the sequential transmission of the digits and other distributors for checking the digits as sent out by the sender, is arranged to automatically preset the distributors on the first set of keys on which a digit is set up.

Means is also provided, in connection with test calls which would normally require the sender to send out a designation differing from that registered, for example to skip three digits, for making two successive tests on the same sender, one instructing the sender to send out the designation as recorded and a second permitting the sender to send out the altered designation.

Since the senders to be tested may send out designations in the form of any one of a plurality of types of pulses, for example, dial pulses, multifrequency pulses or direct-current code pulses, the testing circuit is provided with receiving means of each type, one of which is made effective for each test, with means for checking the setting of the effective receiving means after the receipt of a digit against the setting of the corresponding key-set, and for advancing the receiving distributors only if the check is satisfactory.

In receiving multifrequency pulses, the receiving register not only checks that the digit received corresponds to the setting of the key-set but also checks that the signal received is made up of two frequencies and no more or less than two before permitting the distributor to advance.

These and other features of the invention will be more clearly understood from a consideration of the following description in connection with the drawing in which:

Figs. 1, 2, 9 and 10 show the sender selecting circuits;

Figs. 3, 4, 5, 11, 12, 13 and parts of Figs. 6 and 14 show circuits for testing the sender control conductors;

Figs. 7, 8, 15, 16, 23, 24, 30, 31, 32 and parts of Figs. 6, 14 and 22 show the key-sets and associated circuits;

Figure 22:
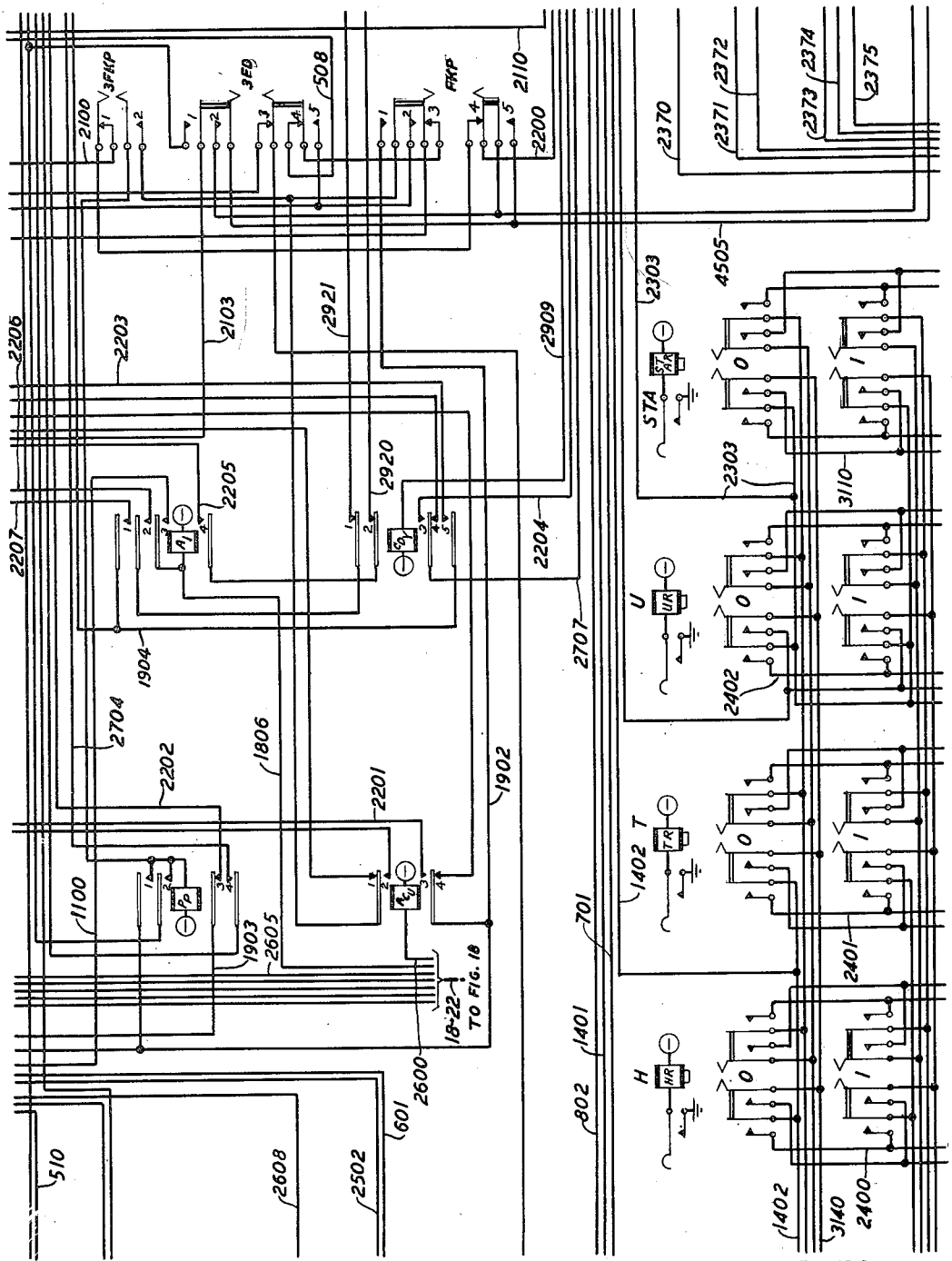
Figure 23:
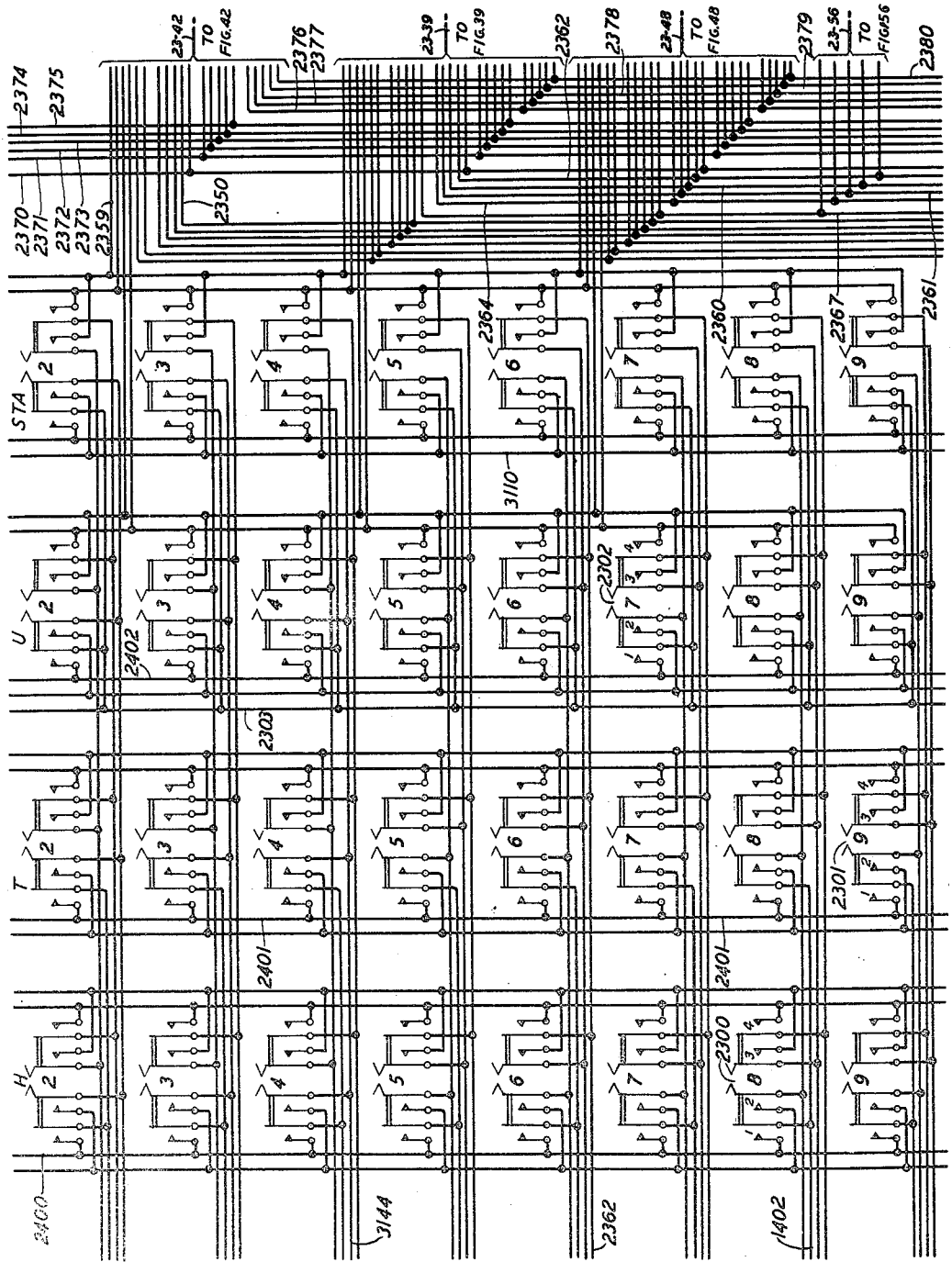
Figure 24:
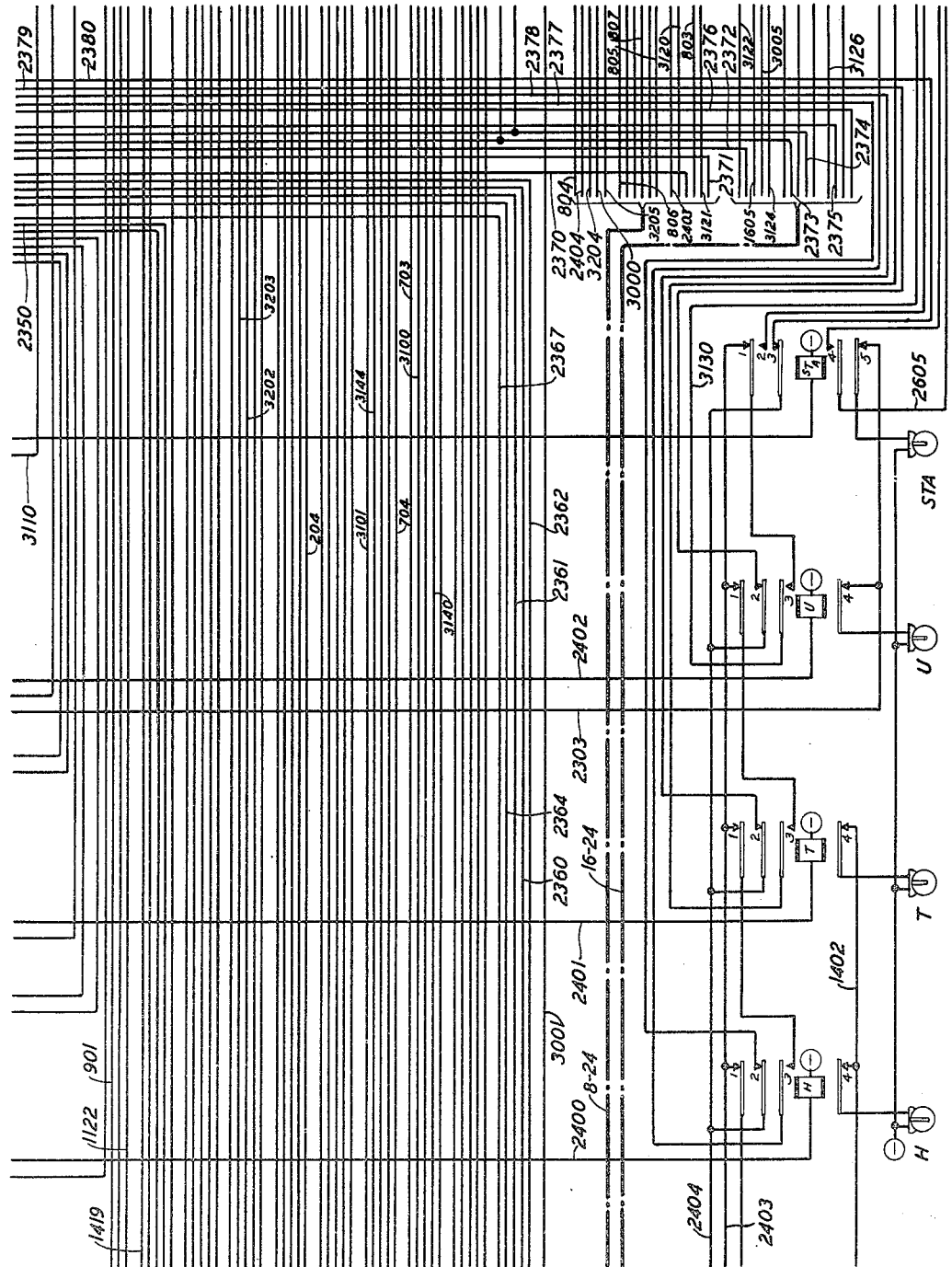
Figure 25:
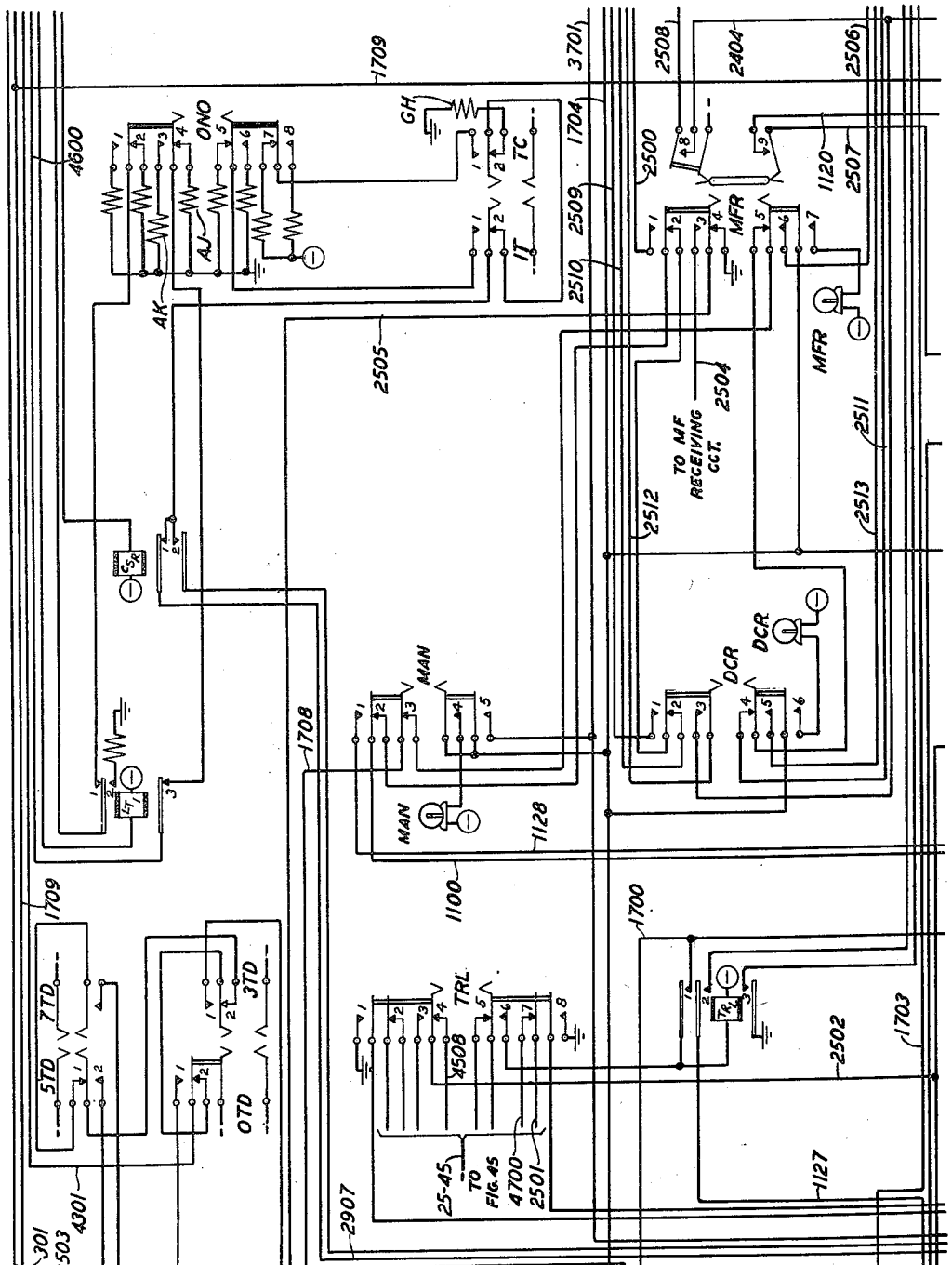
Figure 26:
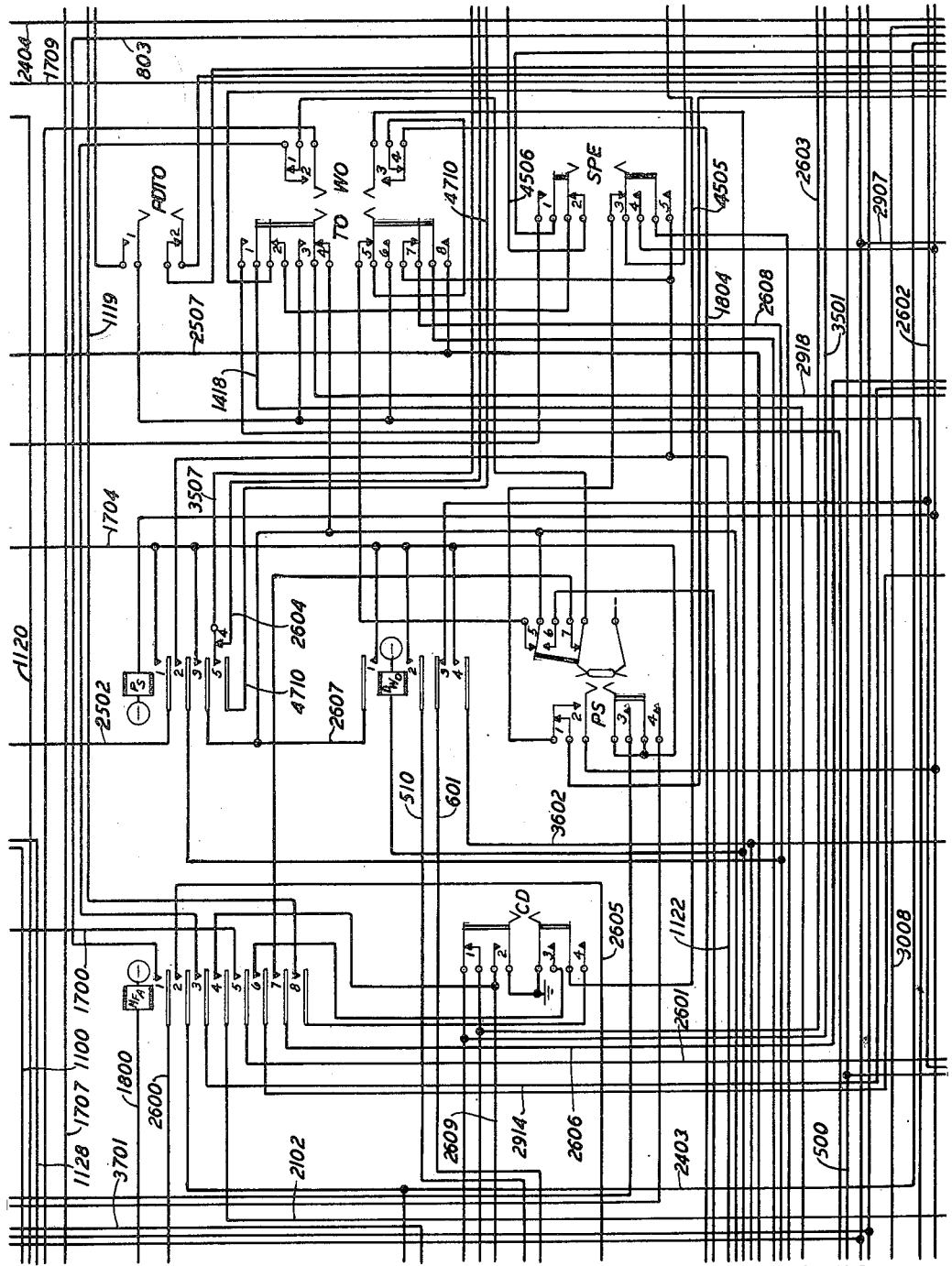
Figure 27:
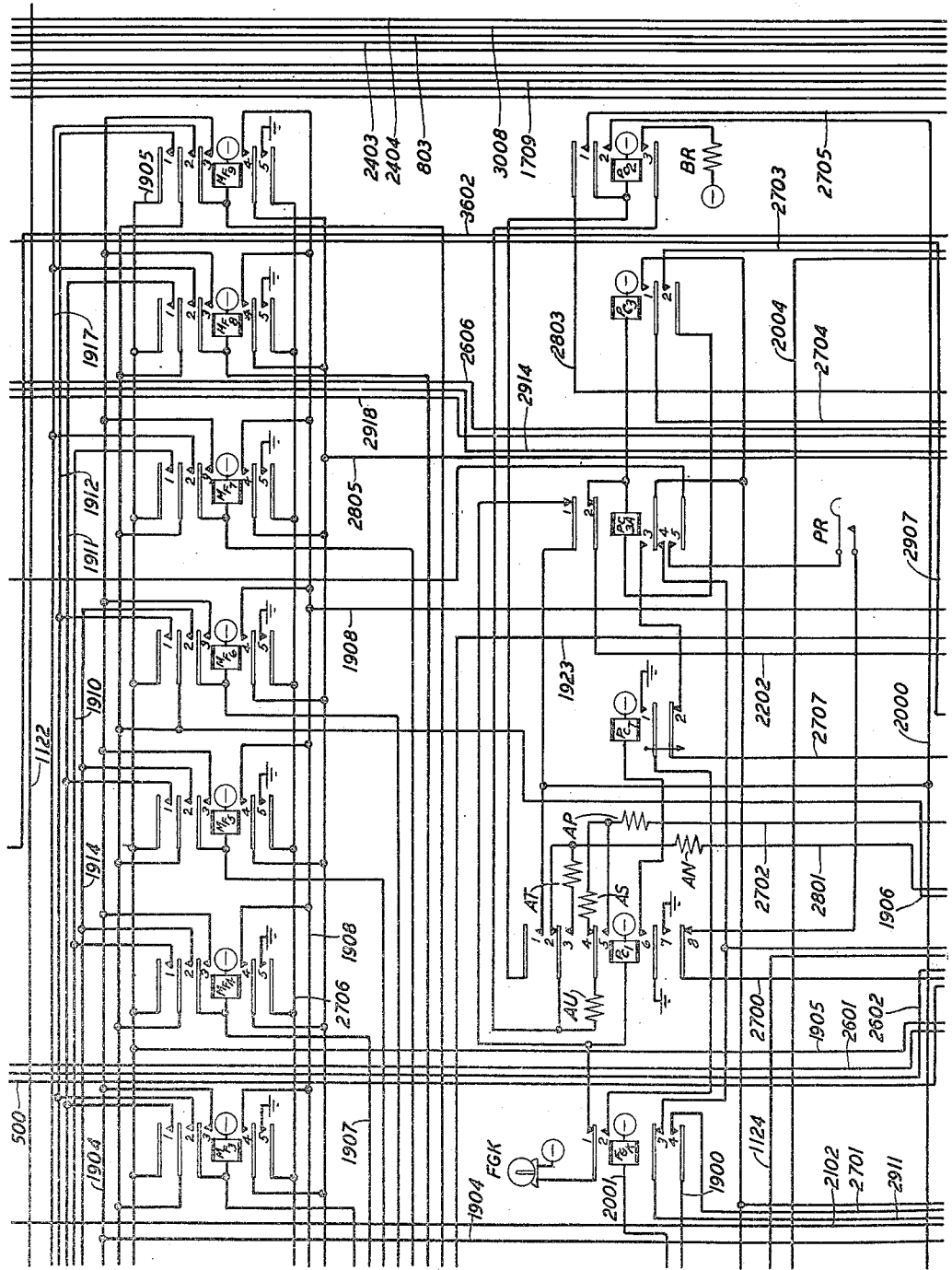
Figure 28:
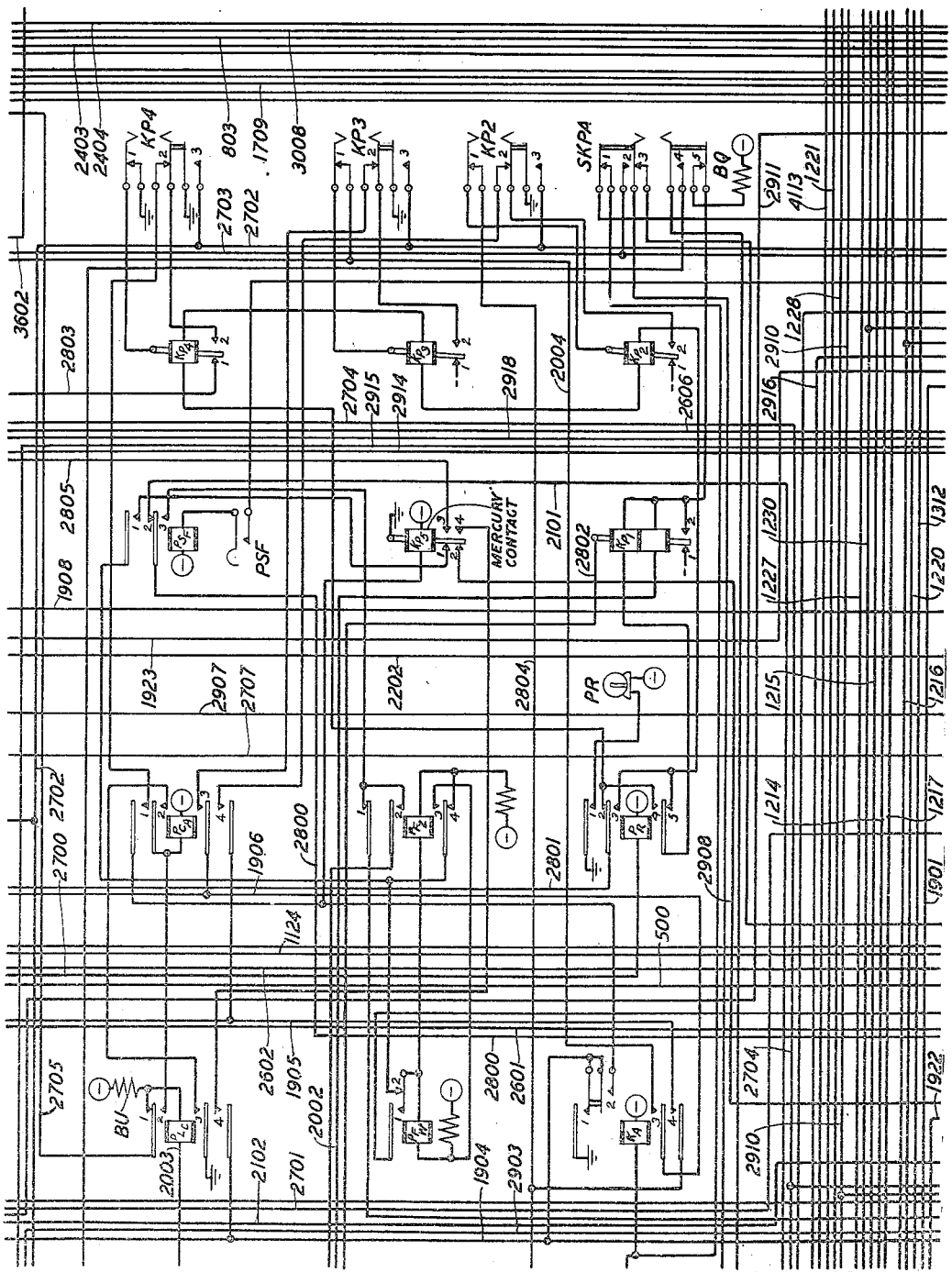
Figure 29:
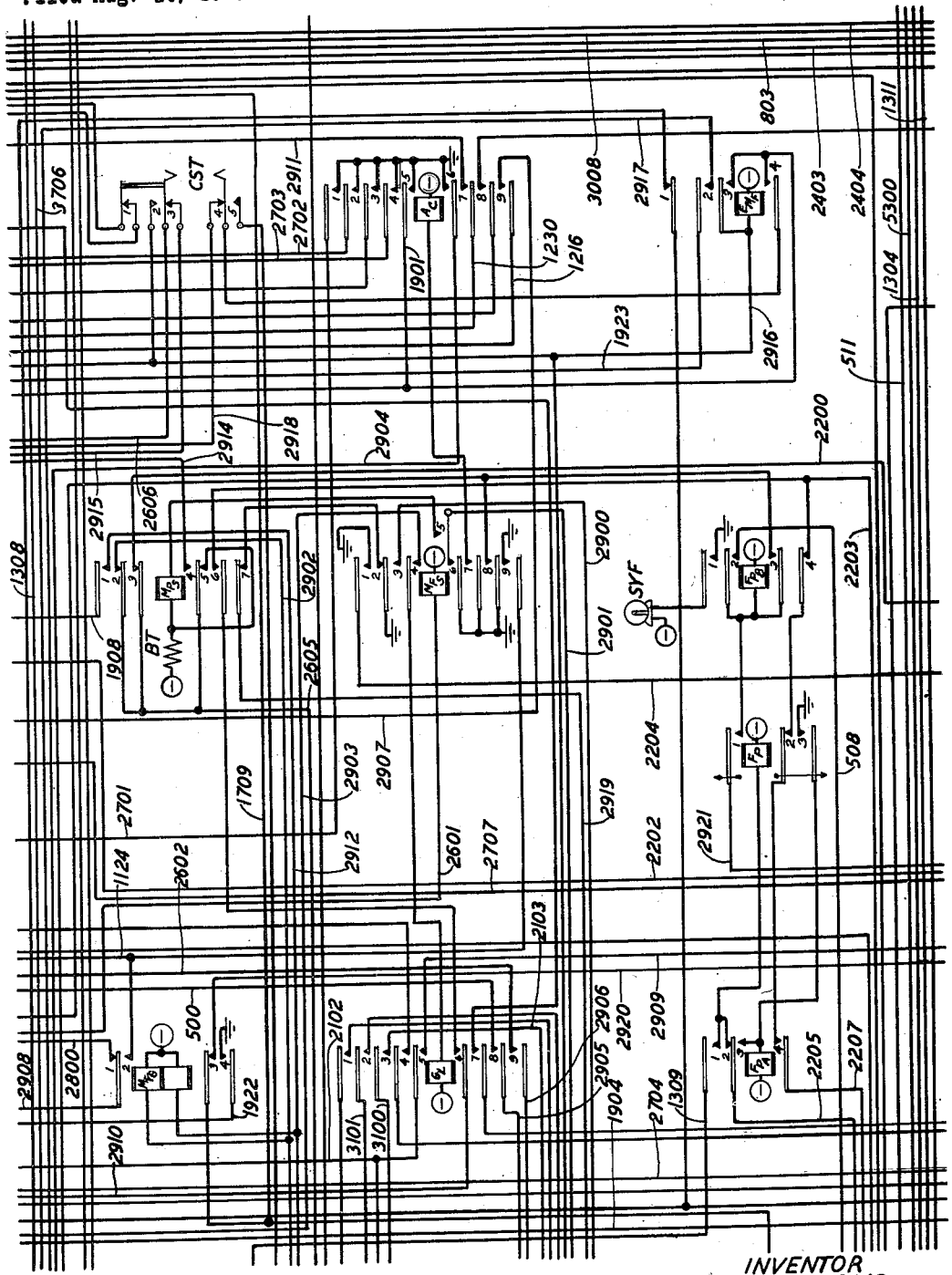
Figure 30:
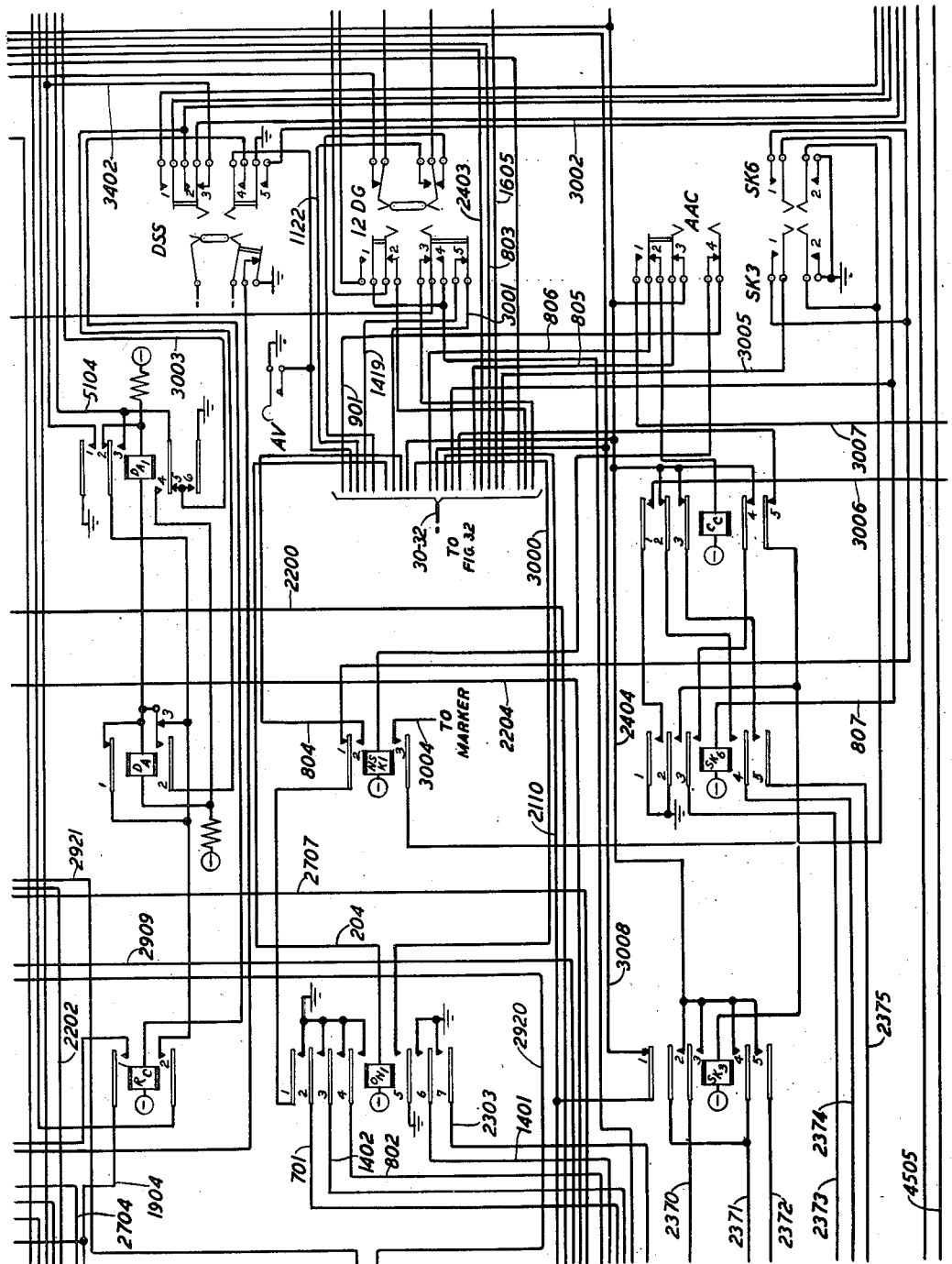
Figure 35:
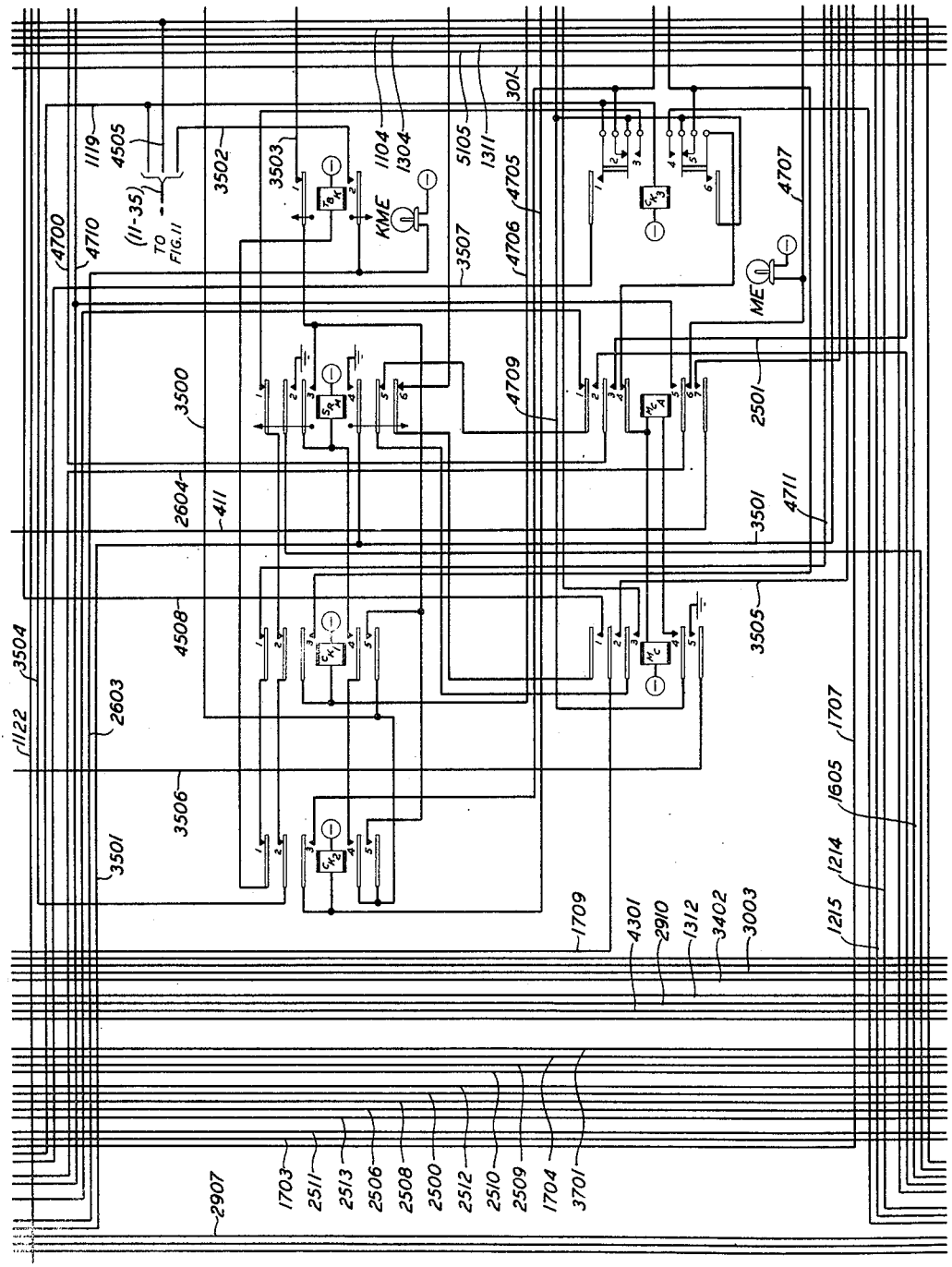
Figure 36:
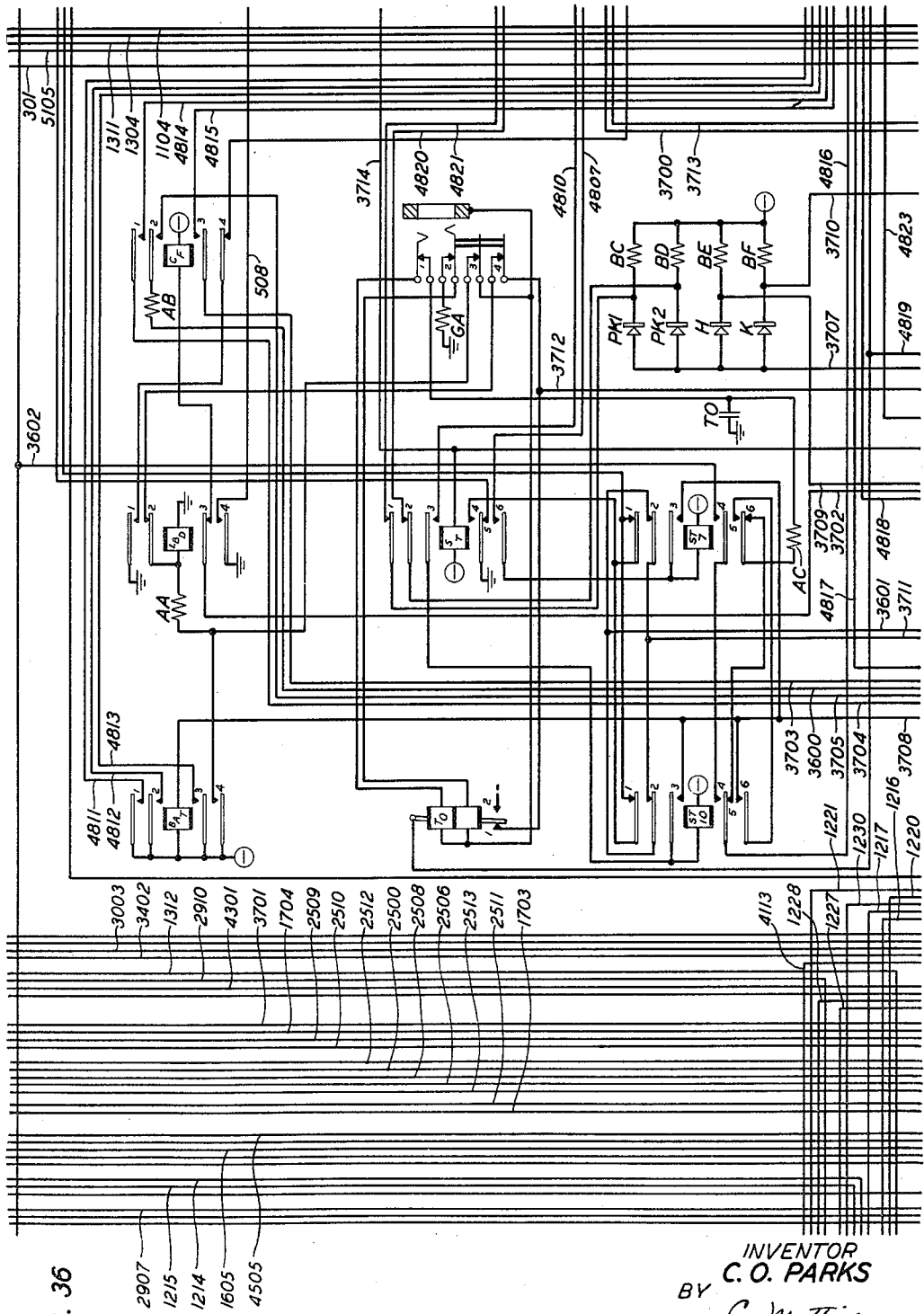
Figure 37:
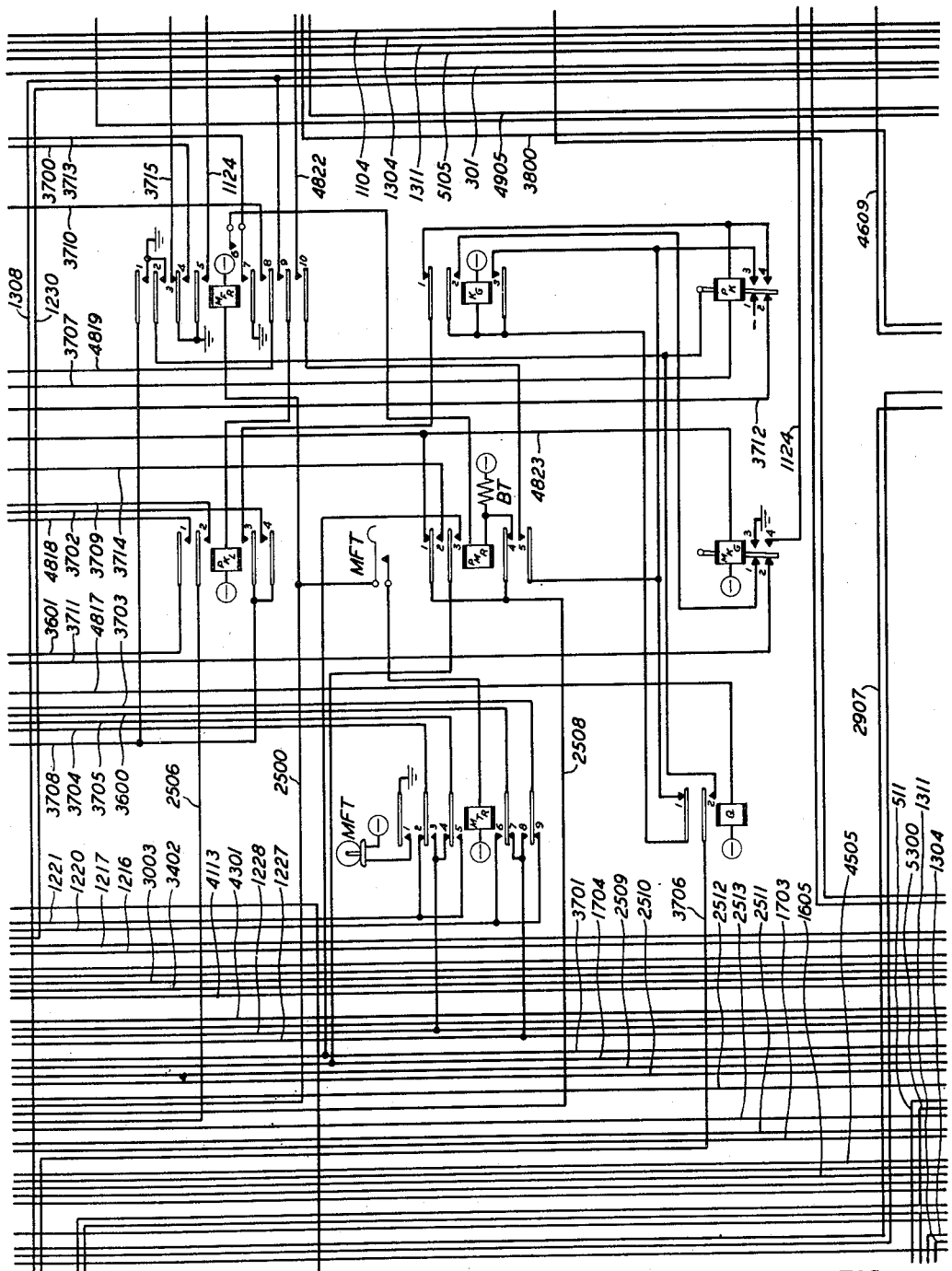
Figure 38:
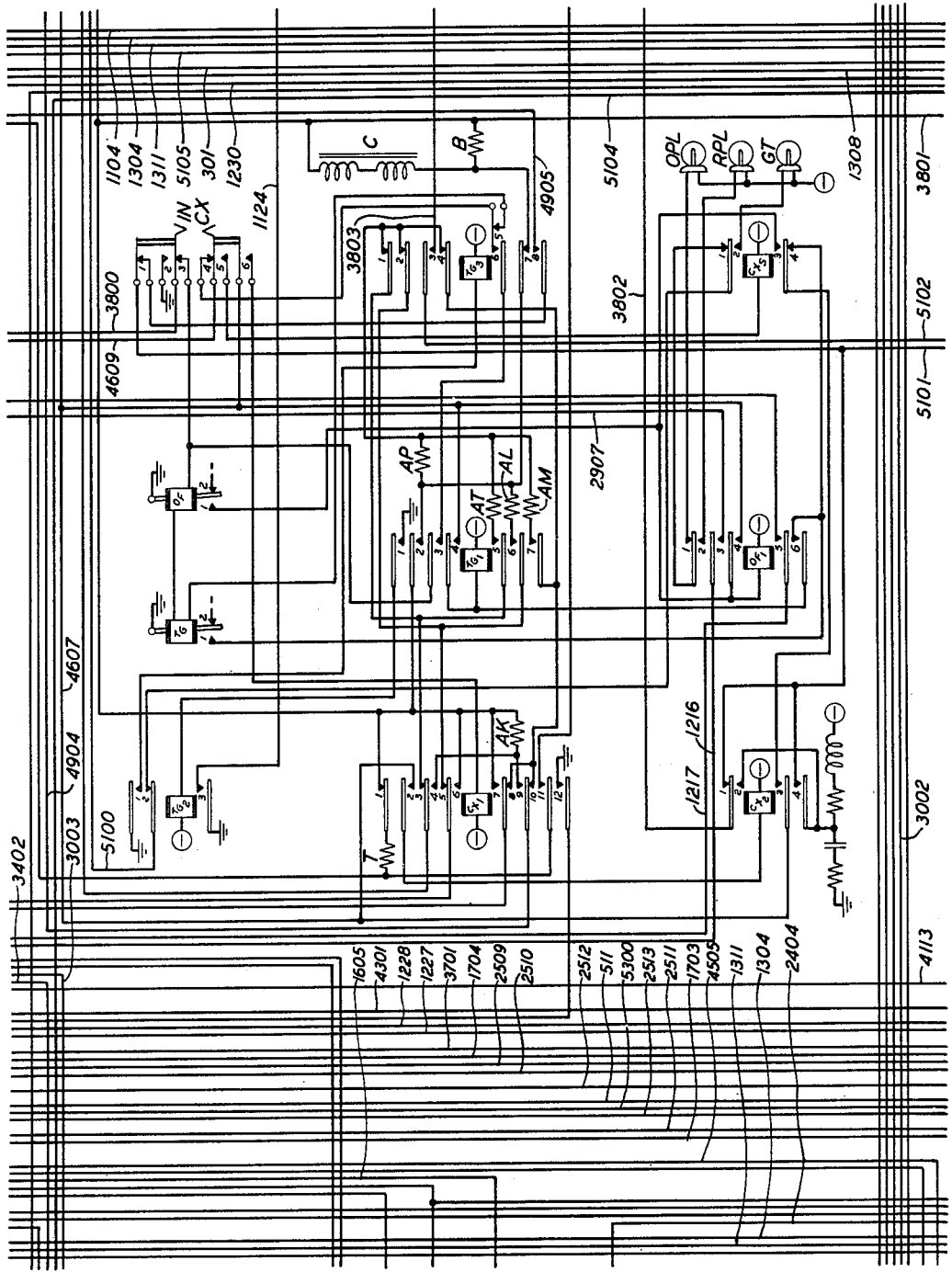
Figure 39:
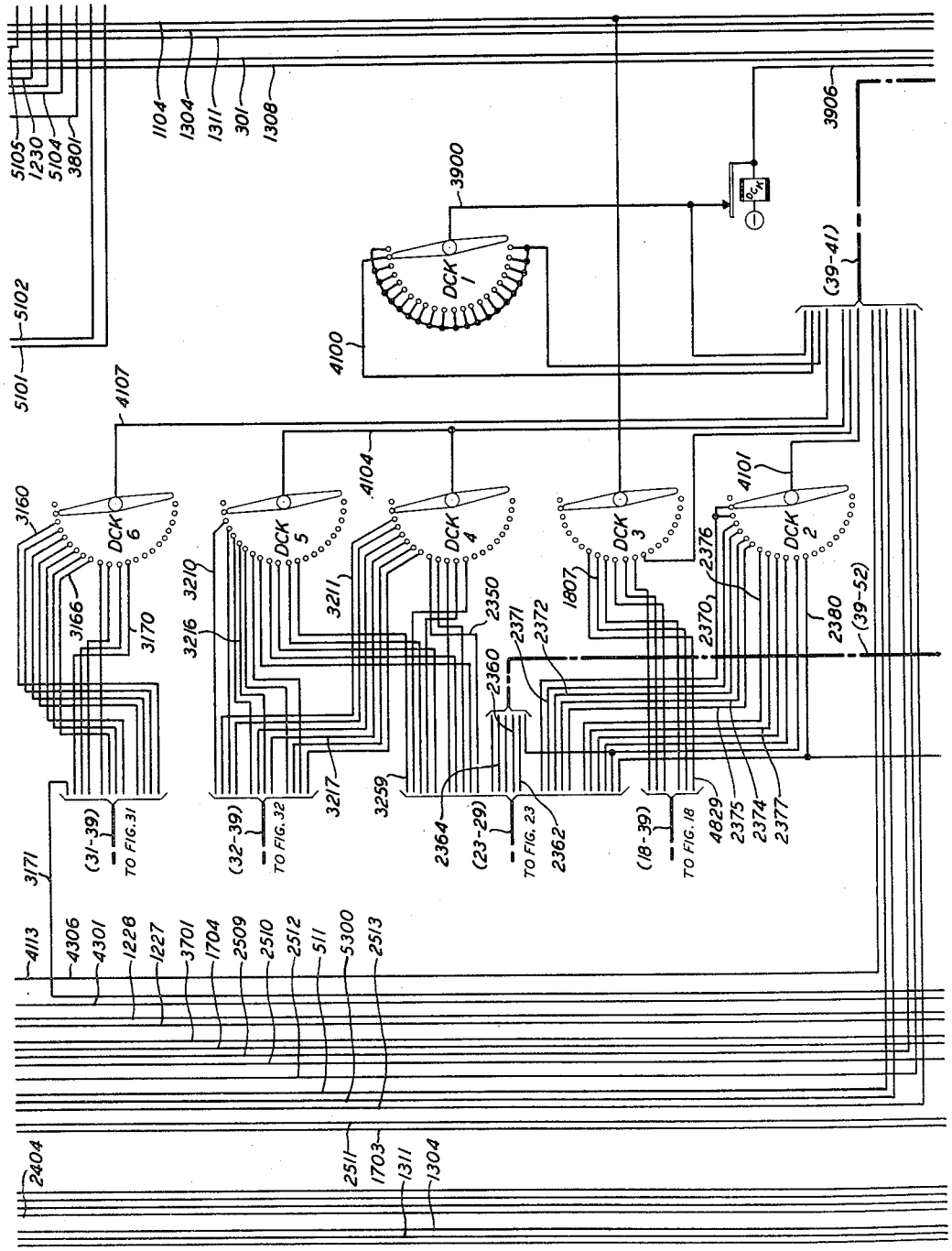
Figure 40:
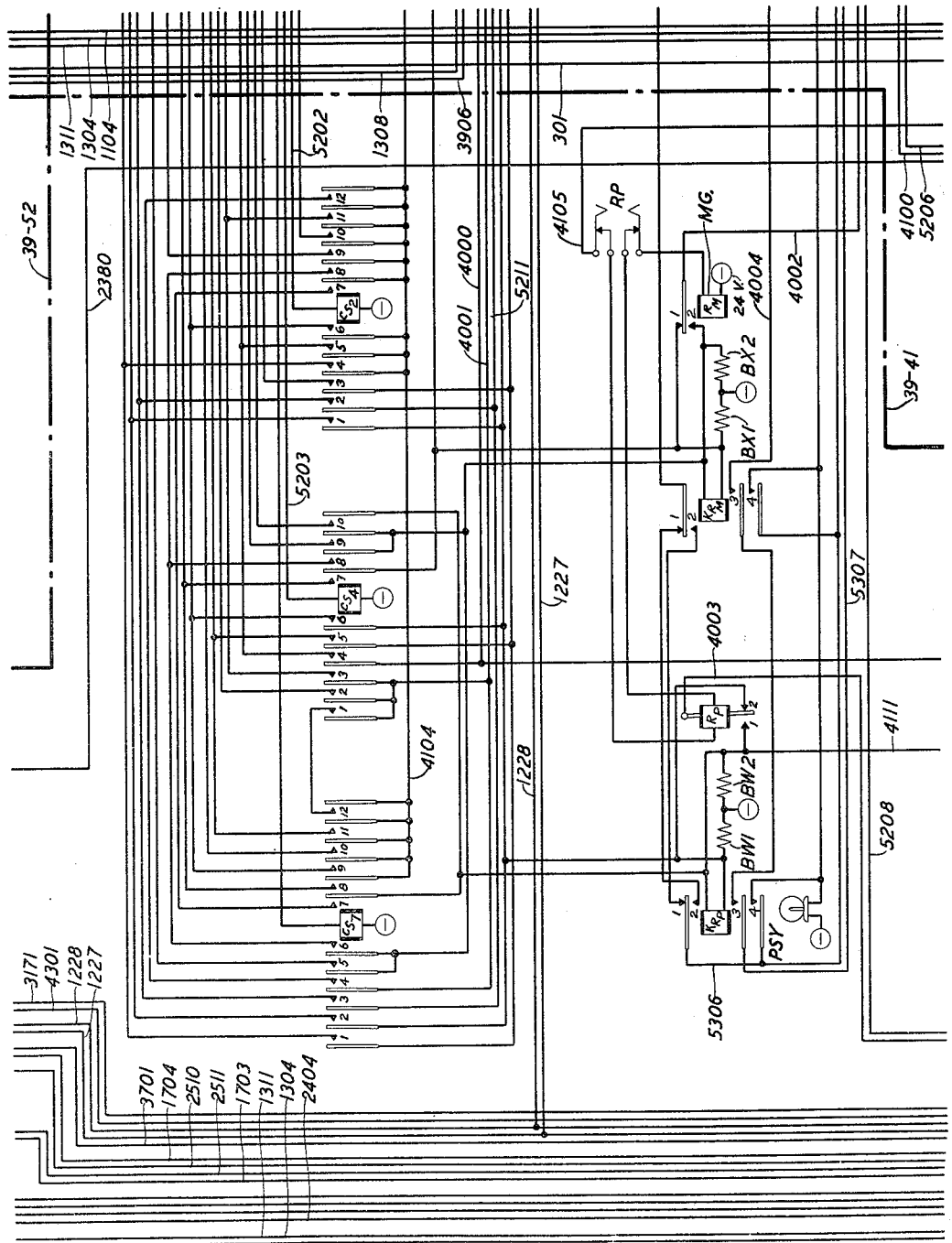
Figure 41:
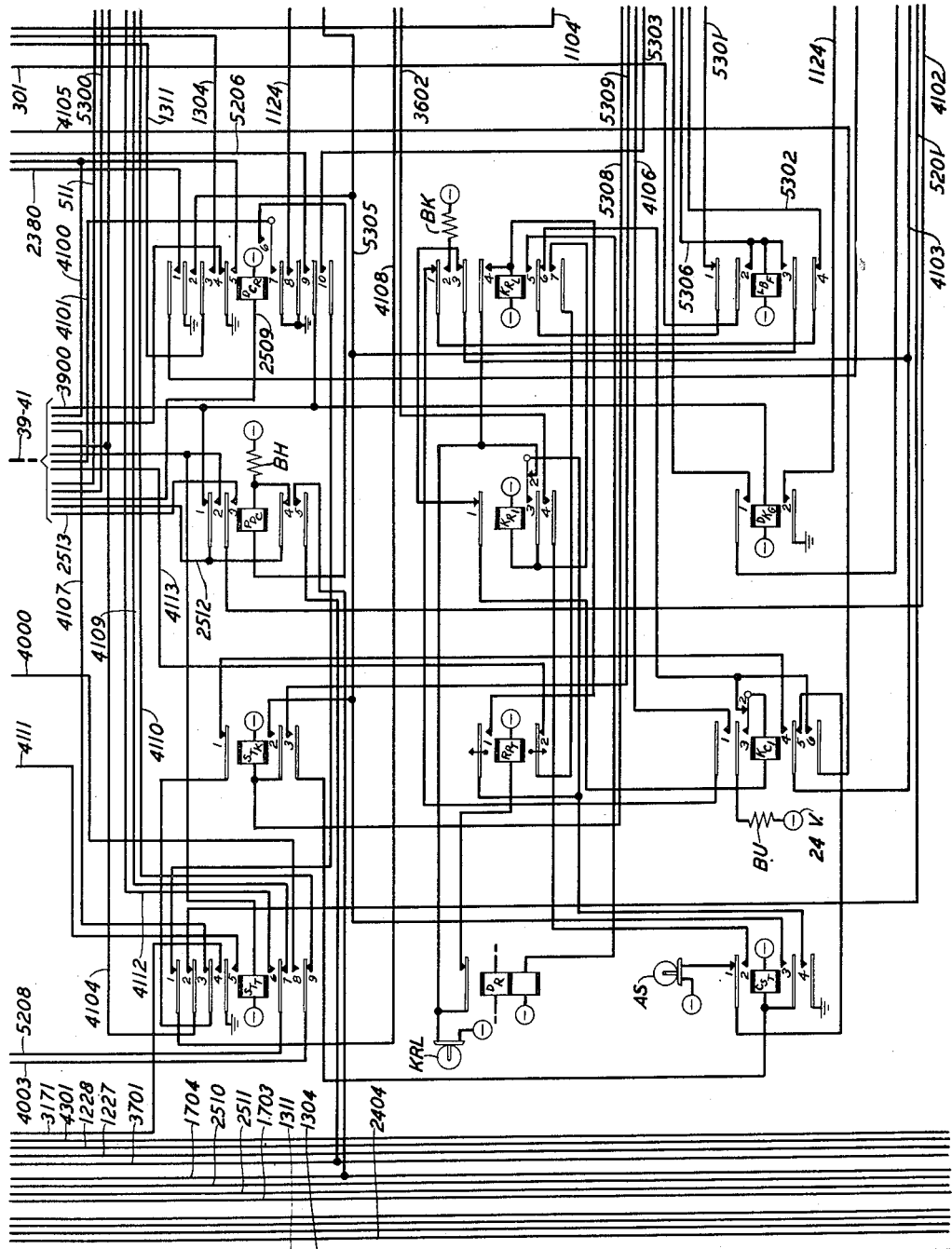
Figure 42:
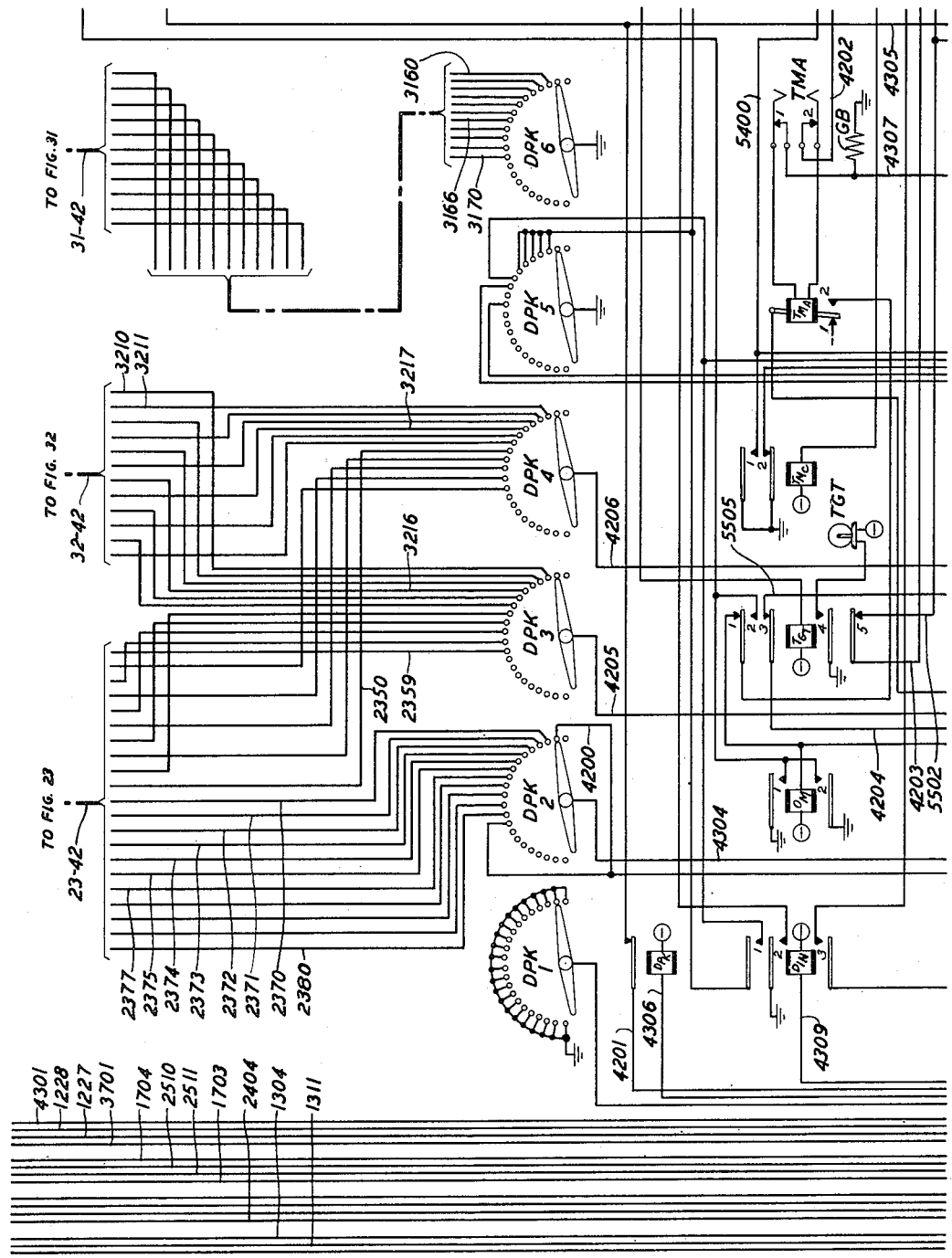
Figure 43:
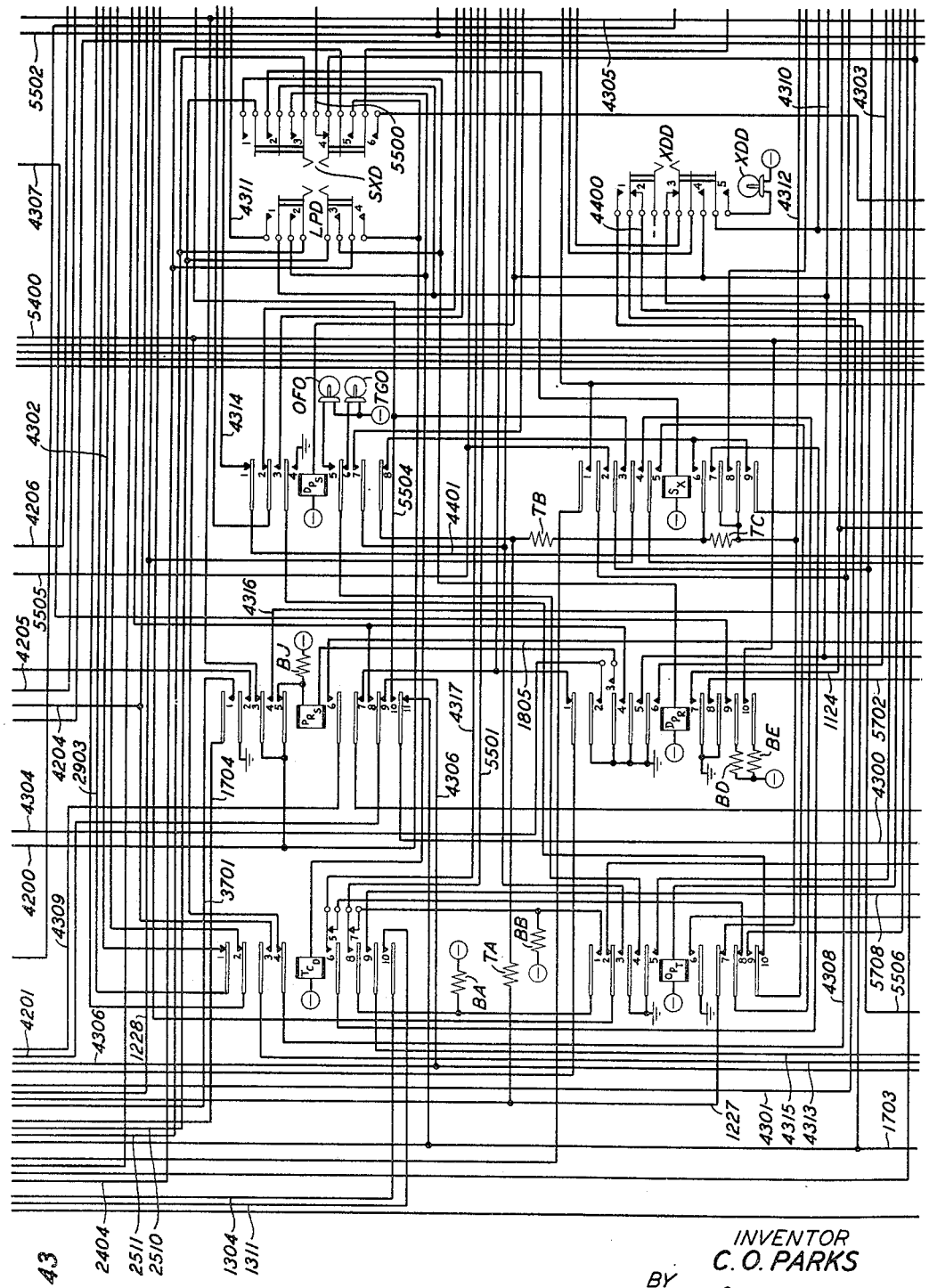
Figure 45:
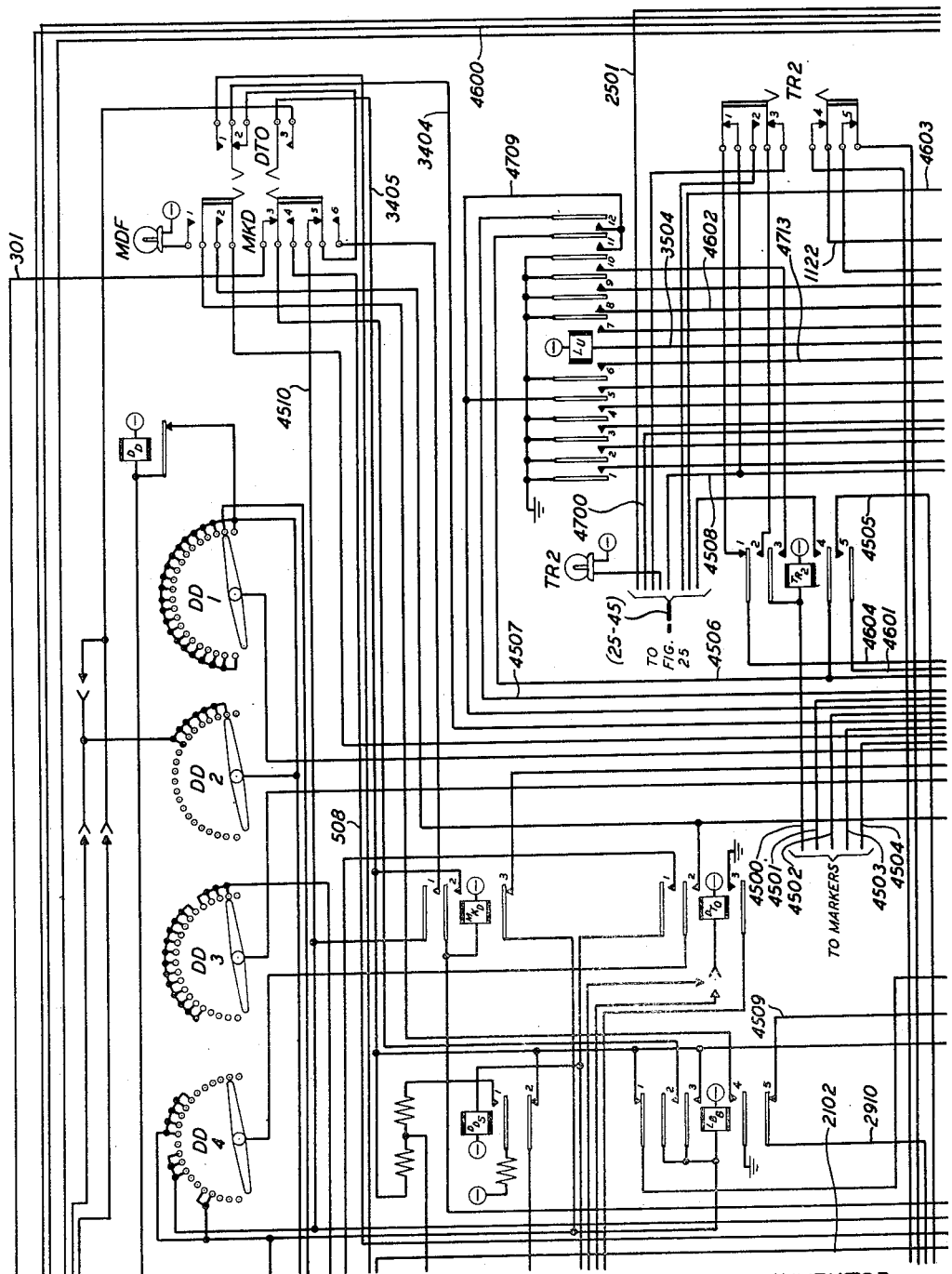
Figure 46:
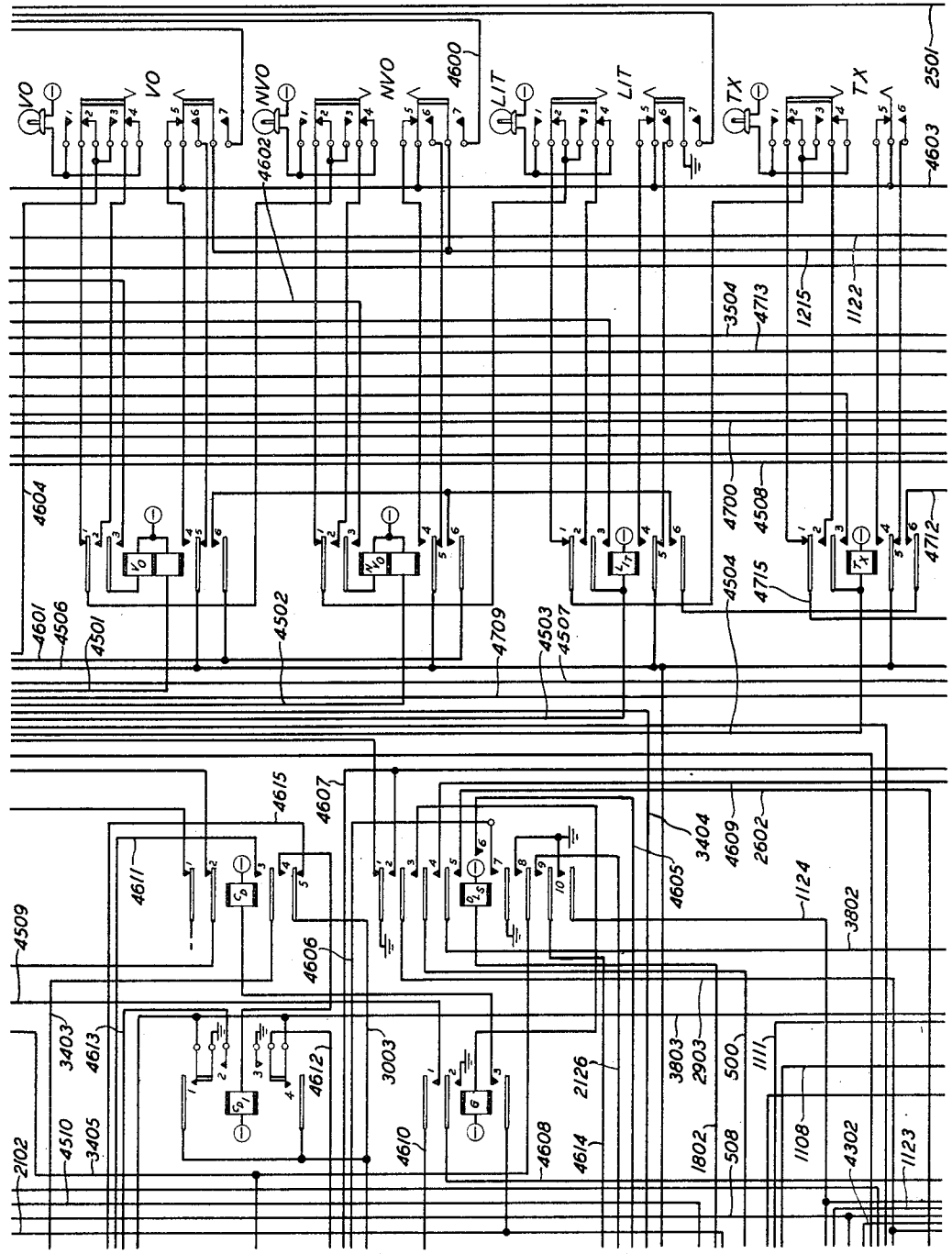
Figure 47:
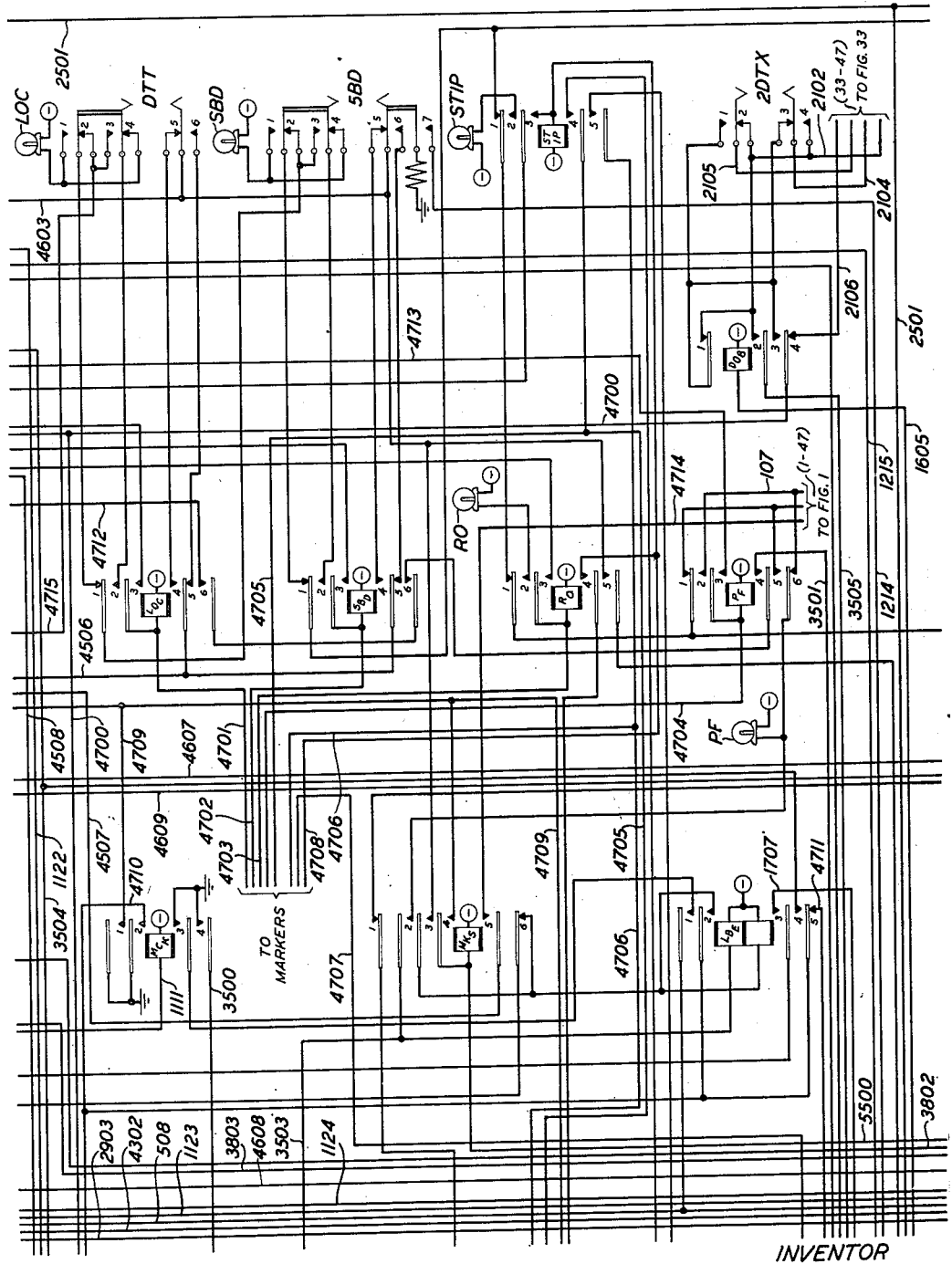
Figure 48:
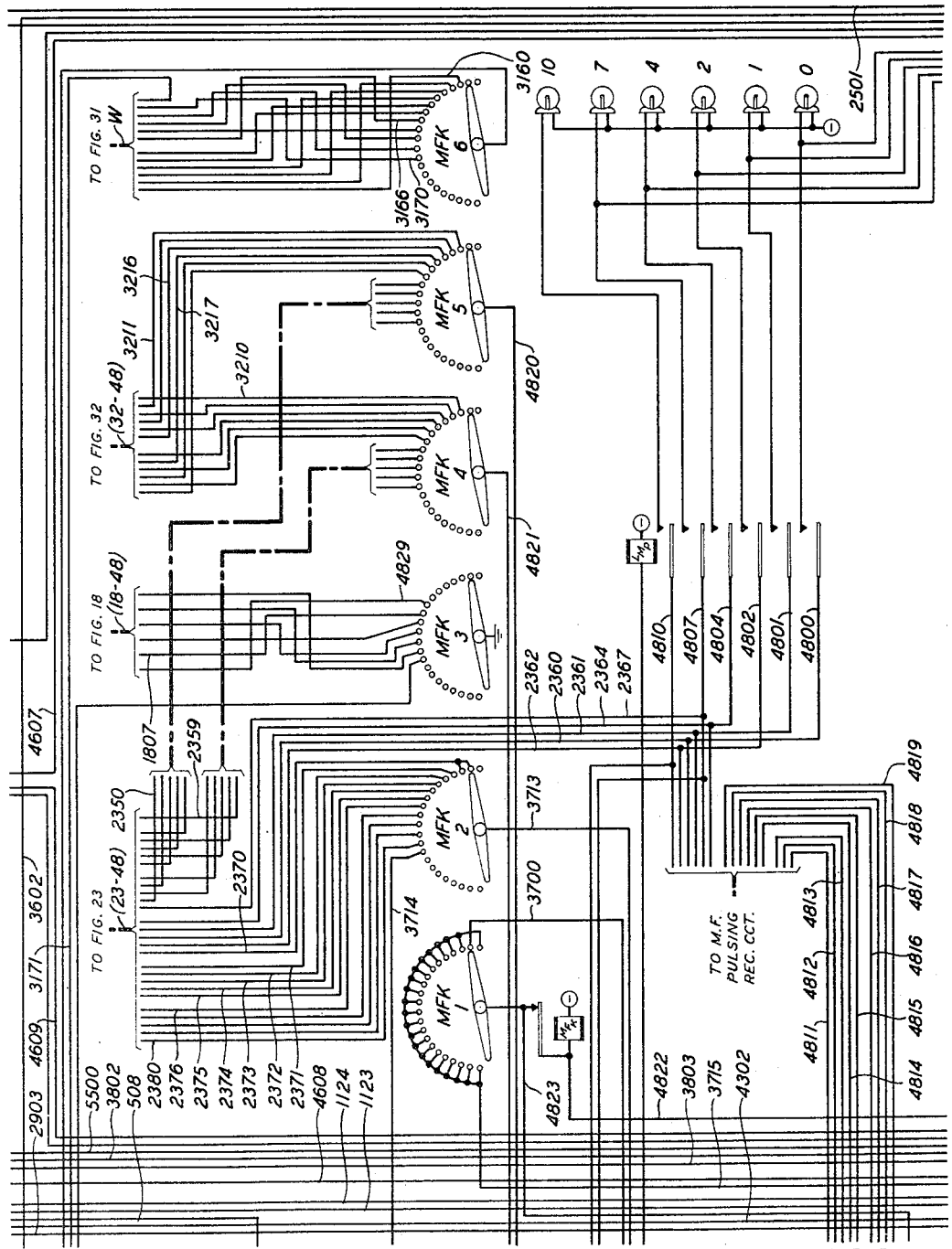
Figure 49:
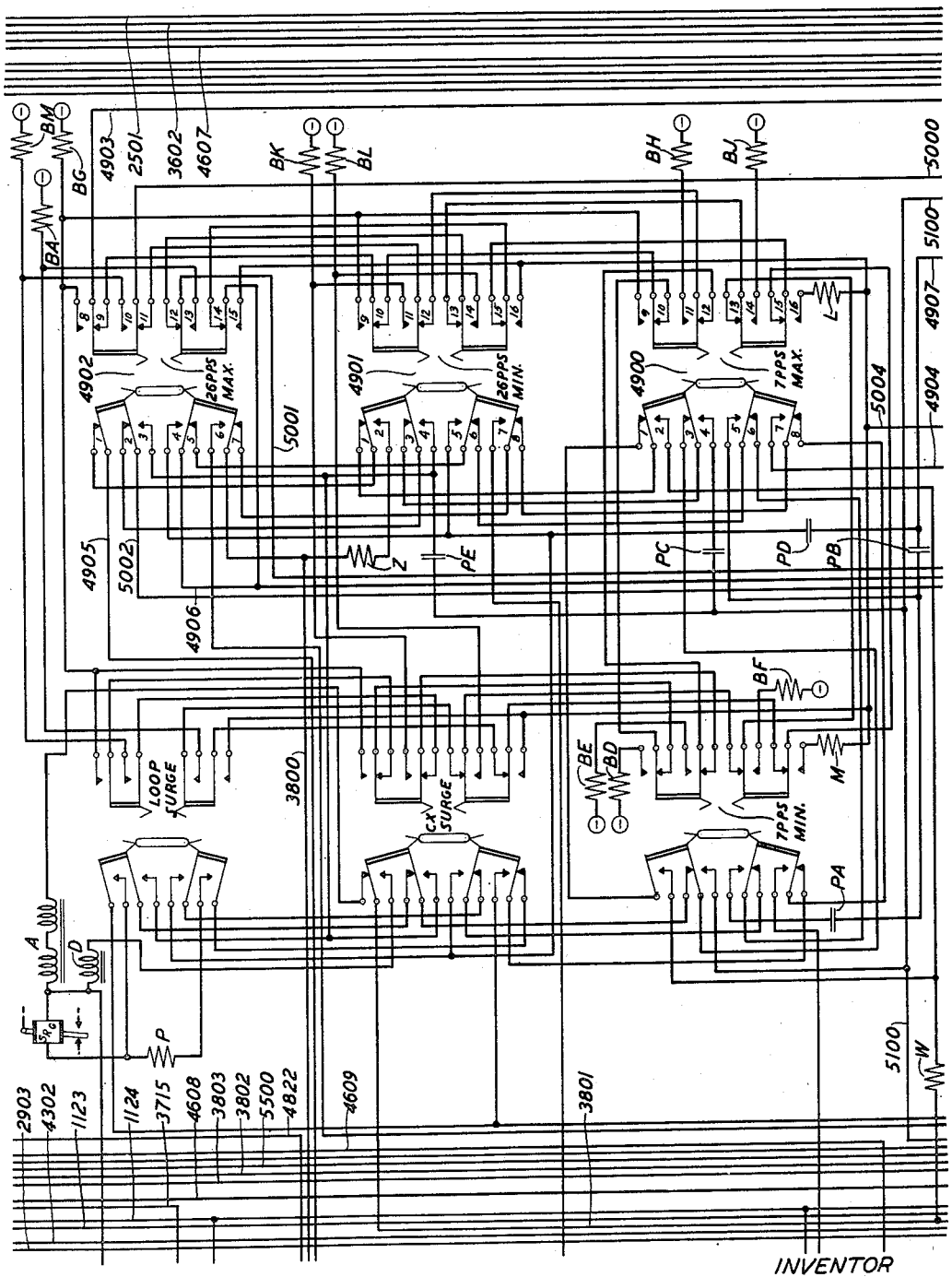
Figure 50:
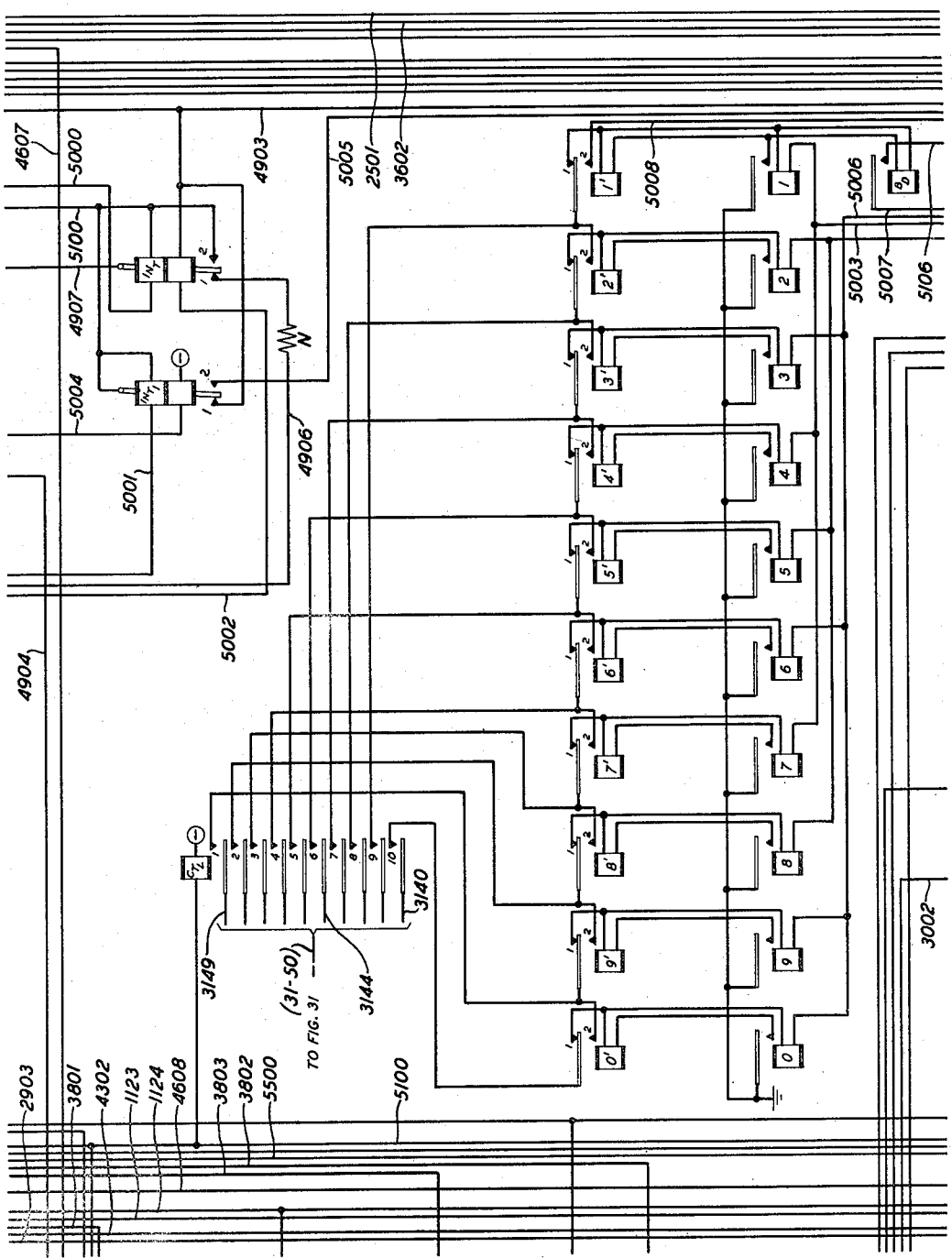
Figure 51:
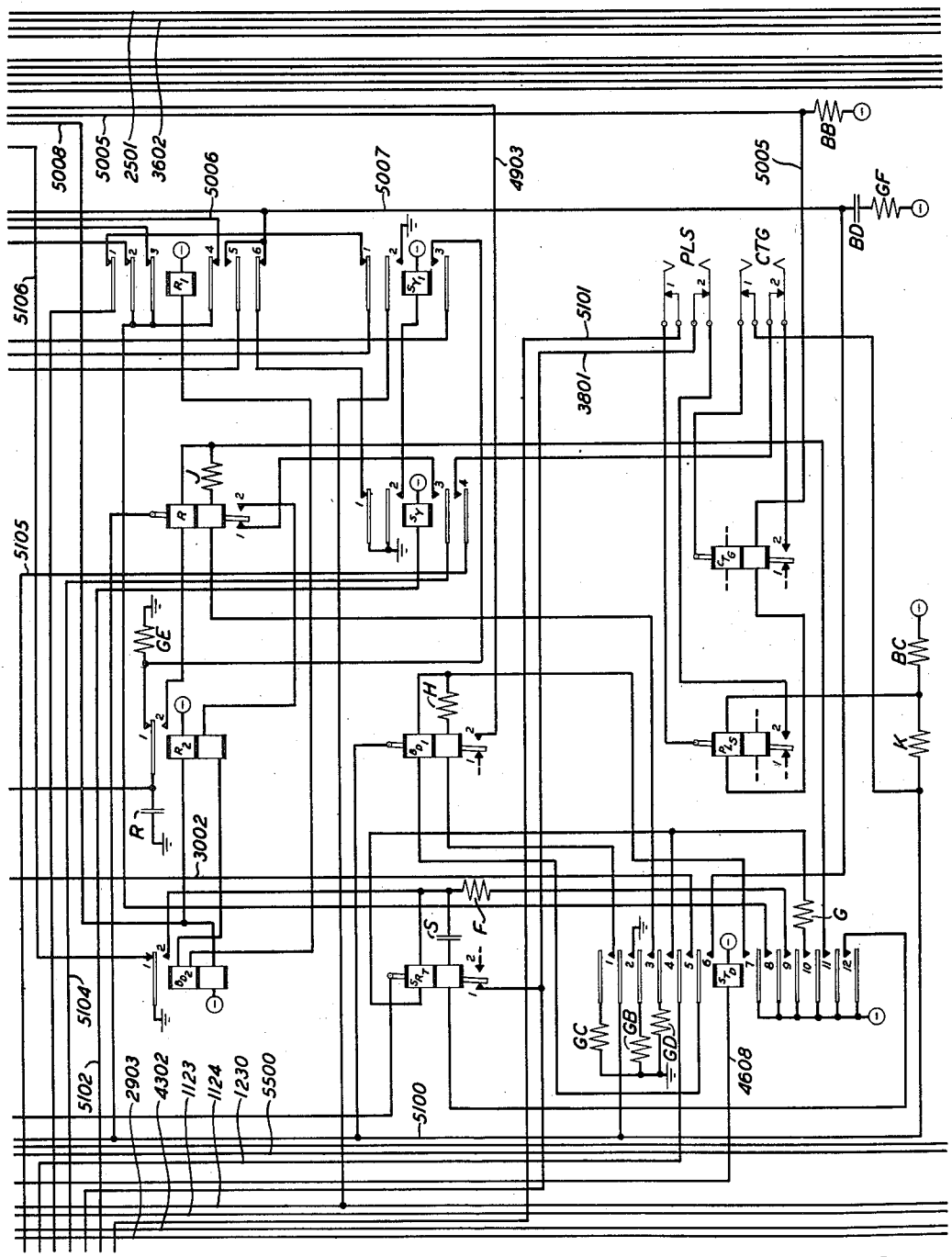
Figure 52:
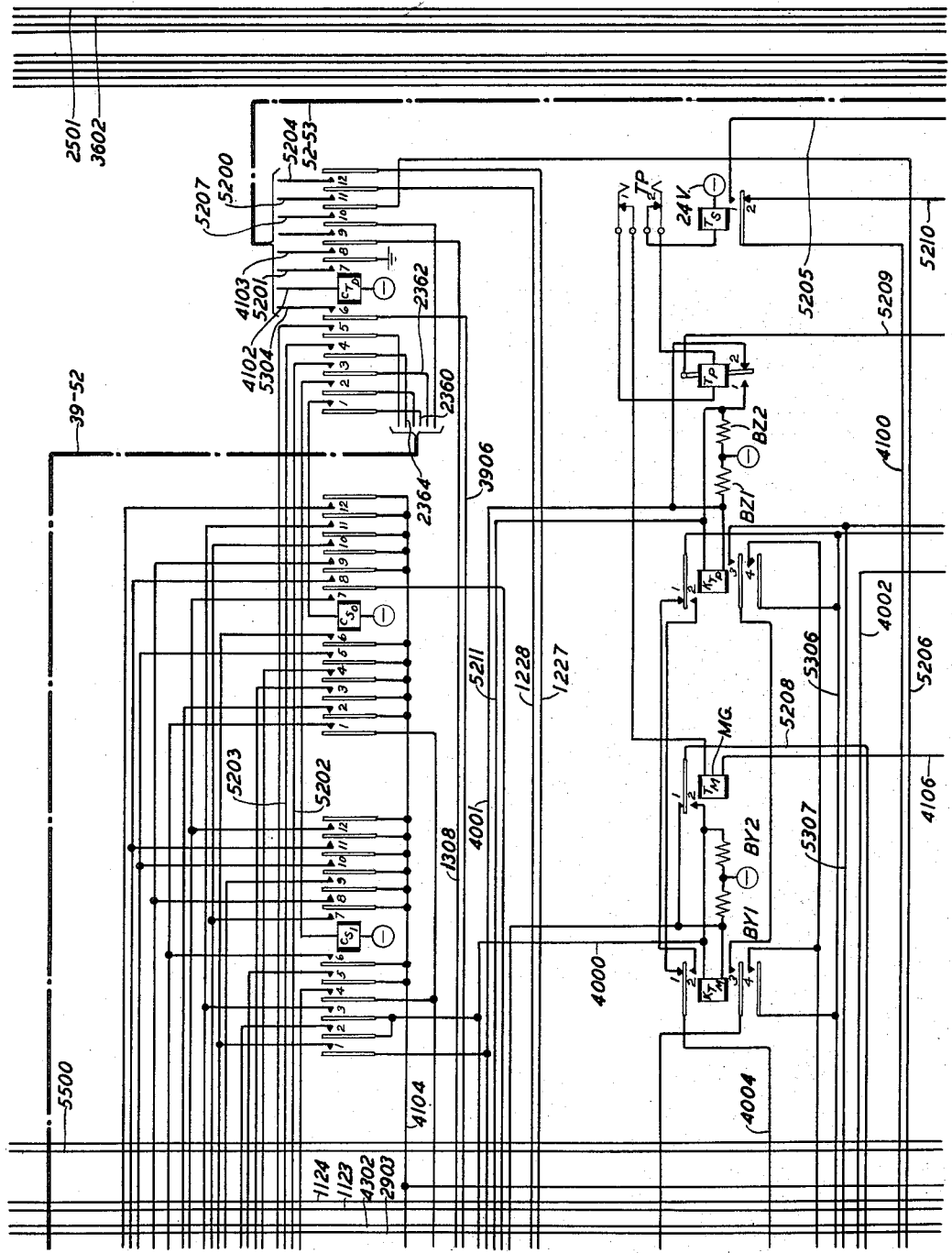
Figure 53:
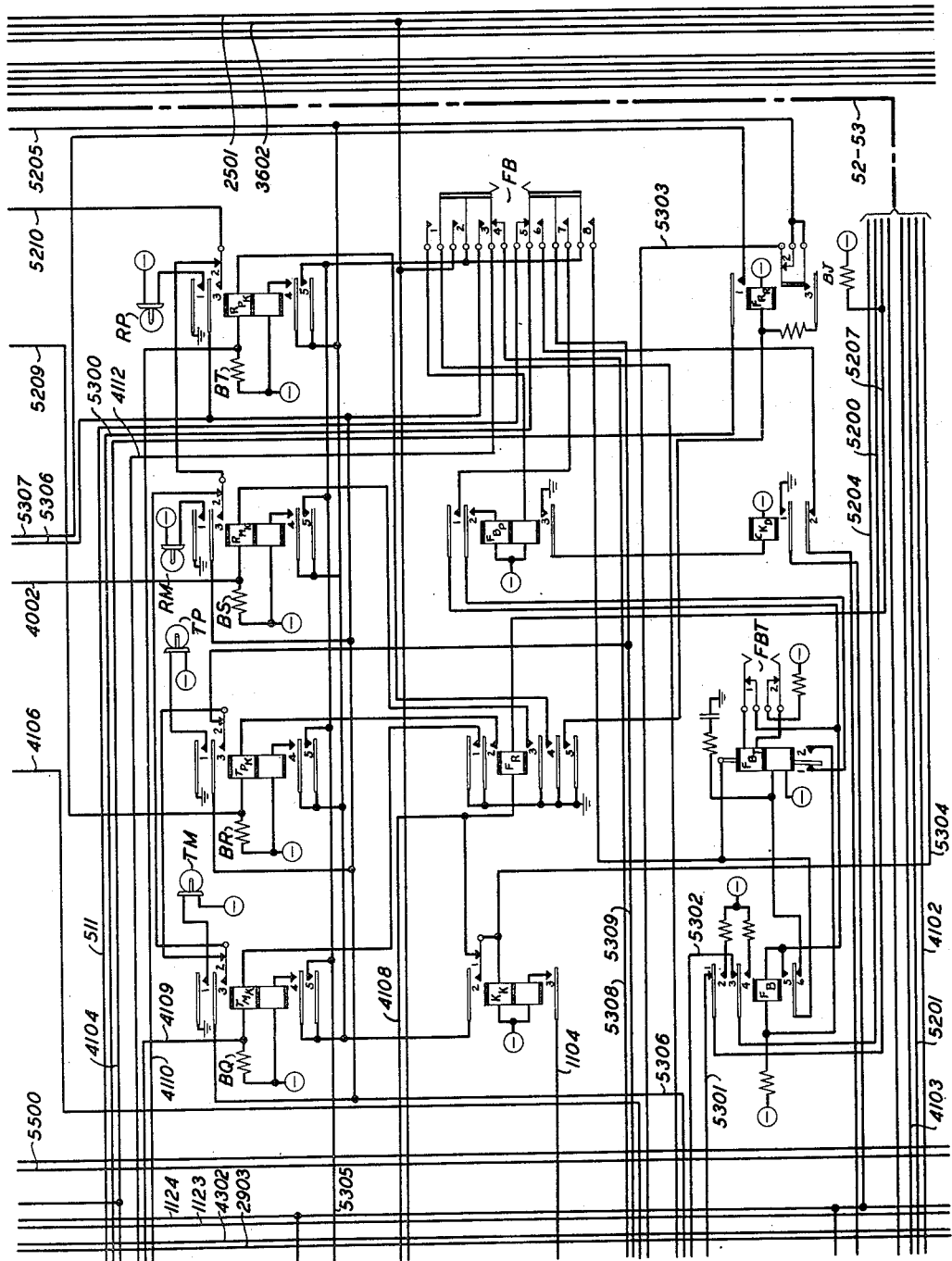
Figure 54:
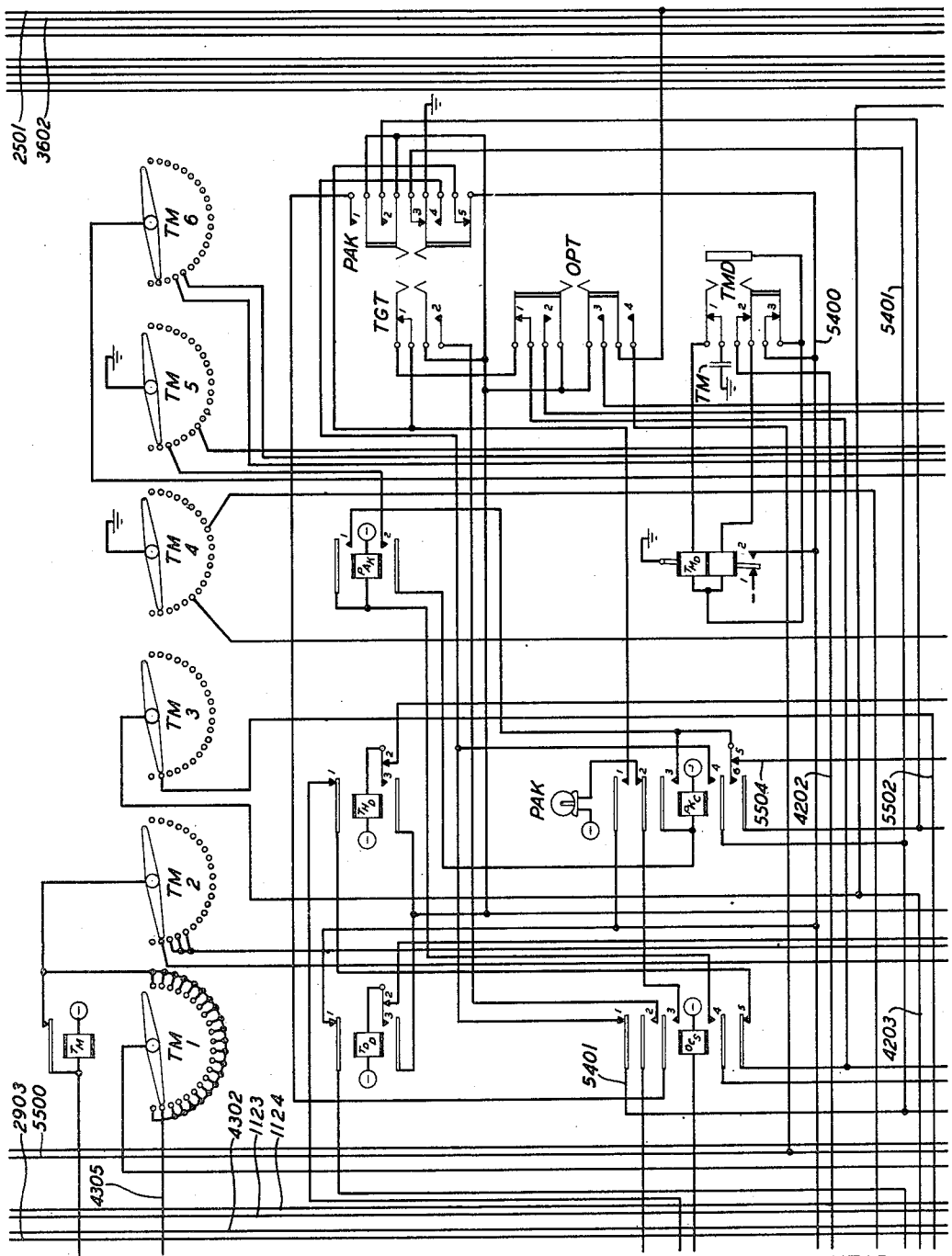
Figure 55:
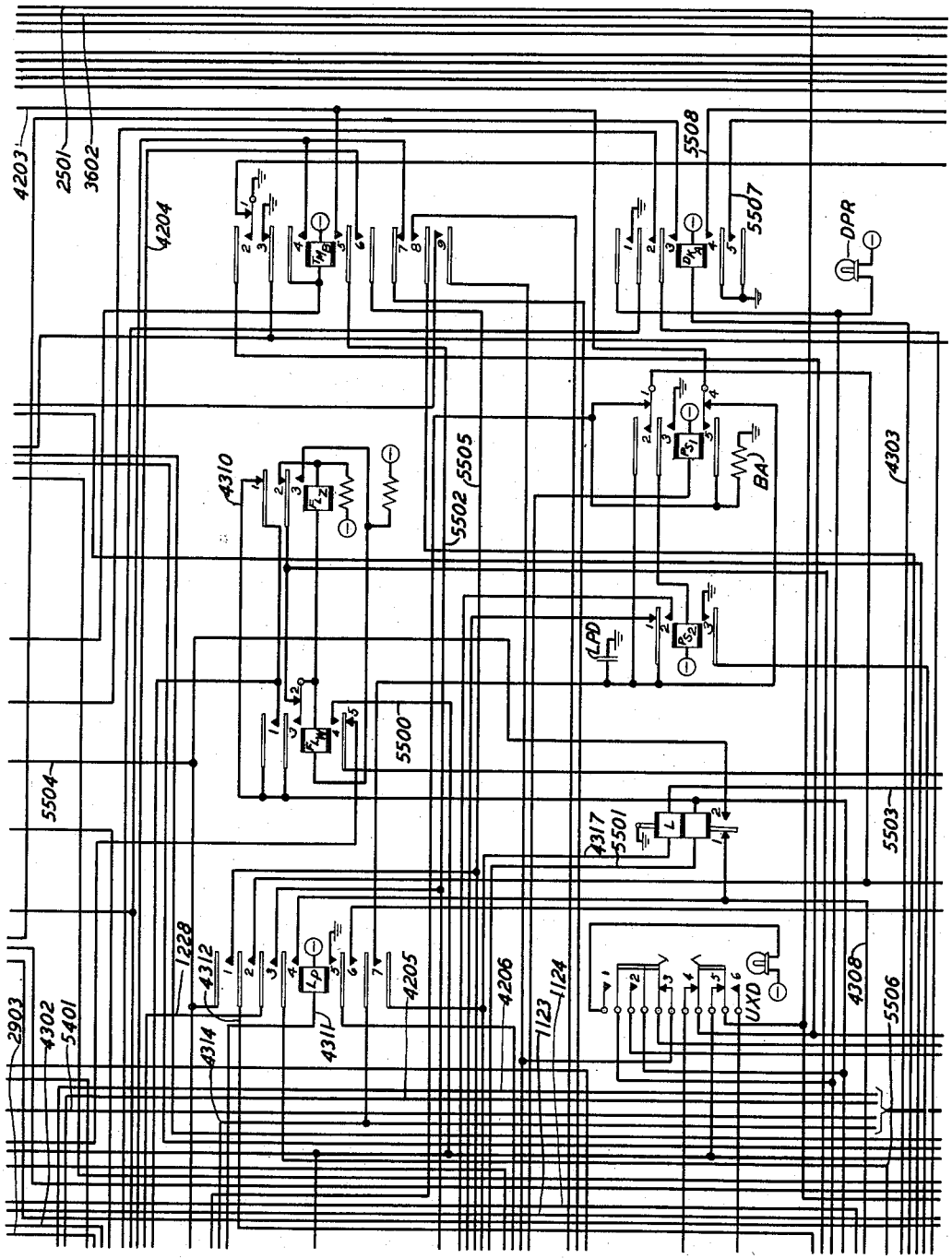
Figure 56:
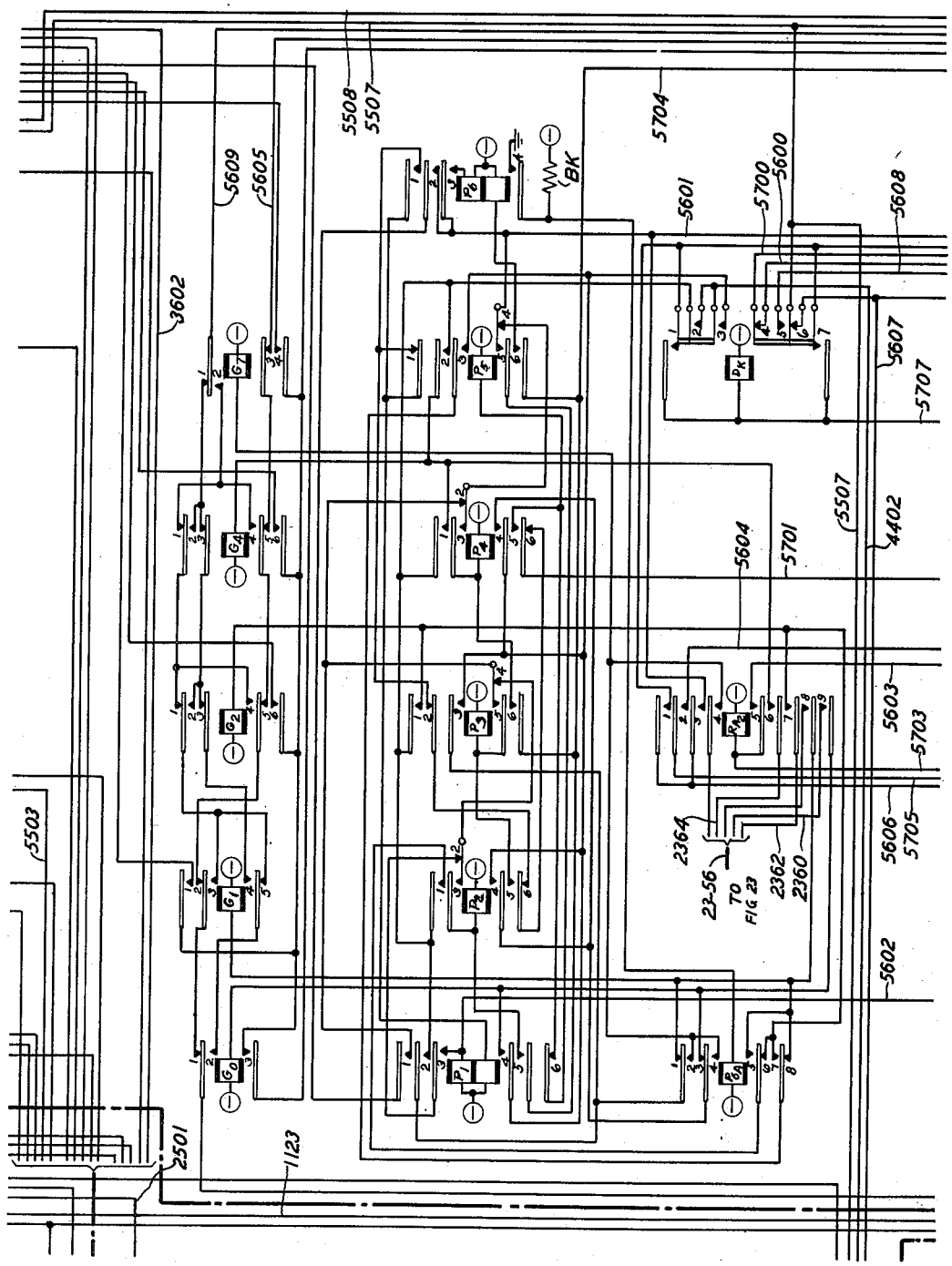
Figure 57:
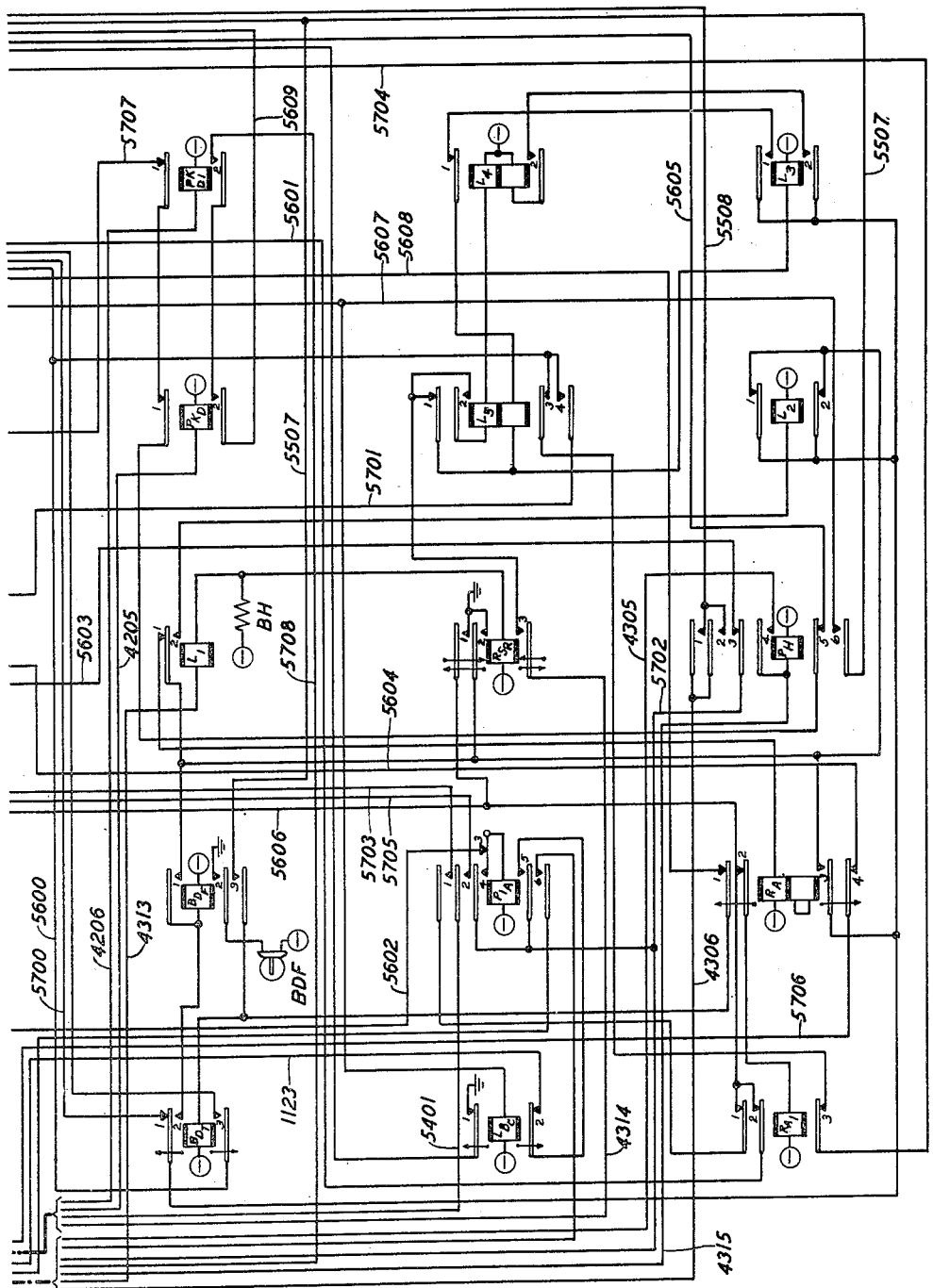

Figs. 19, 20, 21, 27, 28, 29 and part of Fig. 22 show the circuits for setting multifrequency senders;

Figs. 33, 34, 38, 49, 50, 51 and parts of Figs. 45 and 46 show the circuits for setting dial pulse senders;

Figs. 35, 47 and parts of Figs. 45 and 46 show the marker connection checking circuit;

Figs. 36, 37 and 48 show the circuits for receiving and checking digits received by multifrequency pulses;

Figs. 39, 40, 41, 52 and 53 show the circuits for receiving and checking digits received by direct-current code pulses;

Figs. 42, 43, 44, 54, 55, 56 and 57 show the circuits for receiving and checking digits received by dial pulses; and Fig. 58 shows the manner in which the remaining figures are to be arranged.

In general the elements of the circuit have been given functional designations, but, for convenience in locating the elements in the specification, each designation is followed by the number of the figure in which it is located, set off by parentheses. Where conductors are grouped into a cable, the cable has been given a number made up of the numbers of the two figures in which the cable terminates.

A brief description of the operation of an incoming sender in connection with a service call will assist in an understanding of the present disclosure. When an incoming trunk requires the services of a sender, it calls in the sender link control circuit which tests for a sender marked idle and connects the sender with the trunk over a plurality of circuits closed at the contacts of the cross-bar switches constituting a sender link. Over these conductors the sender indicates to the trunk that it has been attached, receives an indication of the class of the trunk and then splits the trunk to establish incoming and outgoing control and pulsing circuits. The wanted designation is transmitted to the sender over the incoming pulsing circuit. After a number of digits have been received the sender calls in a marker or decoder and transfers the code or codes thereto. The marker or decoder translates the code for the purpose of controlling the selection of an outgoing trunk and the connection of the selected trunk to the incoming trunk. It also returns to the sender an indication of the type of out-pulsing required, an indication of the time to be measured by the sender before establishing the out-pulsing circuit, an indication of any digits which are to be substituted for code digits registered, and an indication of the time of completing the connection between trunks. In response to these indications the sender sends out all or a part of the registered designation and then releases. The sender also makes a test of the outgoing supervisory circuit, which takes place before or after out-pulsing under the control of the class indications.

GENERAL DESCRIPTION

For a routine test of all of the senders of an office, a test designation is selected and is set up on the various key-sets, the area code on the area code key-sets ACA(6), ACB(6) and ACC(14), the office code on the office code key-sets OCA(14), OCB(14) and OCC(14), the numerical designation on the numerical key-sets TH(14), H(22), T(22) and U(22) and if used, a stations digit or a fifth numerical digit on the stations key-set STA(22). One of the keys MAN(25), DCR(25), MFR(25), LPD(43) or SXD(43) is operated according as the selected designation represents a call requiring that the sender send out no pulses, direct-current code pulses, multifrequency code pulses, loop dial pulses or simplex dial pulses. One of the keys 0TD(25), 3TD(25), 5TD(25) or 7TD(25) is operated according to the time interval which the sender is required to measure before connecting with the outgoing end of the trunk, in accordance with the type of outgoing trunk represented by the test designation. In addition, certain keys in the marker connection test circuit are operated in accordance with the assumed class of incoming trunk or other signal which the sender should pass to a marker or decoder.

The start key is then operated and the master selector MS(1) advances to the first sender selector after which the first sender selector advances to the first sender. In this position, which is associated with a sender which is to be set by multifrequency pulses, relay IMF(18) is operated. The trunk closure delay timing switch TCD(17) is preset in position 1, the pulse checking switch is preset to the position corresponding to the first key-set in which a key has been operated and then the multifrequency pulsing switch MFP(21) is set to the position corresponding to the first key-set in which a key has been operated.

In the meantime, the circuit for operating the test connector relays in the sender has been tested and those relays operated. The conductors connecting the sender with the test circuit, which are the same as those which connect the sender with the trunk, are tested first for crosses and then for the proper condition. A class signal is then passed to the sender and the response of the sender thereto is tested.

When the sender is ready to receive pulses it signals the test circuit and the code designation set up on the code key-sets is transmitted under the control of the switch MFP(21). The marker connection test circuit then functions to check the information passed from the sender to the marker and a signal is passed back to the sender simulating trunk selection and marker release. The trunk closure delay timing is then checked by switch TCD(17) and for most forms of out-pulsing the operation of the SL relay of the sender is tested. For dial type out-pulsing this test is delayed until after out-pulsing is completed.

Following the trunk closure delay test the remaining digits are transmitted to the sender and, for most calls, following the SL relay test the digits sent out by the sender are received and checked.

When all the digits sent out by the sender have been checked, the operation of the sender in controlling trunk cut-through and release are checked.

The test circuit then advances the sender selector to the next sender and the same tests are made on that sender. When all of the senders connected to the first sender selector have been tested, the master selector is advanced to the next sender selector. When the last multifrequency sender has been tested the dial type senders are tested, relay IDL(18) being operated and the designation sent to the sender under the control of switch DC(33).

DETAILED OPERATION

*Complete cycle—ten-digit number—MF in-pulsing MF out-pulsing*

In order to illustrate the over-all operation of the test circuit, it will be assumed that the test circuit is located in an office of the type disclosed in the above-identified McKim et al. patent and that a complete test cycle is to be made on all senders, using a designation made up of an area, route or systems code, an office code and a four-digit numerical line designation, and that all of the digits are to be out-pulsed by means of multifrequency pulses to an intertoll trunk.

Figure 14:
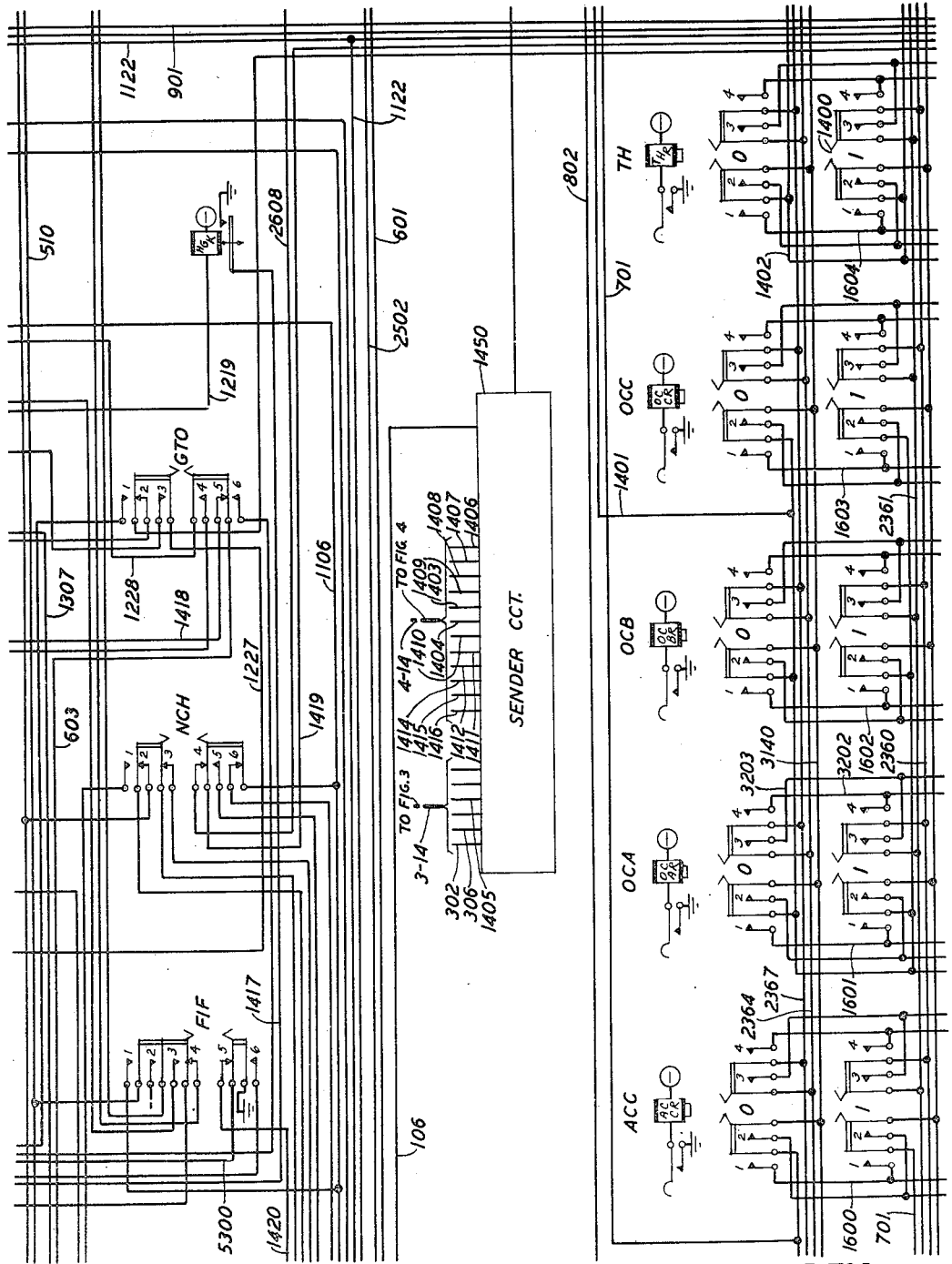
Figure 15:
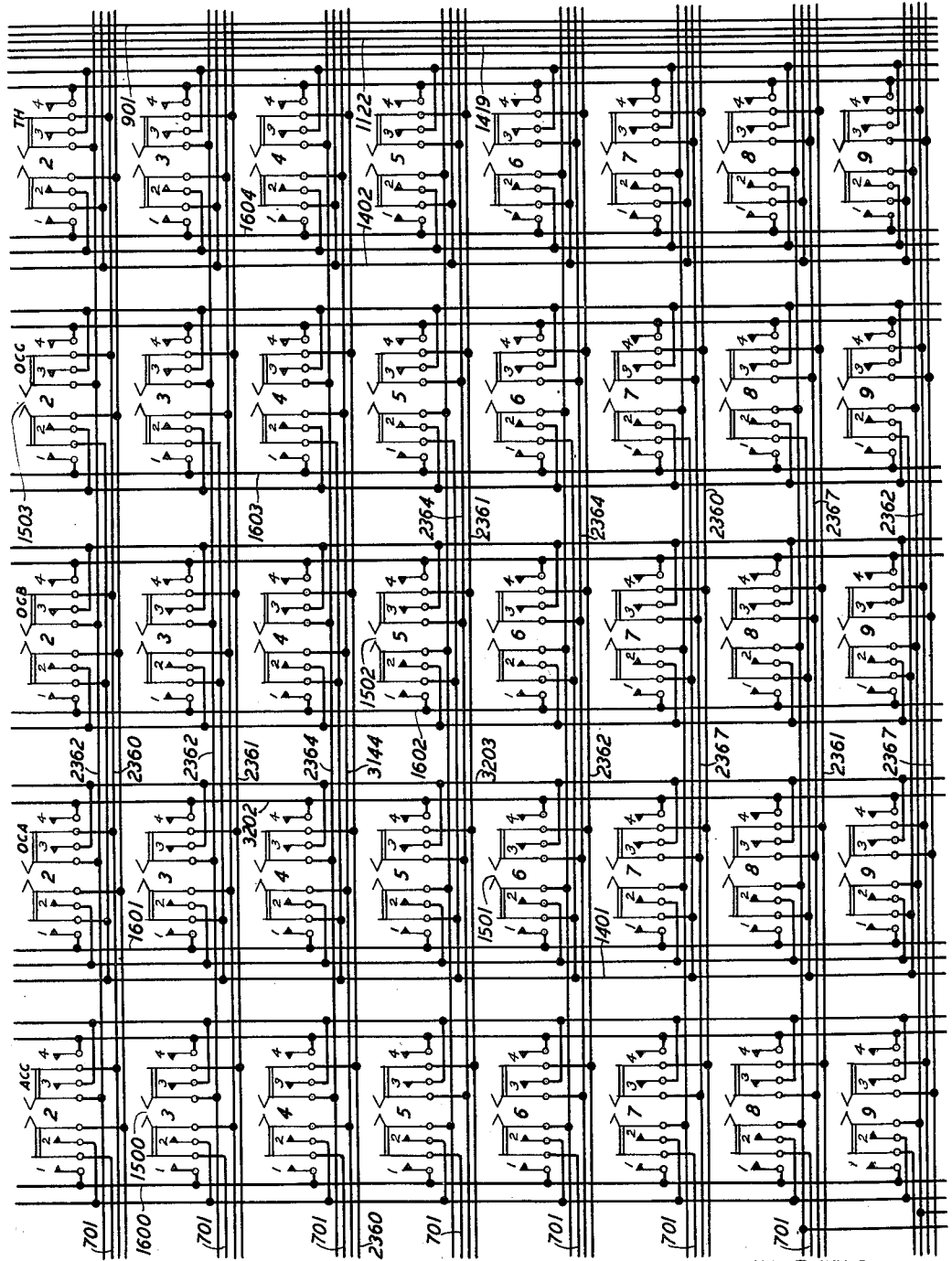

Assuming that all parts of the test circuit are normal and that a designation 403–652–1897 is to be used, the area code 403 will be set up on the area code key-sets ACA, ACB and ACC (Figs. 6, 7, 14 and 15) by operating key 700 (key 4 of ACA), key 600 (key 0 of set ACB) and key 1500 (key 3 of set ACC). The office code 652 is set up on the office code key-sets OCA, OCB and OCC (Figs. 14 and 15) by operating key 1501 (key 6 of set OCA), key 1502 (key 5 of set OCB) and key 1503 (key 2 of set OCC). The numerical designation is set up on the numerical key-sets TH, H, T and U (Figs. 14, 15, 22 and 23) by operating key 1400 (key 1 of set TH), key 2300 (key 8 of set H), key 2301 (key 9 of set T) and key 2302 (key 7 of set U).

One of the trunk class keys V0(46) or NV0(46) must be operated and it will be assumed that key NV0(46) is operated.

Key MFR(25) is operated to prepare the test circuit for checking the multifrequency pulses to be sent out by the sender.

One of the trunk closure delay keys 0TD(25), 3TD(25), 5TD(25) and 7TD(25) is operated in accordance with the requirements of the trunks associated with the area code used for the test. These keys control the measurement of a trunk closure delay of 0 second, .375 second, .575 second or .775 second, respectively. It will be assumed that the trunks associated with area code 403 require a .575-second trunk delay time interval and therefore key 5TD(25) will be operated.

It will be understood that the selection of the area code keys, the code conversion keys and the skip digit keys to be operated for any test will be governed by the conditions existing at the office in which the test circuit is located.

One of the dialing speed and per cent break keys corresponding to the desired in-dialing, to be used in testing dial type senders, is operated. These keys test the action of the sender in response to slow or fast dialing with maximum or minimum length pulses with or without a surge and should be used in rotation on successive test cycles. For this description it will be assumed that key 4900, 7 P. P. S. Max. (49), is operated, which tests the bias and adjustment of the pulsing relay in dial type senders and also the ability of the slow relay to hold over slow dial pulses.

Selection of sender

After the designation keys and the above-noted control keys have been operated, the start key ST(10) is operated. Key ST(10) closes a circuit for operating the locking cycle start relay LCS(2) which may be traced from battery through the winding of relay LCS(2), conductor 200, contact 1 of key ST(10), conductor 1000, to ground at the normally closed contact 4 of relay EC(2). Relay LCS(2) operates in this circuit and locks over its contact 6, conductor 201, normally closed contact 3 of key RN(10) to ground over conductor 1000.

Relay LCS(2) closes a circuit from ground over its contact 3, conductor 202, contact 2 of key ST(10), normally closed contact 2 of key PC(10), conductor 1001, winding of relay FST(2) to battery. Relay FST(2) operates and locks over its contact 4, contact 3 of relay CA1(2), contact 1 of relay EC(2), conductor 203, to ground at normally closed contact 2 of key RN(10). At its contact 5, relay FST(2) connects ground to conductor 204 which extends through cable 30-32 to battery through the winding of relay ON1(30).

Relay FST(2) also starts the operation of selecting a sender by connecting ground to conductor 205, and thence over the normal contact of brush MS4(1) of the master selector MS(1) and conductor 100 to battery through the lower winding of relay MSS(10). Relay MSS(10) operates in this circuit and closes a locking circuit for itself extending from battery through its upper winding and over its contact 2, conductor 1002 to ground at contact 1 of relay LCS(2). Ground connected to conductor 100 over the normal contact of brush MS4(1) also extends to battery through the winding of relay MSC(10), operating that relay, and over the back contact and through the winding of stepping magnet MS(1) of the master selector to battery, operating magnet MS(1) which opens its operating circuit at its back contact and steps the master selector to its first operative position, thereby opening the above-traced operating circuit for relays MSS(10), MSC(10) and the stepping magnet MS(1). Relay MSS(10) is locked as above described but relay MSC(10) releases.

With the master selector in its first off-normal position, connections are set up with the first of a plurality of sender selectors, which control the connection of the test circuit to groups of senders to be tested.

As soon as relay MSC(10) releases, circuits are closed for advancing the first sender selector SS(1) into connection with the first sender to which it has access. A circuit is closed for the selector advance relay SA(10) which may be traced from battery through the winding of relay SA(10), conductor 1003, contact 1 of relay STB(2), conductor 206, contact 1 of relay MSB(10), contacts 2 and 1 of relay MSC(10), contact 3 of relay MSS(10), contact 2 of relay MSA(10), conductor 1002 to ground at contact 1 of relay LCS(2).

Relay SA(10) operates in this circuit and closes a circuit from battery through the winding of relay SSG(1), conductor 101, contact 6 of relay SA(10), contact 1 of relay DSG(10), to ground at contact 1 of relay TCN(10). Relay SSG(1) operates in this circuit and locks over its contact 4 and conductor 102 to ground at contact 1 of relay SA(10).

With relay SSG(1) operated, a circuit is closed from ground over contacts 2 and 3 of relay SSG(1) in parallel, over contacts 4 and 5 of relay SSC(1) in parallel, over the first off-normal terminal of brush MS2(1) to battery through the stepping magnet SS(1) of sender selector SS(1). A circuit is also closed from ground over contacts 2 and 3 of relay SSG(1) and over contact 1 of that relay to battery through the winding of relay SSC(1) and resistance BF'(1). A branch of the operating circuit for magnet SS(1) extends over the back contact of that magnet, conductor 109, the first off-normal terminal of brush MS3(1) and contact 3 of relay SSC(1), to battery through resistance BF(1) in shunt of the winding of relay SSC(1). Magnet SS(1) operates in the circuit above traced, opening at its back contact the shunt around the winding of relay SSC(1) permitting that relay to operate. Relay SSC(1) in operating opens the circuit of magnet SS(1) which releases to advance switch SS(1) to its first off-normal position. Relay SSC(1), at its contact 3, opens the shunt around its winding so that it remains operated after magnet SS(1) releases. At its contact 2, relay SSC(1) connects ground to conductor 103 thereby completing a circuit to battery through the winding of relay DSG(10), operating the latter relay.

Relay DSG(10) closes a circuit from battery through the winding of relay STB(2), conductor 207, contact 4 of relay DSG(10), conductor 208, contact 1 of relay MSC(10), contact 3 of relay MSS(10), contact 2 of relay MSA(10), to ground over conductor 1002. Relay STB(2) operates in this circuit and locks over its contact 2, conductor 208 and thence as above traced to ground on conductor 1002. Relay STB(2) at its contact 1 opens the circuit of relay SA(10) and the latter relay releases.

The release of relay SA(10) opens the locking circuit of relay SSG(1) and that relay releases, in turn releasing relay SSC(1) and relay DSG(10).

With switch SS(1) in position 1, sender lamp 0(1) is lighted over brush SS2(1) and frame lamp F1(1) is lighted over brush SS(1) to identify the sender under test. As soon as switch SS(1) is advanced to its first off-normal or operative position, a circuit is closed for informing the test circuit as to the type of pulsing required for setting the associated sender. This circuit may be traced from ground at contact 1 of relay MSS(10), conductor 1004, brush MS6(1) in its first off-normal position, brush SS3(1) in position 1, contact 2 of key DL0(1), conductor 104 to battery through the winding of relay IMF(18). Relay IMF(18) operates to prepare the test circuit for sending multifrequency pulses to the sender under test. All of the terminals of brush SS3(1) which are associated with senders requiring multifrequency pulses, are strapped together and connected to the circuit for relay IMF(18), as are the similarly associated terminals of other sender selector switches. Terminals of sender selectors associated with senders requiring dial pulses, are connected over conductor 112, contact 2 of key MF0(1) and conductor 105 to battery through the winding of relay IDL(18) to prepare the test circuit to transmit dial type pulses. Relay IMF(18) at its contact 8 lights lamp IMF(18) to indicate the type of sender under test.

When relay SA(10) releases, following the advance of the sender selector SS(1), a circuit is closed for operating the test relays of the sender associated with position 1 of sender selector SS(1), which circuit may be traced from ground at contact 2 of relay FST(2), conductor 205, contact 3 of relay MSC(10), contact 3 of relay SA(10), contact 8 of key PC(10), conductor 1212, winding of relay TCN(10), conductor 1005, brush MSI(1) in position 1, brush SS5(1) in position 1, conductor 106 to the sender indicated by the box 1450. In the sender, conductor 106 extends in parallel to two test connector relays and battery. Relay TCN(10) is marginal so that it operates if the circuit is properly completed through two relay windings and fails to operate if the circuit of either or both test relays is open at the sender.

Assuming that relay TCN(10) operates, a circuit is closed from ground over contact 2 of relay TCN(10), contact 6 of relay MSA(10), conductor 1006, contact 9 of relay CAI(2), conductor 209, to battery through the winding of off-normal relay ON(11) to start the operation of the test circuit.

When relay ONI(30) operates, as above described, it closes a plurality of circuits for operating relays corresponding to the key-sets in which keys have been operated. These circuits may be traced as follows:

Battery through the winding of relay ACA(8), conductor 800, contact 1 of key 700, conductor 701 to ground at contact 2 of relay ONI(30); battery through the winding of relay ACB(8), conductor 801, contact 1 of key 600, to ground on conductor 701; battery through the winding of relay ACC(16), conductor 1600, contact 1 of key 1500, to ground on conductor 701; battery through the winding of relay OCA(16), conductor 1601, contact 1 of key 1501 to ground at contact 6 of relay ONI(30); battery through the winding of relay OCB(16), conductor 1602, contact 1 of key 1502 to ground on conductor 1401; battery through the winding of relay OCC(16), conductor 1603, contact 1 of key 1503 to ground on conductor 1401; battery through the winding of relay TH(16), conductor 1604, contact 1 of key 1400, conductor 1402 to ground at contact 3 of relay ONI(30); battery through the winding of relay H(24), conductor 2400, contact 1 of key 2300 to ground on conductor 1402; battery through the winding of relay T(24), conductor 2401, contact 1 of key 2301 to ground on conductor 1402; battery through the winding of relay U(24), conductor 2402, contact 1 of key 2302, conductor 2303 to ground at contact 7 of relay ONI(30). Therefore relays ACA(8), ACB(8), ACC(16), OCA(16), OCB(16), OCC(16), TH(16), H(24), T(24) and U(24) are operated immeditaely after the operation of relay ONI(30).

Since no keys are operated in sets CCH(7), CCT(7), CCU(7) and STA(22) the associated relays are not operated and circuits are closed for lamps CCH(8), CCT(8) and CCU(8) over the back contacts of the corresponding relays and conductor 802 to ground at contact 4 of relay ONI(30) and for lamp STA(24) over the back contact of relay STA(24) to ground on conductor 2303 to light these lamps. In addition, a circuit is closed from ground over contact 5 of relay ONI(30), conductor 3000 through cables 30-32 and 8-24, contacts 3 of relays CCU(8), CCT(8) and CCH(8), conductor 804 through cable 8-24, to battery through the winding of relay NSK(32).

Relay ON(11) when operated connects ground to conductors 1100 to 1111 to supply ground to various parts of the test circuit, the purpose of which will appear hereinafter. Ground on conductor 1101 completes an obvious circuit for relay CT(11). Ground on conductor 1103 completes a circuit through resistance AC(3) and the lower winding of relay TST(3) to electrically polarize that relay and cause it to hold its contact 1 closed. Ground on conductor 1104 completes a circuit to battery through the winding of relay TDS(17). Ground on conductor 1110 completes a circuit over contact 3 of relay TC0(4) to battery through the winding of relay XTT(4). Ground on conductor 1111 completes a circuit through cable 19-34 to battery through the winding of relay MCK(47).

When relay TDS(17) operates in the above-traced circuit it connects ground to conductor 1704 to light lamp MFR(25) over contact 7 of key MFR(25). It also connects ground over its contact 1 through resistances AF(17) and BA(17) to battery to supply a reduced potential for the timing relays TDA(17) and TDT(17). This reduced potential is connected through resistance AE, contact 1 of jack TDA(17), winding of relay TDA(17), contact 2 of jack TDA(17), contact 1 of jack TDT(17), upper winding of relay TDT(17), contact 3 of jack TDT(17) through resistance BB(17) to full battery potential, thus energizing relay TDA(17) in a direction to close its contact 2. A second circuit extends from full battery potential over contact 3 of jack TDT(17) through the lower winding of relay TDT(17) over contact 2 of jack TDT(17) to ground through resistances AA(17) and AB(17) and condenser TDT(17). However, resistance AB(17) and condenser TDT(17) are shunted by a branch circuit extending over contact 1 of relay LMK(17) and conductor 1700 to ground at contact 3 of relay TDS(17). The energization of the lower winding of relay TDT(17) in this circuit overcomes the effect of the upper winding and holds contact 1 of relay TDT(17) closed.

Relay TDS(17) closes a circuit for checking the normal condition of the trunk closure delay checking apparatus and the operative condition of relay TCK(17) by closing a circuit from battery through the winding of relay TCK(17), conductor 1701, resistance KA(17), contact 2 of relay TDS(17), normal contact and brush TCD2(17) of the trunk closure delay timing switch, contact 5 of relay DF2(17), contact 5 of relay DF1(17), contact 6 of relay TDK(17), conductor 1702 to ground at contact 6 of relay BLK(11).

Relay TCK(17), if properly adjusted, operates and closes a circuit from ground over its contact 2, conductor 1703, terminal of brush TCDI(17) in normal position, back contact and winding of stepping magnet STEP(17) of switch TCD(17) to battery and in parallel therewith through the winding of relay TDG(12) to battery. Relay TDG(17) operates but has no function at this time. Magnet STEP(17) operates, opening its back contact and releases to advance switch TCD(17) to its first off-normal position. The advance of brush TCD2(17) opens the circuit of relay TCK(17) which also releases. The trunk closure delay circuit now awaits action by other parts of the test circuit.

*Presetting the pulse checking switch*

Ground connected to conductor 1100 initiates the presetting of the pulse check and control circuit required to check the designation as sent out by the sender. It will be remembered that key MFR(25) was operated on the assumption that the test code requires multifrequency outpulsing by the senders. Therefore the connection of ground to conductor 1100 completes a circuit over contact 2 of key MAN(25), contact 1 of key MFR(25), conductor 2500 to battery through the winding of relay MFR(37).

Relay MFR(37) operates in this circuit. At its contact 4 relay MFR(37) connects ground over conductor 3700, normal terminal of brush MFK1(48), back contact and winding of stepping magnet MFK(48) to battery. A branch of this circuit extends over conductor 4823 to the winding of relay MKG(37) and over contacts 1 and 4 of relay PMR(37) to battery through resistance BT(37). Relay MFR(37) at its contact 6 connects ground to the winding of relay PMR(37), resistance BT(37) and battery but the circuit above traced to resistance BT(37) prevents the operation of relay PMR(37). Magnet MFK(48) operates in the circuit traced, opening its own circuit to step switch MFK(48) to position 1 in which the previously traced shunt around the winding of relay PMR(37) is opened. For tests in which some or all of the code digits are not to be sent out, relay MFR(37) at its contact 7 closes a shunt around the winding of relay PMR(37), which extends over conductor 3713 and brush MFK2(48) in normal position and position 1 to a back contact of relay ACA(8) and back to conductor 2508. This circuit also serves to operate magnet MFK(48) to further advance switch MFK(48). Under the present assumption, relay ACA(8) is operated and no such shunt is closed. Therefore, relay PMR(37) operates as soon as switch MFK(48) advances to position 1, opening the circuit for operating magnet MFK(48) and leaving switch MFK(48) in position 1. Relay PMR(37) closes a circuit from ground at contact 4 of relay TDS(17), conductor 1704, contact 3 of relay PMR(37), conductor 3701, contact 10 of relay IMF(18), conductor 1800 to battery through the winding of relay MFA(26) to indicate that switch MFK(48) has been preset.

Relay MFR(37) at its contact 1, connects ground to conductor 3708 and battery through the winding of relay BAT(36) operating the latter relay which connects battery over its contacts 1, 2, and 3 to conductors 4811, 4812 and 4813 to prepare the multifrequency pulsing receiving circuit of Fig. 48 for operation.

*Presetting of in-pulsing switch*

Since relay ACA(8) is operated, the operation of relay MFA(26) closes a circuit which may be traced from ground over contact 3 of relay ACA(8), conductor 803 through cables 8-24 and 30-32, contact 1 of relay MFA(26), conductor 2600, through cable 18-22 to battery through the winding of relay ACU(22).

Relay MFA(26) also closes a circuit from ground at contact 3 of relay TDS(17), conductor 1700, contact 5 of relay MFA(26), conductor 2601 to battery through the winding of multifrequency start relay MFS(29). Relay MFS(29) operates in this circuit and closes a circuit from ground over its contact 3, conductor 2900, normal terminal of brush MFP1(21) of the multifrequency pulsing control switch MFP(21), back contact and winding of stepping magnet MFP-(21) to battery. Magnet MFP(21) operates, opens its back contact and releases, advancing switch MFP(21) to position 1. This position is used for testing the reaction of the sender to a false key pulse under the control of keys 3FKP-(22) or FKP(22). With neither of these keys operated, a circuit is now closed from ground over contact 6 of relay MFS(29), conductor 2901, brush MFP2(21) in position 1, conductor 2100, contact 1 of key 3FKP(22), contact 4 of key FKP(22), contacts 2200, contacts 3 and 2 of relay MPS(29), conductor 2902 over the back contact and through the winding of stepping magnet MFP(21) to battery, operating that magnet. Relay MFS(29) at its contact 5 closes a circuit from ground through the winding of relay MPS(29) and resistance BT(29) to battery, but a branch of the circuits traced for magnet MFP(21) extends over contact 5 of relay MPS(29) to resistance BT(29) in shunt of the winding of relay MPS(29). Other branches extend to battery through the windings of relay MFG(29) to battery, operating the latter relay in parallel with the stepping magnet, but relay MFG(29) has no function at this time. When magnet MFP(21) operates, it opens its back contact, interrupting its operating circuit and releases to advance switch MFP(21) to position 2. When brush MFP2(21) leaves position 1, the shunt around the winding of relay MPS(29) is opened and that relay operates, further opening the circuit of magnet MFP(21) and releasing relay MFG(29).

When relay MFS(29) operated, it also closed a circuit from battery through the winding of relay GL(29), contact 4 of relay MFS(29), conductor 2903, contact 1 of relay BLK1(11) to ground on conductor 1109. Relay GL(29) operates in this circuit and closes a plurality of circuits the purpose of which will appear hereinafter.

Relay MFS(29) at its contact 7 closes an obvious circuit for operating relay AC(29). Relay AC(20) closes a circuit from ground over its contact 6, conductor 2904, contact 2 of relay KS(20), conductor 2000, contact 1 of relay PC3A(27) to battery through the winding of relay PC1(27) and over contact 1 of relay FGK(27) to battery through lamp FGK(27).

Relay PC1(27) operates, closing a circuit from ground connected as above traced to conductor 2000, over contact 1 of relay PC1(27) to battery through the winding of relay PC2(27). Relay PC2(27) operates and locks over its contact 2 to ground on conductor 2000. At its contact 6 relay PC1(27) closes an obvious circuit for relay PCT(27). At its contact 7 relay PC1(27) connects ground to conductor 2700 completing a circuit to battery through the winding of relay PR(28). Relays PCT(27) and PR(28) operate, relay PR(28) lighting lamp PR(27). The multifrequency in-pulsing circuit now awaits a signal to start pulsing.

When relay CT(11) operates in response to the operation of off-normal relay ON(11), it connects battery through 8500-ohm resistance AA(11) over contact 1 of relay CA(11), conductor 1112, contact 1 of relay TC(3), contact 1 of relay BTB(3), upper winding of relay TST(3) to +130-volt battery to test the adjustment and non-operate bias of the latter relay. Relay CT(11) also connects ground over its contact 4, conductor 1113, contact 7 of relay TC(3) to battery through the winding of relay SR(3), operating the latter relay. Relay SR(3) at its contact 1 closes a circuit for lighting lamp BY(3) over contact 4 of relay BTC(3).

If relay TST(3) operates falsely in the above-traced circuit it closes a circuit from ground at contact 1 of relay SR(3), contact 2 of relay TST(3), conductor 300, contact 1 of relay AT(11), conductor 1114, contact 7 of relay BTC(3) to battery through test operate failure relay TOF(3). Relay TOF(3) if operated locks over its contact 2 to ground on conductor 1101, lights lamp TOF(3) over its contact 3 and at its contact 1 extends ground from conductor 1101 over conductor 301, contact 1 of relay SK2(11) and conductor 508 to battery through the lower winding of relay BLK(11) to block the operation of the test circuit.

Relay CT(11) at its contact 2 connects the protective network made up of condenser CD(11) and resistance CA(11) to terminal 2 of tube VI(11) and at its contact 3 connects resistance AB(11) in parallel with the winding of relay AT(11).

*Testing condition of sender*

Assuming that relay TST(3) does not operate, the sender, with which the test circuit is connected, is tested to determine whether it is idle, by closing a circuit from battery through the winding of relay BT(3), contact 4 of relay SR(3), contact 4 of relay HRP(3) to conductor 302 which extends through cable 3-14 to sender 1450. If the sender is busy, conductor 302 is open in the sender, but as soon as the sender becomes idle ground is connected to conductor 302, operating relay BT(3). Relay BT(3) locks over its contact 2 to ground in the sender independent of relay SR(3).

Relay BT(3) closes a circuit from ground over contact 1 of relay SR(3), contact 1 of relay TST(3), contact 2 of relay TC(3), contact 1 of relay BT(3) to battery through the winding of relay BTA(3).

Relay BTA(3) operates and at its contact 1, closes an operating circuit for relay BTB(3). Relay BTB(3) operated, closes a circuit from ground at contact 1 of relay SR(3), contact 4 of relay BTB(3) to battery through the winding of relay BTC(3) operating relay BTC(3).

Relay BTC(3) at its contact 4 opens the circuit of lamp BY(3) and closes a circuit from ground at contact 1 of relay SR(3) over contact 5 of relay BTC(3), contact 9 of relay TC(3) to battery through lamp DT(3). In addition relay BTC(3) closes a circuit from ground over its contact 3, contact 3 of relay BTB(3) to battery through the winding of relay DTC(3). At its contact 7, relay BTC(3) opens the circuit of relay TOF(3) to prevent its operation when relay TST(3) operates subsequently.

Relay DTC(3) when operated closes a circuit from ground on conductor 1102, contact 2 of relay DTC(3) to battery through the winding of relay BTT(3) and connects ground on conductor 1102 over its contact 3 and contact 1 of relay BT(3) to the winding of relay BTA(3) to hold that relay operated. Relay DTC(3) at its contact 4 connects +130-volt battery and resistance DTC(3) over conductor 303 to terminal 1 of tube VI(11).

Relay BTT(3) closes a circuit from battery through the winding of relay BTK(11), conductor 1115, contact 2 of relay BTT(3) to ground over conductor 1102.

A test is now made to determine whether a link controller circuit has selected this sender for use in connection with a service call. If the sender has not been selected, negative battery will be connected to conductor 1405, while, if a link controller circuit is connected with the sender, positive potential will be connected to that conductor. Conductor 1405 is connected through cable 3-14, over contact 5 of relay BTB(3), conductor 304, through the winding of relay AT(11) in parallel with resistance AB(11) and contact 3 of relay CT(11) to terminal 4 of tube VI(11). +130-volt battery is connected by relay DCT(3) as previously traced to terminal 1 of tube VI(11) while terminal 2 is connected over contact 2 of relay BTB(3) to positive battery through the upper winding of relay TST(3).

If positive battery is connected to conductor 1405, the test circuit waits until it has been removed. If a controller tests at the same time as the test circuit relay AT(11) operates the circuit waits until the controller withdraws its test. With negative battery on conductor 1405, tube VI(11) breaks down, operating both relay TST(3) and relay AT(11). With these two relays operated a circuit is closed from ground at contact 1 of relay SR(3), contact 2 of relay TST(3), conductor 300, contact 2 of relay AT(11), conductor 1116, to battery through the winding of relay TC(3).

Relay TC(3) operates in this circuit and locks over its contact 4 to ground on conductor 1102. With relay TC(3) operated, ground from conductor 1102 is connected to conductor 305, and relay BTC(3) locks thereto over its contact 6, while relay BTK(11) also locks thereto over its contact 1. At its contact 7, relay TC(3) opens the circuit of relay SR(3) which starts to release. At its contact 5, relay TC(3) connects together terminals 1 and 4 of tube VI(11), quenching the tube and releasing relays TST(3) and AT(11).

When relay SR(3) releases and closes its contact 2, it completes a circuit from ground at contact 6 of relay SK1(4), conductor 400, contact 2 of relay SR(3), contact 2 of relay BTC(3), contact 5 of relay HRP(3), conductor 306 through cable 3-14 to the sender 1450, operating the make-busy relay of the sender which in turn removes ground from conductor 302, releasing relay BT(3).

With relay BT(3) released, biasing circuits are closed for relays SN(3) and MG(3) extending from ground at contact 1 of relay BTC(3), contact 5 of relay BT(3), upper winding of relay SN(3), contact 10 of relay BTC(3) to battery through resistance BC(3) and from ground at contact 1 of relay BTC(3), contact 6 of relay BT(3), lower winding of relay MG(3), contact 9 of relay BTC(3) to battery through resistance BB(3). At its contact 1, relay BT(3) opens the circuit of relay BTA(3) which releases slowly, to allow time for the link controller to disconnect from conductor 1405.

Relay BTA(3) when released, in turn releases relay BTB(3), followed by relay DTC(3) and relay BTT(3), the latter relay also releasing slowly. With relays BTB(3) and DTC(3) released, conductor 1405 is connected over contact 6 of relay BTB(3), contact 8 of relay BTC(3), through the lower winding of relay SN(3) and the upper winding of relay MG(3), contact 2 of relay LK(3), conductor 307, contact 1 of relay DTC(3) to ground on conductor 1102. Relays SN(3) and MG(3) serve to make a marginal test of the value of the resistance connected to conductor 1405 in sender 1450.

Relays SN(3) and MG(3) are so adjusted that if the resistance connected to lead 1405 is less than 1800 ohms, both relays operate; if more than 1800 ohms but less than 5500 ohms, relay SN(3) operates alone and if more than 5500 ohms neither relay operates. With both relays operated, when relay BTT(3) releases a circuit is closed from ground on conductor 1102, over contact 1 of relay DTC(3), conductor 307, contact 2 of relay BTK(11), conductor 1117, contact 1 of relay BTT(3), contact 2 of relay SN(3), contact 2 of relay MG(3), contact 4 of relay LK(3) to battery through lamp —DT(3). If neither relay operates a circuit is closed which extends as above traced to contact 1 of relay BTT(3) and thence over contact 1 of relay SN(3), contact 1 of relay LK(3) to battery through lamp +DT(3). In either case the test circuit cannot proceed with its operation.

If the resistance on conductor 1405 is satisfactory and relay SN(3) operates alone, a circuit is closed from ground as above traced to contact 2 of relay SN(3) and over contact 1 of relay MG(3) to battery through the winding of relay LK(3). Relay LK(3) operates and locks over its contact 3, conductor 307, contact 1 of relay DTC(3) to ground on conductor 1102. Relay LK(3), at its contacts 4 and 1, opens the circuits of lamps —DT(3) and +DT(3) and, at its contact 5, connects ground to conductor 398, completing a circuit over the contact of relay XTT(4), to battery through the winding of relay XK(4) to initiate a test of the sender selector multiple to determine that no crosses exist thereon.

*Test of control conductors*

With relay XK(4) operated, ground on conductor 1110 is connected over contact 1 of relay XK(4) to battery through the winding of relay TC0(4). Relay TC0(4) operates and locks over its contact 2 to ground on conductor 397. At its contacts 2 to 5 and 7 to 12, relay XK(4) connects conductors 1408, 1409, 1403, 1404, 1410, 1411, 1412 and 1414 to 1416 of the sender, which are the conductors which appear in the sender selector multiple, to appropriate testing circuits. Conductors 1416, 1415, 1411 and 1410 which are normally open when the sender is seized are connected over contacts 2, 3, 7 and 8 of relay XK(4) in multiple to 24-volt battery through the lower winding of relay XA(4). Conductors 1414, 1412 and 1409 which are normally connected to 48-volt battery in the sender, are connected over contacts 4, 5 and 11 of relay XK(4) in multiple to 48-volt battery through the upper winding of relay XA(4). Conductor 1403, which is normally connected to ground in the sender, is connected over contact 10 of relay XK(4) to ground through the lower winding of relay XB(4). Conductors 1404 and 1408 are differently connected in senders equipped to receive dial pulses and in senders equipped to receive multifrequency pulses. If the sender under test receives dial pulses, relay IND(4) is operated; but since the sender under test is assumed to be one that receives multifrequency pulses it is not operated at this time. Therefore, conductor 1404, which is normally grounded in a multifrequency sender, is connected over contact 9 of relay XK(4) and contact 1 of relay IND(4) to ground through the lower winding of relay XB(4). Conductor 1408, which is normally connected to 48 volts in a multifrequency sender, is connected over contact 12 of relay XK(4) and contact 5 of relay IND(4) to 48-volt battery through the upper winding of relay XA(4).

If any one of the leads tested is crossed with a foreign potential, relay XA(4) or XB(4) will operate. Relay XA(4) operates relay XB(4) if the latter relay is not operated and relay XB(4) locks through its upper winding and over its contact 2 to conductor 307, lights lamp X(4) at its contact 3 and prevents the further operation of the test circuit.

Relay TC0(4), which operates following the operation of relay XK(4) as above described, opens the circuit of relay XTT(4) but the latter relay is slow to release to allow time for relays XA(4) or XB(4) to operate before opening the circuit of relay XK(4) and causing that relay to release. Relay TC0(4) at its contact 4 connects ground on conductor 1110 to conductor 402, completing a circuit over contact 2 of relay SC(12), conductor 1201, contact 2 of relay SK(5), conductor 502, contact 9 of relay COK(12), conductor 1202 to battery through progress lamp OS(20), to indicate that the S relay of the sender is to be operated.

When relay XK(4) releases, assuming that relays XA(4) and XB(4) have not been operated, a circuit is closed from conductor 1412, over contact 6 of relay XK(4), contact 2 of relay XA(4), contact 1 of relay XB(4), contact 5 of relay TC0(4), conductor 401, winding of relay SC(12), contact 4 of relay SCA(12), conductor 1200, contact 1 of relay SCK(5), to ground on conductor 1107. Conductor 1412 extends in the sender to battery through the winding of the S relay which operates in series with relay SC(12), relay SC(12) also operating in the above-traced circuit.

Relay SC(12) at its contact 2 opens the circuit of lamp OS(20) and completes a circuit from ground connected to conductor 402, as above traced, contact 3 of relay SC(12), conductor 1203, contact 6 of relay SK(5) to battery through the winding of relay SK(5). Relay SK(5) operates in this circuit and locks over its contact 7 to ground on conductor 1107. Relay SC(12) also closes a circuit from ground at contact 1 of relay SPK(12), contact 4 of relay SC(12), conductor 1204 to battery through lamp OSP(20).

Relay SK(5) closes a circuit from ground over its contact 1, conductor 503 to battery through the winding of relay SKI(4). With relay SK(5) operated, it extends its operating ground over its contact 5, conductor 504 and thence over contact 1 of relay SPC(12) and conductor 1205 to battery through lamp OCL(20). Relay SKI(4) at its contact 6 disconnects ground from conductor 306, releasing the make-busy relay of the sender but the operation of the sender S relay as above described prevents the reconnection of ground to conductor 302.

*Test of trunk class registration*

The test circuit is now ready to test the trunk class registration functions of the sender. In preparation for receiving trunk class registration the sender connects 48-volt battery to conductor 1409 and 24-volt battery to conductor 1410. Dial senders also connect 24-volt battery to conductor 1411. With 48-volt battery on conductor 1409, a circuit is completed over contact 3 of relay SKI(4), conductor 403, contact 6 of relay SPA(12), contact 1 of relay CLC(12), conductor 1206, winding of relay TIK(4) and resistance TIK(4) to ground, operating relay TIK(4). With 24-volt battery on conductor 1410, a circuit is completed over contact 1 of relay SKI(4), conductor 404, contact 1 of relay SP(12), contact 5 of relay CLC(5), conductor 1207 to ground through the winding of relay KTK(4). Conductor 1411 is connected over contact 2 of relay SKI(4), conductor 405, contact 7 of relay SP(12), contact 8 of relay CLC(12), conductor 1208 to ground through the winding of relay KRK(4), but since a multifrequency sender is being tested this circuit is not completed, its contact being by-passed by a contact on relay IMF(18).

Relays TIK(4) and KTK(4) operate if the class recording circuits are complete, and a circuit is closed from ground on conductor 1110, contact 4 of relay TC0(4), conductor 402, contact 3 of relay SC(12), conductor 1203, contact 5 of relay SK(5), conductor 504, contact 2 of relay TIK(4), conductor 406, contact 1 of relay IMF(18), which is operated to indicate that a multifrequency sender is being tested, conductor 1801, contact 2 of relay KTK(4), conductor 407, contact 2 of relay COK(12) to battery through the winding of relay SPC(12). Relay SPC(12) operates in this circuit and locks over its contact 3 to ground on conductor 1105. With relay SPC(12) operated the circuit of lamp OCL(20) is opened, extinguishing that lamp, and a circuit is closed, extending as previously traced from ground to conductor 504, over contact 2 of relay SPC(12), contact 10 of relay COK(12), conductor 1209 to battery through lamp OC0(20).

Relay SPC(12) closes the testing circuit for the trunk splitting relays of the sender. This circuit extends from conductor 1415 leading to sender 1450, contact 2 of relay ME(11), conductor 1118, contact 4 of relay SPC(12), contact 4 of relay KW0(12), windings of relays SPK(12) and SP(12) to battery. The resistance ground initially supplied by the sender to conductor 1415 operates relay SPK(12) and the associated sender relay indicating that the circuit is complete, but marginal relay SP(12) does not operate at this time. Relay SPK(12) at its contact 1 opens the circuit of lamp OSP(20), extinguishing that lamp. At its contact 2, relay SPK(12) connects ground to the winding of relay SPI(12) and battery, operating the latter relay.

Relay SPI(12) completes a circuit from battery through the winding of relay CLC(12), contact 2 of relay SPI(12), conductor 1210, contact 8 of relay SP2(4) to ground at contact 7 of relay SKI(4), operating relay CLC(12).

The sender relay in operating causes the connection of ground to conductors 1412 and 1416. Ground on conductor 1412 shunts the winding of relay SC(12) which therefore releases.

Relay SC(12) in releasing closes a circuit from battery through the winding of relay SCA(12), conductor 1211, contact 3 of relay SK(5), conductor 1201, contact 2 of relay SC(12), conductor 402, contact 4 of relay TC0(4) to ground on conductor 1110. Relay SCA(12) operates and locks over its contact 5, conductor 307, contact 1 of relay DTC(3) to ground on conductor 1102.

Ground on conductor 1416 completes a circuit over contact 5 of relay SKI(4), conductor 408, to battery through the winding of relay COK(12). Relay COK(12) operates in this circuit and locks over its contact 5 directly to ground on conductor 1416. At its contact 10 relay COK(12) opens the circuit of lamp OC0(20) extinguishing that lamp. At its contact 5, relay COK(12) connects a supplementary ground over conductor 1212 to the winding of relay TCN(10). At its contact 7, relay COK(12) connects ground on conductor 1107 to conductor 1213 and thence over contact 1 of relay SP2(4) to conductor 1406 leading to the sender to permit class registration to take place in the sender.

The sender and test circuit are now awaiting class registration. When relay CLC(12) operates as above described, it extends conductors 1408, 1409, 1410 and 1411 over which class indications may be received by the sender to equipment in the test circuit for producing such class indications. Conductor 1408 is extended over contact 4 of relay SKI(4), conductor 409, contact 9 of relay SPA(12), contact 3 of relay CLC(12), conductor 1214, to contact 7 of key 5BD(47). Conductor 1409 is extended over contact 3 of relay SKI(4), conductor 403, contact 6 of relay SPA(12), contact 2 of relay CLC(12), conductor 1215, to contacts 7 of keys V0(46) and NV0(46). Conductor 1410 is extended over contact 1 of relay SKI(4), conductor 404, contact 1 of relay SP(12), contact 6 of relay CLC(12), conductor 1216 to the armature of relay OFI(38) and the armature of relay AC(29). Conductor 1411 is extended over contact 2 of relay SKI(4), conductor 405, contact 7 of relay SP(12), contact 9 of relay CLC(12), conductor 1217 to an armature of relay OFI(38).

Since key 5BD(47) has not been operated and relay OFI(38) is not operated, no circuits are closed over conductors 1408 and 1411. With key NV0(46) operated as above mentioned, the circuit over conductor 1409 is further extended over contact 7 of key NV0(46), conductor 4600, contact 3 of relay LTI(25), contact 4 of key ON0(25) to ground through resistance AJ(25). Since relay AC(29) has been operated as previously described, the circuit over conductor 1410 is extended from conductor 1216 over contact 9 of relay AC(29), conductor 2907, contact 1 of relay CSR(25), contact 2 of key IT(25), contact 2 of key TC(25) to ground through resistance GH(25).

Relay CLC(12) also closes a circuit from ground over contact 3 of relay SP(12), contact 7 of relay CLC(12), conductor 1218 to battery through lamp CLC(20). At its contact 4, relay CLC(12) connects ground to conductor 1219 and battery through the winding of relay HGK(14).

The completion of the class registration circuits above traced causes class registration to take place in the sender, which signals the completion of this registration by reducing the resistance connected to conductor 1415 so that relay SP(12) now operates.

Relay SP(12) opens the circuit of lamp CLC(20) extinguishing that lamp as a signal that class registration is completed. At its contact 5, relay SP(12) closes an obvious circuit for operating relay SPB(12). In addition, relay SP(12) closes a simplex circuit to the winding of relay TCK(17) which may be traced from conductors 1410 and 1411, over contacts 1 and 2 of relay SKI(4), conductors 404 and 405, contacts 2 and 6 of relay SP(12), conductors 1220 and 1221, contacts 10 and 8 of relay SLK(13) conductors 1300 and 1301 through cable 18-21, through resistances KC(18) and KB(18) and thence over conductor 1701 to battery through the winding of relay TCK(17). This circuit determines when the sender connects high resistance ground through its SL relay to this simplex circuit but does not operate that relay.

When relay SPB(12) operates as above described, it closes a circuit from grounded conductor 1107, over contact 1 of relay KW0(12), contact 2 of relay SPB(12) to battery through the winding of relay SPA(12), operating that relay. In addition, relay SPB(12) closes a circuit from ground on conductor 1105, over contact 5 of relay SPB(12), conductor 1222, contact 1 of relay SC(12), conductor 1223, contact 4 of relay SK(5), contact 2 of relay SGK(5), contact 1 of relay SCB(5), contact 5 of relay SR2(5) to battery through the winding of relay SCB(5). Relay SCB(5) operates in this circuit and closes a locking circuit for itself which may be traced from battery through its winding over contact 5 of relay SR2(5), contact 2 of relay SCB(5), conductor 401, and thence as previously traced to ground connected by the sender to conductor 1412, before opening its operating circuit at its contact 1.

Relay SPB(12) also closes a circuit from ground on conductor 1105, over its contact 7, conductor 1224, contact 8 of relay SGK(5) to battery through the winding of relay TGC(5). Relay TGC(5) operates and locks over its contact 2 to ground on conductor 1107.

When relay SPA(12) operates as above described it connects ground over its contact 2 and conductor 1225 to battery through lamp SP(20) to indicate that the sender has reduced the resistance connected to conductor 1415 which would operate the trunk-splitting relay in connection with a service operation.

Relay SPA(12) also closes a circuit from ground on conductor 1102, contact 1 of DTC(3), conductor 307, contact 4 of relay SPA(12), conductor 1226, to battery through the winding of relay SP2(4). Relay SP2(4) operates in this circuit and locks over its contact 9 to ground on conductor 1107. With relay SPA(12) operated, conductors 1408 and 1409 are connected over contacts 4 and 3 of relay SK1(4), conductors 409 and 403, and contacts 8 and 5 of relay SPA(12) to conductors 1228 and 1227 which extend to armatures of relay MTR(37) when they are used for checking the multifrequency out-pulsing of the sender as will be described hereinafter.

When relay SCB(5) operates as above described, it closes a circuit from ground on conductor 1107, over its contact 6 to battery through the winding of relay SCD(5). Relay SCD(5) operates in this circuit and locks over its contact 3 to ground on conductor 1107.

Relay TGC(5) in operating, prepares circuits for energizing timing relay SCT(5). At its contact 3 it connects battery to one side of the upper winding of relay SCT(5) and at its contact 4 connects battery to one side of the lower winding of relay SCT(5). At its contact 5, it connects the other side of the lower winding of relay SCT(5) to conductor 505 and over contact 3 of key SGK(6) to ground through resistances GB(6) and GB1(6). At its contact 1, it connects the other side of the upper winding of relay SCT(5) over conductor 506 to ground through condenser SCT(5) and resistance GA(5). However, direct ground is connected to conductor 506 at this time over contact 6 of relay SGK(5), conductor 507 and contact 3 of relay SPB(12). Current flow in the lower winding of relay SCT(5) is in a direction to cause it to close its contact 2, while current flow through the upper winding is in a direction to cause the closure of contact 1 and the current in this winding predominates.

Relay SP2(4), when operated as above described, at its contact 1, disconnects ground from conductor 1406 to simulate the operation of a trunk-splitting relay and extends that conductor over its contact 2 and conductor 410 to battery through the winding of relay ISG(12) to test for the presence of false ground on the conductor. At its contact 8, relay SP2(4) opens the circuit of relay CLC(12) which releases, in turn releasing relay HGK(14). Relay HGK(14) is slow to release so that, if relay ISG(12) operates to indicate a false ground, ground connected to conductor 1417 at the front contact of relay HGK(14) is extended over contact 3 of relay ISG(12), conductor 1229, contact 1 of relay STE(5), conductor 508 to battery through the lower winding of relay BLK(11) which blocks the test as described hereinafter.

*Transmitting code designation to sender*

The test circuit is now ready to start to transmit the line designation to the sender. When relay SK(5) operates it extends the tip and ring, in-pulsing conductors 1403 and 1404 in parallel to the winding of relay FGK(27), the branch from conductor 1403 extending over contact 8 of relay SK(5), conductor 500 through cable 18-21, contact 8 of relay GL(29), conductor 2905 through network C(20), contact 2 of key LL(20), network AC(2), contact 5 of key LL(20), contacts 7 and 5 of key TWT(20), upper right winding of repeating coil AC(20), conductor 2001 to battery through the winding of relay FGK(27), while the branch from conductor 1404 extends over contact 9 of relay SK(5), conductor 501, contact 8 of key SGK(6), conductor 601 through cable 18-21, contact 3 of relay DW0(26), conductor 2602, contact 9 of relay GL(29), conductor 2906, through network C(20), contact 7 of key LL(20), network AC(20), contact 4 of key LL(20), contacts 2 and 4 of key TWT(20), lower right winding of repeating coil AC(20) to conductor 2001 and battery through the winding of relay FGK(27). Until the sender is ready to receive pulses, it connects ground to conductors 1403 and 1404, holding relay FGK(27) operated. When relay SP2(4) operates to remove ground from conductor 1406, the sender removes ground from conductors 1403 and 1404 permitting relay FGK(27) to release.

While relay FGK(27) is operated, a circuit is closed from battery through the winding of relay KPC(19), conductor 1900, contact 4 of relay FGK(27), conductor 2701, to ground over contact 1 of relay AC(29). Relay KPC(19) operates in this circuit and locks over its contact 12 and conductor 1901 to ground at contact 5 of relay AC(29). With relays PCT(27) and FGK(27) operated, lamp FGK(27) is lighted in a circuit over contact 2 of relay FGK(27) and contact 1 of relay PCT(27). When relay FGK(27) releases, the previously traced circuit for lamp FGK(27) is reclosed.

When relay ACU(22) has been operated and switch MFP(21) advanced to position 2 as previously described, a circuit is closed from battery through the winding of relay KP(19), conductor 1902, contact 3 of relay ACU(22), conductor 2201, brush MFP3(21) in position 2, conductor 2101, contact 2 of relay PSF(28), conductor 2800, contact 1 of relay MFG(29), conductor 2908 to ground at contact 2 of relay KP5(28). Relay KP(19) operates in this circuit and closes a circuit from ground over its contact 4, conductor 1903, to battery through lamp KP(21) and over contact 3 of relay PP(22), conductor 2202, contact 2 of relay PC3A(27) to battery through the winding of relay PC3(27).

Relay PC3(27) operates in this circuit and closes a locking circuit for itself from battery through its winding and the winding of relay PC3A(27), contact 2 of relay PC3(27), conductor 2703 to ground at contact 4 of relay AC(29). Relay PC3A(27) does not operate, being shunted by the operating circuit of relay PC3(27).

The pulse generating circuits include relays KP1(28), KP2(28), KP3(28) and KP4(28). With the test circuit normal, a charging circuit exists for condenser PLC(20) which may be traced from ground through condenser PLC(20), contact 3 of relay SKP(20), conductor 2002, lower winding of relay KP1(28), contact 5 of key SKPA(28) to battery through resistance BQ(28) in which condenser PLC(20) is fully charged. With relays AC(29) and PC2(27) operated as above described, the upper winding of relay KP1(28) is included in a circuit from battery through resistance BQ(28), contact 5 of key SKPA(28), upper winding of relay KP1(28), contact 4 of relay PR(28), winding of relay KP4(28), winding of relay KP3(28), winding of relay KP2(28), contact 3 of relay PR(28), conductor 2801, resistances AN(27) and AT(27), contact 3 of relay PC1(27) to the mid-point of a voltage divider circuit which extends from battery through resistance BR(27), contact 3 of relay PC2(27), resistance AU(27), contact 5 of relay PC1(27), resistance AP(27), conductor 2702 to ground at contact 2 of relay AC(29).

Relay KP1(28) is energized in this circuit in a direction to close its contact 2, while relays KP2(28), KP3(28) and KP4(28) close their contacts 2. Ground is supplied to the armature of relay KP1(28) from contact 2 of relay AC(29), conductor 2702, contact 1 of relay KS(20) and conductor 2802. Therefore, as soon as relay KP1(28) closes its contact 2, ground is connected in shunt of battery through resistance BQ(28) and the direction of energization of the upper winding of relay KP1(28) and of relays KP2(28), KP3(28) and KP4(28) is reversed. However, the lower winding of relay KP1(28) is energized by the discharge of condenser PLC(28) holding contact 2 closed for a measured interval, after which relay KP1(28) opens its contact 2 and restores the direction of energization of the upper winding and of the auxiliary relays. Condenser PLC(20) charges through the lower winding to hold contact 2 open for a measured interval. Relay KP1(28) closes and opens its contact 2 in this manner for a number of cycles before transmission to the sender is started.

With switch MFP(21) in positions 1 to 5, ground is connected from brush MFP4(21) and its terminals 1 to 5, conductor 2102, contact 5 of relay GL(29), conductor 2909, to battery through the winding of relay CDY(22) operating the latter relay.

When relay FGK(27) releases as above described, it closes a circuit from ground over contact 2 of relay KP5(28), conductor 2908, contact 1 of relay MFG(29), conductor 2800, contact 2 of relay PSF(28), conductor 2101, brush MFP3(21) in position 2, conductor 2201, contact 3 of relay ACU(22), conductor 1902, contact 3 of relay KP(19), conductor 1904, contact 5 of relay CDY(22), conductor 2203, contact 6 of relay MPS(29), contact 6 of relay GL(29), conductor 2910, contact 7 of relay SPA(12), contact 2 of relay SCA(12), conductor 1230, contact 7 of relay AC(29), conductor 2911, contact 3 of relay FGK(27), contact 4 of relay PC3A(27), contact 1 of relay PC3(27), conductor 2704, contact 4 of relay KS(20), conductor 2003, winding of relay PLC(28) to battery through resistance BU(28). In order to insure that the first pulse sent out will be of full length, a circuit is closed in shunt of the winding of relay PLC(28) if relay KP4(28) has its contact 1 closed, which circuit may be traced from ground over contact 1 of jack KP4(28), contact 1 of relay KP4(28), conductor 2803, contact 1 of relay PC2(27), conductor 2705, contact 1 of relay PLC(28) to resistance BU(28). If contact 1 of relay KP4(28) is open or as soon as it does open, relay PLC(28) operates, opening this shunt and transferring the circuit controlled by relay KP4(28) over its contact 2 to the winding of relay PCA(28), so that at the next closure of contact 1 of relay KP4(28) relay PCA(28) operates, locking over its contact 2 to ground at contact 3 of relay PLC(28).

With relay PCA(28) operated the preliminary or key pulse signal is transmitted to the sender. The multifrequency current supply indicated at the upper left corner of Fig. 19 supplies current of six frequencies to conductors 1910, 1911, 1912, 1914, 1917 and 1920 and ground to conductor 1921. Following is a table showing the frequencies supplied to these conductors and the combinations of these frequencies used to transmit information to the sender.

| Signal or Digit Transmitted | Conductors Used | Frequencies |
| --- | --- | --- |
| | | Cycles |
| 0 | 1914, 1917 | 1300, 1500 |
| 1 | 1910, 1911 | 700, 900 |
| 2 | 1910, 1912 | 700, 1100 |
| 3 | 1911, 1912 | 900, 1100 |
| 4 | 1910, 1914 | 700, 1300 |
| 5 | 1911, 1914 | 900, 1300 |
| 6 | 1912, 1914 | 1100, 1300 |
| 7 | 1910, 1917 | 700, 1500 |
| 8 | 1911, 1917 | 900, 1500 |
| 9 | 1912, 1917 | 1100, 1500 |
| KP | 1912, 1920 | 1100, 1700 |
| ST | 1917, 1920 | 1500, 1700 |

It will be remembered that the in-pulsing conductors 1403 and 1404 of the sender were extended through the right windings of repeating coil AC(20) to the winding of relay FGK(27). With relays KP(19) and PCA(28) operated, as soon as relays KP2(28), KP3(28) and KP4(28) close their contacts 2, a circuit is closed from conductor 1912, contact 1 of relay KP(19), conductor 1905, contact 4 of relay PCA(28), contact 2 of relay KP2(28), contact 1 of jack KP2(28), conductor 2804, to the left windings of repeating coil AC(20) and from conductor 1920, contact 2 of relay KP(19), conductor 1906, contact 3 of relay PCA(28), contact 2 of jack KP3(28), contact 2 of relay KP3(28), contact 1 of jack KP3(28), conductor 2004, to the left windings of repeating coil AC(20). Current of frequencies 1100 cycles and 1700 cycles is therefore transmitted through the repeating coil to the sender.

In addition, relay KP4(28) closes a circuit from ground over contact 1 of jack KP4(28), contact 2 of relay KP4(28), contact 2 of jack KP4(28), contact 1 of relay PCA(28) to battery through the winding of relay KP5(28). Relay KP5(28) at its contact 2 opens the operating circuit of relay KP(19) and at contact 4 connects ground over contact 4 of relay PLC(28) to conductor 1904 to lock relays KP(19) and PLC(28). Relay KP5(28) is a mercury contact relay giving an instantaneous overlap between contacts 2 and 4 so that relays KP(19) and PLC(28) are held operated. Relay KP5(28), also closes a circuit from ground over its contact 3, conductor 2905, contact 5 of relay KP(19), conductor 1908, contact 1 of relay MPS(29) to conductor 2912 and thence to battery through the lower winding of relay MFG(29) and to battery through the winding of magnet MFP(21). Magnet MFP(21) and relay MFG(29) operate in this circuit.

When relays KP3(28) and KP2(28) open their contacts 2, they terminate the key pulse signal, and when relay KP4(28) opens its contact 2, it opens the circuit of relay KP5(28) and the latter relay releases, in turn releasing relay KP(19), relay PLC(28), relay PCA(28), relay MFG(29) and magnet MFP(21) advancing switch MFP(21) to position 3. Relay KP(19) cannot remain operated since its operating circuit is opened, first at contact 1 of relay MFG(29) and then by the advance of switch MFP(21). Relay KP(19) in releasing, extinguishes lamp KP(21) and opens the operating circuit of relay PC3(27), permitting relay PC3A(27) to operate in the previously traced locking circuit of relay PC3(27).

Relay PC3A(27) in operating releases relay PC1(27) and extinguishes lamp FGK(27). Relay PC1(27) in turn releases relay PR(28) and relay PCT(27). With relay PC1(27) released, the resistances included in the voltage divider are rearranged to change the timing of the pulses generated by relay KP1(28). Relay PR(28) reverses the connection of relays KP2(28), KP3(28) and KP4(28) in the circuit of the upper winding of relay KP1(28) to provide the desired timing of the subsequent pulses. Relay PCT(27) when released closes a link in a new operating circuit for relay PLC(28) but is made slow to release to permit the operation of the pulsing relays to become stabilized under the new conditions before the next pulse is transmitted.

With switch MFP(21) in position 3 and relays KP5(28) and MFG(29) released, a circuit is closed for operating one of the relays MF0(19) to MF9(27) to control the pulse representing the first digit of the area code under the control of the area code key set ACA(7). This circuit may be traced from ground at contact 2 of relay KP5(28), conductor 2908, contact 1 of relay MFG(29), conductor 2800, contact 2 of relay PSF(28), conductor 2101, brush MFP3(21) in position 3, conductor 2103, contact 3 of relay GL(29), conductor 3100 through cable 21-31, contact 2 of key 700, conductor 3144 through cable 19-31, contact 8 of relay KPC(19), conductor 1907, to battery through the winding of relay MF4(27), operating the latter relay. Relay MF4(27) closes a circuit from ground over its contact 5, conductor 2706, brush MFP6(21) in position 3, conductor 2120 to battery through lamp ACA(21).

When relay PCT(27) completely releases, the circuit of relay PLC(28) is closed, extending as previously traced to conductor 2704 and thence over contact 1 of relay PC3(27), contact 3 of relay PC3A(27), contact 2 of relay PCT(27), conductor 2707, contact 3 of relay CDY(22), conductor 2204 to ground at contact 1 of relay MFS(29). As previously mentioned, relay PLC(28) does not operate until pulsing relay KP4(28) opens its contact 1. At the next closure of contact 1 of relay KP4(28), relay PCA(28) operates and locks under the control of relay PLC(28) and when relays KP2(28) and KP3(28) close their contacts 2, with relays MF4(27) and PCA(28) operated, a pulse made up of 700-cycle and 1300-cycle current is connected over conductors 1910 and 1914, contacts 1 and 2 of relay MF4(27), conductors 1905 and 1906, contacts 4 and 3 of relay PCA(28), contacts 2 of jacks KP2(28) and KP3(28), contacts 2 of relays KP2(28) and KP3(28), contacts 1 of jacks KP2(28) and KP3(28), conductors 2904 and 2004 to the left windings of repeating coil AC(20).

With contact 2 of relay KP4(28) closed, relay KP5(28) operates, locking relays MF4(27) and PLC(28) and operating relay MFG(29) and magnet MFP(21). When relays KP3(28) and KP2(28) open their contacts 2, the first code impulse is terminated and when relay KP4(28) opens its contact 2 it releases relay KP5(28) in turn releasing relays MF4(27), PLC(28), PCA(28) and MFG(29) and magnet MFP(21) advancing switch MFP(21) to position 4.

In a similar manner relays MF0(19) and MF3(27) are operated under the control of area code keys 600 and 1500, the corresponding multi-frequency pulses are transmitted and switch MFP(21) is advanced to positions 5 and 6. When, in testing a sender of the present type, an area code is set up on the key-set and relay ACC(16) is operated, a circuit is closed from ground at contact 5 of relay ON1(30), conductor 3000 through cables 30-32 and 8-24, contact 3 of relay ACC(16), conductor 1605 through cables 16-24 and 30-32, winding of relay D08(47) to battery. Relay D08(47) operates in this circuit. This circuit is shown with optional wiring since it is not required by certain other types of sender.

In position 6, with relay D08(47) operated, a circuit is closed from ground over brush MFP4(21), conductor 2104 through cables 21-33 and 33-47, contact 3 of key 2DTX(47), contact 3 of relay D08(47), conductor 4700, through cable 25-45, contact 7 of key TRL(25), conductor 2501, through cable 25-45, contact 5 of key UXD(55), conductor 5500, to battery through the winding of relay MKS(47).

Relay MKS(47) operates in this circuit, locks over its contact 4 and conductor to ground at contact 1 of relay MCK(47), and starts the marker engaged and marker check test. As soon as this type of sender has received three digits, it calls in a marker and transmits these code digits to the marker along with the trunk class information. In doing so, transmitting circuits connecting the sender and marker are at first all connected to ground either by the registration set up in the sender or by checking ground supplied by the marker. Conductors 4500 to 4504 and 4701 to 4708 are connected to all marker circuits of the type used with the present type of sender. When the sender has been connected to the marker, ground is connected to either conductor 4501 or conductor 4502 and to conductors 4500, 4503, 4504, 4701, 4702 and 4704 operating relays V0(46) or NV0(46), TR2(45), LIT(45), TX(46), LOC(47), 5BD(47) and PF(47) as well as to checking conductors 4705, 4706 and 4707. Ground on conductor 4707 lights lamp ME(35). Ground on conductor 4706 operates relay CK1(35) and ground on conductor 4705 operates relay CK2(35). Relay CK1(35) locks over its contact 3 and contact 5 of relay CK3(35) to ground on conductor 4709. Relay CK2(35) locks over its contact 3 and contact 2 of relay CK3(35) to ground on conductor 4709.

With relays CK1(35) and CK2(35) operated, a circuit is closed from battery through the winding of relay SRM(35), contact 4 of relay CK1(35), contact 4 of relay CK2(35), conductor 3500 to ground at contact 4 of relay MCK(47). Relay SRM(35) operates in this circuit and locks over its contact 3 and contacts 5 of relays CK1(35) and CK2(35) in parallel to ground on conductor 3500.

As soon as relay MCK(47) operated, a circuit was closed from ground at contact 2 of relay MCK(47), conductor 4710, contact 5 of relay LBE(47), conductor 4711, contacts 1 of relays CK1(35) and CK2(35) to battery through the winding of relay TBK(35) operating the latter relay. When relays CK1(35) and CK2(35) operate as above described, they open the circuit of relay TBK(35), but that relay is slow to release and maintains its contact 2 closed for an interval. As soon as relay SRM(35) operates, it closes a circuit from ground over its contact 4, conductor 3501, contact 1 of key CD(26), conductor 2603, contact 2 of relay TBK(35), conductor 3502, through cable 11-35 to battery through the winding of relay ME(11). With relay ME(11) operated, a circuit is closed to check that the registration transfer circuits are intact as indicated by the operation of relays TR2(45), etc., which may be traced from ground on conductor 3501, contact 4 of relay PF(47), contact 6 of relay 5BD(47), contact 6 of relay LOC(47), conductor 4712, contact 6 of relay TX(46), contact 6 of relay LIT(46), contact 6 of either relay V0(46) or relay NV0(46), conductor 4601, contact 5 of relay TR2(45), conductor 4505 through cable 11-35, contact 1 of relay ME(11), conductor 1119 through cable 11-35 to battery through the winding of relay CK3(35).

Relay CK3(35) operates and locks over its contact 1, conductor 3507, contact 4 of relay PS(26), conductor 2604, contact 6 of relay MCA(35) to ground supplied to checking conductor 4707 by the marker connector. At its contact 3, relay CK3(35) opens the locking circuit of relay CK2(35) and at its contact 5 opens the locking circuit of relay CK1(35). In addition, relay CK3(35) closes a circuit from battery through the winding of relay MC(35), contact 4 of relay MCA(35), contact 6 of relay CK3(35), conductor 4709 to ground at contact 1 of relay MCK(47). Relay MC(35) closes a locking circuit for itself from battery through its winding, winding of relay MCA(35), contact 4 of relay MC(35) to ground on conductor 4709. Relay MCA(35) does not operate in this locking circuit, being shunted by the operating circuit for relay MC(35).

If all of the registration circuits above mentioned are also complete in the marker, the marker responds by disconnecting ground from conductors 4705 and 4706 so that, with relay CK3(35) operated, relays CK1(35) and CK2(35) release.

When relay TBK(35) releases after an interval, if relays CK1(35) and CK3(35) have not released, a circuit is closed from ground at contact 4 of relay MCK(47), conductor 3500, over contact 5 of either relay CK2(35) or CK1(35) or both, contact 1 of relay TBK(35), conductor 3503 to battery through the winding of relay LBE(47) to block the test.

Assuming that relays CK1(35) and CK2(35) release as they should, they open the operating and locking circuits for relay SRM(35) which releases slowly to allow time for sender release in case of trouble or for out-trunk class registration to take place.

When relay ME(11) operates as above described, it transfers the circuit of relays SP(12) and SPK(12) from conductor 1415 leading to the sender to ground through resistance GC(11). This opens the circuit of the splitting relay of the sender but that relay should be held operated under the control of the marker. If the splitting relay is not held operated the sender releases and blocks the operation of the test circuit.

Assuming that the sender is held, the release of relay SRM(35) closes a circuit from ground at contact 1 of relay MCK(47), conductor 4709, contact 3 of relay CK3(35), contact 1 of relay SRM(35), contact 2 of relay CK1(35), contact 2 of relay CK2(35), conductor 3504 to battery through the winding of relay LU(45). Relay LU(45) in operating supplies locking ground for the registration relays of Figs. 45, 46 and 47. When the marker removed ground from conductors 4706 and 4705 it also removed ground from conductors 4500 to 4504 and 4701 to 4703, but under the assumed conditions, the sender maintains ground on conductor 4502. Therefore, relay NV0(46) is held operated, while the remaining relays TR2(45), etc., release. Relay NV0(46) locks in a circuit from battery through its upper winding, over its contact 3 and conductor 4602 to ground at contact 8 of relay LU(45).

Conductor 4704 should be grounded if the sender under test is located on an even-numbered frame and should not be grounded if the sender under test is on an odd-numbered frame. Since the testing circuit is testing a sender on the first or No. 0 frame, conductor 4704 should be grounded, relay PF(47) operated and locked over its contact 3 and conductor 4713 to ground at contact 6 of relay LU(45).

Relay LU(45) closes two circuits for checking that the relays locked operated correspond to the conditions set up on the keys. One of these circuits operates relay LBE(47) in the case of a mismatch. For example, suppose relay V0(46) is falsely operated with key V0(46) normal. A circuit would be closed from ground on conductor 4709, over contact 11 of relay LU(45), conductor 4506, contact 4 of relay V0(46), contact 5 of key V0(46), conductor 4603, contact 3 of relay MKS(47) to battery through the lower winding of relay LBE(47). Similarly, if relay NV0(46) had failed to lock up, with key NV0(46) operated, as has been assumed, ground connected to conductor 4506 as above traced would extend over contact 5 of relay NV0(16) and contact 6 of key NV0(46) to conductor 4603 to operate relay LBE(47).

Assuming that the operation of the registration relays has been correct, the second checking circuit closed by relay LU(45) may be traced from ground on conductor 4709, contact 12 of relay LU(45), conductor 4507, contact 5 of relay MKS(47), conductor 4714 through cable 1-47, brush SS4(1) in position 1, conductor 107 through cable 1-47, contact 2 of relay PF(47), contact 1 of relay R0(47), contact 1 of relay STIP(47), contact 1 of relay 5BD(47), contact 2 of key 5BD(47), contact 1 of relay LOC(47), contact 2 of key LOC(47), conductor 4715, contact 1 of relay TX(46), contact 2 of key TX(46), contact 1 of relay LIT(46), contact 2 of key LIT(46), contact 2 of relay NV0(46), contact 3 of key NV0(46), contact 1 of relay V0(46), contact 2 of key V0(46), conductor 4604, contact 1 of relay TR2(45), contact 1 of key TR2(45), conductor 4508 through cable 25-45, contact 4 of key TRL(25), conductor 2502 to battery through the winding of relay MKC(17).

It may be noted, in tracing this circuit, that in the case of a mismatch, the lamp corresponding to the registration failure is lighted. For example, if relay NV0(46) had failed to lock, this circuit would extend as above traced to the upper armature of relay NV0(46) and over contact 1 of that relay and contact 1 of the operated key NV0(46) to battery through lamp NV0(46).

*Test of trunk closure delay timing*

With relay MKC(17) operated a test is made of the trunk closure delay timing of the sender. The duration of the trunk closure delay is determined by class information transmitted from the marker to the sender. The timing operation in the sender is initiated by closing a circuit from ground over contact 3 of relay TDS(17), contact 2 of relay MKC(17) to conductor 1705 leading to the marker and thence to the sender to simulate the trunk selected signal normally transmitted by the marker. A branch of this circuit extends to battery through the winding of relay LMK(17) which operates and locks over its contact 2, conductor 1706 through cable 18-21, contact 1 of relay SLK(13), to ground on conductor 1105.

Relay MKC(17) also closes a circuit from ground on conductor 1108, contact 3 of relay MKC(17), to conductor 1707 leading to the marker and thence to the sender to simulate the release signal which the marker normally transmits to the sender when it is ready to be released. The sender releases the marker in response to this latter signal, causing the removal of ground from conductor 4707, releasing relay CK3(35) which opens the operating circuit of relay MC(35), permitting relay MCA(35) to operate. When the marker is released, relay ME(11) releases restoring the connection of relays SP(12) and SPK(12) to conductor 1415.

Relay LMK(17) initiates the timing operation in the test circuit by disconnecting ground from condenser TDT(17) and resistance AB(17). Condenser TDT(17) now charges in the circuit previously traced through the lower winding of relay TDT(17) continuing the energization of that winding, in a direction to hold contact 1 closed, for a measured interval. With switch TCD(17) in position 1 to which it was advanced as previously described, the armature of relay TDT(17) is connected over brush TCD2(17) in position 1, contact 5 of relay DF2(17), contact 5 of relay DF1(17), contact 6 of relay TDK(17), conductor 1702 to ground at contact 6 of relay BLK(11). When the charging current dies down, the current in the upper winding of relay TDT(17) causes the closure of contact 2, connecting ground in shunt of battery through resistance BB(17), reversing the direction of energization of relay TDT(17) and closing a circuit for discharging condenser TDT(17). The discharge current energizes the lower winding of relay TDT(17) in a direction to hold contact 2 closed. When this current dies down the current in the upper winding causes the opening of contact 2 and the closure of contact 1, whereupon the operations are repeated. Relay TDA(17) whose winding is included in the circuit of the upper winding of relay TDT(17) is polarized to close its contact 2 at the same time that relay TDT(17) closes its contact 2. At each closure of contact 2 of relay TDT(17) a circuit is closed from ground over that contact, contact 7 of relay TDS(17) to battery through the winding of magnet STEP(17) operating that magnet and at each opening of that contact magnet STEP(17) releases to advance switch TCD(17) one step.

Until the sender has completed trunk closure delay timing it connects battery to conductors 1410 and 1411, and to the circuit previously traced for relay TCK(17). At the end of timing, the sender connects ground to this circuit, operating relay TCK(17).

Switch TCD(17) in combination with keys 0TD(25), 3TD(25), 5TD(25) and 7TD(25) sets up checking circuits which check that the delay measured by the sender is right, within certain limits. When relay TCK(17) operates to mark the end of the delay, a circuit is closed from ground over contact 2 of relay TCK(17), conductor 1703, contact 11 of relay PRS(43), conductor 4300, contact 2 of relay UXD(44), conductor 4400, contact 2 of key XDD(43), conductor 4301 to key 0TD(25) and thence to one of the brushes TCD3(17) to TCD6(17) of switch TCD(17) in accordance with the key operated. Since it has been assumed that key 5TD(25) is operated the circuit closed by relay TCK(17) extends over contact 2 of key 0TD(25), contact 2 of key 3TD(25), contact 2 of key 5TD(25), conductor 2503 to brush TCD5(17). The terminals of brush TCD5(17) in positions 2 to 6 are connected to the winding of relay DF1(17), that in position 8 is connected to contact 2 and the winding of relay TDK(17) and those in positions 9 to 12 are connected to the winding of relay DF2(17).

Therefore, if relay TCK(17) is operated too soon, relay DF1(17) will be operated, if operated at the proper time, relay TDK(17) is operated and if operated too late, relay DF2(17) will operate. The operation of any one of these relays or the advance of switch TCD(17) to position 12 disconnects ground from the armature of relay TDT(17) and stops the timing.

If either relay DF1(17) or relay DF2(17) is operated to indicate an incorrect timing operation, the operated relay locks to conductor 1704, lights the corresponding lamp, and connects conductor 1704 to conductor 301 to close a circuit for operating relay BLK(11) to block the test.

Assuming that the sender operates correctly and that, therefore, relay TDK(17) operates, that relay locks over its contact 3 to conductor 1704 and opens the circuit of relay DF2(17). Relay TDK(17) also closes a circuit from ground supplied to conductor 2504 by the multifrequency receiving circuit, contact 3 of key MFR(25), conductor 2505, contact 4 of relay TDK(17), contact 3 of relay DF1(17), contact 3 of relay DF2(17), conductor 1708, contact 3 of key MAN(25), contact 6 of key MFR(25), conductor 2506, to Fig. 37 where it is used during the checking of the pulses sent out by the sender.

Relay TDK(17) also closes a circuit from ground on conductor 1702 over its contact 5, conductor 1709, contact 2 of relay MC(35), conductor 3505, contact 2 of relay D08(47), conductor 2102 through cables 33-47 and 21-33 and thence as previously traced to the winding of relay CDY(22), operating the latter relay.

With relay CDY(22) operated, the operation of the pulsing circuit for transmitting the office code digits is similar to that for transmitting the area code digits, relays MF6(27), MF5(27) and MF2(19) being operated under the control of the office code keys 1501, 1502 and 1503, and switch MPF(21) being advanced to positions 7, 8 and 9 in the manner previously described.

The remaining digits are transmitted to the sender in the manner previously described, switch MFP(21) advancing through positions 9 to 12 during the transmission of the thousands, hundreds, tens and units numerical digits. Lamps OCA(21) to U(21) are lighted over brush MFP6(21) in the corresponding positions. When switch MFP(21) advances to position 13, corresponding to the stations digit, since no key has been operated in the key-set STA(23), a circuit is closed from ground at contact 6 of relay MFS(29), conductor 2901, brush MFP2(21) in position 13, conductor 3130 through cable 21-31, contact 3 of relay U(24), contact 1 of relay STA(24), conductor 2403 through cables 8-24 and 30-32, contact 2 of relay MFA(26), conductor 2605 through cable 18-22, contact 4 of relay MPS(29), conductor 2914, contact 3 of relay MFA(26), contact 1 of key W0(26), contact 7 of key PS(26), contact 7 of relay MFA(26), conductor 2606, contact 3 of key CST(29), conductor 2915 to battery through the winding of relay STC(19). Relay STC(19) connects the start combination of frequencies to the pulsing circuit and lights lamp ST(21). With relay STC(19) operated, the operation of relay KP5(28) operates magnet MFP(21) to advance switch MFP(21) and relay MFG(29) as previously described. When relay MFG(29) operates a circuit is closed from battery through the winding of relay EMF(29), conductor 2916, contact 4 of relay STC(19), conductor 1922 to ground at contact 4 of relay MFG(29). Relay EMF(29) operates in this circuit and locks over its contact 3 to ground on conductor 1901. It may be noted that, if a stations digit is set up and sent out so that switch MFP(21) advances to position 14, no start signal is sent out and relay EMF(29) is operated over brush MFP (21) in that position.

When relay KP5(28) releases, relay STC(19) also releases and a circuit is closed from ground on conductor 1901, contact 3 of relay EMF(29), conductor 2916, contact 3 of relay STC(19), conductor 1923, contact 2 of relay EMF(29), conductor 2917 through resistance AV(20) to condenser PLC(20) in shunt of the lower winding of relay KP1(29) to stop the pulsing operation. At its contact 4, relay EMF(29) extends its locking ground over contact 4 of key CST(29), conductor 2918, contact 4 of key T0(26), conductor 2607 to battery through the winding of relay RLK(11). Relay RLK(11) operates to indicate that the in-pulsing to the sender has been completed and locks over its contact 2 to ground on conductor 1106.

The connection of ground to conductor 1709 by relay TDK(17) also completes a circuit over contact 5 and through the winding of relay SLK(13) to battery. Relay SLK(13) locks over its contact 6 to grounded conductor 1105 and initiates the test of the SL relay of the sender. When the sender is set to send out multifrequency pulses, the high resistance winding of relay SL is connected to conductors 1410 and 1411 to test when the distant trunk is ready for pulsing, immediately after the end of the trunk closure delay timing.

Relay SLK(13) at its contact 1 opens the locking circuit for relay LMK(17) and that relay releases, connecting ground on conductor 1700 over its contact 1 to resistance AB(17) and condenser TDT(17) to cause the relay TDT(17) to hold its ineffective contact 1 closed. At its contacts 10 and 8, relay SLK(13) disconnects conductors 1410 and 1411 from relay TCK(17) and at contacts 9 and 7 connects them to the windings of relays KT(13) and KR(13).

If the sender has failed to operate relay ISG(12) as previously described, the operation of relay SLK(13) closes a circuit from ground over its contact 4, conductor 1302, contact 1 of relay ISG(12) to battery through lamp HG(12) and a circuit from grounded conductor 1107 over contact 4 of key SGK(6), conductor 602, contact 11 of relay SLK(13), conductor 1303, contact 1 of relay SCD(5), conductor 509, contact 4 of relay ISG(12), conductor 1229, contact 1 of relay STE(5), to conductor 508 to operate relay BLK(11) and block the test.

When relay MC(35) operated as previously described, a circuit was closed from ground, contact 5 of relay MC(35), conductor 3506 through cable 19-34, contact 1 of relay MAN(11), conductor 1120, contact 9 of key MFR(25), conductor 2507 through cable 18-21, contact 4 of relay MFT(13) to battery through the winding of relay HPT(13). With relay HPT(13) operated, the windings of relays KT(13) and KR(13) are connected over conductor 1304, contact 4 of relay HPT(13), conductor 1311, contact 5 of relay KTR(13) and conductor 1306 to battery through resistance BD(6).

The connection of conductors 1410 and 1411 to battery through the windings of relays KT(13) and KR(13) causes the SL relay of the sender to operate but does not operate relays KT(13) and KR(13) in series with the high resistance winding of the SL relay. As a result of the operation of the SL relay of the sender, ground through the low resistance winding of the SL relay is connected in parallel with the high resistance winding, operating relays KT(13) and KR(13). With relays KT(13) and KR(13) operated a circuit is closed from ground on conductor 1109, contact 1 of relay BLK1(11), conductor 2903 through cable 19-34, contact 1 of relay TCD(43), conductor 4302 through cable 19-34, contact of relay KT(13), contact of relay KR(13), conductor 1307, contact 1 of relay ROL(6), conductor 603, contact 5 of key GT0(14), conductor 1418 to battery through the winding of relay KTR(13).

Relay KTR(13) operates in this circuit and locks over its contact 6 to ground on conductor 1105. At its contact 1 it closes an obvious circuit for operating relay MFT(13). At its contact 5, it disconnects the windings of relay KT(13) and KR(13) from battery through resistance BD(6) and connects them over its contact 4, high resistance OFH(13), contact 3 of relay HPT(13), contact 5 of relay MFT(13), conductor 2507 through cable 18-21, contact 9 of key MFR(25), conductor 1120, contact 1 of relay MAN(11), conductor 3506 through cable 19-34 to ground at contact 5 of relay MC(35).

Between the opening of contact 5 of relay KTR(13) and the closure of contact 5 of relay MFT(13) there is a slight opening in the circuit of the SL relay of the sender, which should be covered in the sender. The closure of ground to the circuit of the sender SL relay is a "stop" signal and no pulses should be sent out. If the opening of the circuit is not covered, the sender would start to pulse-out prematurely.

Relay MFT (13) closes a circuit from ground on conductor 1105, contact 4 of relay LBA(13), contact 1 of relay MFT (13), conductor 1308, contact 9 of relay MFR(37) to battery through the winding of relay PKL(37) in anticipation of the check of the first digit to be out-pulsed. At its contact 4, relay MFT (13) opens the circuit of relay HPT(13) which releases slowly.

Relay PKL(37) when operated, closes a circuit from ground over contact 1 of relay MFR(37), contact 4 of relay PKL(37) conductor 3702, contact 3 of relay LBD(36) to battery through the winding of relay CF(36). Relay CF(36) operates and completes the establishment of the outpulsing circuit from the sender to the multifrequency pulsing receiving circuit. This circuit may be traced from the sender over conductors 1410 and 1411, contacts 1 and 2 of relay SK1(4), conductors 404 and 405, contacts 2 and 6 of relay SP(12), conductors 1220 and 1221, contacts 9 and 2 of relay MTR(37), conductors 3703 and 3704, contacts 3 and 1 of relay CF(36), conductors 4815 and 4814 to the receiving circuit. At the same time the other pair of outgoing conductors 1408 and 1409, which are extended over contacts 4 and 3 of relay SK1(4), conductors 409 and 403, contacts 8 and 5 of relay SPA(12) to conductors 1227 and 1228, are connected together over contact 4 of relay MTR(37), conductor 3705, contact 2 of relay CF(36), resistance AB(36), conductor 3600 and contact 7 of relay MTR(37).

Whenever an incoming signal appears at the receiving circuit, ground is connected to conductor 4817, operating relay Q(37). If the sender starts to out-pulse prematurely, that is, before relay HPT(13) releases, a circuit would be closed from ground at contact 2 of relay MFR(37), contact 2 of relay Q(37), conductor 3706, contact 2 of relay MFT(13), contact 2 of relay HPT(13) to battery through the winding of relay LBA(13). Relay LBA(13), if operated, lights lamp OFF(13), locks to ground on conductor 1105 and extends ground from conductor 1105 over its contact 1 to conductor 301, over contact 1 of relay SK2(11) and conductor 508 to battery through the lower winding of relay BLK(11) to block the test.

When relay HPT(13) releases it disconnects ground from the windings of relays KT(13) and KR(13) to terminate the "stop" signal and permit the sender to start sending out the registered designation.

Relay PKL(37) also closes a circuit from ground at contact 1 of relay MFR(37), contact 3 of relay PKL(37), contact 1 of relay KG(37), winding of relay PK(37), conductor 3707, and in parallel to battery through four parallel circuits, that is, through rectifier K(36) and resistance BF(36), through rectifier H(36) and resistance BE(36), through rectifier PK2(36) and resistance BD(36) and through rectifier PK1(36) and resistance BC(36). To each of these parallel circuits a branch circuit is connected at the point between the rectifier and the resistance, which circuits are later connected to ground as will be described. Relay PK(37) is so adjusted that if any one of these branch circuits is open, relay PK(37) will operate. Assuming that relay PK(37) operates, it locks over its contact 4 to ground at contact 2 of relay MFR(37). Relay PK(37) closes a circuit from ground on contact 2 of relay MFR(37), contact 3 of relay PK(37), contact 1 of relay Q(37) to battery through the winding of relay KG(37). Relay KG(37) operates and locks over its contact 3 and contact 3 of relay PK(37) to ground at contact 2 of relay MFR(37) and connects its locking ground over its contact 2, contacts 1 and 2 of relay MKG(37), conductor 3711, contacts 2 of relays ST7(36) and ST10(36), conductor 3601, contact 1 of relay PKL(37) to conductor 4818 to permit the channel relays of the receiving circuit to operate.

When the sender sends out the preliminary or KP signal it causes the multifrequency pulsing receiving circuit to prepare to receive the line designation.

When relay BAT(36) operates it connects battery over its contact 4, over contact 3 of jack GA(36) to the left sides of the windings of relay T0(36). The right side of the lower winding of relay T0(36), is connected over contact 2 of jack GA(36) through resistance GA(36) to ground. The right side of the upper winding of relay T0(36) is connected over contact 1 of jack GA(36) to ground through condenser T0(36) and in shunt thereof through resistance AC(36), contact 6 of relay ST7(36), contact 5 of relay ST10(36) to conductor 4816 to which ground is normally connected by the receiving circuit. Relay T0(36) is energized by these circuits to hold its contact 1 closed.

When the key pulsing signal is received by the receiving circuit, ground is disconnected from conductor 4816 and connected to conductor 4817, operating relay Q(37) and removing the shunt from condenser T0(36). Condenser T0(36) charges through the lower winding of relay T0(36) and holds contact 1 of that relay closed for a measured interval to test whether the key pulsing signal is of proper length.

Relay BAT(36) also closes a circuit from battery over its contact 4 through resistance AA(36) to ground through the winding of relay LBD(36), but the winding of relay LBD(36) is normally shunted over contact 2 of relay LBD(36), contact 4 of jack GA(36), contact 1 of relay T0(36) to ground on conductor 4819 to which ground is connected unless a signal of other than two frequencies is received. If the key pulsing signal is of insufficient length, relay T0(36) will operate and open this shunt permitting relay LBD(36) to operate, release relay CF(36), operate relay LMP(48) and connect ground to conductor 509 to operate relay BLK(11).

If the signal is of proper length the test circuit awaits the digits of the designation. As each digit is received by the receiving circuit, two of the code conductors 4800 to 4807 are grounded, conductor 4810 being used only for the start signal. Conductor 4819 is grounded at all times unless a signal of more or less than two frequencies is received; conductor 4818 is grounded by the test circuit to permit the channel relays of the received circuit to operate; conductor 4816 is normally grounded but is opened whenever a signal is present; conductor 4817 is normally open but is grounded when a signal is received and conductor 2504 which is extended to conductor 2506 is grounded when a two-frequency signal is received.

Since the first digit to be sent out is the area code hundreds digit 4, conductors 4800 and 4804 should be grounded. Ground on conductor 4800 extending over conductor 2360 through cable 23-48, contact 4 of key 700, conductor 703, contact 2 of relay NSK(32), conductor 3211 through cable 32-48, brush MFK5(48) in position 2, conductor 4820, contact 2 of relay ST(36), to battery through resistance BD(36). Ground on conductor 4804 extends over conductor 2364 through cable 23-48, contact 3 of key 700, conductor 704, contact 1 of relay NSK(32), conductor 3210 through cable 32-48, brush MFK4(48), conductor 4821, contact 1 of relay ST(36) to battery through resistance BC(36). Ground on conductor 2506 extends over contact 2 of relay PKL(37), conductor 3709 to battery through resistance BE(36).

Ground on conductor 4819 extends over contact 8 of relay MFR(37), conductor 3710 to battery through resistance BF(37).

With ground connected in shunt of all of the battery supplies to relay PK(37) that relay releases. The rectifiers in the battery supply circuit prevent ground on less than all of the branch circuits from releasing relay PK(37). Therefore, the release of relay PK(37) indicates that for each multifrequency pulse, two frequencies are sent out, that the two frequencies check with the digit set up on the key-set and that no more than two frequencies have been sent out. The removal of ground from conductor 4816 tests for the length of the pulse by means of relay T0(36) as previously described. Relay PK(37) in releasing opens the locking circuit of relay KG(37) causing that relay to release.

When relay PK(37) operated as previously described, it closed a circuit from ground over contact 2 of relay MFR(37), contact 3 of relay PK(37), contact 5 of relay PMR(37), contact 10 of relay MFR(37), conductor 4822 to battery through the winding of magnet MFK(48), and over the back contact of magnet MFK(48), conductor 4823 to battery through the winding of relay MKG(37). Magnet MFK(48) and MKG(37) operate in this circuit, but as soon as magnet MFK(48) opens its contact, relay MKG(37) releases.

When relay PK(37) releases, to indicate that a correct pulse has been received, it in turn releases magnet MFK(48) to advance switch MFK(48) into position to check the next digit. With relay PK(37) released, ground is connected over contact 2 of relay MFR(37), contact 2 of relay PK(37), conductor 3712, contact 4 of jack GA(36), contact 2 of delay LBD(36) to resistance AA(36) in shunt of the winding of relay LBD(36) to prevent its operation after the reception of a correct digit. If relay PK(37) should fail to release, the operation of relay T0(36) would permit relay LBD(36) to operate and block the test.

At the end of the pulse, ground is removed from code conductors 4800 and 4804, and from conductors 4817 and 2506. Removal of ground from conductors 4800, 4804 and 2506 permits relay PK(37) to reoperate, while removal of ground from conductor 4817 causes relay Q(37) to release. With relay PK(37) operated and relay Q(37) released, relay KG(37) operates and locks and magnet MFK(48) is operated. The test circuit now awaits the next digit.

The remaining digits are received and checked in a manner similar to that described, switch MFK(48) advancing as each digit is checked. When switch MFK(48) is advanced to position 11, since no stations digit key has been operated, a circuit is closed from ground over contact 7 of relay MFR(37), conductor 3713, brush MFK2(48) in position 11, conductor 2380, through cable 23-48, contact 3 of relay STA(24), conductor 2404, through cables 824 and 30-32, contact 8 of key MFR(25), conductor 2508, contact 2 of relay PMR(37), conductor 3714 to battery through the winding of relay ST(36).

Relay ST(36) at contacts 1 and 2 opens the checking circuits over brushes MFK4(48) and MFK5(48) and at contacts 6 and 3 connects the windings of relays ST7(36) and ST10(36) to conductors 4807 and 4810 which should be grounded by the start signal from the sender.

When the start pulse is received, relays ST7(36) and ST10(36) operate and lock over their contacts 3 to ground on conductor 3708.

With relays ST7(36) and ST10(36) operated ground is removed from conductor 4818. Ground on conductor 3708 is extended over contact 6 of relay ST19(36), contact 5 of relay ST7(36) and resistance AC(36) to condenser T0(36) to prevent the operation of relay T0(36).

At the end of the start pulse, when ground is reconnected to conductor 4816 a circuit is closed from that ground over contact 4 of relay ST10(36), contact 4 of relay ST7(36), conductor 3602 through cable 18-21, contact 6 of relay SP2(4), conductor 411 to battery through the winding of relay SK2(11).

The sender is now ready to cause the trunk circuit to establish the talking circuit after which the sender releases.

It will be remembered that relay RLK(11) was operated at the completion of pulsing into the sender. Relay SK2(11) has now been operated at the completion of pulsing out by the sender. In the sender, at the completion of out-pulsing, conductor 1415 is opened to permit the splitting relay of the trunk to release and close the talking conductors. For an interval following the opening of conductor 1415 the sender should hold ground on conductors 1412 and 1406 to insure the holding of the switches by the trunk.

The opening of conductor 1415 releases relay SP(12) and relay SPK(12). The release of relay SPK(12) also releases relay SPI(12). The release of relay SP(12) also releases relay SPB(12), which in turn releases relay SPA(12). At its contact 3 relay SPB(12) disconnects ground from conductor 507 which extends as previously traced to the upper winding of relay SCT(5) in shunt of condenser SCT(5), thereby permitting condenser SCT(5) to charge through the upper winding of relay SCT(5) to measure off a time interval before relay SCT(5) closes its contact. When relay SCT(5) operates, if relay SCB(5) is still operated, it closes a circuit from ground on conductor 1105, contact 6 of relay SPB(12), conductor 1231, contact 8 of relay SCB(5), contact 2 of relay SCT(5), conductor 510 to battery through the winding of relay STE(5). Relay STE(5) operates in this circuit and locks over its contact 3 to ground on conductor 1107.

If relay SCB(5) is released by the removal of ground from conductor 1412, to which it is locked, before relay STE(5) operates, relay SCB(5) closes a circuit from ground over its contact 9, contact 5 of relay SCD(5), contact 4 of relay STE(5) to battery through lamp SGK(5). At its contact 3, relay SCB(5) connects ground over contact 5 of relay SGK(5) to conductor 506 to shunt condenser SCT(5) and prevent the operation of relays SCT(5) and STE(5). In addition relay SCB(5) closes a circuit from ground on conductor 1107, contact 5 of relay SCB(5), contact 4 of relay SCD(5), contact 1 of relay STE(5) to conductor 508 to operate relay BLK(11) and block the test.

If the sender removes ground from conductor 1406 before relay STE(5) operates and relay ISG(12) releases, a circuit is closed from ground on conductor 1107, contact 4 of key SGK(6), conductor 602, contact 11 of relay SLK(13), conductor 1303, contact 1 of relay SCD(5), conductor 509, contact 4 of relay ISG(12), conductor 1229, contact 1 of relay STE(5) to conductor 508 to operate relay BLK(11) and block the test. With relay ISG(12) released the circuit of lamp HG(12) is reclosed.

If relay STE(5) operates and locks before either relay SCB(5) or relay ISG(12) releases, the blocking circuits above traced are opened as well as the circuit for lamp SGK(5). Immediately after the opening of conductor 1406, the sender opens conductor 1416 releasing relay COK(12). With relay COK(12) released, a circuit is closed from ground on conductor 1102, contact 1 of relay DTC(3), conductor 307, contact 3 of relay SPA(12), conductor 1232, contact 5 of relay SP2(4), conductor 412, contact 4 of relay RLK(11), conductor 1121, contact 1 of relay COK(12), conductor 1233 to battery through the winding of relay CLK(11). The operation of relay CLK(11) indicates that in-pulsing has been completed and that conductor 1415 has been opened and that the relay in the sender which controls conductors 1412 and 1406 has been released.

With relay CLK(11) operated a circuit is closed from battery through the winding of relay CPT(11), contact 1 of relay BLK(11), conductor 1122, contact 7 of key T0(26), conductor 2608 through cable 18-21, contact 4 of key NCH(14), conductor 1419 through cable 30-32, contact 5 of key 12DG(30), conductor 3001 through cable 30-32, contact 2 of relay STE(5), conductor 511 through cable 39-40, contact 5 of key FB(53), conductor 5309 through cable 39-40, contact 5 of key FIF(14), conductor 1420, contact of relay CLK(11), conductor 1127, contact 2 of relay SK2(11), contact 6 of relay MAN(11), conductor 1123, contact 7 of relay SP2(4), conductor 413, contact 3 of relay COK(12) to ground on conductor 1105.

Relay CPT(11) operates in this circuit as an indication that all the test functions in connection with the call in process have been successfully completed and that the test circuit is ready to advance the sender selector, restore and restart. Relay CPT(11) locks over its contact 2 to conductor 1124 which is grounded at contact 6 of relays TDS(17), at contact 9 of relay MFS(29) and at contact 5 of relay MFR(37). At its contact 3, relay CPT(11) connects ground to conductor 1125, completing a circuit over contact 2 of key REP(9), contact 4 of key REP2(9), contact 5 of key CDK(9) to battery through register CT(9).

Register CT(9) operates to register one complete test and connects ground over its contact, conductor 900 and contact 1 of key TA(10) to battery through the circuit advance relay CA(10). Relay CA(10) operates and locks over its contact 1 and conductor 1007 to ground at contact 1 of relay SSC(1).

Relay CA(10) at its contact 2 closes a circuit from ground over that contact, contact 5 of key PC(10) and conductor 1003 to battery through the winding of relay SA(10) and at its contact 3 connects ground to conductor 1008, completing a circuit to battery through the winding of relay CA1(2).

Relay SA(10) operates and opens the circuit of relay TCN(10) and operates relay SSG(1) as previously described. Relay SSG(1) operates magnet SS(1) followed by relay SSC(1) which releases magnet SS(1) to advance the sender selector to the next sender.

Relay CA1(2) operates and closes a locking circuit over its contact 5 and conductor 210 which is completed only if relay CPT(11) has released or relays BTA(3), BTT(3), KTK(4) or KRK(4) have failed to release. Relay CA1(2) at its contact 9 opens the circuit of relay ON(11) which releases, removing ground from conductors 1100 to 1111. At its contact 2, relay CA1(2) disconnects ground from interrupter TA(10) to stop the timing operation which will be described hereinafter. Relay CA1(2) also closes a circuit from ground over contact 2 of key RN(10), conductor 203, contact 1 of relay EC(2), contact 4 of relay CA1(2) to conductor 306 to hold the sender busy until it is freed by the release of the test relays or the advance of the sender selector.

The release of relay ON(11) releases all relays which are operated or locked over conductors 1100 to 1111. The removal of ground from conductor 1104 releases relay TDS(17) which, in releasing disconnects ground from the voltage divider made up of resistances AF(17) and BA(17). It also disconnects ground from conductors 1700, 1704 and 1124, to release the relays associated with the trunk closure delay timing circuit. In addition it closes a circuit from ground over its contact 5, the strapped off-normal terminals of brush TCD1(17) to battery through the winding of relay TDG(17) and over the normal contact and winding of magnet STEP(17) to battery. Relay TDG(17) operates, to ground conductor 1124 until the switch TCD(17) has been restored to normal. Magnet STEP(17) operates in the self-interrupting circuit advancing switch TCD(17) to normal where the circuit of magnet STEP(17) and relay TDG(17) is opened, relay TDG(17) is released and ground removed at that point from conductor 1124.

The removal of ground from conductor 1100 releases relay MFR(37) which disconnects ground from conductors 3708, etc., and from conductor 1124 releasing the relays associated with the multifrequency out-pulsing checking circuit. At contact 3, relay MFR(37) connects ground over conductor 3715, the strapped off-normal terminals of brush MFK1(48), and conductor 4823 to battery through the winding of relay MKG(37) and over the back contact and winding of magnet MFK(48) to battery. Relay MKG(37) operates, connecting ground over its contacts 3 and 4 to conductor 1124. Magnet MFK(48) operates in a self-interrupting circuit to advance switch MFK(48) to normal where the circuit of magnet MFK(48) and relay MKG(37) is opened and relay MKG(37) releases to remove ground from conductor 1124.

When relay TDS(17) released as above described, disconnecting ground from conductor 1700, it released relay MFS(29). Relay MFS(29) removes ground from a number of conductors releasing relays associated with the multifrequency in-pulsing circuit and also removing ground from conductor 1124. Relay MFS(29) released, connects ground over its contact 2, contact 7 of relay MPS(29), conductor 2919 over the strapped off-normal contacts of brush MFP1(21) to battery through the upper winding of relay MFG(29) and over the back contact and winding of magnet MFP(21) to battery. Relay MFG(29) operates connecting ground from contact 2 of relay KP5(28) over conductor 2908 and contact 2 of relay MFG(29) to conductor 1124. Magnet MFP(21) operates in a self-interrupting circuit to advance switch MFP(21) to normal when relay MFG(29) releases, removing ground from conductor 1124.

Removal of ground from conductor 1111 releases relay MCK(47) which in turn releases relay MKS(47) and other relays in the marker checking circuit.

When relay ON(11) removed ground from conductor 1107 the operating circuit of relay CPT(11) is opened and when switches TCD(17), MFK(48) and MFP(21) have been restored to normal, the locking circuits of relay CPT(11) are opened and that relay releases slowly in turn releasing register CT(9). Register CT(9) opens the operating circuit of relay CA(10) and the operation of relay SSC(1) in the advance of the sender selector SS(1) opens the locking circuit of that relay so that relay CA(10) now releases, in turn releasing relay SA(10) and relay CAI(2). With relay SA(10) released, relay TCN(10) is connected to the test connector relays of the sender connected to position 2 of switch SS(1) and when relay TCN(10) operates, with relay CAI(2) released, relay ON(11) reoperates and the test of the next sender is started, which takes place as above described.

At the end of the test of this sender, switch SS(1) is advanced as described and in this manner continues to test multifrequency senders until it is advanced to position 19. In position 19 a circuit is closed from ground at contact 1 of relay MSS(10), conductor 1004, brush MS6(1) in position 1, brush SS3(1) in position 19, conductor 108 to battery through the winding of relay MSA(10).

Relay MSA(10) operates and closes a circuit from ground at its contact 4 over its contact 5 to battery through relay MSB(10) and resistance BG(10). A second circuit is closed from ground at contact 4 of relay MSA(10) over contact 2 of relay MSB(10), conductor 1009 to battery through the winding of magnet MS(1) and over the back contact of magnet MS(1) and conductor 100 to battery through the winding of relay MSC(10) and from conductor 100 over contact 3 of relay MSB(10) to battery through resistance BG(10) in shunt of the winding of relay MSB(10). Relay MSC(10) and magnet MS(1) operate. When magnet MS(1) opens its back contact relay MSC(10) releases and the shunt around the winding of relay MSB(10) is opened so that the latter relay operates.

Relay MSB(10) in operating opens the circuit of magnet MS(1) which releases and advances the master selector MS(1) to position 2. The advance of switch MS(1) opens the circuit of relay MSA(10) and that relay releases, in turn releasing relay MSB(10).

With relays MSA(10) and MSB(10) released, relay SA(10) operates and advances the second sender selector to position 1. In this manner the master selector and sender selectors are advanced until all of the multifrequency senders have been tested. If on the last sender selector connected to multifrequency senders, not all the positions are used, the sender selector is advanced over these unused positions by connecting the corresponding terminals of brush SS3(1) to conductor 109 to provide a self-interrupting circuit for magnet SS(1) to advance that sender selector to position 19 after which the master selector is advanced to the next sender selector as above described.

The test circuit then tests all of the dial type senders as will be described hereinafter, the master selector and sender selectors being advanced as described. When the master selector is advanced to the first unused position, shown as position 14, a circuit is closed over brush MS5(1) in positions 14 to 19 over the back contact and through the winding of magnet MS(1) to battery providing a self-interrupting circuit for advancing the master selector to position 20.

In this position a circuit is closed from ground over brush MS5(1), conductor 110 to battery through the winding of the end-of-cycle relay EC(2). Relay EC(2) operates, lighting lamp EC(2).

Relay EC(2) at contact 4 opens the operating and locking circuits of relay LCS(2) releasing the latter relay and at contact 1 opens the locking circuit of relay FST(2) which also releases. Relay LCS(2) releases relay MSS(10). Relay FST(2) releases relay ON1(30) which releases the key-set relays and extinguishes the key-set lamps. With the sender selector in an unused position neither relay IMF(18) nor relay IDL(18) is operated. Therefore, the end-of-cycle condition finds the test circuit with relay EC(2) operated and lamp EC(2) lighted. No other relays are operated and no other lamps are lighted.

To restore the test circuit to normal, start key ST(10) is restored and return-to-normal key RN(10) is operated. A circuit is then closed from ground over contact 1 of key RN(10), conductor 1010, contact 5 of relay LCS(2), contact 6 of relay FST(2), conductor 211, off-normal contacts of brush SS6(1) over the back contact and through the winding of magnet SS(1) to battery. Selector SS0(1) is advanced to normal in this circuit, where ground on conductor 211 is extended to the corresponding brush of the next sender selector SS1 which is restored in turn. When the last sender selector, SS13, has been restored, ground is extended to conductor 111 and the off-normal terminals of brush MS4(1) of the master selector and over the back contact and through the winding of magnet MS(1) to battery, advancing the master selector to normal. When the master selector steps to normal relay EC(2) is released and lamp EC(2) is extinguished.

It is, of course, possible to abandon a test cycle at any point and restore the equipment to normal, for example when it is necessary to use the test circuit to clear trouble in a particular circuit. When this is to be done, key ST(10) is released and, when the test circuit stops at the end of the test call in progress, key RN(10) is operated until all of the frame and sender lamps are extinguished and the master selector is normal.

*Dial in-pulsing*

With the master selector in positions 7 to 13, a circuit is closed from ground over contact 1 of relay MSS(10), conductor 1004, brush MS6(1) in positions 7 to 13, over the brush corresponding to brush SS3(1) of sender selectors SS7 to SS13, to conductor 112, contact 2 of key MF0(1), conductor 105 to battery through the winding of relay IDL(18) and to battery through the winding of relay IND(4). Relay IDL(18) operated lights lamp IDL(18).

The trunk closure delay test switch TCD(17) and the multifrequency out-pulsing test switch MFK(48) are preset as previously described. With switches TCD(17) and MFK(48) preset, relays TDS(17) and PMR(37) are operated and a circuit is closed from ground over contact 4 of relay TDS(17), conductor 1704, contact 3 of relay PMR(37), conductor 3701, contact 8 of relay IDL(18), conductor 1802 through cable 18-34 to battery through the winding of relay DLS(46).

Relay DLS(46) operates in this circuit and closes a circuit from ground on conductor 1109, over contact 1 of relay BLK1(11), conductor 2903 through cable 19-34, contact 3 of relay DLS(46) to battery through the winding of relay G(46) operating the latter relay. Relay DLS(46) at its contact 6 connects ground to conductor 4605, completing a circuit to battery through the winding of relay PSD(34) and resistance BA(34). Just prior to closing this circuit relay DLS(46) connects ground over its contact 7, conductor 4606, brush DC2(34) in its normal and first position, conductor 3120 through cables 31-34 and 8-24 to the back contact of relay ACA(8) in a partial closure of a shunt for relay PSD(34) but since relay ACA(8) is operated as a result of setting up an area code, this shunt is incomplete. Relay DLS(46) also closes a circuit from ground over its contact 2, conductor 4607, normal contact of brush DC1(34), over the back contact of magnet DC(34) to battery through the winding of magnet DC(34), through the lower winding of relay DCG(34) to battery and over contacts 2 and 4 of relay PSD(34) to resistance BA(34) and battery in shunt of the winding of relay PSD(34). Magnet DC(34) operates, opens its back contact and releases, advancing switch DC(33) to position 1, thereby releasing relay DCG(34) and opening the shunt around the winding of relay PSD(34), permitting that relay to operate.

With switch DC(33) in position 1, relay G(46) closes a circuit from ground at contact 3 of relay EP(34), conductor 3401, brush DC4(33) in position 1, conductor 2102, contact 3 of relay G(46), to battery through the winding of relay CD(46). Relay G(46) also closes a circuit from ground at its contact 2, conductor 4608 to battery through the winding of relay STD(51), operating that relay.

Relay STD(51) in operating connects ground to conductor 5100, closing a circuit to battery through resistances K(51) and BC(51) providing a voltage divider, from the mid-point of which a circuit extends through the upper winding of relay PLS(51) and the lower winding of relay CTG(51) through resistance BB(51) to full battery potential, thereby energizing relays PLS(51) and CTG(51) in a direction to close their contacts 1. However, with relay INT1(50) operated as described hereinafter, ground on conductor 5100 is connected over contact 2 of relay INT1(50), conductor 5005 to the winding of relay CTG(51) in shunt of battery through resistance BB(51) energizing relays PLS(51) and CTG(51) in a direction to close their contacts 2. Ground on conductor 5100 is also connected to battery through the winding of relay CTL(50) operating that relay.

Relay STD(51) also closes a biasing circuit for relay R(51) which may be traced from ground through resistance GB(51), contact 3 of relay STD(51), lower winding of relay R(51), resistance J(51), contact 11 of relay STD(51) to battery. Relay R(51) is energized in a direction to hold its contact 1 closed. In addition, relay STD(51) closes a biasing circuit for relay BD1(51) which may be traced from ground through resistance GC(51), contact 1 of relay STD(51), lower winding of relay BD1(51), resistance H(51) to battery over contact 7 of relay STD(51). A circuit is also closed at this time from battery at contact 7 of relay STD(51) through the upper winding of relay BD1(51), contact 6 of relay STD(51), to ground through condenser BD(51) and resistance GF(51) but condenser BD(51) is shunted over contact 6 of relay R1(51), and ground at contact 1 of relay SY(51) so that relay BD1(51) operates. At its contacts 4 and 10, relay STD(51) connects ground through resistance GD(51) to battery through resistance G(51) to set up a second voltage divider, the mid-point of which is connected through the upper winding of relay SRT(51), through resistance F(51) to full battery potential over contact 9 of relay STD(51). Relay STD(51) also connects battery over its contact 12 through the lower winding of relay SRT(51) to one side of condenser S(51) and battery over its contact 9 through resistance F(51) to the other side of condenser S(51).

It will be remembered that key 4900 was operated in setting up the test conditions for this series of tests. With key 4900 and relay STD(51) operated, biasing circuits are closed for interrupter relays INT(50) and INT1(50), which may be traced from ground on conductor 5100, upper winding of relay INT(50), conductor 5000, contact 11 of key 4902, contact 12 of key 4901, contact 11 of key 4900 to battery through resistance BH(49) and from ground on conductor 5100, upper winding of relay INT1(50), conductor 5001, contact 12 of key 4902, contact 13 of key 4901, contact 14 of key 4900 to battery through resistance BJ(49). Relay INT(50) and relay INT1(50) operate to close their contacts 2 in these circuits. A circuit is closed from battery through resistance BG(49), contact 9 of key 4900, contact 10 of key 4901, contact 9 of key 4902, conductor 4903, lower winding of relay INT(50), conductor 5002, contact 2 of key 4902, contact 3 of key 4901, contact 4 of key 4900, condenser PC(49) to ground on conductor 5100. However, battery through resistance BG(49) is shunted at this time by ground connected to conductor 4903 over contact 2 of relay BD(51) and conductor 5100. With contact 2 of relay INT(50) closed, a circuit is closed from battery through the lower winding of relay INT1(50), conductor 5004, resistance L(49), contact 16 of key 4900, contact 15 of key 4901, contact 14 of key 4902, contact 5 of key 4902, contact 6 of key 4901, contact 5 of key 4900, condenser PB(49), conductor 4907, contact 2 of relay INT(50) to ground on conductor 5100, in which circuit condenser PB(49) is charged. The in-dialing circuit now awaits the completion of the sender busy test and the test of the control conductors, all of which take place as previously described.

When relay SK(5) is operated during the test of the sender control conductors, the input tip and ring conductors 1403 and 1404 are extended to the in-dialing circuit, completing a loop circuit which may be traced from conductor 1403, contact 8 of relay SK(5), conductor 500 through cable 18-21, contact 4 of relay DLS(46), conductor 4609, contact 4 of key INCX(38), contact 5 of relay TG3(38), winding of relay TG(38), winding of relay OF(38), contact 3 of key INCX(38), conductor 3800, contact 7 of key 4902, contact 8 of key 4901, contact 7 of key 4900, conductor 4904, contact 10 of relay CX1(38), contact 4 of relay TG3(38), resistance AP(38), contact 7 of relay TG3(38), through retard coil C(38) and resistance B(38) in parallel, conductor 3801, contact 2 of jack PLS(51), contact 2 of relay PLS(51), contact 1 of jack PLS(51), conductor 5101, contact 1 of relay CX2(38), conductor 3802, contact 5 of relay DLS(46), conductor 2602, contact 3 of relay DW0(26), conductor 601 through cable 18-21, contact 8 of key SGK(6), conductor 501, contact 9 of relay SK(5) to conductor 1404.

When the sender is first seized the current in this circuit is in such a direction that relay OF(38) operates, but relay TG(38) remains normal. Relay OF(38) in operating closes a circuit for relay OF1(38) which operates and locks over its contact 4 and conductor 4607 to ground at contact 2 of relay DLS(46). When relay STD(51) operated, grounding conductor 5100, a circuit was closed over contact 2 of relay TG2(38), contact 1 of relay CXS(38) and contact 1 of relay OF1(38) to battery through lamp OPL(38). When relay OF1(38) operates, it extinguishes lamp OPL(38) and extends the above-traced circuit over its contact 2 to battery through lamp RPL(38) causing that lamp to light.

Relay OF1(38) closes a class registration circuit from conductor 1410, contact 1 of relay SK1(4), conductor 404, contact 1 of relay SP(12), contact 6 of relay CLC(12), conductor 1216, contact 3 of relay OF1(38), conductor 2907, contact 1 of relay CSR(25), contact 2 of key IT(25), contact 2 of key TC(25), resistance GH(25) to ground. No circuit is closed over conductor 1411 at this time.

After the sender has completed class registration it reverses the connection of battery and ground to the above-traced loop circuit, releasing relay OF(38) and operating relay TG(38).

Relay TG(38) closes a circuit over its contact, contact 6 of relay OF1(38) to battery through the winding of relay TG1(38). Relay TG1(38) operates and locks over its contact 4 to ground on conductor 4607. At its contact 1, relay TG1(38) closes a circuit for relay TG2(38) which operates, in turn operating relay TG3(38).

With relays TG1(38) and TG3(38) operated the loop circuit is changed from the trunk test condition to the dialing condition. The loop circuit now extends from conductor 1403 as above-traced to conductor 4609, over contact 4 of key INCX(38), contact 6 of relay TG3(38), contact 3 of relay TG1(38), contact 3 of key INCX(38), conductor 3800, contact 7 of key 4902, contact 8 of key 4901, contact 7 of key 4900, conductor 4904, contact 10 of relay CX1(38), contact 7 of relay TG1(38), resistance AM(38), resistance AP(38), contact 2 of relay TG1(38), conductor 3801 and thence as previously traced to conductor 1404. This circuit is closed at contact 6 of relay TG3(38) before the circuit through relays TG(38) and OF(38) is opened at contact 5 of relay TG3(38). With key 4900 operated, a high resistance shunt is connected around the contact of relay PLS(51) from conductor 3801, resistance W(49), contact 2 of key 4900, contact 1 of key 4901, contact 1 of key 4902, conductor 4905, contact 8 of relay TG3(38) and contact 1 of key INCX(38) of conductor 5101.

With relay TG3(38) operated a circuit is closed for operating the synchronizing relay SY(51). This circuit may be traced from battery through the winding of relay SY(51), conductor 5102, contact 3 of relay TG3(38), conductor 3803, contact 2 of relay DLK(34), contact 3 of relay AV1(34), conductor 3402, contact 3 of key DSS(30), conductor 3002, contact 5 of relay STD(51), conductor 1230, contact 2 of relay SCA(12), contact 7 of relay SPA(12), conductor 2910, contact 5 of relay LBB(45), conductor 4509, contact 1 of relay G(46), conductor 4610, contact 5 of relay PSD(34), contact 1 of relay EP(34), conductor 3403, contact 3 of relay CD(46), conductor 4611 to ground at contact 1 of relay DCG(34).

Relay SY(51) at contact 1 opens the shunt around condenser BD(51) to the upper winding of relay BD1(51) causing that relay to start to release. At its contact 2, relay SY(51) closes an obvious circuit for relay SY1(51) which operates. Relay SY(51) also closes a circuit from ground on conductor 5100, contact 1 of relay R(51), contact 3 of relay SY(51), conductor 5104, contact 5 of relay DA1(30), conductor 3003, contact 4 of relay CD(46) to battery through the winding of relay CD1(46), operating the latter relay.

In addition, relay SY(51) closes a circuit from ground on conductor 5100, contact 1 of jack CTG(51), contact 2 of relay CTG(51), contact 2 of jack CTG(51), contact 4 of relay SY(51), conductor 5105, brush DC3(33) in position 1, conductor 3100, through cable 31-34, contact 2 of key 700, conductor 3144, through cable 31-50, contact 6 of relay CTL(50), contact 1 of counting relay 4'(50), winding of counting relay 4(50), conductor 5003, contact 3 of relay R1(51) to battery over contact 8 of relay STD(51). Relay 4(50) operates in this circuit and locks in a circuit from battery on conductor 5003, winding of relay 4(50), winding of relay 4'(50), contact of relay 4(50) to ground. Relay 4'(50) does not operate at this time being shunted by the operating circuit of relay 4(50).

Relay CD1(46) closes a circuit from ground over its contact 3, conductor 4612 to battery through the winding of relay DLK(34), operating the latter relay. At its contact 2, relay CD1(46) connects ground to conductor 4613 completing a circuit to battery through the winding of relay DCG(34) and to battery through the winding of magnet DC(34). Relay DCG(34) in operating opens the operating circuit for relay SY(51) but relay SY(51) is held operated in a circuit extending as previously traced to conductor 3803 and over contacts 1 and 4 of relay CD1(34) to conductor 3003 and thence as traced for the operating circuit of relay CD1(46) to ground over contact 1 of relay R(51) and conductor 5100.

When relay SY(51) opens the shunt around condenser BD(51), relay BD1(51) is held operated for a time due to the charging current for condenser BD(51). This measures the interval between digits which are sent in rapid succession for testing the sender register advance. The release of relay BD1(51) disconnects ground from conductor 4903 and battery through resistance BG(49), thereby permitting condenser PC(49) to charge in series with the lower winding of relay INT(50) and cause relay INT(50) to close its contact 1. When condenser PC(49) is charged, relay INT(50) opens its contact 1 and recloses its contact 2. The length of time that contact 2 of relay INT(50) is open depends upon the values of the resistance and condenser connected in series with its lower winding by the keys of Fig. 49.

When relay INT(50) opens its contact 2, it disconnects ground from the circuit through the lower winding of relay INT(50) and connects resistance N(50) across condenser PB(49) discharging the condenser. When relay INT(50) recloses its contact 2, condenser PB(49) recharges through the lower winding of relay INT1(50), this charging current causing relay INT1(50) to open its contact 2 and close its contact 1, until the condenser is charged when contact 2 is reclosed. The interval during which contact 2 is open controls the open period of the dial interrupter. While contact 1 is closed ground on conductor 5100 is connected to conductor 4903, to shunt battery through resistance BG(49) and permit condenser PC(49) to discharge through the lower winding of relay INT(49), holding that relay operated for a measured interval. When relay INT(50) reoperates, condenser PC(49) is recharged delaying the reoperation of relay INT(50). The release time of relay INT(50) controls the closed period of the dial interrupter.

When relay INT1(50) opens its contact 2 it disconnects ground from conductor 5005 and causes relays PLS(51) and CTG(51) to release and when relay INT1(50) recloses its contact 2, relays PLS(51) and CTG(51) reoperate.

While relay INT(50) is released, condenser PB(49) is discharged, and when relay INT(50) reoperates, condenser PB(49) charges through the lower winding of relay INT1(50), releasing relay INT1(50). Relays INT(50) and INT1(50) continue to operate and release as long as the contact of relay BD1(51) is open, the rate of pulsing being determined by the operation of key 4900. Therefore relays PLS(51) and CTG(51) pulse at the same rate as relay INT1(50).

Each time that relay PLS (51) releases a simulated dial pulse is transmitted to the sender.

When relay CTG(51) releases, it opens the operating circuit of relay 4(50) permitting relay 4'(50) to operate in the locking circuit of relay 4(50) previously traced. With relay 4'(50) operated, when relay CTG(51) operates, the counting relay operating circuit extends as above traced to conductor 3144 and thence over contact 6 of relay CTL(50), contact 2 of relay 4'(50), contact 1 of relay 3'(50), winding of relay 3(50), conductor 5006, contact 4 of relay R1(51) to battery at contact 8 of relay STD(51). Relay 3(50) operates and locks through the winding of relay 3'(50) to ground.

At the second release of relay CTG(51), relay 3'(50) operates and advances the counting relay operating circuit, and when relay CTG(51) reoperates relay 2(50) is operated. In a similar manner relay 2'(50) operates in response to the third release of relay CTG(51) and relay 1(50) operates on the reoperation of relay CTG(51). The locking circuit of relay 1(50) includes the windings of relays 1'(50) and BD(50) which operate in response to the fourth release of relay CTG(51).

Relay BD(50) closes a circuit from ground at contact 1 of relay BD2(51), conductor 5106, contact of relay BD(50), conductor 5007, contact 6 of relay STD(51), upper winding of relay BD1(51) to battery over contact 7 of relay STD(51), reoperating relay BD1(51), which again connects ground to conductor 4903 preventing condenser PC(49) from charging when relay INT1(50) reoperates. When relays INT1(50), PLS(51) and CTG(51) operate at the end of the pulse, they stay operated until relay BD1(51) again releases. The reoperation of relay CLG(51), recloses the counting relay operating circuit which extends as previously traced to the armature of relay 4'(50) and thence over contact 2 of relay 4'(50), contact 2 of relay 3'(50), contact 2 of relay 2'(50), contact 2 of relay 1'(50), conductor 5008 in parallel to battery through the lower winding of relay BD2(51) and the upper winding of relay R2(51).

Relay BD2(51) disconnects ground from condenser BD(51) and the upper winding of relay BD1(51), so that relay BD1(51) releases after an interval determined by the charging of condenser BD(51).

Relay R2(51) at its contact 1 disconnects condenser R(51) from ground through resistance GE(51) and at its contact 2 connects the condenser through the upper winding of relay R(51), to battery over contact 11 of relay STD(51). Relay R(51) is operated while condenser R(51) is charging. Relay R(51) in operating opens the locking circuit of relay SY(51) causing that relay to release, in turn releasing relay CD1(46). While relay R(51) is operated, it closes a circuit from ground on conductor 5100, contact 2 of relay R(51), lower winding of relay R2(51), upper winding of relay BD2(51), to battery through the winding of relay R1(51), holding relays R2(51) and BD2(51) operated and operating relay R1(51). Relay R1(51) disconnects battery from the windings of the counting relays and the operated ones of these relays, including relay BD(50), release. When condenser R(51) is charged, after an interval, relay R(51) releases, in turn releasing relays BD2(51), R2(51) and R1(51).

When relay CD1(46) releases it opens the circuit of magnet DC(34) advancing switch DC(33) to position 2, and at the same time releases relay DCG(34). It also releases relay DLK(34). With relays DCG(34) and DLK(34) released, the previously traced circuit for operating relay SY(51) is closed and that relay reoperates. With relay SY(51) operated the counting relay operating circuit is closed, extending as previously traced from ground on conductor 5100 to brush DC3(33), over conductor 3101, through cable 31-34, contact 2 of key 600, conductor 3140 through cable 31-50, contact 10 of relay CTL(50), contact 1 of relay 0'(50), winding of relay 0(50), conductor 5006, contact 4 of relay R1(51) to battery over contact 8 of relay STD(51).

When relay BD1(51) releases at the end of the interdigital interval, the interrupter relays INT(50) and INT1(50) start pulsing and the second digit, zero, is sent out. In a similar manner the third digit is sent out.

When switch DC(33) advances to position 4, following the transmission of the third digit, the circuit of relay CD(46) is opened, stopping the in-pulsing and a circuit is closed from ground over contact 3 of relay EP(34), conductor 3401, brush DC4(33), conductor 2104 through cable 33-47, contact 3 of key 2DTX(47), contact 3 of relay DO8(47), conductor 4700 through cable 25-45, contact 7 of key TRL(25), conductor 2501 through cable 25-45, contact 5 of key UXD(55), conductor 5500, to battery through the winding of relay MKS(47).

Relay MKS(47) initiates the test of the connection with the marker, which takes place as previously described, resulting if satisfactory in the operation of relay MC(35). The test of the trunk closure delay timing is also made, resulting, if satisfactory, in the operation of relay TDK(17). With relays MC(35) and TDK(17) operated, a circuit is closed from ground over contact 6 of relay BLK(11), conductor 1702, contact 5 of relay TDK(17), conductor 1709, contact 2 of relay MC(35), conductor 3505, contact 2 of relay DO8(47), conductor 2102 through cable 33-47, contact 3 of relay G(46) to battery through the winding of relay CD(46).

With relay CD(46) operated, the remaining digits are transmitted to the sender. During this time the test of the sender SL relay is made as previously described. Since no stations digit key was operated, when switch DC(33) advances to position 11, a circuit is closed from battery through the winding of relay EP(34), contact 3 of relay PSD(34), conductor 1803 through cable 18-34, contact 7 of relay IDL(18), conductor 2403 through cables 30-32 and 8-24, contact 1 of relay STA(24), contact 3 of relay U(24), conductor 3130 through cable 31-34, brush DC2(34) in position 11, conductor 4606 to ground at contact 7 of relay DLS(46).

Relay EP(34) operates in this circuit and closes a circuit from ground at its contact 4, conductor 3404, contact 2 of key DT0(45), contact 5 of key MKD(45), conductor 4510 through cable 18-34, contact 6 of relay IDL(18), conductor 1804, contact 4 of key W0(26), contact 5 of key T0(26), contact 5 of key PS, conductor 2607 to battery through the winding of relay RLK(11).

Relay RLK(11) operates to indicate that the transmission of the designation to the sender has been completed. With relay EP(34) operated the dial pulsing circuit awaits restoring to normal.

The checking of the designation as transmitted from the sender and the restoration of the test circuit to normal takes place as for the multifrequency sender.

Dial out-pulsing—loop dialing

If it is desired to test the senders for their ability to send out dial pulses a corresponding designation will be set up on the designation key-sets and either key LPD(43) or key SXD(43) will be operated according to whether the designation requires loop dialing or simplex dialing, instead of key MFR(25). It will be assumed that loop dialing is required and that, therefore, key LPD(43) is operated.

With key LPD(43) operated, a circuit is closed from off-normal ground on conductor 1100, contact 2 of key MAN(25), contact 2 of key MFR(25), contact 2 of key DCR(25), conductor 2510, contact 3 of key LPD(43), to battery through the winding of relay DPR(43).

Relay DPR(43) operates in this circuit and at its contact 6 connects ground to conductor 4303, through the winding of relay DKA(55) to battery. Relay DKA(55) operates, lighting lamp DPR(55). Relay DKA(55) also closes a circuit from ground over its contact 5, conductor 5507, contact 6 of relay DK(56), conductor 5601, to battery through the winding of relay LBC(57).

At its contact 2, relay DPR(43) connects ground to conductor 4304, completing a circuit over brush DPK2(42) in normal position, conductor 4200, over contact 5 of relay PRS(43) to battery through the resistance BJ(43) in shunt of the winding of relay PRS(43) and over contact 3 of relay PRS(43), conductor 4305, back contact of magnet DPK(42), conductor 4201, contact 9 of relay PRS(43), conductor 4306 to battery through the winding of magnet DPK(42). Magnet DPK(42) operates, opening its contact and thereby its operating circuit and advancing switch DPK(42) to position 1. Relay DPR(42) at its contact 3 closes a circuit from ground to battery through the winding of relay PRS(43). When switch DPK(42) advances to position 1, the shunt above traced around the winding of relay PRS(43) is opened and with a key operated in key-set ACA(6) no shunt is closed in position 1 of switch DPK(42) and relay PRS(43) operates, leaving switch DPK(42) preset in position 1.

Relay DPR(43) connects battery through resistance BD(43) over its contact 9 and conductor 4307 to ground through resistance GB(42), these two resistances constituting a voltage divider, from the mid-point of which a circuit extends over contact 1 of jack TMA(42), winding of relay TMA(42), contact 2 of jack TMA(42), conductor 4202, contact 2 of jack TMD(54), lower winding of relay TMD(54), contact 3 of jack TMD(54), conductor 5400, contact 10 of relay DPR(43), resistance BE(43) to full battery potential. A circuit also extends from battery on conductor 5400 over contact 3 of jack TMD(54) through the upper winding of relay TMD(54), contact 1 of jack TMD(54), through condenser TM(54) to ground.

However, ground is also connected to conductor 5400 at this time over contact 4 of relay TCD(43), conductor 4308 and contact 1 of relay L(55) so that condenser TM(54) is discharged and relays TMD(54) and TMA(42) are released, that is, hold their contacts 1 closed.

In addition relay DPR(43) closes a circuit from ground over its contact 5, conductor 4310, contact 1 of key LPD(43), conductor 4311, to battery through the winding of relay LP(55), operating that relay. Relay DPR(43), in grounding conductor 4310, also closes a biasing circuit for relay L(55) which may be traced from ground on conductor 4310, through the lower winding of relay L(55), conductor 5501, contact 7 of relay TCD(43), to battery through resistances BB(43).

When relay PRS(43) operates after switch DPK(42) has been preset, if the sender is to be set by dial pulses, it closes a circuit from ground at contact 4 of relay IDL(18), conductor 1805 through cable 18-44, contact 6 of relay PRS(43), conductor 4309 to battery through the winding of relay DIN(42), which operates. If the sender is to be set by multifrequency pulses, relay DIN(42) is not operated. For this description it will be assumed that relay DIN(42) is not operated.

The seizure of the sender, test of its condition, test of the class registration function, transmission of the designation to the sender, the marker test and the trunk closure delay test, all take place substantially as previously described. For calls requiring dial-type out-pulsing the SL relay of the sender does not function until after out-pulsing has been completed and therefore the test of that function is also delayed.

Trunk closure by the sender is tested for over conductors 1409 and 1408, conductor 1409 extending over contact 3 of relay SK1(4), conductor 403, contact 5 of relay SPA(12), conductor 1227, contact 7 of relay OPT(43), conductor 4312, contact 2 of relay LP(55), contact 1 of relay PS1(55) to ground through resistance BA(55) and conductor 1408 extending over contact 4 of relay SK1(4), conductor 409, contact 8 of relay SPA(12), conductor 1228, contact 3 of relay LP(55), conductor 5502, in parallel over contact 5 of relay TGT(42) and brush TM3(54) of timing switch TM(54), conductor 4203, contact 4 of relay PS1(55), to ground through condenser LPD(55) and over contact 7 of relay LP(55), upper winding of relay L(55), conductor 5503, over contact 2 of relay RES(44) to battery through resistance BC(44).

When the sender closes the trunk, after trunk closure delay, relay L(55) operates and closes a circuit from ground over contact 2 of relay L(55), conductor 5504, contact 10 of relay PRS(43), conductor 4300, contact 9 of relay UXD(44), conductor 4400, contact 2 of key XDD(43), conductor 4301, contact 2 of key 0TD(25), contact 2 of key 3TD(25), contact 2 of key 5TD(25), conductor 2503, brush TCD5(17) in position 8 (assuming that the trunk closure delay was correct), contact 2 and winding of relay TDK(17) to battery. Relay TDK(17) operates and closes a circuit from ground over contact 4 of key MFR(25), conductor 2505, contact 4 of relay TDK(17), contact 3 of relay DF1(17), contact 3 of relay DF2(17), conductor 1708, contact 3 of key MAN(25), contact 5 of key MFR(25), contact 4 of key DCR(25), conductor 2511, contact 2 of key LPD(43) to battery through the winding of relay TCD(43).

At its contacts 7 and 8, relay TCD(43) transfers the biasing circuit of relay L(55) from battery through resistance BB(43) to battery through resistance BA(43) thereby increasing the release bias on relay L(55), but relay L(55) remains operated.

With relay L(55) operated, the operation of relay TCD(43) closes a circuit from ground over contact 2 of relay L(55), conductor 5504, contact 1 of relay LP(55), conductor 5505, contact 3 of relay TGT(42), conductor 4204, contact 3 of relay TCD(43), conductor 4313, winding of relay L1(57), in parallel to battery through resistance BH(57) and through the winding of relay RSR(57). Relay RSR(57) operates slowly and relay L1(57) operates quickly to prevent a premature operation of relay RA(57). With both relay L1(57) and relay RSR(57) operated, a circuit is closed from ground at contact 2 of relay RSR(57), contact 2 of relay L1(57) through the winding of relay L2(57). Relay RSR(57) also closes a circuit from ground over its contact 1, contact 2 of relay RA(57) to battery through the winding of relay RA1(57). The dial pulse check circuit is now ready to receive dial pulses.

For each pulse of a digit, the sender opens the connection between conductors 1408 and 1409, causing relay L(55) to release, opening its contact 2 and closing its contact 1. When relay L(55) opens its contact 2, relay L1(57) releases but relay RSR(57) which is slow to release holds over the interruptions of its circuit due to dial pulses. Relay L1(57) in turn releases relay L2(57). Relay L1(57) also closes a circuit from ground at contact 2 of relay RSS(57), contact 1 of relay L1(57), to battery through the upper winding of relay RA(57). Relay RA(57), because of its short-circuited lower winding is slow to release and remains operated throughout the digit. Relay RA(57) opens the circuit of relay RA1(57) causing the latter relay to release.

When relay L(55) closes its contact 1, it completes a circuit from ground over its contact 1, contact 4 of relay LP(55), conductor 5506, contact 4 of relay UXD(44), conductor 4401, contact 1 of relay DPS(43), conductor 4314, contact 3 of relay RSR(57), contact 1 of relay L5(57) to battery through the winding of relay L3(57). Relay L3(57) operates and closes a locking circuit for itself from battery through its winding, lower winding of relay L5(57), contact 1 of relay L4(57), contact 1 of relay L3(57), in parallel over contacts of relay L2(57) and contact 3 of relay RA(57) to ground at contact 2 of relay RSR(57). Relay L5(57) does not operate in this locking circuit since it is shunted by the operating circuit of relay L3(57).

At the end of the first pulse, relay L(55) opens its contact 1 and closes its contact 2, reoperating relays L1(57) and L2(57). The opening of contact 1 of relay L(55) opens the operating circuit of relay L3(57) and permits relay L5(57) to operate.

With relay L5(57) operated, a circuit is closed from ground at contact 2 of relay RSR(57), contact 3 of relay RA(57), contact 1 of relay BDT(57), conductor 5700, contact 4 of relay DK(56), conductor 5600, contact 4 of relay L5(57), conductor 5701, contact 6 of relay P4(56), contact 6 of relay P2(56), contact 2 of relay P3(56), contact 1 of relay P5(56), to battery through the lower winding of relay P1(56). Relay P1(56) operates and locks over a circuit from battery through its upper winding and its contact 3, contact 2 of relay P2(56), contact 4 of relay P3(56), contact 2 of relay P4(56), contact 4 of relay P5(56), conductor 5601, contact 2 of relay RA1(57), to ground at contact 1 of relay RSR(57). A branch of this locking circuit extends over conductor 5602 to contact 3 and the winding of relay P1A(57) operating that relay, which locks over its contact 4 and conductor 5702 to ground at contact 8 of relay DPR(43).

Relay P1A(57) in operating closes a circuit from ground over contact 1 of relay RSR(57), contact 1 of relay RA1(57), contact 1 of relay P1A(57), conductor 5703, to battery through the winding of relay RA2(56). Relay RA2(56) operates and locks over its contact 5, conductor 5603, contact 3 of relay PH(57), to ground on conductor 5702.

When relay L(55) releases at the beginning of the second pulse, relays L1(57) and L2(57) again release, and ground is again connected to conductor 4314, completing a circuit over contact 3 of relay RSR(57), contact 2 and upper winding of relay L5(57), upper winding of relay L4(57) to battery. Relay L5(57) is held operated and relay L4(57) operates, closing a locking circuit for itself from battery through its lower winding and over its contact 2, contact 2 of relay L3(57), contact 3 of relay RA(57) to ground at contact 2 of relay RSR(57). At its contact 1, relay L4(57) opens the locking circuit for relay L3(57) which releases and opens the locking circuit for relay L4(57) so that relay L4(57) is held only under the control of relay L(55).

At the end of the second pulse, relay L(55) reoperates, opening the circuits of relays L5(57) and L4(57), restoring these relays to normal. With relay L5(57) released, a circuit is closed from ground on conductor 5600, contact 3 of relay L5(57), contact 3 of relay RA1(57), conductor 5704, contact 5 of relay P1(56) to battery through the winding of relay P2(56). Relay P2(56) operates, locking over its contact 3, contact 4 of relay P3(56) and thence as traced for the locking circuit of relay P1(56) to ground at contact 1 of relay RSR(57). At its contact 2, relay P2(56) opens the locking circuit of relay P1(56) which releases.

With relays L3(57), L4(57) and L5(57) released, the release of relay L(55) in response to the third pulse operates relay L3(57) and its reoperation at the end of that pulse operates relay L5(57). At the beginning of the fourth pulse relay L4(57) is operated, relay L3(57) released, and relay L5(57) held operated, and at the end of that pulse relays L4(57) and L5(57) release. It will be apparent, therefore, that at the end of each odd pulse relay L5(57) is operated, grounding conductor 5701 and at the end of each even pulse relay L5(57) is released, grounding conductor 5704.

Ground on conductor 5701 at the end of the third pulse is extended over contact 6 of relay P4(56) and contact 5 of relay P2(56) to battery through the winding of relay P3(56). Relay P3(56) operates, locks over its contact 5, contact 2 of relay P4(56), and contact 4 of relay P5(56) to ground over conductor 5601, and opens the locking circuit of relay P2(56) which releases.

Ground on conductor 5704 at the end of the fourth pulse extends over contact 6 of relay P3(56), to battery through the winding of relay P4(56). P4(56) locks over its contact 3 and contact 4 of relay P5(56) to conductor 5601 and opens the locking circuit of relay P3(56) causing that relay to release.

With relay P4(56) operated, ground connected to conductor 5701 following the fifth pulse is extended over contact 5 of relay P4(56) to battery through the winding of relay P5(56) which operates. Relay P5(56) locks over contact 6 of relay P1(56) and contact 5 of relay P5(56) to conductor 5601 and releases relay P4(56).

With relay P5(56) operated, ground connected to conductor 5704 at the end of the sixth pulse is extended over contact 6 of relay P5(56), to battery through the lower winding of relay P6(56). Relay P6(56) locks through its upper winding and over its contact 3 to conductor 5601, and closes a circuit from ground over its contact 4 to battery through resistance BK(56) and the winding of relay P6A(56) in parallel. Relay P5(56) remains operated.

At the end of the seventh pulse, ground connected to conductor 5701 is extended over contact 6 of relay P4(56), contact 6 of relay P2(56), contact 2 of relay P3(56), contact 1 of relay P6(56) to battery through the lower winding of relay P1(56). Relay P1(56) opens the locking circuit of relay P5(56) which releases, after which relay P1(56) locks in the circuit previously traced.

The eighth, ninth and tenth pulses cause the operation of relays P2(56), P3(56) and P4(56) as described for the second, third and fourth pulses.

At the end of a digit, relay L(55) remains operated, holding relay L1(57) operated for a sufficient interval to permit relay RA(57) to release. With relay RA(57) released, a circuit is closed to determine that the checking relays are normal. This circuit may be traced from ground over contact 3 of key PAK(54), conductor 5401, contact 2 of relay P1A(57), conductor 5705, contact 2 of relay RA2(56), conductor 5604, contact 4 of relay RA(57), conductor 5706, contact 1 of relay G0(56), contact 2 of relay G1(56), contact 5 of relay G2(56), contact 5 of relay G4(56), contact 3 of relay G7(56), conductor 5605, contact 5 of relay PH(57), contact 1 of relay PKD(57), contact 1 of relay PKD1(57), conductor 5707, to battery through the winding of relay DK(56). Relay DK(56) operates in this circuit and locks over its contacts 1 and 7, contact 1 of relay RA2(56), conductor 5606 to ground at contact 1 of relay RSR(57). At its contact 6 relay DK(56) opens the circuit of relay LBC(57) but that relay is slow to release and remains operated for an interval. At its contact 5, relay DK(56) connects ground on conductor 5507 to conductor 5608 and thence over contact 1 of relay RA(57) to battery through the winding of relay BDT(57).

With relay DK(56) operated, two checking circuits are closed for checking the digit received against the digit set up on the key-set. Assuming that the first digit of the code used for this call is the same as previously used, namely 4, and that relay P4(56) was operated in response to the reception of four pulses from the sender, one circuit will be closed from ground over contact 11 of relay UXD(44), conductor 4402, contact 2 of relay DK(56), contact 1 of relay P4(56), to battery through the winding of relay G4(56) and in parallel therewith over contact 6 of relay RA2(56), conductor 2364 through cable 23-56, contact 3 of key 700, conductor 704, contact 1 of relay NSK(32), conductor 3210, through cable 32-42, brush DPK3(42) in position 1, conductor 4205, to battery through the winding of relay PKD(57). A second circuit will be closed from ground over contact 11 of relay UXD(44), conductor 4402, contact 3 of relay DK(56), contact 4 of relay P4(56), contact 3 of relay P6A(56) to battery through the winding of relay G0(56) and in parallel therewith over contact 9 of relay RA2(56), conductor 2360 through cable 23-56, contact 4 of key 700, conductor 703, contact 2 of relay NSK(32), conductor 3211 through cable 32-42, brush DPK4(42) in position 1, conductor 4205, to battery through the winding of relay PKD1(57).

If relays PKD(57) and PKD1(57) both operate and two of the relays G0(56) to G7(56), neither more nor less, operate, a circuit is closed from ground over contact 3 of key PAK(54), conductor 5401, contact 2 of relay P1A(57), conductor 5705, contact 2 of relay RA2(56), conductor 5604, contact 4 of relay RA(57), conductor 5706, contact 2 of relay G0(55), contact 5 of relay G1(55), contact 1 of relay G2(55), contact 2 of relay G4(56), contact 1 of relay G7(56), conductor 5609, contact 2 of relay PKD(57), contact 2 of relay PKD1(57), conductor 5708, contact 9 of relay TCD(43), conductor 4315 to battery through the winding of relay PH(57).

Relay PH(57) operates and locks over its contact 4, conductor 4305, back contact of magnet DPK(42), conductor 4201, contact 8 of relay PRS(43) to ground at contact 4 of relay DPR(43). Relay PH(57) closes a circuit from ground over contact 4 of relay DKA(55), conductor 5508, contacts 1 and 2 of relay PH(57), conductor 4306 to battery through the winding of magnet DPK(42). At its contact 3, relay PH(57) opens the locking circuit of relay RA2(56) which releases, in turn releasing relay DK(56).

With relay PH(57) operated, to indicate a digit check, it closes a circuit from battery through the winding of relay LBC(57), contact 6 of relay PH(57) to ground over conductor 5507, which circuit becomes effective to hold relay LBC(57) operated before sufficient time has elapsed, following the operation of relay DK(56), to permit slow-to-release relay LBC(57) to release.

Relay DK(56) in releasing also releases relays G0(56), G4(56), PKD(57) and PKD1(57), opens the circuit of relay BDT(57), which releases slowly, and recloses the circuit of relay LBC(57). The release of relays G0(56), etc., opens the operating circuit for relay PH(57).

When magnet DPK(42) operates in the circuit above traced, it opens the locking circuit for relay PH(57) and that relay releases, in turn releasing magnet DPK(42) to advance switch DPK(42) to position 2.

When relay BDT(57) now releases the circuit is ready to receive the next digit.

If the sender starts to send out the next digit prematurely, that is, before relay BDT(57) releases, a circuit is closed from ground over contact 2 of relay RSR(57), contacts of relay L2(57) released, contact 2 of relay BDT(57) to battery through the winding of relay BDF(57). Relay BDF(57), if operated, lights lamp BDF(57), locks over its contact 1 to ground at contact 2 of relay RSR(57) and connects the winding of relay BDT(57) to ground on conductor 5507, holding the latter relay operated.

If the digit fails to check, relay LBC(57) releases after an interval and connects ground to contacts of relays G0(56) to G7(56) to light the lamps of Fig. 48 which correspond to the operated relays and indicate the digit received. It also connects ground on conductor 5702, contact 5 of relay P1A(57), contact 2 of relay LBC(57), conductor 1123 through cable 19-34, contact 6 of relay MAN(11), contact 1 of relay SK2(11), conductor 508 to battery through the lower winding of relay BLK(11) to battery to block the test.

Assuming that the digit checks properly, the test circuit proceeds to check each of the succeeding digits in substantially the manner described.

Assuming that no stations digit has been set up, when switch DPK(42) is advanced to position 11, a circuit is closed from ground over contact 2 of relay DPR(43), conductor 4304, brush DPK2(42) in position 11, conductor 2380 through cable 23-42, contact 3 of relay STA(24), conductor 2404 through cables 8-24 and 30-32, contact 4 of key LPD(43), contact 4 of relay PRS(43), conductor 4316, contact 4 of key 2OC(44), contact 1 of key SXR(44), conductor 3602, contact 6 of relay SP2(4), conductor 411 to battery through the winding of relay SK2(11) to indicate the successful completion of the outpulsing check.

With relay SK2(11) operated the test of the sender SL relay is made. Relay SLK(13) was operated and locked following the trunk closure delay test and relay RLK(11) was operated following the completion of in-dialing. With relay SLK(13) operated, conductor 1410 is connected to the winding of relay KT(13) and conductor 1411 is connected to the winding of relay KR(13) as previously described. When relay TCD(43) operated following the trunk closure delay test, the windings of relays KT(13) and KR(13) were connected over conductor 1304, contact 9 of relay TCD(43), conductor 1311, contact 5 of relay KTR(13), conductor 1306 to battery through resistance BD(6). When relay SK2(11) operates, ground is connected over off-normal conductor 1109, contact 1 of relay BLK1(11), contact 1 of relay RLK(11), contact 3 of relay SK2(11), conductor 4302, to the contact of relay KT(13).

Battery through the windings of relays KT(13) and KR(13) connected to conductors 1410 and 1411 operates the SL relay of the sender through its high resistance winding. When dialing is completed ground is connected through the low resistance winding of the SL relay in parallel with the high resistance winding of that relay and marginal relays KT(13) and KR(13) operate, completing a circuit from ground connected to conductor 4302 as above traced, over contact of relay KT(13), contact of relay KR(13), conductor 1307, contact 1 of relay ROL(6), conductor 603, contact 5 of key GT0(14), conductor 1418 to battery through the winding of relay KTR(13).

Relay KTR(13) locks over its contact 6 to ground on conductor 1105 and disconnects battery from the windings of relays KT(13) and KR(13) to cause the sender to release. The restoration of the test switches and the advance of the sender selector take place as previously described.

*Simplex dialing*

If the designation set up on the key-set is one which requires simplex out-dialing, key SXD(43) is operated and relay SX(43) operated in place of relay LP(55). With relay SX(43) operated, the operating circuit for relay L(55) extends from conductor 1408 to conductor 1228 as above traced and thence over contact 4 of relay SX(43), contact 8 of relay OPT(43), contact 5 of relay TCD(43), conductor 4317, upper winding of relay L(55) and thence to battery. Conductor 1409 is not connected to ground at this time, but when the sender closes the trunk for this class of call, it connects low voltage battery to conductor 1408, operating relay L(55) which operates relay TDK(17), relay TDK(17) in turn operating relay TCD(43).

Relay TCD(43) alters the bias on relay L(55) as described and transfers the operating winding of relay L(55) to conductor 1227 over contact 6 of relay TCD(43), contact 7 of relay SX(43) and contact 7 of relay OPT(43). Conductors 1408 and 1409 to which conductors 1227 and 1228 are connected, are connected in simplex in the sender but are used separately in the test circuit to test each conductor for continuity. The change in the bias on relay L(55) under the simplex dialing condition is sufficient to cause relay L(55) to release and close its contact 1.

With relay SX(43) operated, relays L1(57) and RSR(57) operate in a circuit which extends as previously traced to conductor 5505 and thence over contact 2 of relay SX(43) and conductor 4308 to ground at contact 1 of relay L(55).

For simplex pulsing, the sender connects ground through a resistance to conductors 1408 and 1409, operating relay L(55) at each pulse. When relay L(55) closes its contact 2, it connects ground over that contact to conductor 5504, over contact 3 of relay SX(43) to conductor 5506, and thence as previously traced to the winding of relay L3(57). Relays L3(57), L4(57) and L5(57) respond to closures of the front contact of relay L(55) to count the incoming pulses as previously described, and the operation of recording and checking the designation takes place as described for loop dialing.

*Direct-current code out-pulsing*

The senders being tested are also equipped to send out designations by means of direct-current code pulses. Since this type of pulsing is used to set outgoing senders which in general control local or tandem offices, it will be assumed that only the office code and numerical designation are to be sent to and received from the sender and that therefore no keys are operated in the area code key sets ACA(6), ACB(6) and ACC(14) so that relays ACA(8), ACB(8) and ACC(16) are not operated. For convenience it will be assumed that the same office code and numerical keys are operated, although it will be understood that, in practice, the keys to be operated will be determined by the codes corresponding to such calls in the particular office where the test circuit is installed.

Assuming also that the sender under test is to be set by multifrequency pulses, relay IMF(18) will be operated to control the setting of the sender and key DCR(25) will be operated to prepare the test circuit to receive direct-current code pulses.

The seizure of the sender and the test of the control conductors and class registration take place as previously described.

With key DCR(25) operated, as soon as off-normal relay ON(11) operates, conductor 1100 is grounded, completing a circuit over contact 2 of key MAN(25), contact 2 of key MFR(25), contact 1 of key DCR(25), conductor 2509 through cable 39-40 to battery through the winding of relay DCR(41). Relay DCR(25) closes a circuit from ground over its contact 5, conductor 4100, through cable 39-40, brush DCK1(39) in its normal position, conductor 3900, back contact and winding of magnet DCK(39) to battery, operating magnet DCK(39) in a self-interrupting circuit to advance switch DCK(39) to position 1. Conductor 3900 also extends through cable 39-41 to battery through the winding of relay DKG(41) which operates and then releases when switch DCK(39) advances to position 1.

Relay DCR(41) closes a circuit from ground over its contact 6 through the winding of relay PDC(41) to battery through resistance BH(41). However, since relay ACA(8) is not operated, relay DCR(41) at its contact 7, which closes before contact 6 closes, connects ground to conductor 4101 which extends through cable 39-41 over brush DCK2(39) in its normal position and position 1, conductor 2370 through cables 23-39 and 8-24, contact 2 of relay ACA(8), conductor 805, through cables 8-24 and 30-32, contact 3 of key AAC(30), conductor 2404, contact 3 of key DCR(25), conductor 2512, through cable 39-41, over contact 4 of relay PDC(41) to battery through resistance BH(41) in shunt of the winding of relay PDC(41) to prevent that relay from operating and over contact 1 of relay PCD(41) to conductor 3900 and the self-interrupting circuit of magnet DCK(39). Therefore when switch DCK(39) reaches position 1, magnet DCK(39) is again operated and released, advancing switch DCK(39) to position 2.

In position 2, with relay ACB(8) not operated, the shunt and magnet operating circuit above traced extends over brush DCK2(39), conductor 2371 through cables 23-39 and 8-24, contact 2 of relay ACB(8), to conductor 805. Brush DCK2(39) bridges its contacts so that the shunt does not open as the switch advances to position 3. In this position, the shunt extends over brush DCK2(39), conductor 2372 through cables 23-39 and 16-24, contact 2 of relay ACC(16) to conductor 805 causing switch DCK(39) to advance to position 4, where the shunt is opened since relay OCA(16) is operated, and relay PCD(41) operates, opening the operating circuit of magnet DCK(39), leaving switch DCK(39) preset in position 4.

Relay PCD(41) operated closes a circuit from ground at contact 4 of relay TDS(17), conductor 1704, contact 5 of relay PDC(41), conductor 3701, contact 10 of relay IMF(18), conductor 1800 to battery through the winding of relay MFA(26). Relay MFA(26) in turn operates relay MFS(29) which starts the presetting operation for switch MFP(21). Relay MFS(29) closes the circuit for relay MPS(29) and the operating circuit for magnet MFP(21) for advancing switch MFP(21) to position 2 as previously described. In position 2, with no area code set up, an operating circuit for magnet MFP(21) and a shunt around the winding of relay MPS(29) is closed from ground at contact 6 of relay MFS(29), conductor 2901, brush MFP2(21) in position 2, conductor 3121, through cables 21-31 and 8-24, contact 1 of relay ACB(8), conductor 2403, contact 2 of relay MFA(26), conductor 2605, through cable 18-22, contact 5 of relay MPS(29) to battery through resistance BT(29) in shunt of the winding of relay MPS(29) and from conductor 2605 over contact 2 of relay MPS(29) and conductor 2902, to the back contact and winding of magnet MFP(21) and battery. Magnet MFP(21) operates and advances switch MFP(21) to position 3, where the circuit for magnet MFP(21) and the shunt around relay MPS(29) extends over contact 3 of brush MFP2(21), conductor 3122, through cables 21-31 and 16-24, over contact 1 of relay ACC(16) to conductor 2403. Switch MFP(21) is therefore advanced to position 4 and then to position 5 over the circuit by which it was advanced to position 1. In position 5 no shunt is closed around the winding of relay MPS(29) and that relay operates, opening the circuit of magnet MFP(21) and leaving switch MFP(21) preset in position 5.

The transmission of the designation to the sender takes place as previously described, starting with the first office code digit.

For this type of call, trunk closure is indicated by the operation of relay TCK(17) as described for the multifrequency out-pulsing, relay TCK(17) operating relay TDK(17) if the trunk closure delay is satisfactory. With relay TDK(17) operated, a circuit is closed from ground over contact 4 of key MFR(25), conductor 2505, contact 4 of relay TDK(17), contact 3 of relay DF1(17), contact 3 of relay DF2(17), conductor 1708, contact 3 of key MAN(25), contact 5 of key MFR(25), contact 5 of key DCR(25), conductor 2513 through cable 39-41, contact 3 of relay PDC(41), conductor 4102 through cable 52-53 to battery through the winding of relay CTD(52).

Relay CTD(52) closes circuits for operating two of the relays CS0(52) to CS7(40) under the control of the key-set to prepare for checking the first digit. These circuits may be traced from ground over contact 7 of relay CTD(52), conductor 5201 through cable 52-53, contact 2 of relay STT(41), conductor 4104 through cable 39-40, to brushes DCK4(39) and DCK5(39). With switch DCK(39) in position 4, the circuit over brush DCK4(39) extends over conductor 3217 through cable 32-39, contact 8 of relay NSK(32), conductor 3202, contact 4 of key 1501, conductor 2362 through cables 23-30 and 39-52, contact 3 of relay CTD(52), conductor 5202 to battery through the winding of relay CS2(40). The circuit over brush DCK5(39) extends over conductor 3216 through cable 32-39, contact 7 of relay NSK(32), conductor 3203, contact 3 of key 1501, conductor 2364 through cables 23-39 and 39-52, contact 4 of relay CTD(52), conductor 5203 to battery through the winding of relay CS4(40). Relays CS2(40) and CS4(40) are operated to indicate the digit set up on the first office code key-set.

The test of the SL relay of the sender takes place as for multifrequency out-pulsing after which relay MFT(13) is operated as previously described. With relay MFT(13) operated, relay CTD(52) closes a circuit from conductor 1408 leading to the sender, contact 4 of relay SK1(4), conductor 409, contact 8 of relay SPA(12), conductor 1228, contact 11 of relay CTD(52), conductor 5200, contact 1 of relay FB(53), conductor 5301, contact 1 of relay LBF(41), contact 6 of relay KRL(41), contact 2 and winding of relay KC1(41); contact 1 of relay KR1(41), contact 3 of relay KRL(41), conductor 4103, through cable 52-53, contact 8 of relay CTD(52), conductor 1308, contact 1 of relay MFT(13), contact 4 of relay LBA(13) to ground on conductor 1105. Ground on conductor 4103 extends over contact 5 of relay KC1(41) and contact 1 of relay CST(41) to battery through lamp AS(41).

When the sender is ready to send out pulses, it first connects 24-volt battery to conductor 1408, operating relay KC1(41) which locks over its contact 3 to battery through resistance BU(41) and extinguishes lamp AS(41). At its contact 6, it extends the circuit from conductor 1408 over conductor 4105, contact 1 of jack RP(40), winding of polarized relay RP(40), contact 2 of jack RP(40), winding of marginal relay RM(40) to 24-volt battery. Relay KC1(41) also closes a circuit from conductor 1409 leading to the sender, over contact 3 of relay SK1(4), conductor 403, contact 5 of relay SPA(12), conductor 1227, contact 12 of relay CTD(52), conductor 5204 through cable 52-53, contact 3 of relay FB(53), conductor 5302, contact 4 of relay LBF(41), contact 1 of relay KRL(41), contact 1 of relay KC1(41), conductor 4106, winding of marginal relay TM(52), contact 1 of jack TP(52), winding of polarized relay TP(52), contact 2 of jack TP(52), winding of sensitive relay TS(52) to 24-volt battery.

Figure 31:
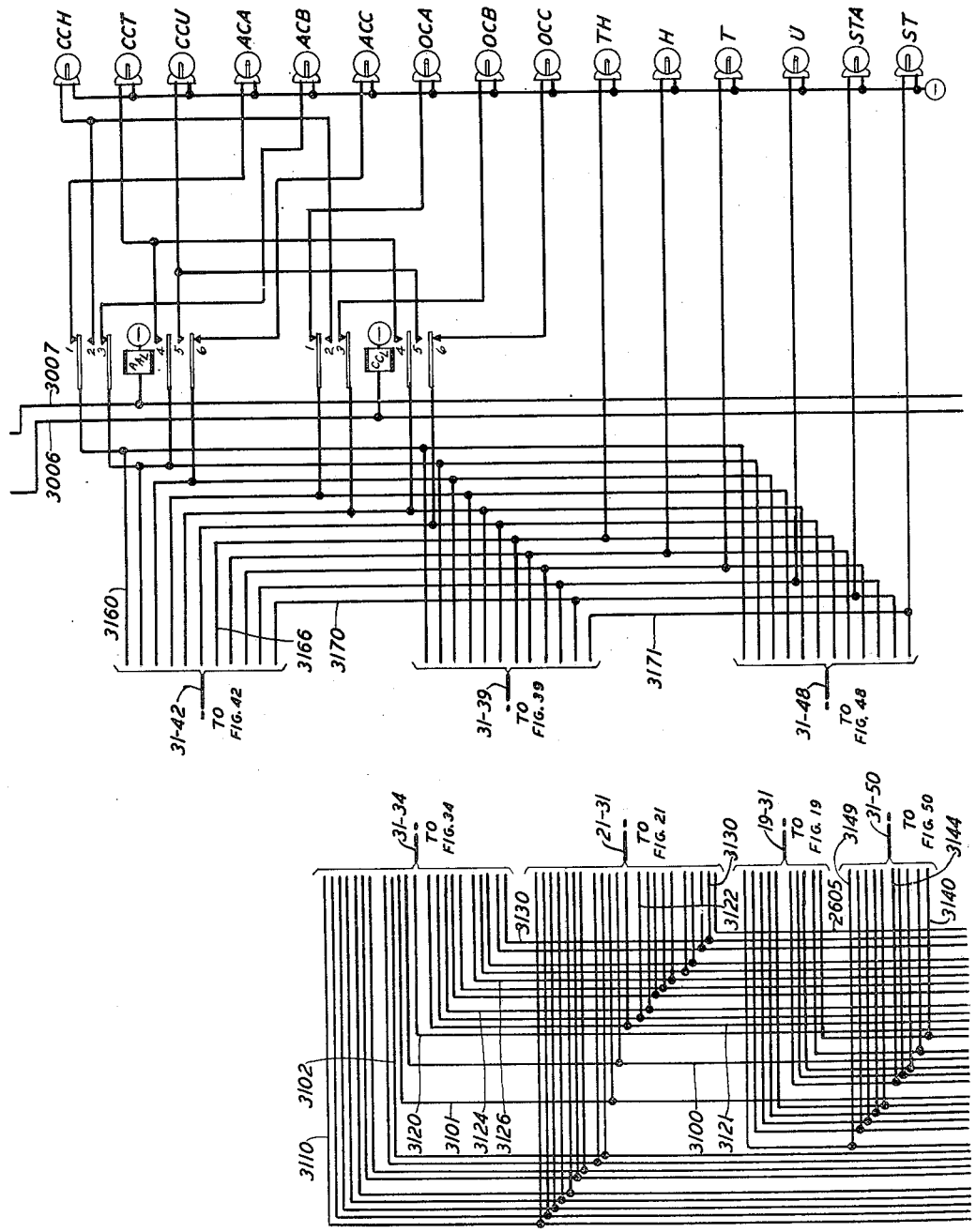
Figure 32:
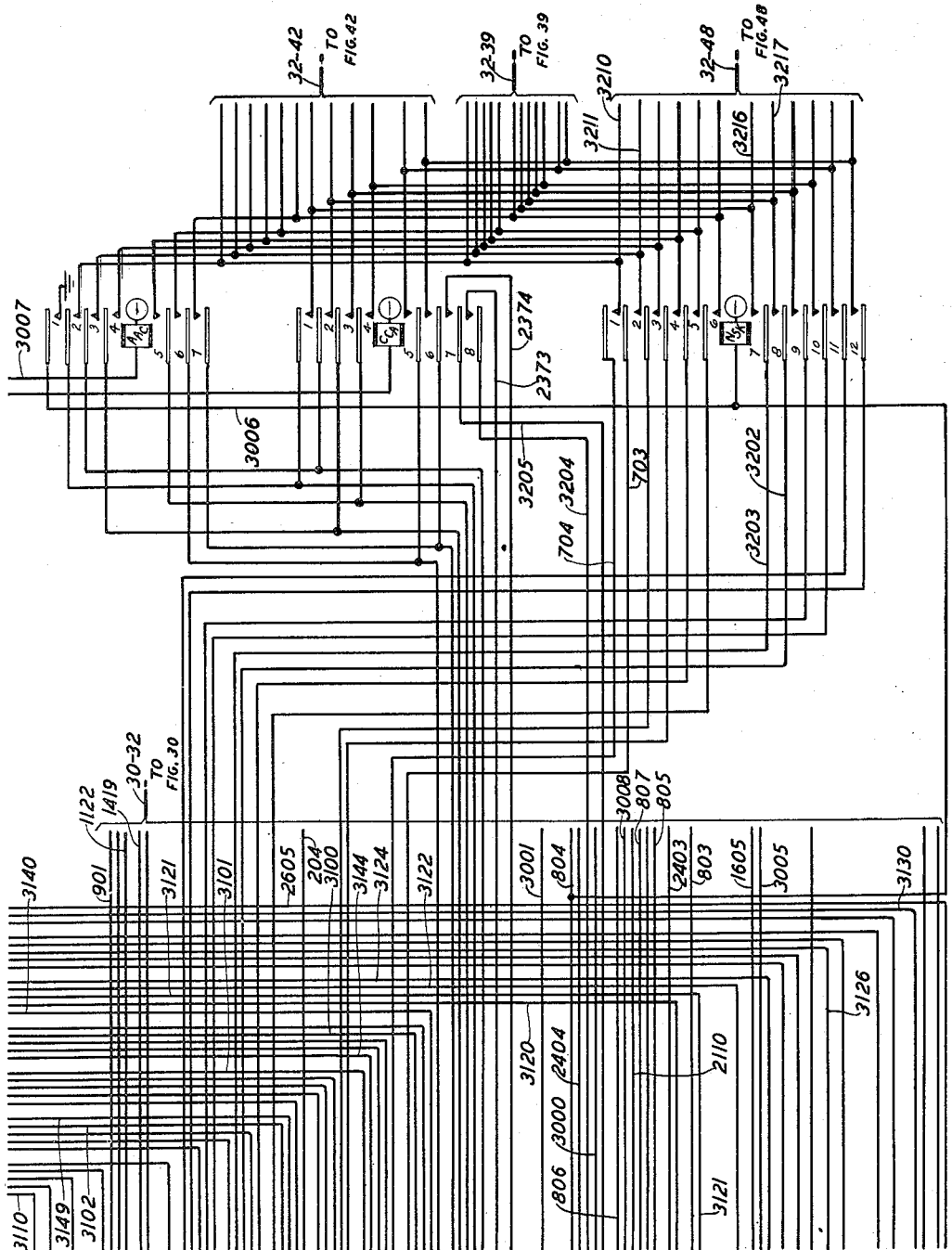
Figure 33:
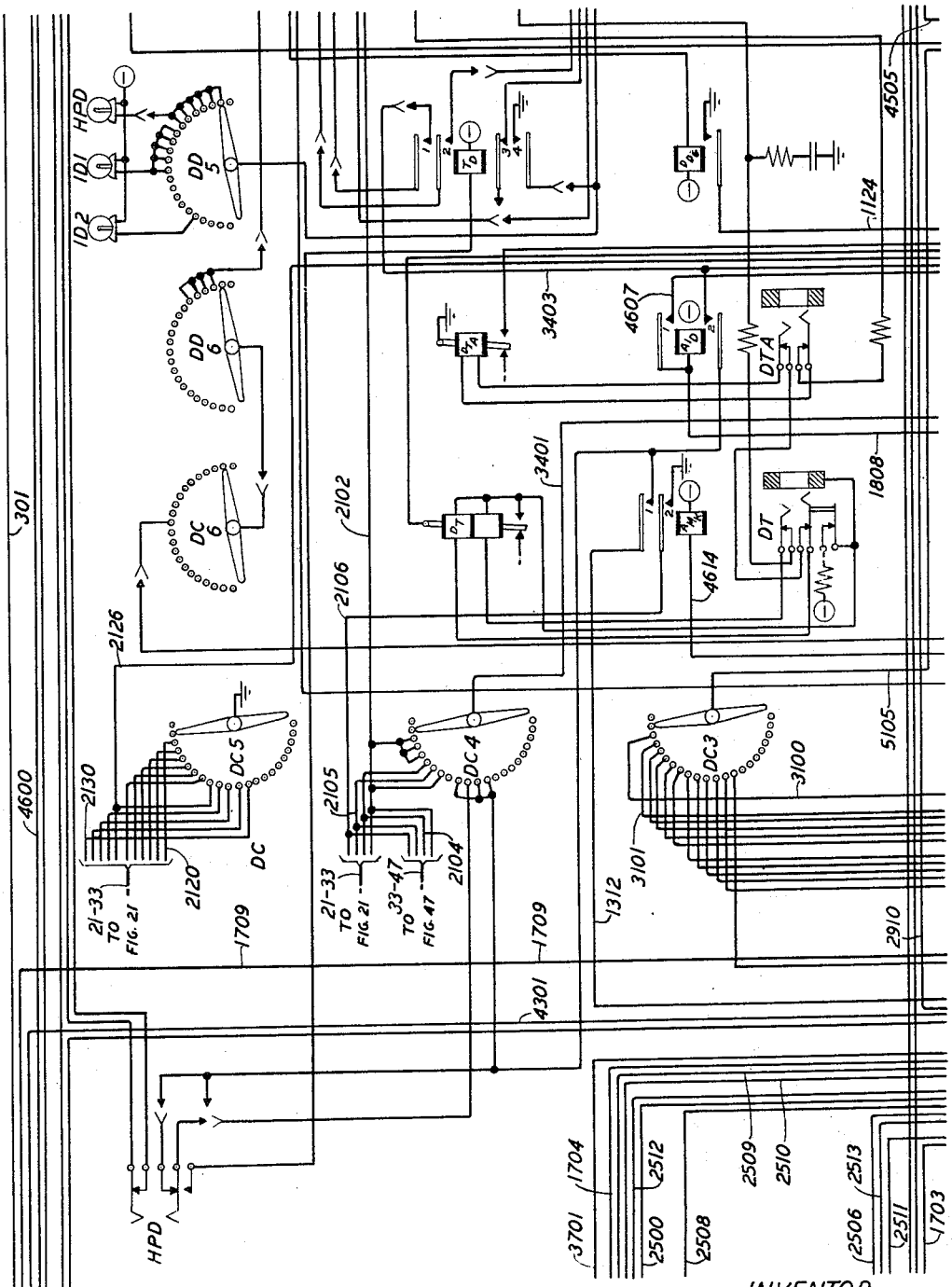
Figure 34:
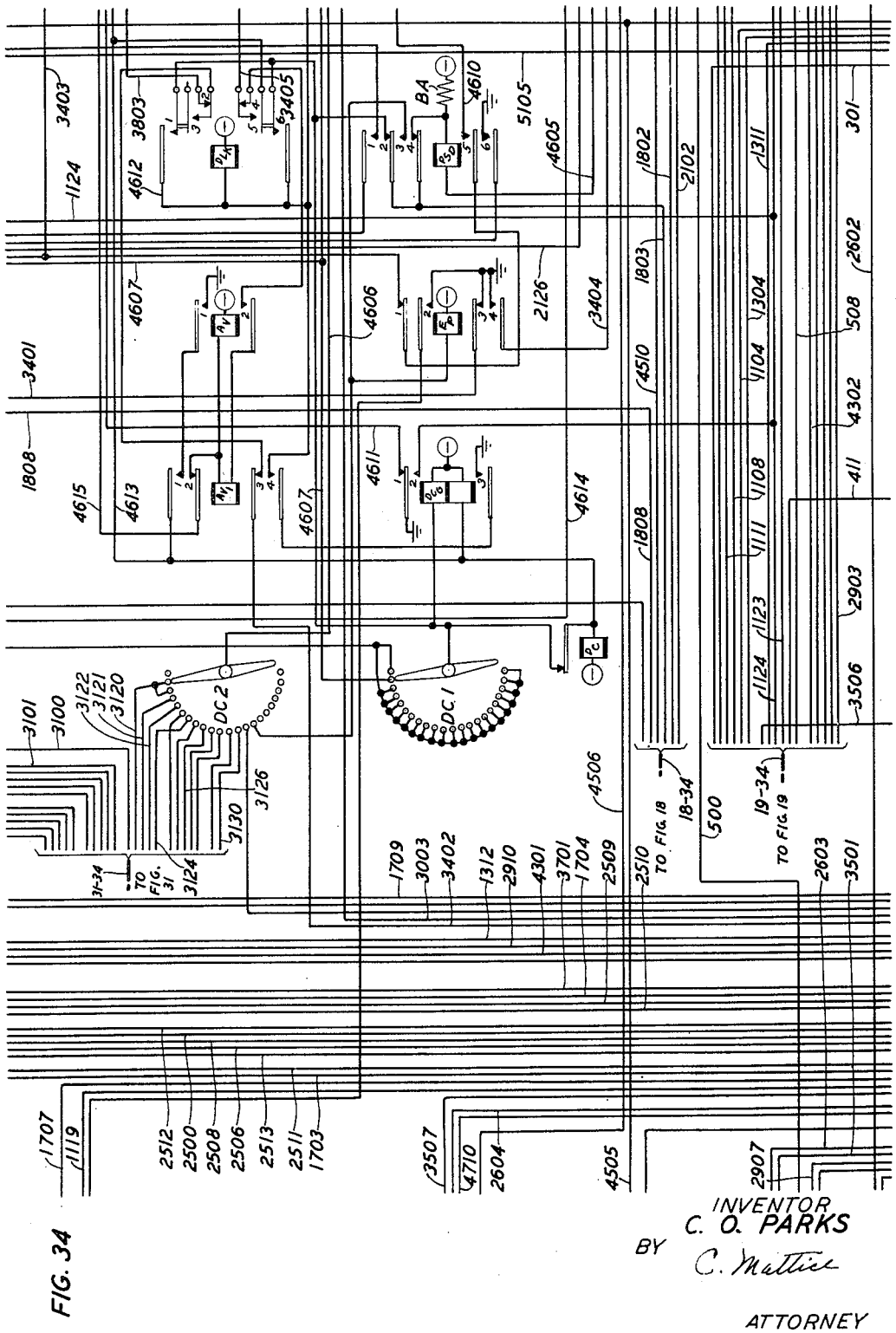

Relay KC1(41) also connects ground from conductor 4103 over its contact 4, contact 1 of relay STK(41), contact 3 of relay STT(41), conductor 4107 through cable 39-41 to brush DCK6(39) and over conductors of cable 31-39 to light the progress lamps of Fig. 31.

Following is a table showing the conditions applied by the sender to conductors 1408 and 1409 for each of the digits, the relays operated in response thereto, as well as the relays operated over the test circuit key-sets for the corresponding digits:

| Digit | Condition Connected to Conductor | | Relays Operated by Sender | | Relays Operated by Test Circuit |
|---|---|---|---|---|---|
|  | 1409 | 1408 |  |  |  |
| 0 | L+ |  | TS |  | CS4-CS7 |
| 1 | H+ |  | TS-TM |  | CS0-CS1 |
| 2 | L- |  | TS-TP |  | CS0-CS2 |
| 3 | H- |  | TS-TM-TP |  | CS1-CS2 |
| 4 | L+ | L- | TS | RP | CS0-CS4 |
| 5 | L+ | H+ | TS | RM | CS1-CS4 |
| 6 | H+ | H+ | TS-TM | RM | CS2-CS4 |
| 7 | L- | H+ | TS-TP | RM | CS0-CS7 |
| 8 | H- | H+ | TS-TM-TP | RM | CS1-CS7 |
| 9 | L+ | H- | TS | RM-RP | CS2-CS7 |

In the foregoing table L+ (light positive) indicates ground through a high resistance, H+ (heavy positive) indicates ground through a low resistance, L— (light negative) indicates 48-volt battery through a high resistance and H— (heavy negative) indicates 48-volt battery through a low resistance.

When relay KC1(41) operates, substituting 24-volt battery for ground on conductor 1408, a relay in the sender operates to initiate the sending of the designation, but relay TS(52) does not operate.

When the sender sends out the first digit, which has been assumed to be the digit 6, as shown in the above table, low resistance ground will be connected to both conductors 1408 and 1409 and relays TS(52), TM(52) and RM(40) will be operated.

Since relays TS(52), TM(52), TP(52), RM(40) and RP(40) differ as to type, code and adjustment, it is necessary to delay the check of their armature positions until it is certain that the slowest of them will have operated. Since relay TS(52) is operated for every signal, this relay is used to obtain the delay. When relay TS(52) operates, it closes a circuit from ground at contact 5 of relay DCR(41), conductor 4100, contact 1 of relay TS(52), conductor 5205, contact 2 of relay FRR(53), conductor 5303, contact 10 of relay DCR(41), contact 1 of relay STT(41), conductor 4108, in parallel over contact 1 and through the upper winding of relay KK(53) to battery, and through the winding of relay FR(53), to conductor 5207 and resistance BJ(53) to battery.

Ground connected to conductor 4108 as above traced also extends over contact 1 of relay KK(53), conductor 5304, through cable 52-53, contact 6 of relay CTD(52), conductor 3906, to battery through the winding of magnet DCK(39) and over the back contact of that magnet to conductor 3900 which extends through cable 39-41 in parallel to battery through the winding of relay DKG(41) and over contact 9 of relay DCR(41), conductor 5206, contact 10 of relay CTD(52), conductor 5207 through cable 52-53 to battery through resistance BJ(53) in shunt of the winding of relay FR(53).

Relay KK(53) operates, locking in a circuit from battery through its lower winding and over its contact 3 to ground on conductor 1104. Relay KK(53) at its contact 2 connects conductor 5205 to conductor 5304 to render the circuit of magnet DCK(39) independent of relay FRR(53).

Magnet DCK(39) operates, opening at its contact the shunt around relay FR(53) which now operates. The sequential operation of relay TS(52), magnet DCK(39) and relay FR(53) allows sufficient time for the pulse receiving relays to reach a steady state.

Relay FR(53) at its contact 5 closes an operating circuit for relay FRR(53) which operates and locks over its contact 3 to conductor 5205 under the control of relay TS(52) and then at its contact 2 opens the operating circuit for relay FR(53).

At its contact 1, relay FR(53) connects ground through the upper winding of relay TMK(53) and resistance BQ(53) to battery. At its contact 2, relay FR(53) connects ground through the upper winding of relay TPK(53) and resistance BR(53) to battery. At its contact 3, relay FR(53) connects ground through the upper winding of relay RMK(53) and resistance BS(53) to battery. At its contact 5, relay FR(53) connects ground through the upper winding of relay RPK(53) and resistance BT(53) to battery.

With relays CS2(40) and CS4(40) operated from the key-set and relays TM(51) and RM(40) operated by the first pulse as above described, and relays TP(51) and RP(40) not operated, a circuit is closed from ground at contact 7 of relay CTD(52), conductor 5201 through cable 52-53, contact 2 of relay STT(41), conductor 4104 and thence in parallel over four paths, one over contact 5 of relay CS2(40), contact 4 of relay CS4(40), conductor 4000, operated contact 1 of relay TM(52), conductor 5208, contact 7 of relay STT(41), conductor 4109 to resistance BQ(53) in shunt of the winding of relay TMK(53). A second circuit extends from conductor 4104 over contact 11 of relay CS2(40), contact 3 of relay CS4(40), conductor 4001, normally closed contact 2 of relay TP(52), conductor 5209 to battery through resistance BR(53) in shunt of the winding of relay TPK(53). A third circuit extends from conductor 4104 over contact 8 of relay CS2(40), contact 8 of relay CS4(40), operated contact 2 of relay RM(40), conductor 4002 to battery through resistance BS(53) in shunt of the winding of relay RMK(53). The fourth circuit extends from conductor 4104 over contact 6 of relay CS2(40), contact 6 of relay CS4(40), normally closed contact 2 of relay RP(40), conductor 4003, contact 9 of relay STT(41), conductor 4110, to battery through resistance BT(53) in shunt of the winding of relay RPK(53). Therefore none of the relays TMK(53), TPK(53), RMK(53) or RPK(53) is permitted to operate.

In this way, for each digit the operation of the pulse receiving relays is checked against the digit set up on the corresponding key-set.

If any one of the shunts is not closed, the corresponding relay operates, locks, lights a lamp and operates relay LBF(41). For example, if relay TMK(53) operates, it locks through its lower winding and contacts 4 and 5, conductor 5305 to ground at contact 2 of relay DCR(53). At its contact 1, it lights lamp TM(53) and, when relay TS(52) releases, completes a circuit from ground on conductor 4100, contact 2 of relay TS(52), conductor 5210, contact 2 of relay RPK(53), contact 2 of relay RMK(52), contact 3 of relay TMK(53), conductor 5306 to battery through the winding of relay LBF(41). Relay LBF(41), in operating, locks over its contact 3 to ground on conductor 5305 and extends its locking ground over conductor 301 and contact 1 of relay SK2(11) to conductor 506 to operate blocking relay BLK(11). In addition, if relay TMK(53) is operated, it connects ground from conductor 5305 over its contact 5 to conductor 5205 to hold relay FRR(53) locked after relay TS(52) releases.

A further check is made to insure that no false cross-connections exist in the wiring of relays CS0(52) to CS7(40). For this purpose, relays KRP(40), KRM(40), KTM(52) and KTP(52) are provided. The two sides of the winding of each relay are connected to battery through resistances and to the two contacts of the associated pulse receiving relay. If only one contact of a pulse receiving relay is grounded the associated checking relay operates, whereas if, because of a false cross-connection, both contacts are grounded, the check relay cannot operate. For example, as above traced, conductor 4001 was grounded over the contacts of relays CS2(40) and CS4(40). Therefore, battery through resistance BZ1(52) is shunted by ground on conductor 4001 and relay KTP(52) operates in series with resistance BZ2(52). If, because of some fault, conductor 5211 were also grounded, ground would be connected to both sides of the winding of relay KTP(52) and that relay could not operate. If relay KTP(52) fails to operate, when relay FRR(53) operates it connects ground from conductor 4104 to conductor 5307 and over contact 3 of relay KRP(40), contact 3 of relay KRM(40), conductor 4004, contact 2 of relay KTM(52), contact 1 of relay KTP(52) to conductor 5306 and battery through the winding of relay LBF(41). Lamp PSY(40) is lighted whenever one of these check relays fails to operate.

Assuming however that the digit is set up properly and that it checks, when relay FR(53) releases, it opens the operating circuit for relay FRR(53) and, if the digit checks, when relay TS(52) releases at the end of the pulse relay FRR(53) also releases.

The release of relay TS(52) opens the circuit of magnet DCK(39) advancing switch DCK(39) to position 5 where the next digit is set up on relays CS0(52) to CS7(40), the wiring checked and then the digit checked as described for the first digit. The check of the remaining digits takes place in the same manner.

Since no station's digit key was operated, when switch DCK(39) reaches position 11, a circuit is closed from ground over contact 7 of relay DCR(41), conductor 4101 through cable 39–41, brush DCK2(39) in position 11, conductor 2380 through cable 23–39, contact 3 of relay STA(24), conductor 2404, through cables 8–24 and 30–32, contact 3 of key DCR(25), conductor 2512 through cable 39–41, contact 2 of relay PDC(41), to battery through the winding of relay STT(41).

Relay STT(41) prepares for the check of the start pulse from the sender and opens the circuits for operating relays CS0(52) to CS7(40) and relay FR(53). The start pulse comprises a heavy positive pulse on conductor 1409 and a light negative pulse on conductor 1408, thereby operating relays TS(52), TM(52) and RP(40). With relay STT(41) operated, the operation of relays TM(52) and RP(40) closes a circuit from ground at contact 5 of relay STT(41), conductor 4111, contact 1 of relay RP(40), conductor 4003, contact 8 of relay STT(41), conductor 4000, contact 2 of relay TM(52), conductor 5203, contact 6 of relay STT(41), conductor 4112, contact 4 of key FB(53), conductor 5308, to battery through the winding of relay STK(41). Relay STK(41) operates in this circuit and locks over its contact 2 to ground on conductor 5305.

When relay TS(52) releases, at the end of the start pulse, a circuit is closed from ground on conductor 4100, contact 2 of relay TS(52), conductor 5210, contact 2 of relay RPK(53), contact 2 of relay RMK(53), contact 2 of relay TMK(53), contact 2 of relay TPK(53), conductor 5309, contact 3 of relay STK(41) to battery through the winding of relay CST(41). Relay CST(41) operates and locks over its contact 3 to ground on conductor 5305. At its contact 4, relay CST(41) closes a circuit from ground over that contact, contact 2 of relay KRI(41) to battery through lamp KRL(41) and also over the back contact of relay DR(41) to battery through the winding of relay RPT(41).

Relay RPT(41) closes a circuit from ground over contact 4 of relay CST(41), contact 1 of relay RPT(41), to battery through the winding of relay KRL(41). Relay KRL(41) operates and locks over its contact 4 and contact 2 of relay KRI(41) to ground at contact 4 of relay CST(41). With relay KRL(41) operated, the circuit of relay KCI(41) is opened and that relay releases. In addition relay KRL(41) transfers the pulsing conductors 1408 and 1409, which extend as previously traced to the topmost armature and the inner lower armature of relay KRL(41), from the pulse receiving relays to 48-volt battery through resistance BK(41) and the lower winding of relay DR(41) respectively.

This connection of 48-volt battery to the pulsing conductors simulates the action of an outgoing sender in sending a key release signal to the originating sender. In response to this signal the sender should connect low resistance ground to conductor 1409 and operate relay DR(41) but should not advance to its trunk cutthrough and sender release functions until the key release signal is terminated.

Relay DR(41) in operating opens the circuit of relay RPT(41) which releases slowly to measure a time interval in which the sender may advance if it fails to wait for the end of the key release signal. If the sender fails to wait, relay SP(12) will be released before relay RPT(41) closes its contact 2. Assuming that the sender does wait, a circuit is closed from ground at contact 4 of relay SP(12), conductor 4113 through cable 39–41, contact 2 of relay RPT(41), contact 7 of relay KRL(41), to battery through the winding of relay KRI(41). Relay KRI(41) operates and locks over its contact 3 to ground at contact 4 of relay CST(41).

With relay RPT(41) released, the operating circuit of relay KRL(41) is opened and with relay KRI(41) operated the locking circuit of relay KRL(41) is opened and relay KRL(41) releases. Relay KRI(41) also opens the circuit of relay KCI(41) so that relay KCI(41) cannot reoperate when relay KRL(41) releases. Relay KRL(41) disconnects the 48-volt key release signal from the sender, permitting the sender to advance and release. In addition relay KR1(41) closes a circuit from ground connected to conductor 4103 as previously traced, contact 5 of relay KC1(41), contact 2 of relay CST(41), contact 4 of relay KR1(41), conductor 3602, contact 6 of relay SP2(4), conductor 411 to battery through the winding of relay SK2(11).

The test of the release of the sender and the advance to the next sender take place as previously described.

Skip digits on out-pulsing

Due to service requirements the number of digits pulsed into a sender and the number of digits pulsed out from the sender may differ. The principal variations to be expected and provided for in the test circuit are omitting the area code, or omitting both area code and office code where both area code and office code are sent to the sender, converting an office code to a different code, or adding an area code.

To prepare for omitting the area code, the skip-three key SK3(30) is operated, while to prepare for omitting both the area code and the office code, the skip-six key SK6(30) is operated. If the office code is to be converted into another code, a key in one or more of the key-sets CCH(6), CCT(6) and CCU(6) is operated. If an area code is to be added key AAC(30) is operated. In making any of the above tests, in order to be sure that the omitted digits have been received correctly, key CDK(9) is provided, which causes the test circuit to make a no-skip test, prior to the skip test.

Assuming now that the test designation previously used represents a call requiring the pulsing out of only the numerical designation, keys SK6(30) and CDK(9) will be operated. In describing the resulting operation it will also be assumed that the sender under test is one which is set by multifrequency pulses and is to send out multifrequency pulses, although it will be understood that the operation would be similar for other in-pulsing and out-pulsing combinations.

With key CDK(9) operated, a circuit is closed from ground over contact 1 of relay RZ2(9), contact 1 of relay RZ1(9), contact 1 of key CDK(9), conductor 901 through cable 30-32, contact 4 of key AAC(30) to battery through the winding of relay NSK1(30). With relay NSK1(30) operated, the circuit of relay SK6(30) is opened and the multifrequency pulse checking switch MFK(48) is preset as previously described. Relay NSK1(30) closes a circuit from ground over contact 2 of key SK6(30), contact 3 of relay NSK1(30) to conductor 3004 leading to the marker so that when the sender is connected with the marker it will receive a signal to send out the designation as received.

The test will progress as for the multifrequency test previously described. When the test is satisfactorily completed, relay CPT(11) is operated as previously described. With key CDK(9) operated, instead of operating register CT(9), a circuit is closed from ground over contact 3 of relay CPT(11), conductor 1125, contact 2 of key REP(9), contact 4 of key REP2(9), contact 6 of key CDK(9), contact 3 and winding of relay RW1(9), to battery through resistance BD(9). Relay RW1(9) operates in this circuit and locks in a circuit from battery through resistance BD(9), winding of relay RW1(9) and its contact 4, conductor 902, contact 2 of relay CA3(2) to ground at contact 3 of relay FST(2).

Relay RW1(9) also closes a circuit from battery through resistance BC(9), winding of relay RZ1(9) over contact 4 of relay RW1(9) to ground as above traced, but relay RZ1(9) does not operate, being shunted by ground from the operating circuit of relay RW1(9) over its contact 2.

In addition, relay RW1(9) closes a circuit from ground over its contact 2, contact 5 of relay RZ1(9), to battery through the winding of restart register RST(9). Register RST(9) operates, registering one repeat test and closing a circuit from ground over its contact, conductor 903 to battery through the winding of relay CA2(2). Relay CA2(2) operates, grounding conductor 1006 to provide an operating circuit for relay CA1(2). Relay CA1(2) performs the functions previously described for restoring the in-pulsing and out-pulse checking switches to normal as well as the trunk closure delay switch. It may be noted that no circuit is closed by relay CA2(2) for operating relay SA(10) such as was closed by relay CA(11) at the end of the single test so that the sender selector is not advanced and the test circuit remains connected with the same sender.

When the test switches have returned to normal, relay CPT(11) releases, opening the operating circuit of relay RW1(9) thereby permitting relay RZ1(9) to operate over the locking circuit of relay RW1(9). Relay RZ1(9) opens the circuit of register RST(9) and also the operating circuit for relay NSK1(30). The release of register RST(9) releases relays CA2(2) and CA1(2), permitting the second test to start.

With relay NSK1(30) released and key SK6(30) operated, as soon as relay ON1(3) operates, a circuit is closed over contact 1 of relay ON1(30), contact 1 of relay NSK1(30), contact 1 of key SK6(30) to battery through the winding of relay SK6(30). Relay SK6(30) operates and closes a circuit over its contact 2 for operating relay SK3(30).

The release of relay NSK1(30) also disconnects ground from conductor 3004 so that the sender will function to send only the numerical digits.

To preset the pulse checking switch MFK(48), relay MFR(37) is operated, advancing switch MFK(48) to position 1. The circuit of relay PMR(37) is closed as previously described. With switch MFK(48) in position 1, an operating circuit for magnet MFK(48) may be traced from battery through the winding and over the back contact of that magnet, conductor 4823 over contact 1 of relay PMR(37) to conductor 2508, this conductor being connected over contact 4 of relay PMR(37) to battery through resistance BT(37) in shunt of the winding of relay PMR(37). Conductor 2508 is connected over contact 8 of key MFR(25), conductor 2404, contact 3 of relay SK3(30), conductor 2370, through cable 23-48, brush MFK2(48) in position 1, conductor 3113 to ground at contact 7 of relay MFR(37). Therefore switch MFK(48) is stepped to position 2 and relay PMR(37) remains unoperated. With switch MFK(48) in position 2, ground on conductor 3113 is connected over brush MFK2(48) to conductor 2371 and over contacts 2 and 4 of relay SK3(30) to conductor 2404 to advance the switch to position 3. In position 3, ground on conductor 3113 is connected over brush MFK2(48) to conductor 2372 and over contact 5 of relay SK3(30) to conductor 2404 to advance switch MFK(48) to position 4. In positions 4, 5 and 6 of switch MFK(48) ground is connected over brush MFK2(48) to conductors 2373, 2374 and 2375 respectively, these conductors extending through cable 23-48, contacts 3, 4 and 5 of relay SK6(30), contacts 4, 2 and 3 of relay CC(30) to conductor 2404, causing the advance of switch MFK(48) to position 7. In position 7, although conductor 2376 is grounded, since relay TH(16) is operated, no circuit is closed over this conductor, switch MFK(48) comes to rest in position 7, and relay PMR(37) operates.

The remainder of the test is the same as described, except that checking of the out-pulsing starts with the first numerical digit.

Code conversion

To test the ability of the sender to substitute a different office code for the code registered, key SK3(30) and CDK(9) are operated. In addition, according as the test code requires the sending out of one, two or three substitute digits, the corresponding keys are operated in set CCU(6), on sets CCT(6) and CCU(6) or on sets CCH(6), CCT(6), and CCU(6). With any one of relays CCH(8), CCT(8) or CCU(8) operated in response to the operation of a key in the associated key-set, a circuit is closed from ground over contact 5 of relay ONI(30), conductor 3000 through cables 30-32 and 8-24, contact 2 of relay CCU(8), CCT(8) or CCH(8), conductor 806, through cables 8-24 and 30-32, contact 2 of key AAC(30), to battery through the winding of relay CC(30).

A send-as-received test is made as described for the skip-six test, except that, since one or more of relays CCH(8), CCT(8) and CCU(8) are operated, the circuit for operating relay NSK(32) extends over conductor 804 through cable 30-32, contact 2 of relay NSKI(30) to ground at contact I of relay ONI(30).

At the beginning of the second or code-conversion test, relay NSKI(30) is released and relay NSK(32) cannot operate. A circuit is closed, when relay ONI(30) operates for this test, from ground over contact I of that relay, contact I of relay NSKI(30), contact I of key SK3(30), conductor 3005 through cables 30-32 and 16-24 over contact 5 of relay ACC(16), conductor 1606, contact 4 of relay ACB(8), contact 5 of relay ACA(8), conductor 807 through cables 8-24 and 30-32, to battery through the winding of relay SK6(30). Relay SK6(30) operates relay SK3(30) as previously described. With relays SK6(30) and CC(30) both operated, a circuit is closed from ground over contact I of relay SK6(30), contact I of relay CC(30), conductor 3006 to battery through the windings of relays CCL(31) and CCA(32) in parallel, operating these relays.

With relay CCL(31) operated, the circuits normally used for lighting the office code lamps OCA(31), OCB(31) and OCC(31) are transferred to the code-conversion lamps CCH(31), CCT(31) and CCU(31).

With no area code set up, the pulse transmitting switch, for example switch MFP(21) is preset in position 4 to send out the first of the office code digits.

With relay SK3(30) operated, the pulsing checking switch, for example switch MFK(48) is advanced to position 4 under the control of relay SK3(30) as above described. Since relay CC(30) is operated, the circuits closed by relay SK6(30) for advancing switch MFK(48) through position 4 is connected over contact 8 of relay With relay CCA(32) operated, ground connected to conductor 2373 over brush MFK2(48) in position 4 is connected over contact 8 of relay CCA(32), conductor 3204 through cable 8-24 to the back contact of relay CCH(8) and ground connected to conductor 2374 over brush MFK2(48) in position 5 is connected over contact 7 of relay CCA(32) and conductor 3205 through cable 8-24 to the back contact of relay CCT(8). The other sides of these contacts are connected to conductor 2404 and therefore, if less than three code-conversion digits are to be pulsed out, switch MFK(48) may be advanced one or two steps into the proper position to check the first digit to be received.

Relay CCA(32) also closes the pulse checking circuits, to be used in positions 4, 5 and 6 of switch MFK(48) or of other pulse checking switches, to the code-conversion key-sets. With these changes the operation of the test circuit is as previously described.

Area code added

If the test designation requires that the sender prefix an area code, to the designation as registered, when it is sent out, key AAC(30) is operated, no area code is set up on the area code key-sets, but the code to be prefixed is set up on the code-conversion key-sets. The test designation is set up on the office code and numerical keys in the usual manner.

With key AAC(30) operated and the code-conversion key-set relays operated, a circuit is closed from ground over contact 5 of relay ONI(30), conductor 3000 through cables 30-32 and 8-24, over contacts 2 of relays CCA(8), CCB(8) and CCC(8) in parallel, conductor 806 through cables 8-24 and 30-32, contact I of key AAC(30), conductor 3007 to battery through the windings of relays AAL(31) and AAC(32) in parallel. Relay AAL(31) transfers the circuits used for lighting lamps ACA(31), ACB(31) and ACC(31) to lamps CCH(31), CCT(31) and CCU(31).

Relay AAC(32) at its contact I closes a circuit for relay NSK(32) which closes the pulse checking circuits to the key-sets as previously traced.

With relay AAC(32) operated the pulse checking circuits closed by the pulse checking switch in positions 1, 2 and 3 are extended to the code-conversion key-sets. The circuits prepared by relay NSK(32) and which extend to the area code key-sets in these positions are ineffective since no keys are operated in the area code key-sets.

With the above-outlined changes in the checking circuits, the test takes place as previously described.

Synchronized in and out-pulsing

Figure 1:
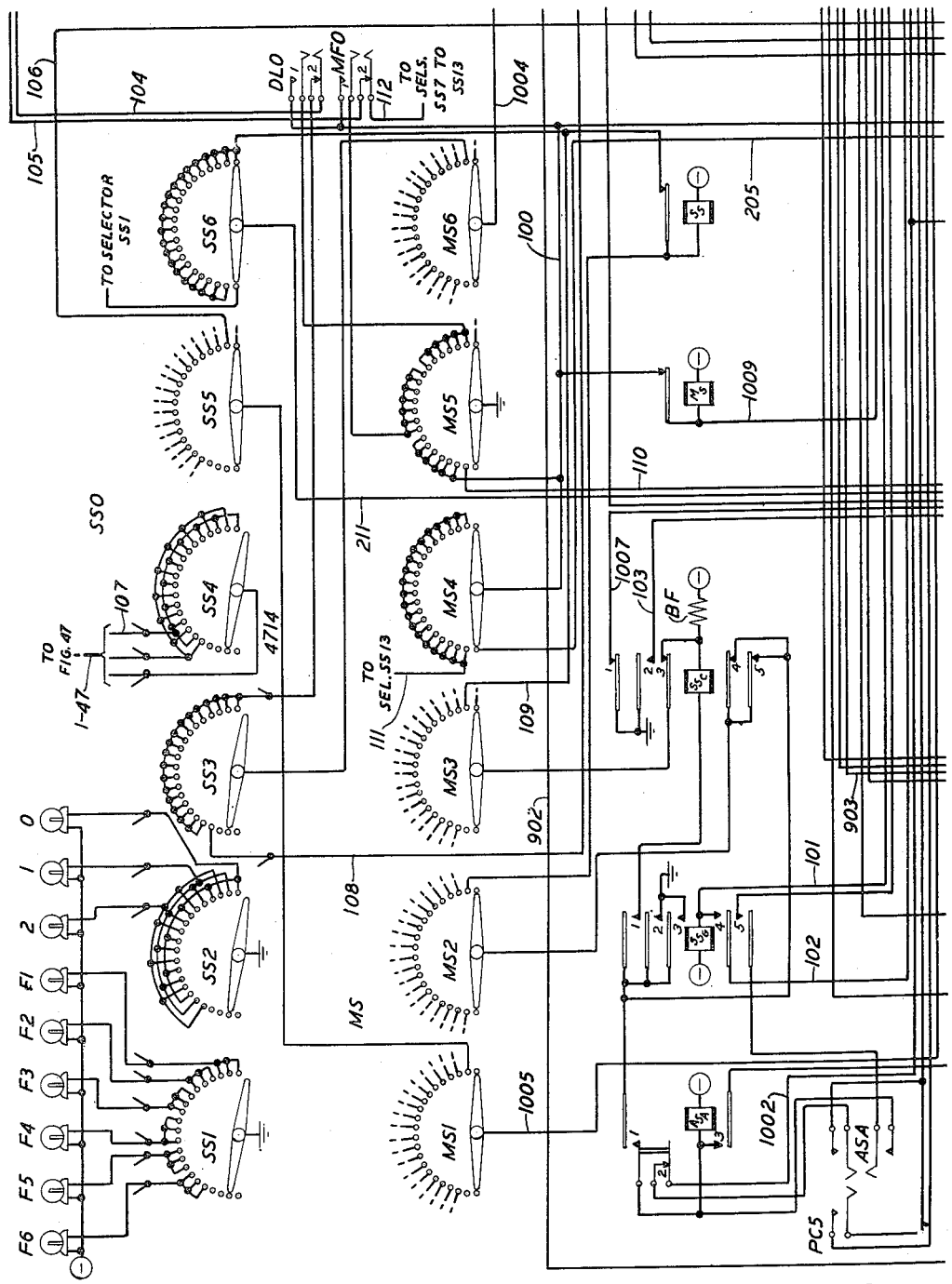
Figure 2:
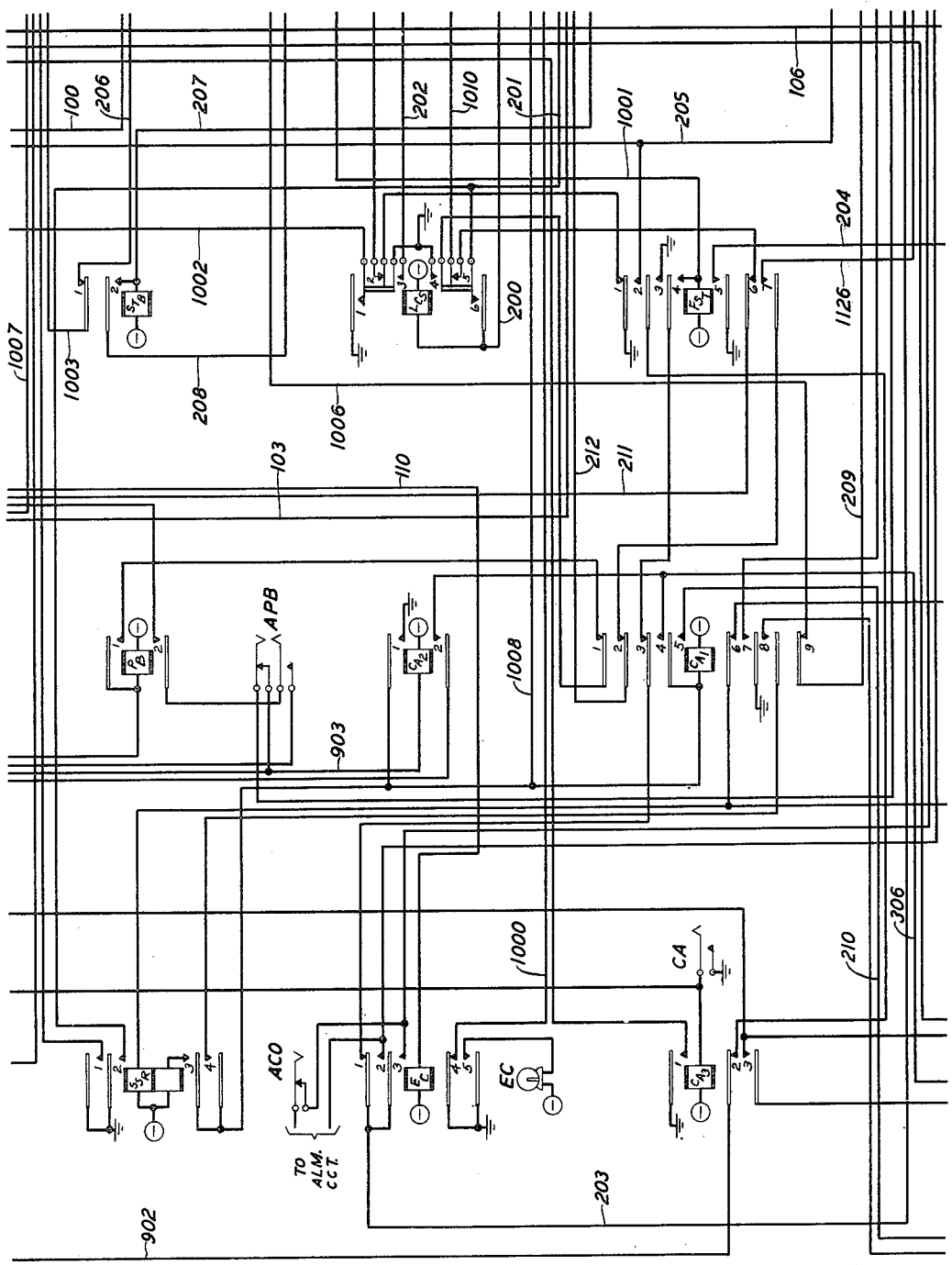
Figure 3:
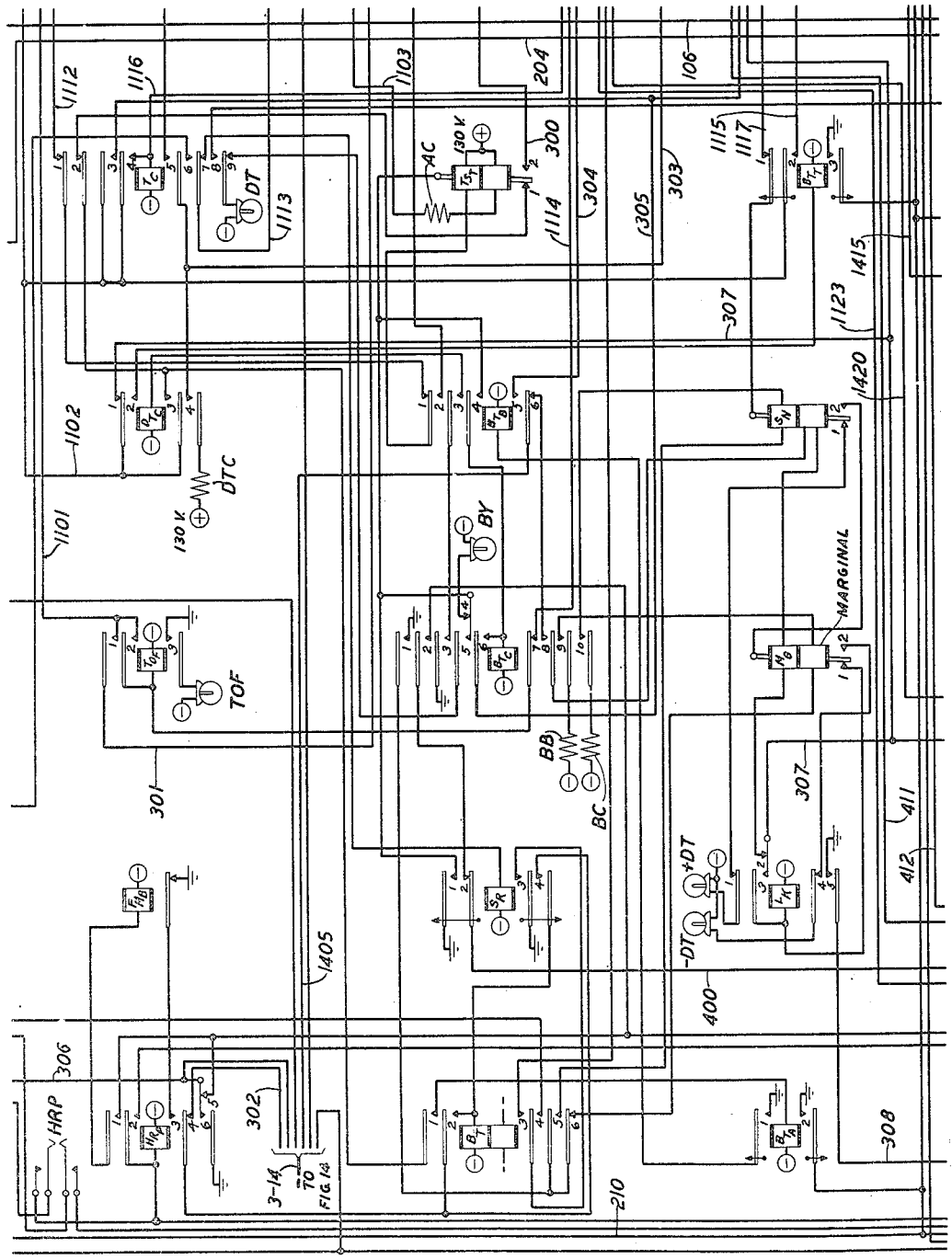
Figure 4:
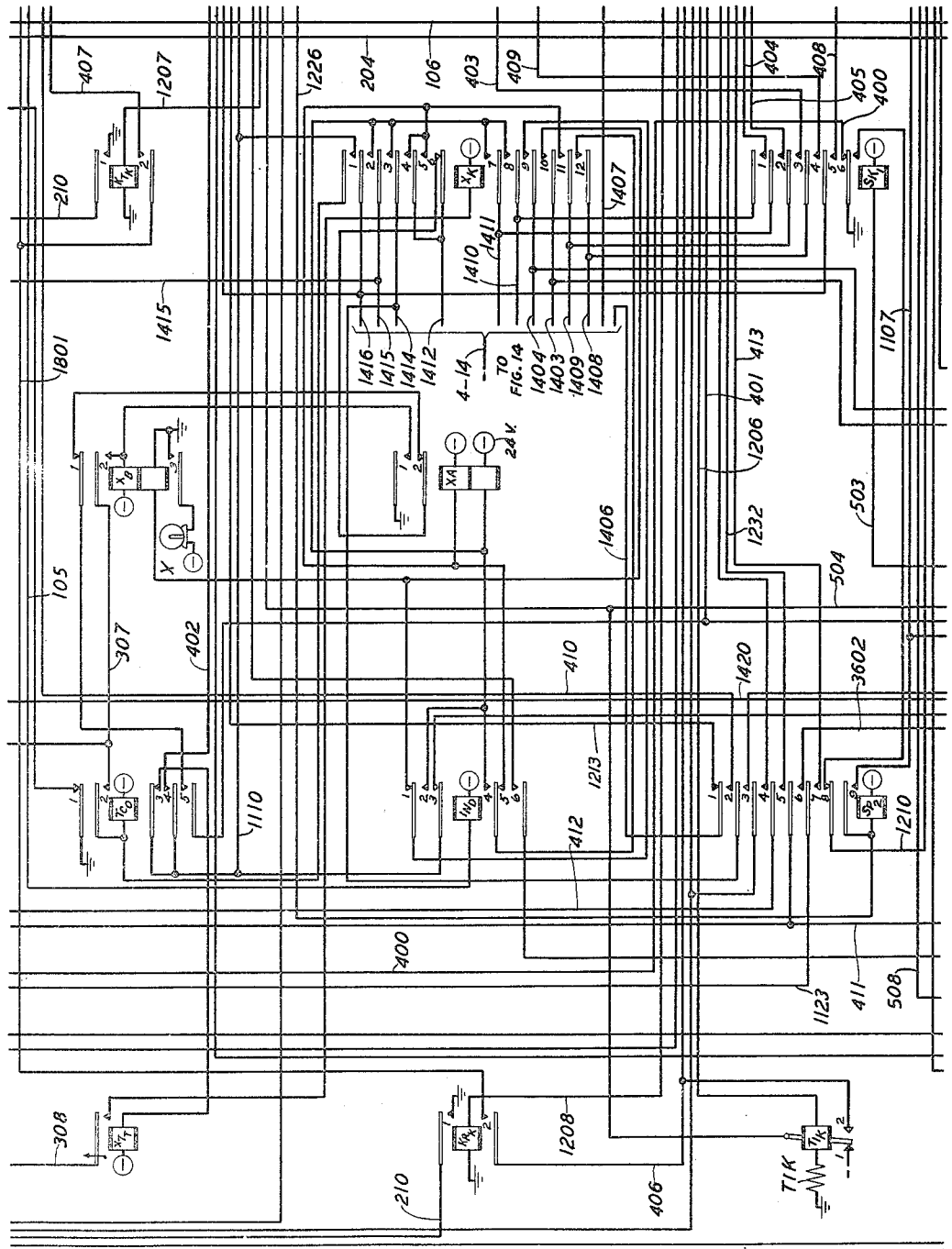
Figure 5:
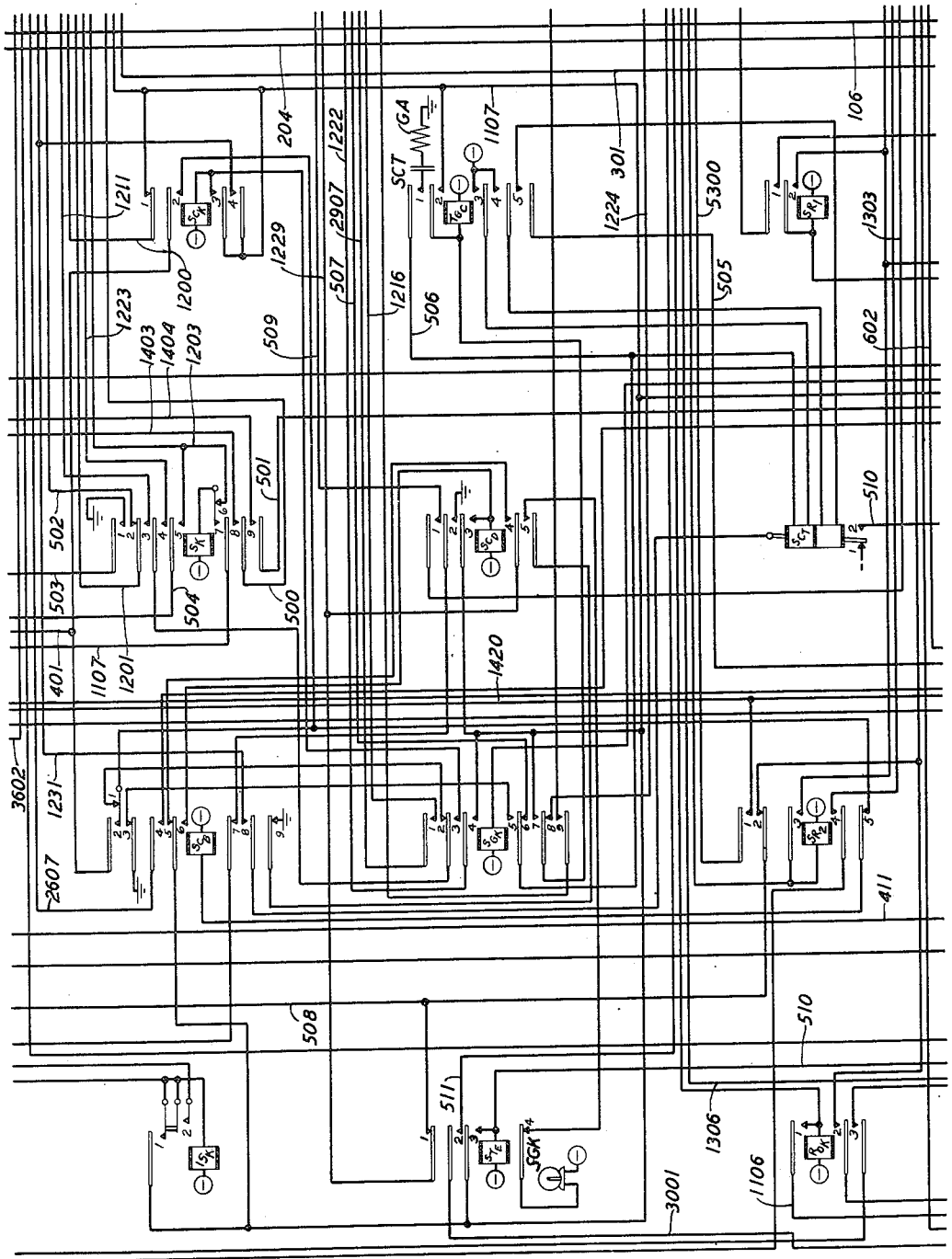
Figure 6:
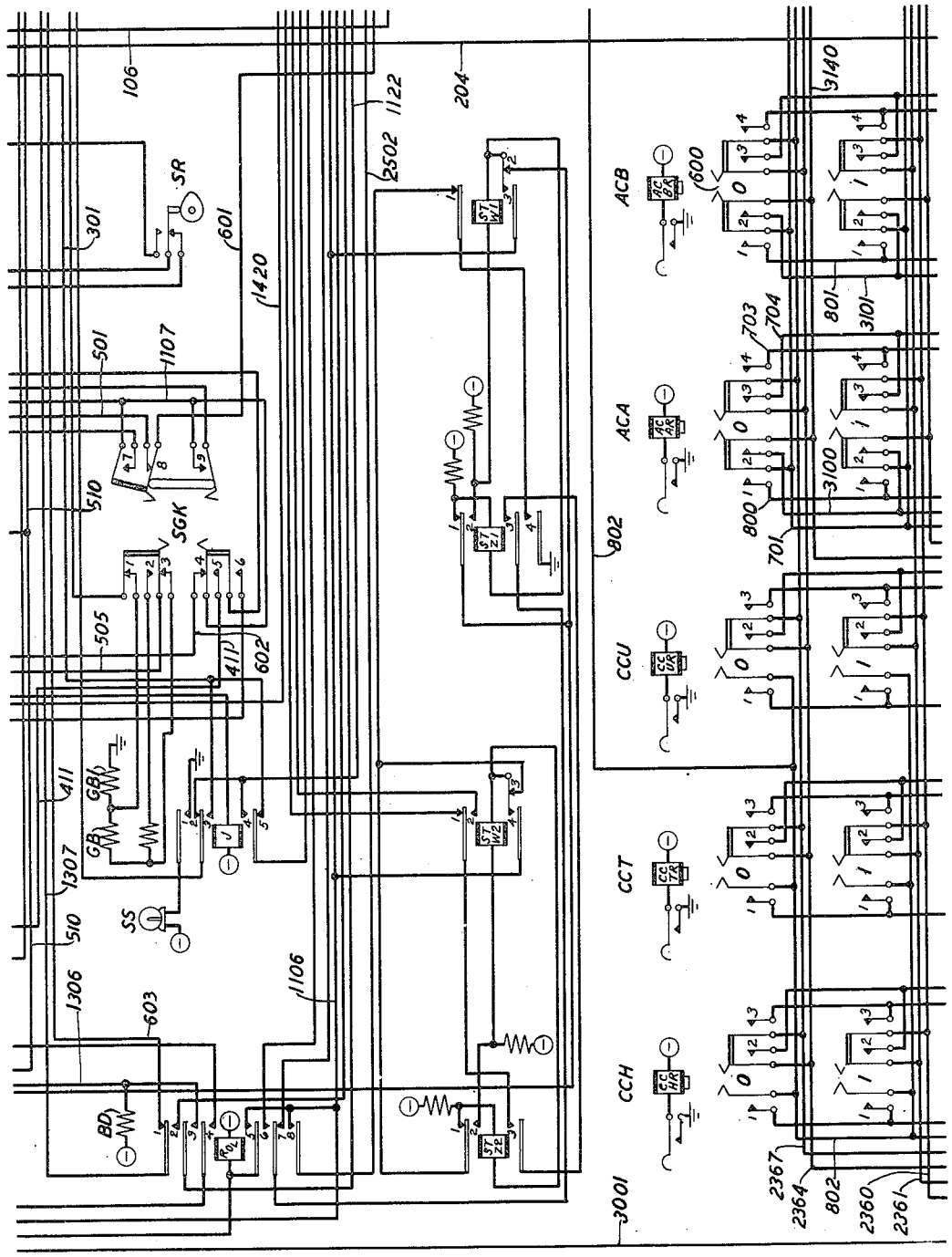
Figure 7:
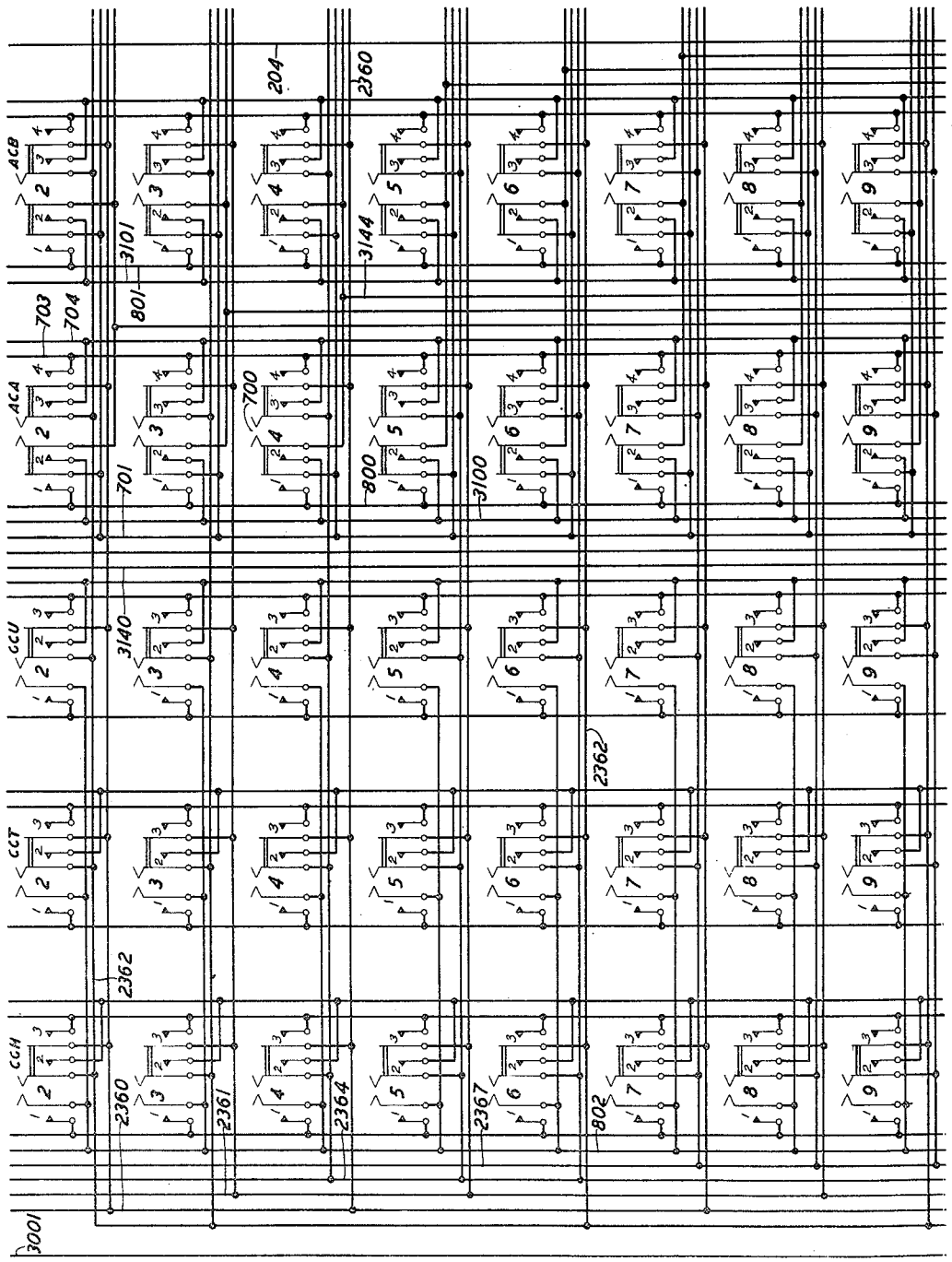
Figure 8:
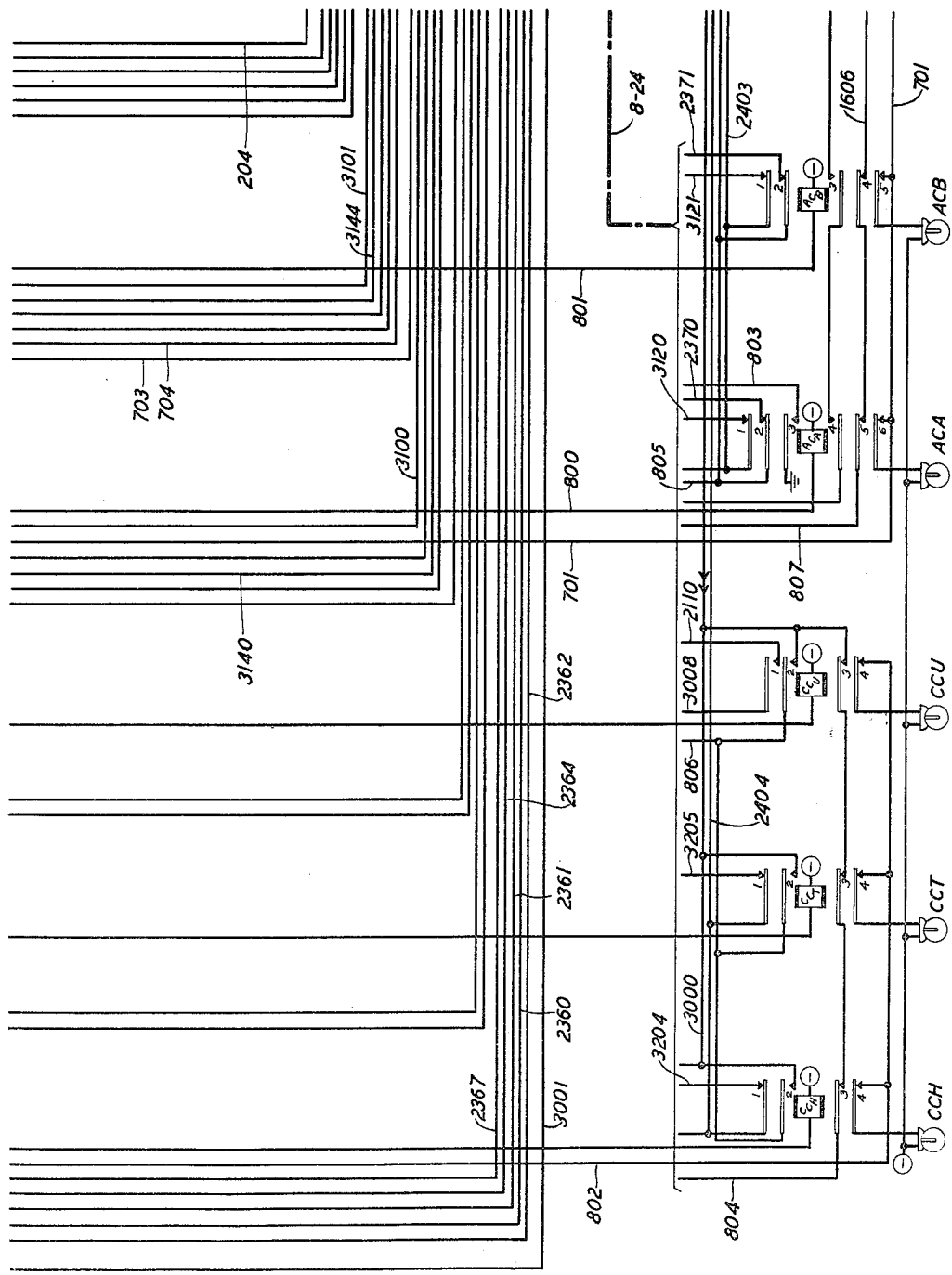
Figure 9:
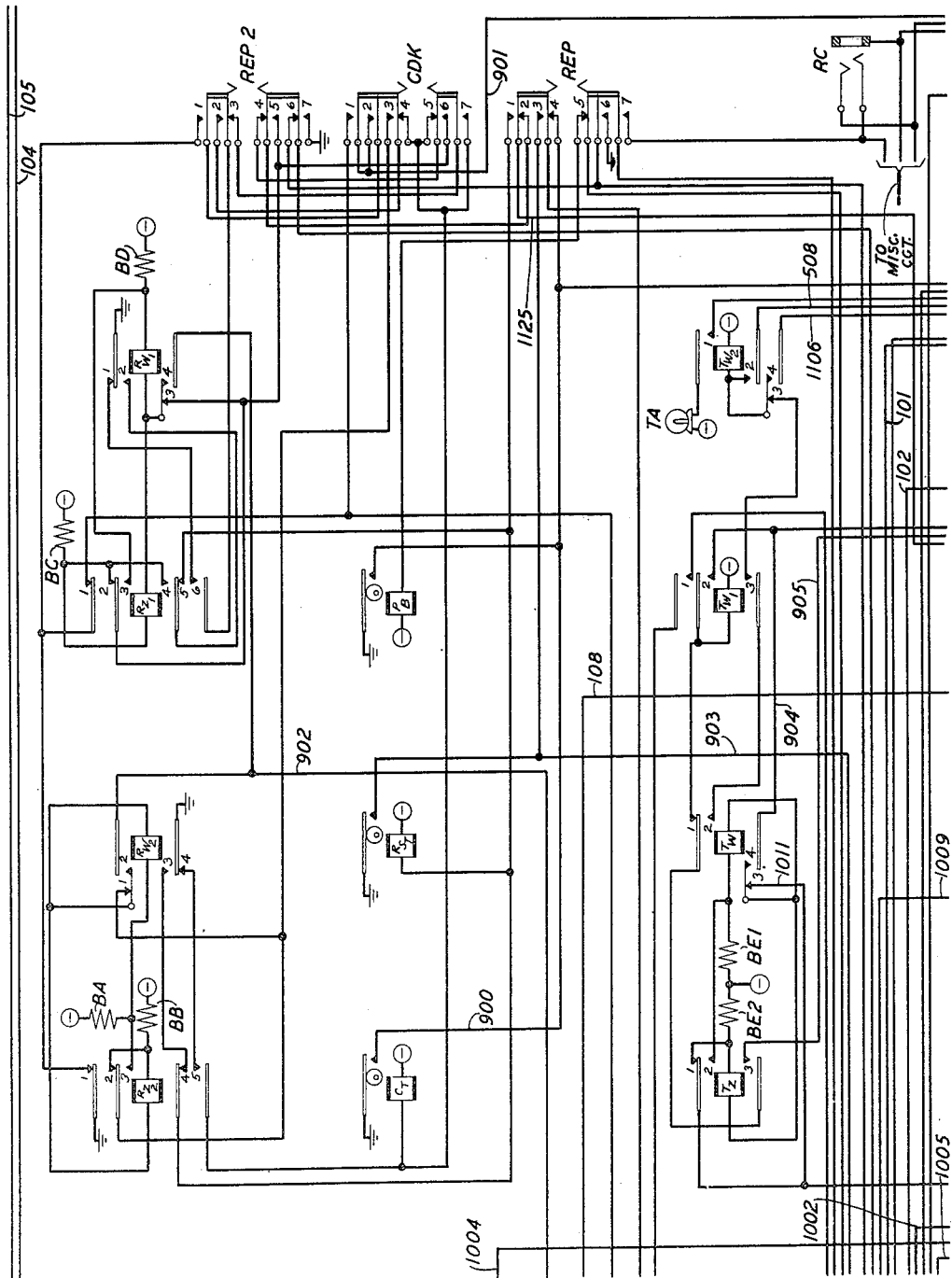
Figure 10:
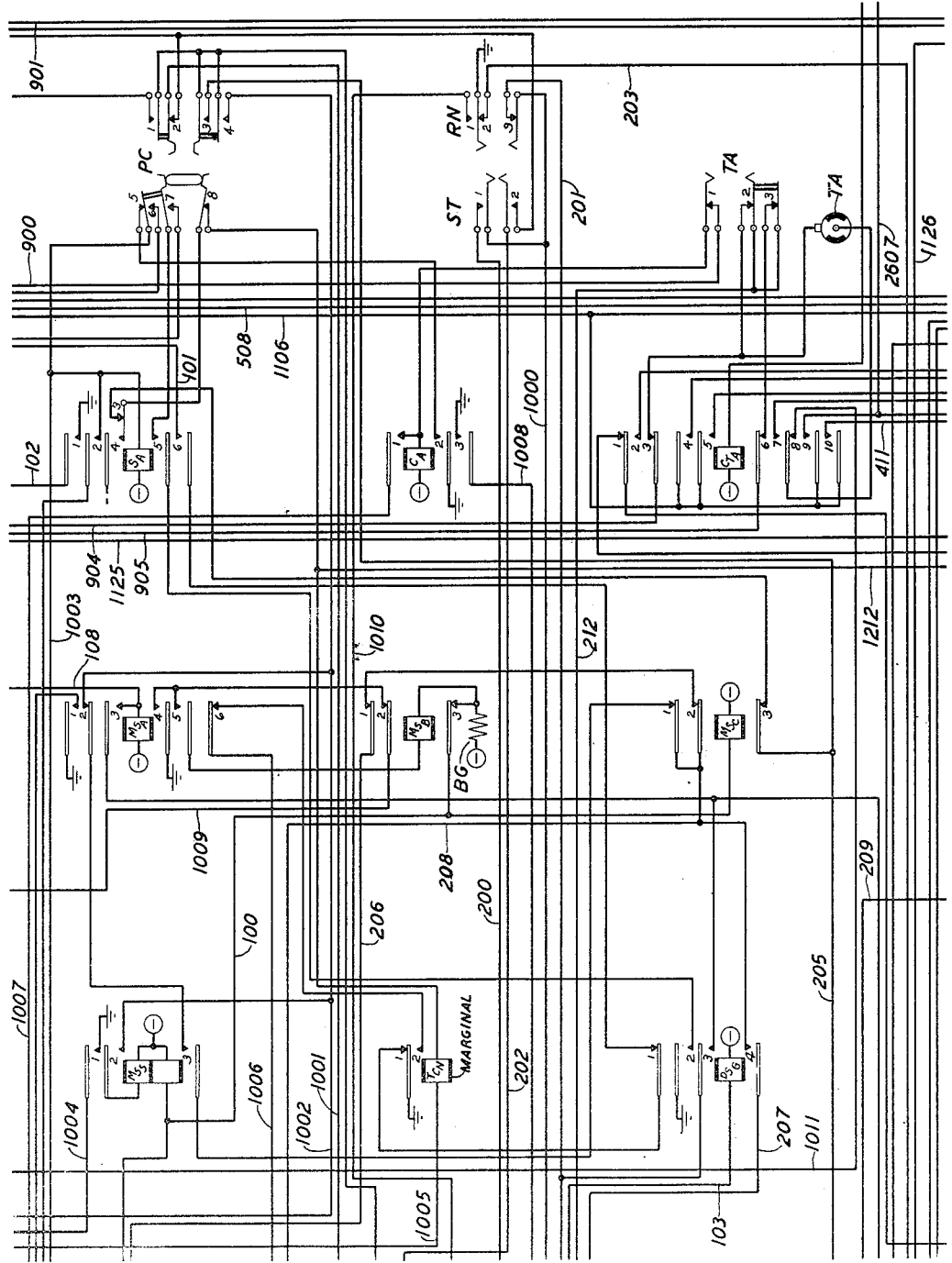
Figure 11:
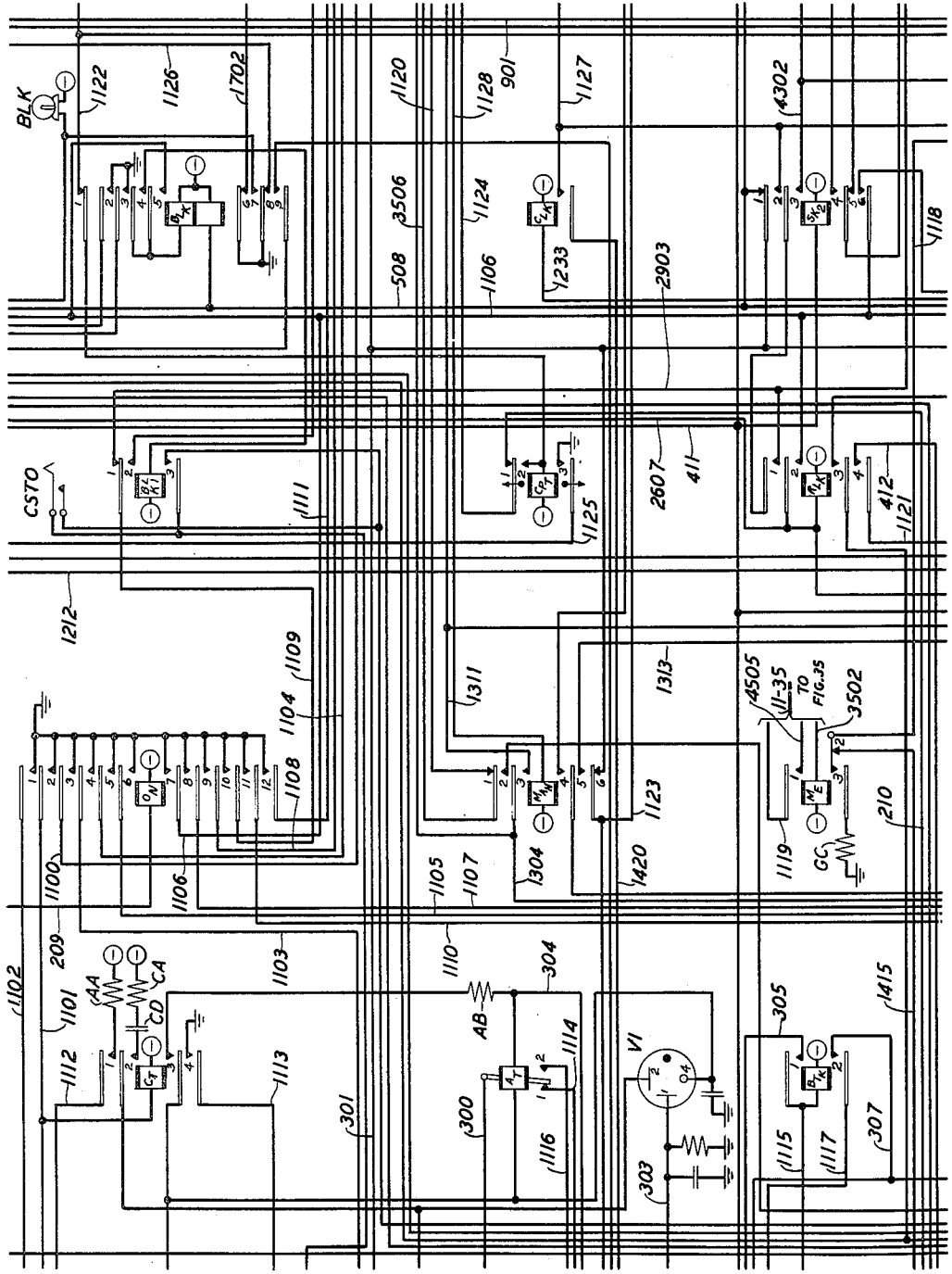
Figure 12:
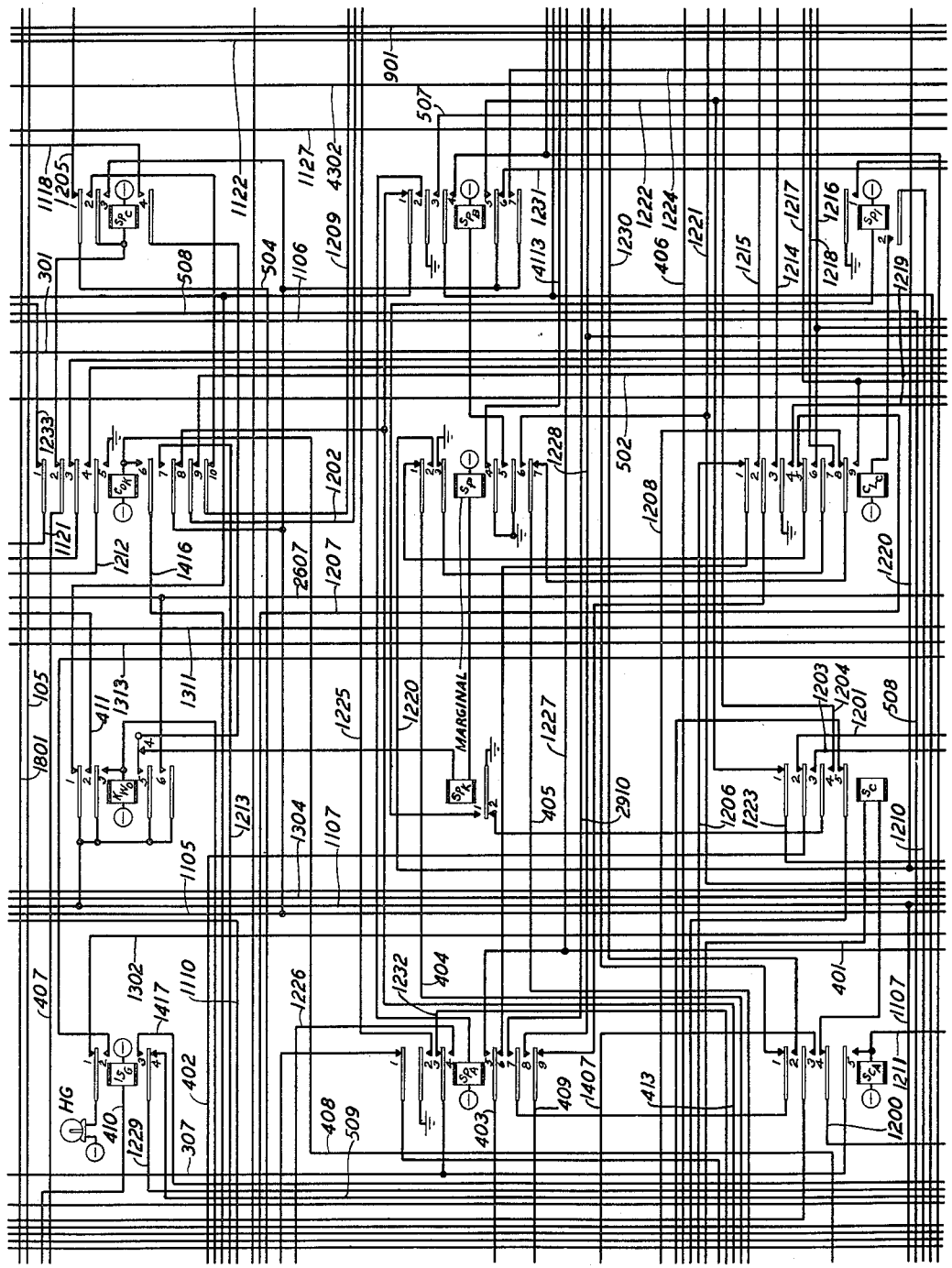
Figure 13:
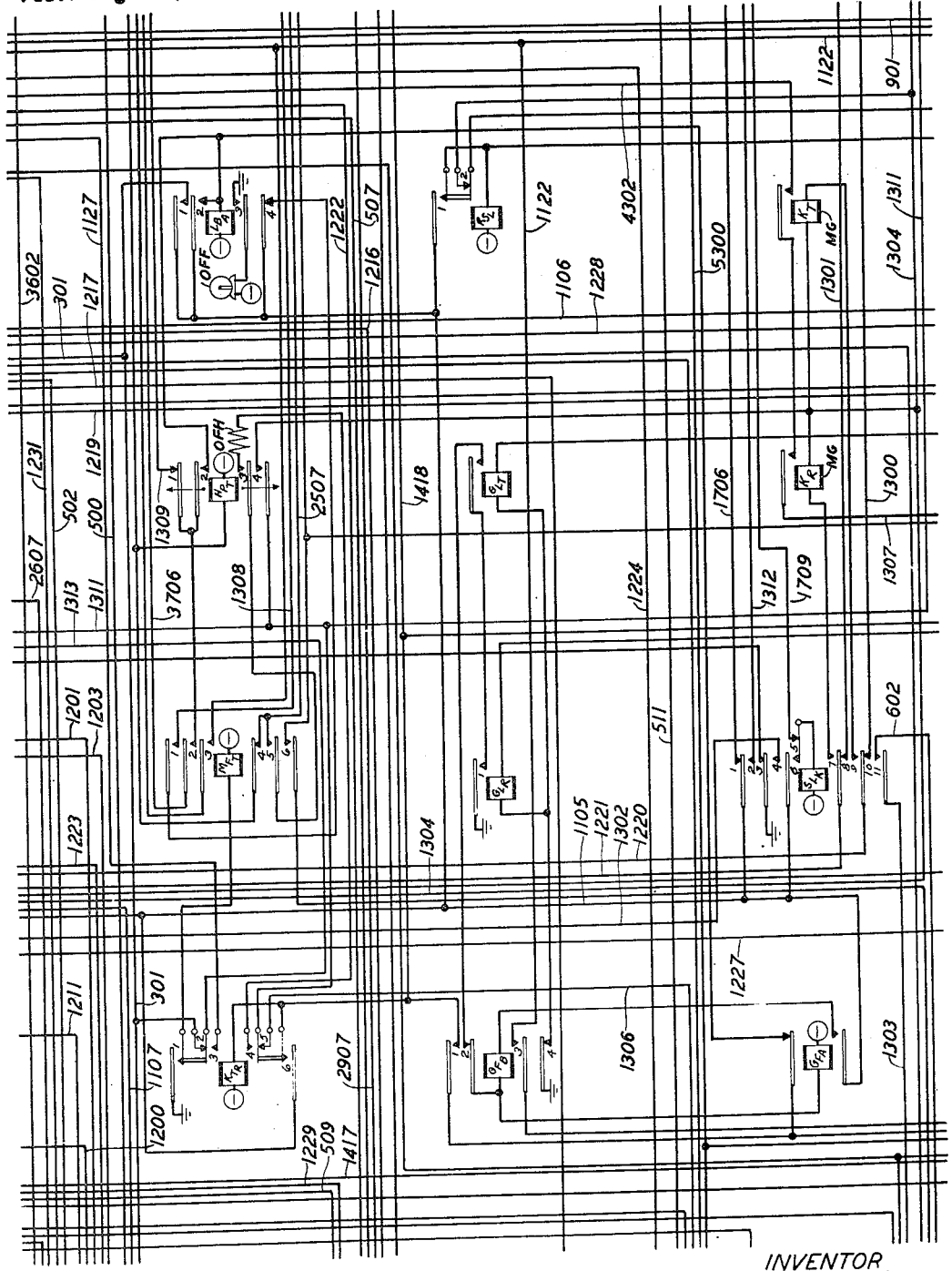
Figure 16:
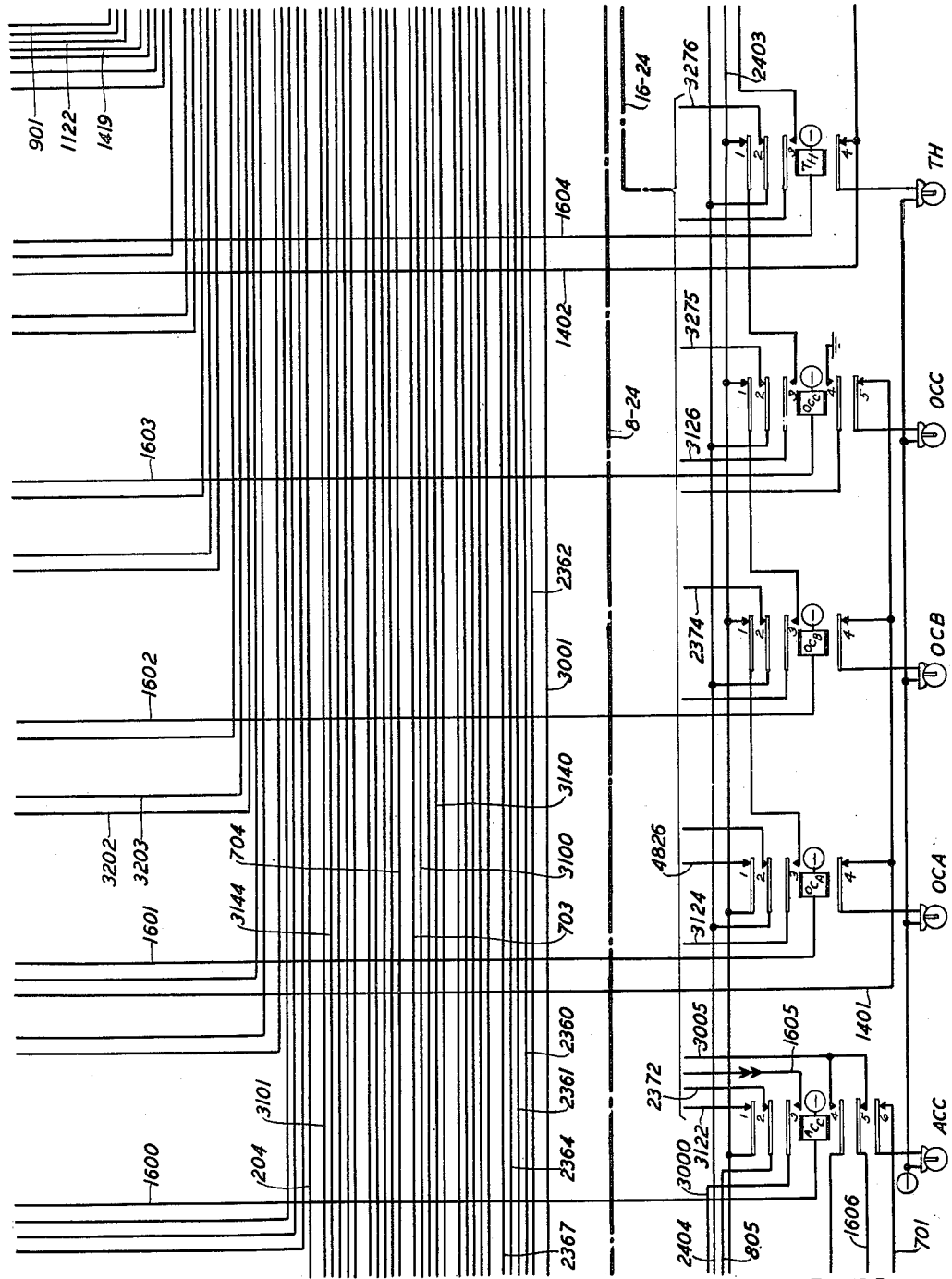
Figure 17:
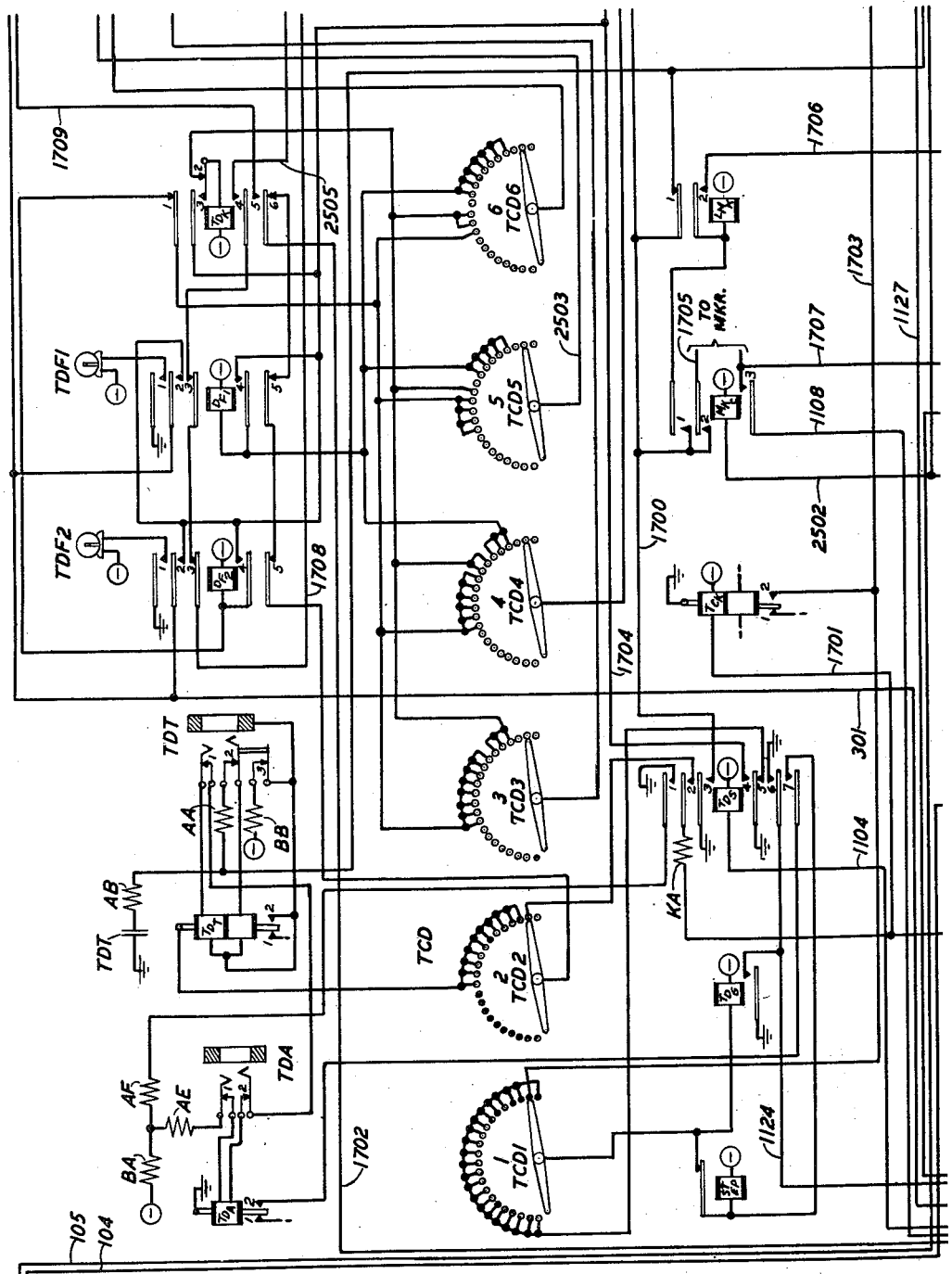
Fig. 17 shows the trunk closure delay testing circuit.
Figure 18:
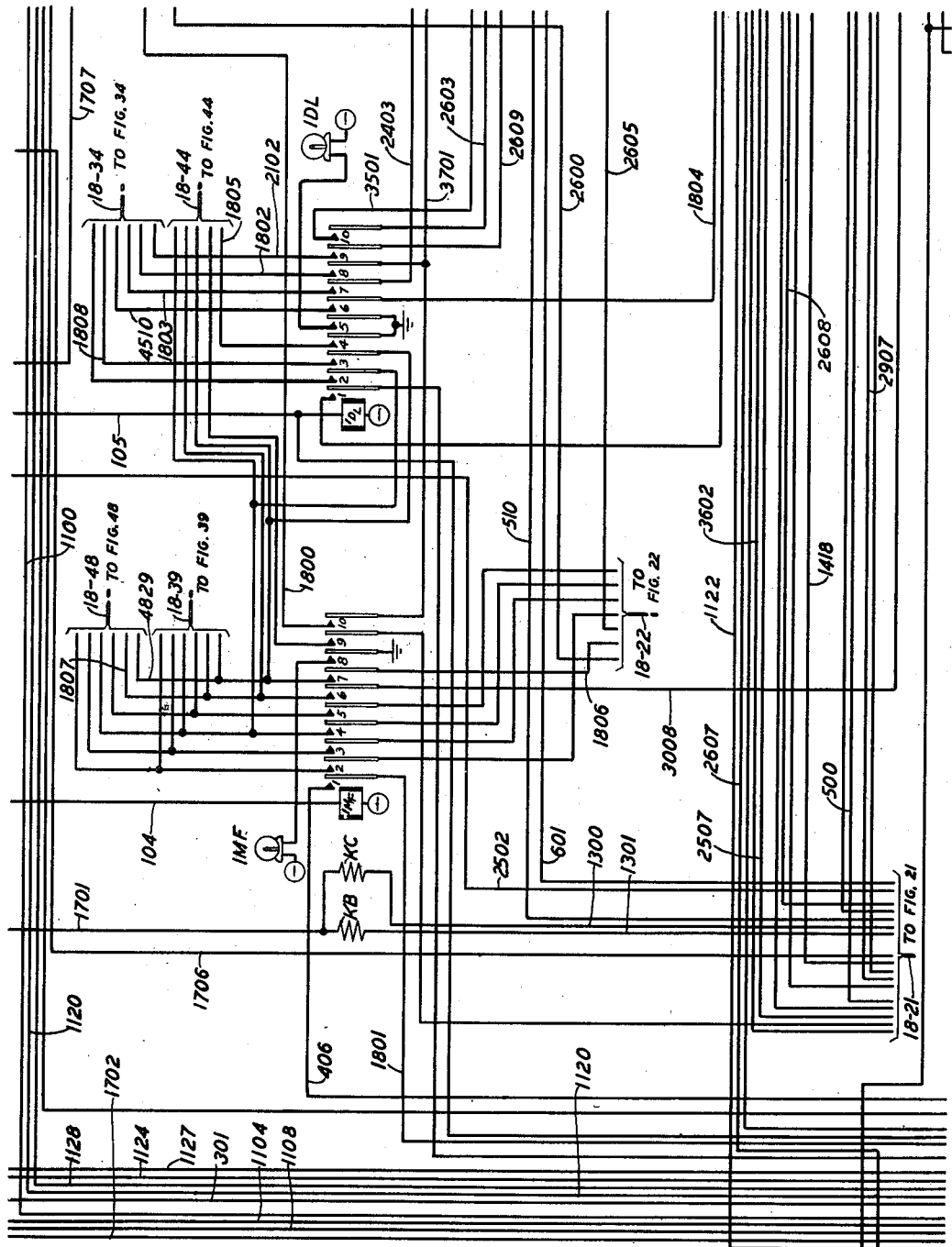
Figs. 18, 25 and 26 show a plurality of control keys.
Figure 19:
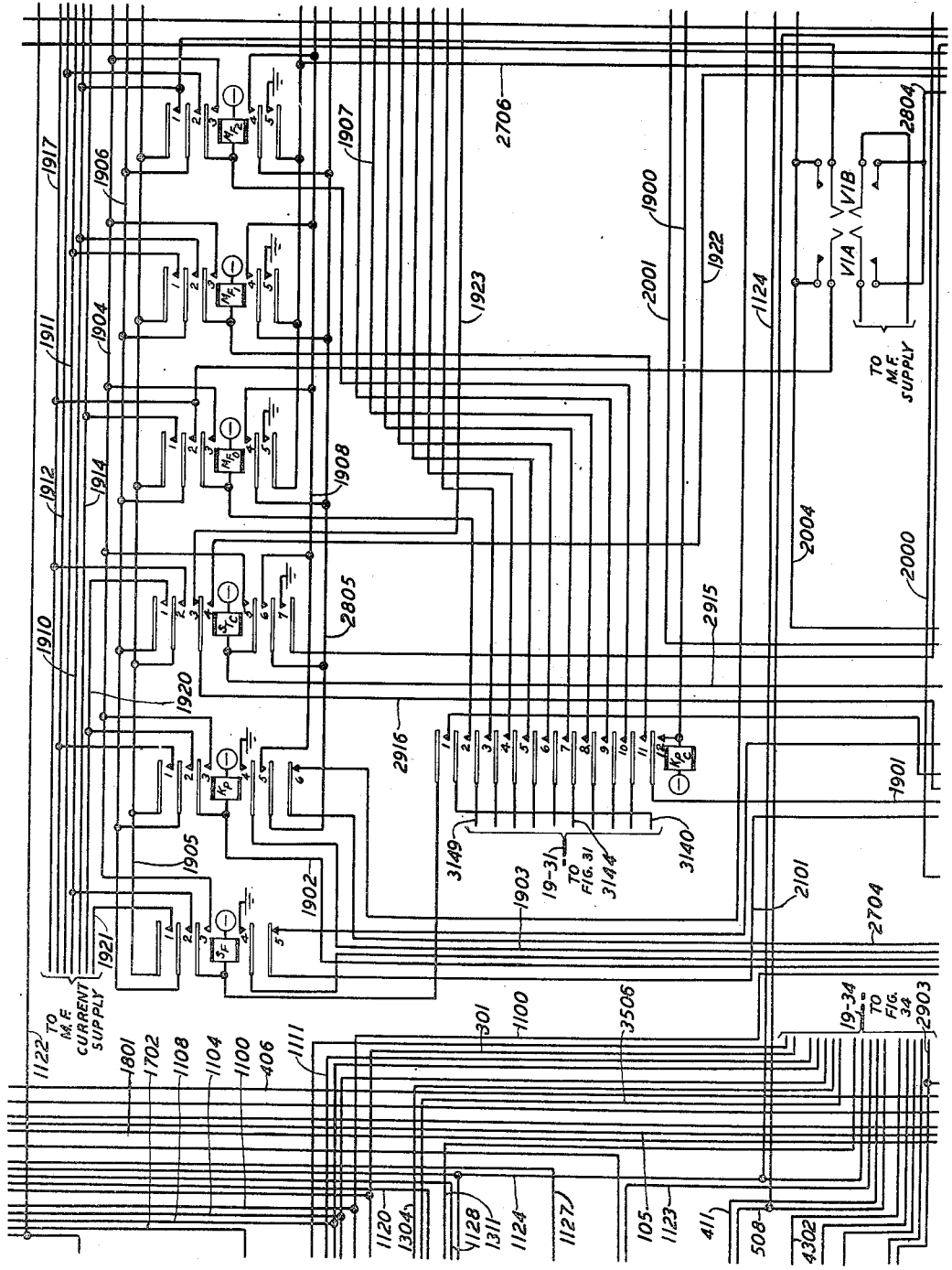
Figure 20:
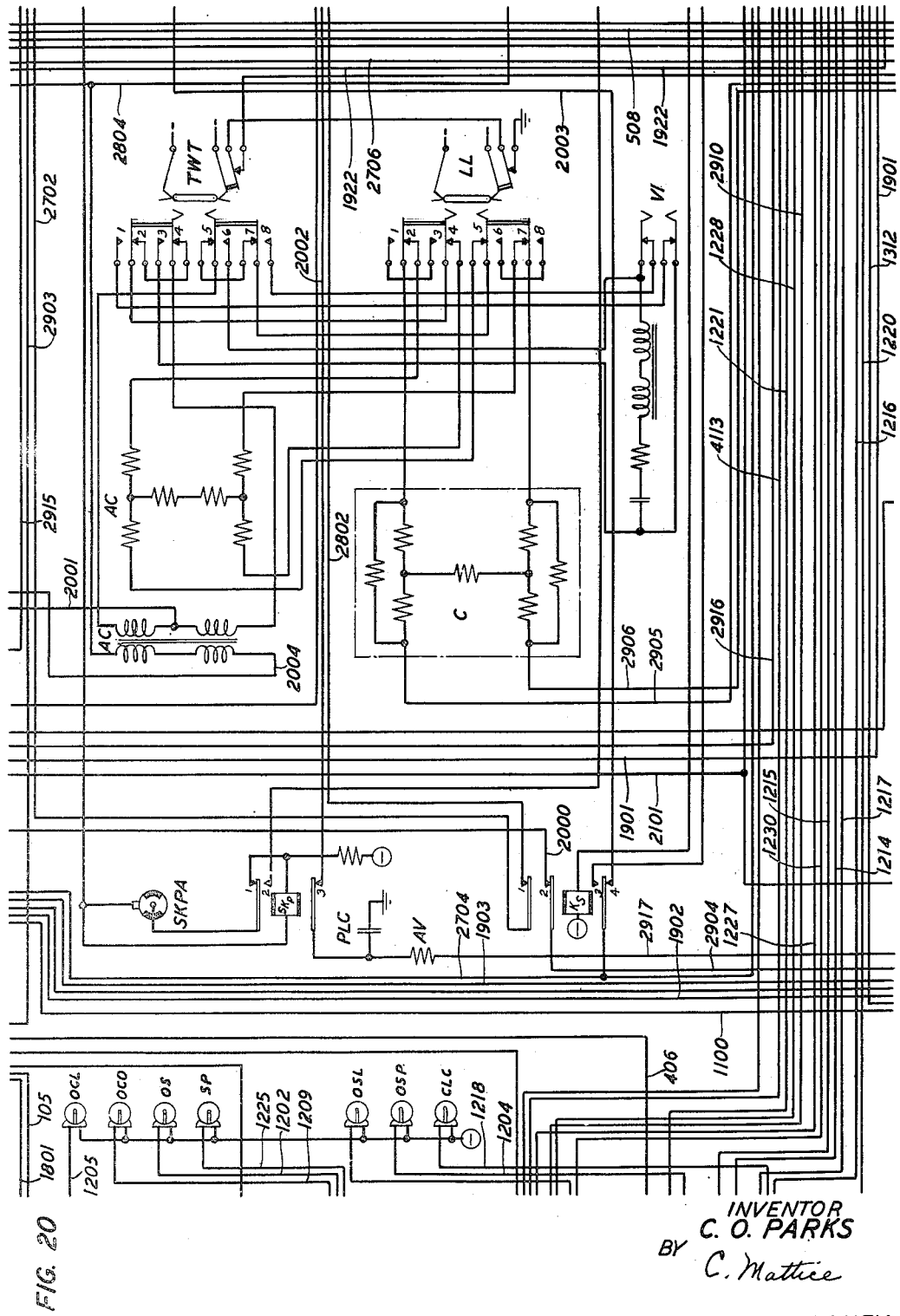
Figure 21:
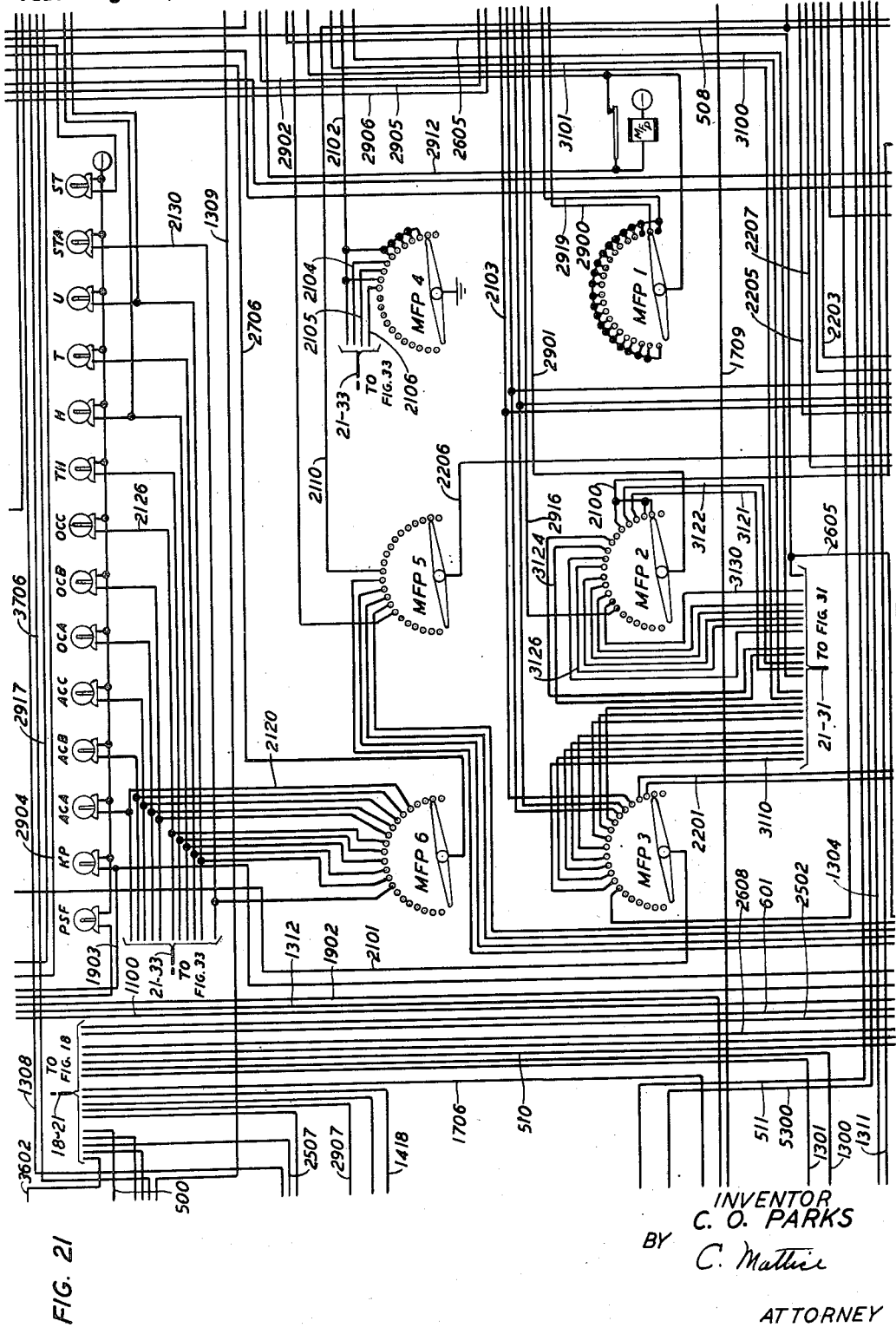

If the test circuit is used in an office of the type in which the in and out pulsing is synchronized, the optional wiring shown in Figs. 8 and 16 is omitted and relay D08(47) is not operated.

If the sender under test is one which is set by multi-frequency pulses, the area code digits are sent out as previously described. However, when switch MFP(21) reaches position 6, a circuit is closed from ground over brush MFP4(21), conductor 2104 through cables 21-33 and 33-47, contact 3 of key 2DTX(47), contact I of relay D08(47), conductor 2102 through cables 33-47 and 21-33, contact 5 of relay GL(29), conductor 2909 to battery through the winding of relay CDY(22). Therefore, the first office code digit is transmitted immediately following the last area code digit. With switch MFP(21) in position 7, ground is connected over brush MFP4(21) to conductor 2105 which is connected over contact 2 of key 2DTX(47) to conductor 2102 to operate relay CDY(22), while in position 8, ground is connected over brush MFP4(21) directly to conductor 2102 to operate relay CDY(22) and the remaining office code digits are sent out in positions 7 and 8 in the manner described.

When switch MFP(21) reaches position 9, ground is connected over brush MFP4(21) to conductor 2106 which extends over contact 4 of relay D08(47) conductor 4700, through cable 25-45, contact 7 of key TRL(25) conductor 2501, through cable 25-45, contact 5 of key UXD(55) conductor 5500 to battery through the winding of relay MKS(47), operating the latter relay to intiate the marker test. No circuit is closed for relay CDY(22) in this position and that relay releases, in turn releasing relay PLC(28). Therefore, the thousands digit cannot be sent to the sender at this time.

The trunk closure delay test is made as previously described, followed by the SL relay test after which the sender starts to send out pulses which are checked, for example by switch MFK(48), which checks the area code digits and the first two office code digits, advancing as previously described to position 6. The sender should not send out the last office code digit until it has received the thousands digit. Similarly it should not send the thousands digit until the hundreds digit is received, the hundreds digit until the tens digit is received, and the tens digit until the units digit is received. The units digit must wait for either a stations digit or the start signal, and if a stations digit is received, the latter digit cannot be sent out until the start signal is received.

With switch MFK(48) in position 6, ready to check the last office code digit, a test is made to see that that digit is not sent out prematurely. A circuit is closed from ground over brush MFK3(48) in position 6, conductor 4829 through cable 18-48, contact 7 of relay IMF(18), conductor 1806 through cable 18-22 to battery through the winding of relay AI(22). Relay AI(22) operates and locks over its contact 3 to ground on conductor 1100. With relay AI(22) operated, a circuit is closed from ground at contact 6 of relay BLK(11), conductor 1702, contact 5 of relay TDK(17), conductor 1709, contact 3 of relay MFG(29), conductor 2920, contact 2 of relay CDY(22), contact 4 of relay AI(22), conductor 2205, contact 2 of relay FPA(29) to battery through the winding of relay FP(29). Relay FP(29) operates and, at its contact 3 closes a circuit for relay FPA(29), which operates and locks over its contact 3 to conductor 2205 and the circuit above traced. When relay FPA(29) operates it opens the operating circuit of relay FP(29) and connects that relay over contact 1 of relay FPA(21), conductor 1309, contact 1 of relay HPT(13), contact 2 of relay MFT(13), and conductor 3706 to the contact of relay Q(37). Relay Q(37) is operated, as previously described, whenever a signal is received and, if the last code digit is sent out by the sender at this time, relay FP(29) is held operated to close a circuit from battery through the winding of relay FPB(29), contact 1 of relay FP(29), conductor 2921, contact 1 of relay CDY(22), contact 2 of relay AI(22), conductor 2206, brush MFP5(21) in position 9, conductor 2110, contact 1 of relay SK3(30), conductor 3008, contact 6 of relay IMF(18), conductor 1807 through cable 18-48 to ground over brush MFK3(48) in position 7, to which position it has been advanced by the operation of relay Q(37) in response to the reception of the digit. If relay FPB(29) is operated it locks under the control of relay MFS(29), lights lamp SYF(29), operates relay BLK(11) and opens the circuit for advancing the test.

Assuming that the sender waits properly, relay FP(29) releases. Relay MFI(19) has been operated in the manner previously described under the control of thousands digit key 1400 and the operating ground for this relay is extended over its contact 3, conductor 1904, contact 1 of relay AI(22), conductor 2207, contact 4 of relay FPA(29), contact 2 of relay FP(29), contact 4 of relay FPB(29), contact 6 of relay MPS(29), contact 6 of relay GL(29), conductor 2910, contact 7 of relay SPA(12), contact 2 of relay SCA(12), conductor 1230, contact 7 of relay AC(29), conductor 2911, contact 3 of relay FGK(27), contact 4 of relay PC3A(27), contact 1 of relay PC3(27), conductor 2704, contact 4 of relay KS(20), conductor 2003, winding of relay PLC(28) to battery through resistance BU(28). Relay PLC(28) causes the thousands digit to be transmitted to the sender in the manner previously described. When relay KP5(28) closes its contact 3 to operate magnet MFP(21) to advance switch MFP(21) to position 10, it also operates relay MFG(29) which opens the locking circuit of relay FPA(29). When relay MFG(29) releases after relay KP5(28) releases to advance selector MFP(21), relay FP(29) is reoperated, in turn operating relay FPA(29) which again connects relay FP(29) to the contact of relay Q(37). The last code digit should be transmitted at this time and relay FP(29) held operated but, since switch MFP(21) has now been advanced to position 10 while switch MFK(48) is in position 7, no circuit is closed for relay FPB(29) and when relay Q(37) releases, relay FP(29) also releases to cause the hundreds digit to be sent out. In a similar manner the remaining digits are sent out and checked.

If the sender under test is one which is set by dial pulses, switch DC(33) is used and when brush DC4(33) reaches position 4, relay CD(46) which controls the sending out of the digits is operated in a circuit from ground over contact 3 of relay EP(34), conductor 3401, brush DC4(33) conductor 2104 through cable 33-47, contact 3 of key 2DTX(47), contact 1 of relay D08(47), conductor 2102, contact 3 of relay G(46) to battery through the winding of relay CD(34). With relay CD(34) operated the first office code digit is sent to the sender and switch DC(33) advanced to position 5. In this position, conductor 2105 is grounded over brush DC4(33) which is connected over contact 2 of key 2DTX(47) to conductor 2102 to operate relay CD(34), and control the sending of the second office code digit. Switch DC(33) is advanced to position 6 where conductor 2102 is grounded over brush DC4(33) and the last office code digit sent to the sender.

When switch DC(33) arrives in position 7, preparatory to sending the thousands digit, no circuit is closed over brush DC4(33) for operating relay CD(46) and the thousands digit is not sent out at this time. However, a circuit is closed from ground over brush DC5(33) in position 7, conductor 2126, contact 9 of relay DLS(46), conductor 4614, to battery through the winding of relay AMK(33). With relay AMK(33) operated a circuit is closed from ground over contact 2 of relay AMK(33), conductor 2106 through cable 33-47, contact 4 of relay D08(47), conductor 4700 and thence as above traced to battery through the winding of relay MKS(47) to start the marker check.

Following the marker check, the trunk closure delay test is made, after which the sender sends out the area code digits and the first two office code digits. When the pulse checking switch, for example switch MFK(48) has checked these digits it is advanced to position 6. In this position a circuit is closed from ground over brush MFK3(48), conductor 4829 through cable 18-48, contact 3 of relay IDL(18), conductor 1808 through cable 18-34 to battery through the winding of relay AID(33). Relay AID(33) operates and locks over its contact 1 and conductor 4607 to ground at contact 2 of relay DLS(46).

When relay TDK(17) operates at the end of trunk closure delay timing, it closes a circuit from ground at contact 6 of relay BLK(11), conductor 1702, contact 5 of relay TDK(17), conductor 1709, contact 5 and winding of relay SLK(13) to battery. Relay SLK(13) operates and locks over its contact 6 to ground on conductor 1105. With relay SLK(17) operated, when relay AID(33) is operated as above described a circuit is closed from ground on conductor 1105, contact 2 of relay SLK(13), conductor 1312, contact 1 of relay AMK(33), contact 2 of relay AID(33), conductor 3403, contact 1 of relay EP(34), contact 5 of relay PSD(34), conductor 4610, contact 1 of relay G(46), conductor 4509, contact 5 of relay LBB(45), conductor 2910, contact 7 of relay SPA(12), contact 2 of relay SCA(12), conductor 1230, contact 5 of relay STD(51), conductor 3092, contact 3 of key DSS(30), conductor 3402, contact 3 of relay AVI(34), contact 2 of relay DLK(34), conductor 3893, contact 3 of relay TG3(38), conductor 5102 to battery through the winding of relay SY(51).

Relay SY(51) initiates the sending of the next digit, and operates relay SYI(51) as previously described. In addition it closes a circuit from ground at contact 2 of relay STD(51), conductor 5100, contact 1 of relay R(51), contact 3 of relay SY(51), conductor 5104, contact 5 of relay DAI(30), conductor 3003, contact 5 of relay CD(46), conductor 4615, contact 2 of relay AVI(34) to battery through the winding of relay AV(34). Relay AV(34) operates in this circuit and locks in a circuit from battery through its winding, winding of relay AVI(34), contact 2 of relay AV(34), contact 4 of relay DLK(34), conductor 3405 to ground at contact 8 of relay DLS(46). Relay AVI(34) cannot operate being shunted by the operating circuit of relay AV(34).

When relay R(51) operates at the end of the digit, relay AVI(34) operates and closes a circuit from ground at contact 1 of relay AV(34), contact 1 of relay AVI(34) to battery through the lower winding of relay DCG(34) and the winding of magnet DC(34). At its contact 3, relay AVI(34) opens the circuit of relay SY(51) causing that relay to release. Relay DCG(34) in operating closes a circuit from ground at its contact 3, contact 4 of relay AVI(34) to battery through the winding of relay DLK(34). Relay DLK(34) operates and locks over its contacts 1 and 6, over the back contact of magnet DC(34) to ground over contacts 1 of relays AVI(34) and AV(34). Relay DLK(34) at its contact 4 opens the locking circuit for relays AVI(34) and AV(34), and at contact 5 connects ground from conductor 3405 to the winding of magnet DC(34) to insure its complete operation and to the winding of relay DCG(34). When the magnet DC(34) has opened its contact and relays AVI(34) and AV(34) have released, relay DLK(34) releases, in turn releasing relay DCG(34) and magnet DC(34) to advance switch DC(33) into position to send out the next digit.

With switch DC(33) in positions 8, 9, 10 and 11, the circuit for operating relay SY(51) may be traced from ground at contact 3 of relay EP(34), conductor 3401, brush DC4(33), contact 2 of relay AID(33), conductor 3403 and thence as above traced to the winding of relay SY(51). (The optional wiring through key HPD(33) would not be furnished in offices of the type employing synchronized testing of the type being described.) Therefore the transmission of the remaining digits to the sender takes place without further interruption.

For either type of sender, if it is desired to set the sender without delays, the cancel delay key CD(26) may be operated. With relay MFA(26) operated for multifrequency pulsing, a circuit is closed from ground over contact 2 of key CD(26), contact 4 of relay MFA(26) to conductor 2102 to operate relay CDY(22) and that relay remains operated throughout the test. For dial pulse senders, with relay IDL(18) operated, ground from contact 2 of key CD(26) is connected over conductor 2609, and contact 9 of relay IDL(18), to conductor 2102 to operate relay CD(46) throughout the test.

*Manual calls*

Manual calls are of two kinds, those directed to a B operator who completes a connection and those to a traffic assistance or TX operator. For calls to a B operator an office code is sent to the sender while for calls to a TX operator a special code comprising the digits 1–1 and one or two other digits is sent to the sender. For this class of call, no digits are sent out by the sender.

To prepare the test circuit for testing the senders for such calls, key MAN(25) is operated as well as key CD(26). For a B operator call, the office code is set up on the office code key-sets OCA(14), OCB(14) and OCC(14). For a TX operator call the TX code is set up on the area code key-sets, ACA(6), ACB(6) and ACC(14) together with one of the office code key-sets if a four-digit code is used. In addition, if the test circuit is used in an office of the type disclosed in the McKim et al. application, where the operation of a key in area code key-set ACC(14) operates relay DO8(47), key 2DTX(47) must also be operated. In addition, key TX(46) must be operated, since relay TX(46) will be operated by the grounding of conductor 4504 to tell the marker that a TX code has been registered.

With key MAN(25) operated, a circuit is closed from ground at contact 4 of relay TDS(17), conductor 1704, over contact 4 of key MAN(25) to battery through lamp MAN(25). A circuit is also closed from ground on conductor 1100, contact 1 of key MAN(25), conductor 1128 to battery through relay MAN(11). Assuming that the sender under test requires multifrequency pulses for setting, relay IMF(18) will be operated as previously described. With relay IMF(18) operated a circuit is closed from ground on conductor 1704, contact 5 of key MAN(25), conductor 3701, contact 10 of relay IMF(18), conductor 1800 to battery through the winding of relay MFA(26). Switch MFP(21) will be preset in position 6. Relay CDY(22) is operated in a circuit which extends as previously traced to conductor 2102, contact 4 of relay MFA(26) to ground at contact 2 of key CD(26). Assuming a B operator call, the digits set up on key-sets OCA(14), OCB(14) and OCC(14) are sent out in positions 6, 7 and 8 of switch MFP(21) as previously described. When switch MFP(21) advances to position 9 (since no key is operated in key-set TH(14), and consequently relay TH(16) is not operated, a circuit is closed from ground at contact 6 of relay MFS(29), conductor 2901, brush MFP2(21) in position 9, conductor 3126 through cables 21-31 and 16-24, contact 3 of relay OCC(16), contact 1 of relay TH(16), conductor 2403 through cable 30-32, contact 2 of relay MFA(26), conductor 2605 through cable 18-22, contact 4 of relay MPS(29), conductor 2914, contact 3 of relay MFA(26), contact 1 of key W0(26), contact 7 of key PS(26), contact 7 of relay MFA(26), conductor 2606, contact 3 of key CST(29), conductor 2915 to battery through the winding of relay STC(19) to battery. With relay STC(19) operated the start signal is sent out as previously described, relay STC(19) also operating relay EMF(29) which locks under the control of relay AC(29) and operating relay RLK(11). When brush MFP(21) is in position 9, relay MKS(47) is operated to initiate the marker tests, after which the trunk closure delay test is made followed by the SL relay test. With relay MAN(11) operated, battery is connected to the windings of relays KR(13) and KT(13) for the SL relay test over conductor 1304, contact 3 of relay MAN(11), conductor 1311, contact 5 of relay KTR(13) and conductor 1306.

Immediately after the SL relay test, the sender functions to permit the trunk to complete the talking circuit and is ready to release. After checking these functions as previously described, a circuit is closed for relay CPT(11) which may be traced from battery through the winding of relay CPT(11), contact 1 of relay BLK(11), conductor 1122, contact 7 of key T0(26), conductor 2608, through cable 18-21, contact 4 of key NCH(14), conductor 1419 through cable 30-32, contact 5 of key 12DG(30), conductor 3001 through cable 30-32, contact 2 of relay STE(5), conductor 511, through cable 39-41, contact 5 of key FB(53), conductor 5300 through cable 39-41, contact 5 of key FIF(14), conductor 1420, contact of relay CLK(11), conductor 1127, contact 3 of relay KTR(13), conductor 1313, contact 5 of relay MAN(11), conductor 1123, contact 7 of relay SP2(4), conductor 413, contact 8 of relay COK(12) to ground on conductor 1107.

The restoration of the test circuit and the advance to the next sender take place as previously described.

For a three-digit TX code the operation is the same as above described except that on marker test, ground on conductor 4504 is checked against operated key TX(46).

For a four-digit TX code the operation is the same, except that relay STC(19) is operated in a circuit which extends as above traced to conductor 2403 and thence over contact 1 of relay OCB(16), contact 3 of relay OCA(16), conductor 3124, through cables 16-24 and 19-31, brush MFP2(21) in position 7, conductor 2901 to ground at contact 6 of relay MFS(29).

For an office of the type disclosed in the McKim et al. patent, relay D08(47) is operated because of the operation of a key in key-set ACC(14) and key 2DTX(47) is also operated. Switch MFP(21) is preset in position 3 and the first three digits are sent out as previously described. Conductor 2102 is connected over contact 4 of key 2DTX(47) to conductor 2104 to operate relay CDY(22) to control the sending of the fourth digit in position 6. When switch MFP(21) advances to position 7, ground is connected over brush MFP4(21) to conductor 2105 which is connected over contact 1 of key 2DTX(47) and contact 3 of relay D08(47) to conductor 4700, completing the circuit previously traced for relay MKS(47) to initiate the marker test.

*Time out*

As soon as relay FST(2) operates following the operation of start key ST(2), a circuit is closed from ground at contact 8 of relay BLK(11), conductor 1126, contact 7 of relay FST(2), contact 2 of relay CA1(2), conductor 212, contact 2 of key TA(10) to interrupter TA(10). At the first closure of the interrupter contact a circuit is closed from ground as above traced over the interrupter contact, contact 8 of relay CTA(10), conductor 1011, contact 3 and winding of relay TW(9), to battery through resistance BE1(9). Relay TW(9) operates and locks over its contact 4, conductor 904, contact 3 of relay CTA(10), contact 2 of key TA(10) to ground over conductor 212 as above traced. Relay TW(9) closes a circuit from battery through resistance BE2(9), winding of relay TZ(9), contact 4 of relay TW(9) to ground over conductor 904 as traced. However, ground from the interrupter contact is connected over contact 1 of relay TZ(9) to battery through resistance BE2(9) in shunt of the winding of relay TZ(9) preventing its operation.

When the interrupter contact opens, relay TZ(9) operates. At the next closure, ground on conductor 1011 is extended over contact 2 of relay TZ(9) to battery through resistance BE1(9) in shunt of the winding of relay TW(9) and relay TW(9) releases, relay TZ(9) being held operated over contact 3 of relay TW(9) and conductor 1011. With relay TW(9) released and relay TZ(9) operated, a circuit is closed from battery through the winding of relay TW(9), contact 1 of relay TW(9), contact 3 of relay TZ(9), conductor 905, contact 6 of relay CTA(10), contact 3 of key TA(10) to ground on conductor 212. Relay TW1(9) operates and locks over its contact 2 to ground on conductor 904.

When the interrupter contact again opens, relay TZ(9) also releases. The third closure of ground to conductor 1011 again operates relay TW(9), and the following removal of ground from conductor 1011 operates relay TZ(9) as above described. With relay TW1(9) operated, the operation of relays TW(9) and TZ(9) closes a circuit from battery through the winding of relay TW2(9) and over its contact 3, contact 3 of relay TW1(9), contact 2 of relay TW(9), contact 3 of relay TZ(9) to ground on conductor 905. Relay TW2(9) operates, locking over its contact 4 to off-normal ground on conductor 1106 and extending this locking ground to conductor 508 to operate relay BLK(11). Relay TW2(9) also closes a circuit for lamp TA(9), which lights in parallel with lamp BLK(11) from ground at contact 7 of relay BLK(11).

Relay BLK(11) at its contact 8, removes ground from conductor 212 to stop the timing operation. The timing is stopped and recycled each time that relay CA1(2) is operated and released when the test circuit advances to the next sender. A normal test is completed prior to the time that relay TW2(9) would be operated. The timing operation may be canceled by the operation of key TA(10) when a test is being made under close observation. It is also canceled by the operation of relay CTA(10) in connection with certain special tests involving time out by the sender.

Relay BLK(11) is operated in response to the occurrence of a number of specific circuit failures as described hereinbefore and is operated in response to the timing operation as a result of other failures which prevent the normal completion of a test.

Relay BLK(11), when operated for any reason, locks over its contact 5 and conductor 1106 to ground at contact 7 of relay ON(11) and extends its locking ground over its contact 4 to battery through the winding of relay BLK(11), operating the latter relay. At its contacts 2 and 3, relay BLK(11) operates an audible and visual alarm. At its contact 1, relay BLK(11) opens the circuit of relay CPT(11) to prevent the test circuit from advancing to another sender. At its contact 6 it removes ground from conductor 1102 to stop the trunk closure delay pulsing and at contact 9 closes a circuit for relay CA2(2), if relay BT(3) operates after relay BLK(11) has been operated while connected to a busy sender, to cause the test circuit to recycle and make another busy test on the same sender.

Relay BLKI(11) cancels sender time out and stops inpulsing. Key CST0(11) when operated also prevents the sender from timing out.

Special tests, etc.

In addition to the general tests described above, the test circuit is equipped with keys for modifying the tests for various purposes. Among these the following may be mentioned: Key MF0(1) causes the test circuit to test only multifrequency senders by providing circuits for automatically advancing the master switch MS(1) over the positions corresponding to dial-type senders. Key MF0(1) also opens the circuit for operating relay IDL(18). Similarly key DL0(1) causes the test circuit to test dial-type senders only.

Key AC0(2) may be used to silence an alarm while determining the cause. Key APB(2) operated permits the test circuit to advance over busy senders.

Key REP(9) is used to make repeated tests on the same sender. In conjunction with this key, key HRP(3) may be used to prevent the seizure of the sender for service. Key REP2(9) causes the test circuit to make two tests on each sender before advancing to the next sender. If key CDK(9) is also operated, to make the two tests on each sender as described, both tests will be repeated.

Keys PC(10), ASA(1) and PCS(1) are used in selecting a particular sender for test.

Key DSS(30) places the setting of the sender under manual control which is exerted by the use of key AV(30), or by remote control, using a cord inserted in jack RC(9).

Key CA(2) is used to advance the test circuit to start a new test after a test failure. If key REP(9) is operated the new test is made on the same sender, if not, the test circuit advances to the next sender.

Key RN(10) restores the test circuit to normal.

Key INCX(38) is used when the dial-type sender should be set by composite signaling. Key SKPA(28) causes the multifrequency in-pulsing to be done very slowing to permit observing the operation of the sender.

Figure 44:
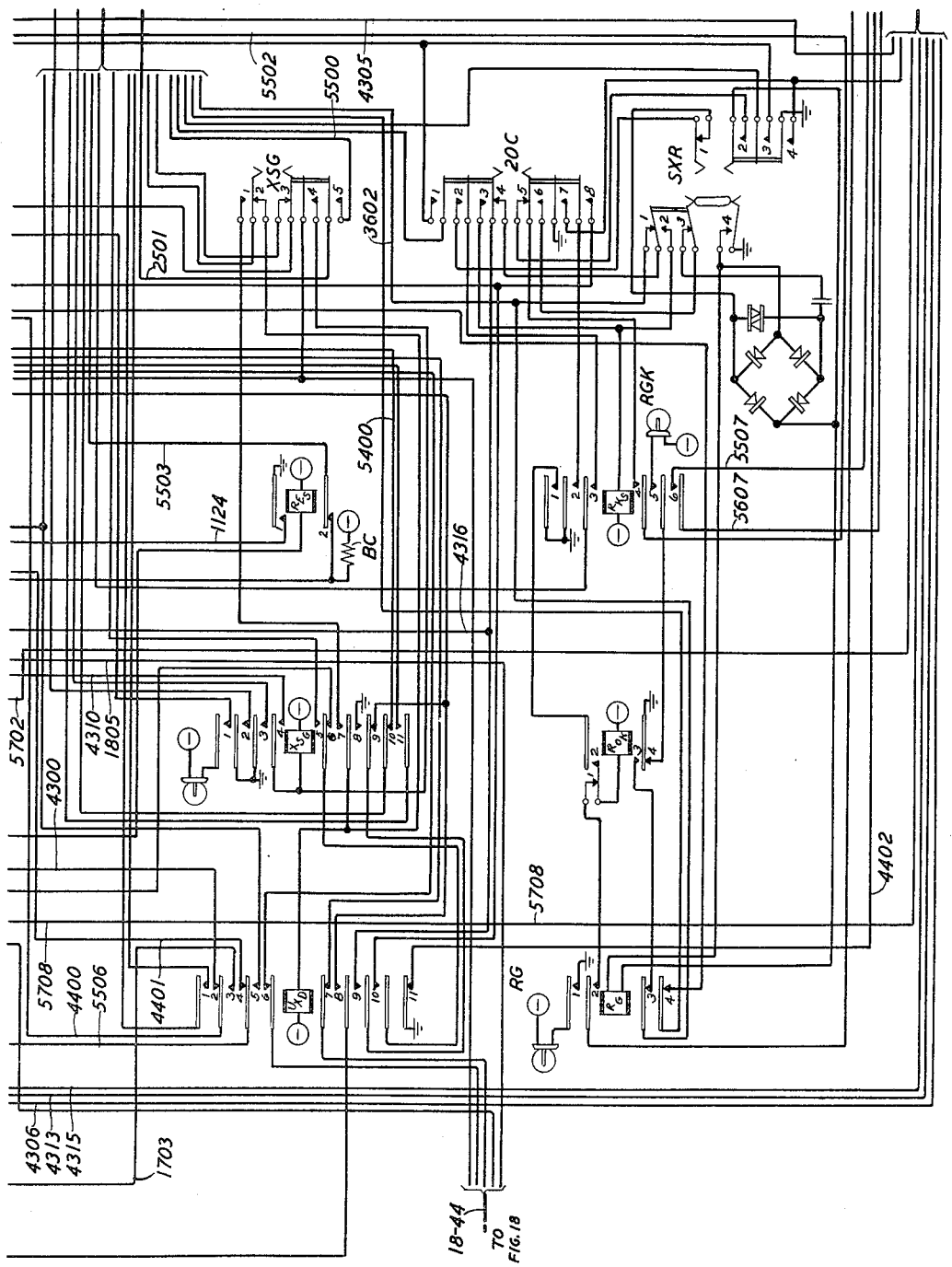

For some routes the sender is arranged to transmit a ringing signal, either 20-cycle or simplex and to test the sender for this function, when using the proper designation, keys 2OC(44), SXR(44) and the equipment of Fig. 44 is provided.

Key PS(26) tests the sender for reaction to a permanent signal condition.

Key PSF(28), preliminary single frequency, key FKP(22) false key pulse, key 3FKP(22) three-frequency key pulse, key 3FD(22), three-frequency digit, and key SPE(26) start pulse error, test the sender for response to unstandard multifrequency in-pulsing.

Keys UXD(55) unexpected delay, XDD(43) expect digit delay and XSG(44) expect stop-go, arranges the test circuit to test the sender for out-dialing delays. These key function with the timing switch TM(54).

Key MKD(45) and switch DD(45) are used in testing the interdigital timing by the sender, while key DT0(45) and switch DD(45) test the ability of the sender to treat a prolonged interdigital interval as the end of dialing.

What is claimed is:

1. In a testing circuit for testing register senders of a telephone system, means for connecting said testing circuit with a sender, a plurality of rows of keys including one row for each possible digit of telephone designations, a transmitting circuit including a digit distributor for transmitting digits to the connected sender in accordance with a designation set up on said rows of keys, a receiving circuit including a digit distributor for receiving digits from said sender, and means for presetting the digit distributors of said transmitting circuit and said receiving circuit in accordance with the first row of keys in which a key is operated.

2. In a testing circuit for testing register senders of a telephone system, means for connecting said testing circuit with a sender, a plurality of rows of keys including one row for each possible digit of telephone designations, a transmitting circuit for transmitting digits to the connected sender in accordance with a designation set up on said rows of keys, a stepping switch in said transmitting circuit having a position corresponding to each of said rows of keys, and means under the joint control of unoperated rows of keys and said switch to preset said stepping switch in the position corresponding to the first row of keys in which a key is operated.

3. In a testing circuit for testing register senders of a telephone system, means for connecting said testing circuit with a sender, a plurality of rows of keys including one row for each possible digit of telephone designations, a transmitting circuit for transmitting digits to the connected sender in accordance with a designation set up on said rows of keys, a stepping switch in said transmitting circuit having a position corresponding to each of said rows of keys, and means to preset said stepping switch in the position corresponding to the first row of keys in which a key is operated comprising a stepping magnet for said switch, a relay, means for simultaneously closing a circuit through the winding of said relay and through the winding of said stepping magnet over a normally closed contact of said relay, and means under the joint control of said switch and unoperated rows of said keys to prevent the operation of said relay to permit said stepping magnet to operate and advance said switch until said switch reaches a position corresponding to an operated row of keys.

4. In a testing circuit for testing register senders of a telephone system, means for connecting said testing circuit with a sender, a plurality of rows of keys including one row for each possible digit of telephone designations, a transmitting circuit for transmitting digits to the connected sender in accordance with a designation set up on said rows of keys, a stepping switch in said transmitting circuit having a position corresponding to each of said rows of keys, and means to preset said stepping switch in the position corresponding to the first rows of keys in which a key is operated comprising a stepping magnet for said switch, a relay, means for simultaneously closing a circuit through the winding of said relay and through the winding of said stepping magnet over a normally closed contact of said relay, and means under the joint control of said switch and unoperated rows of said keys to close a shunt around the winding of said relay to prevent its operation and means for maintaining said shunt over said switch and contacts controlled by unoperated keysets to permit said stepping magnet to operate and advance said switch until said switch reaches a position corresponding to an operated row of keys.

5. In a testing circuit for testing register senders of a telephone system, means for connecting said testing circuit with a sender, a plurality of rows of keys including one row for each possible digit of telephone designations, a plurality of transmitting circuits each including a digit distributor, means for selecting one of said transmitting circuits in accordance with the sender to which the testing circuit is connected, a plurality of receiving circuits each including a digit distributor, means for selecting one of said receiving circuits, and means for presetting the digit distributors of said selected transmitting circuit and said selected receiving circuit in accordance with the first row of keys in which a key is operated.

6. In a testing circuit for testing register senders of a telephone system, means for connecting said testing circuit with a sender, a plurality of rows of keys including one row for each possible digit of telephone designations, a transmitting circuit for transmitting digits to the connected sender, a plurality of receiving circuits, means for selecting one of said receiving circuits, means for presetting said transmitting circuit and said selected receiving circuit in accordance with the first row of keys in which a key is operated, means in said transmitting circuit to transmit the digit corresponding to said operated key, means in said receiving circuit to register the digit received from the sender, and means including said register and contacts on said operated key to advance said receiving means if the digit received corresponds to the operated key.

7. In a testing circuit for testing register senders of a telephone system, means for connecting said testing circuit with a sender, a plurality of rows of keys including one row for each possible digit of telephone designations, a transmitting circuit for transmitting digits to the connected sender, a plurality of receiving circuits, means for selecting one of said receiving circuits, means for presetting said transmitting circuit and said selected receiving circuit in accordance with the first row of keys in which a key is operated, means in said transmitting circuit to successively transmit the digits corresponding to said operated keys, means in said receiving circuit to register each digit as received from the sender, and means including said register and contacts on said operated keys to advance said receiving circuit if the digit received corresponds to the operated key.

8. In a testing circuit for testing register senders of a telephone system, means for connecting said testing circuit with a sender, a plurality of rows of keys including one row for each possible digit of telephone designations, a transmitting circuit for transmitting digits to the connected sender, a plurality of receiving circuits, means for selecting one of said receiving circuits, means for presetting said transmitting circuit and said selected receiving circuit in accordance with the first row of keys in which a key is operated, means in said transmitting circuit to successively transmit a plurality of digits corresponding to operated keys, means operated following the transmission of said plurality of digits to stop said transmitting circuit and to cause said sender to transmit digits, means in said receiving circuit to regster the digits as received from the sender, means to compare each digit as received with a digit set up on the corresponding row of keys, means operated if the digit received is the same as the digit set up to prepare said receiving circuit to receive the next digit, and means operated following the reception of a predetermined number of digits to cause said transmitting circuit to transmit the remaining digits to said sender.

9. In a testing circuit for testing register senders of a telephone system, means for connecting said testing circuit with a sender, a plurality of rows of keys including one row for each possible digit of telephone designations including code digits and numerical digits, a transmitting circuit for transmitting digits to the connected sender, a plurality of receiving circuits, means for selecting one of said receiving circuits, means for presetting said transmitting circuit and said selected receiving circuit in accordance with the first row of keys in which a key is operated, means in said transmitting circuit to successively transmit the code digits corresponding to operated keys, means operated following the transmission of said plurality of digits to stop said transmitting circuit and to cause said sender to transmit digits, means in said receiving circuit to register the digits as received from the sender, means to compare each digit as received with a digit set up on the corresponding row of keys, means operated if the digit received is the same as the digit set up to prepare said receiving circuit to receive the next digit, and means operated when said receiving circuit is prepared to receive the last code digit to cause said transmitting circuit to transmit the numerical digits to said sender.

10. In a testing circuit for testing register senders of a telephone system, means for connecting said testing circuit with a sender, a plurality of rows of keys including one row for each possible digit of telephone designations, a transmitting circuit for transmitting digits to the connected sender, a receiving circuit for receiving digits from said sender, means to transmit a designation to said sender in response to which the sender normally causes a translation to be performed resulting in sending out a different designation, and means to successively cause said sender to send out the designation registered and to send out the translated designation.

11. In a testing circuit for testing register senders of a telephone system, means for connecting said testing circuit with a sender, a plurality of rows of keys including one row for each possible digit of telephone designations, a transmitting circuit for transmitting digits to the connected sender, a receiving circuit for receiving digits from said sender, means in said receiving circuit to compare each digit as received with the digit set up on the corresponding row of keys, means to advance said receiving circuit if the same digit is received and set up, means to render said receiving circuit effective to compare the digits received with the proper rows of keys, means to transmit a designation to said sender in responce to which the sender normally causes a translation to be performed resulting in sending out a different designation, and means to successively cause said sender to send out the designation registered and to send out the translated designation.

12. In a testing circuit for testing register senders of a telephone system, means for connecting said testing circuit with a sender, a plurality of rows of keys including one row for each possible digit of telephone designations, a transmitting circuit for transmitting digits to the connected sender, a receiving circuit for receiving digits from said sender, means to successively connect said receiver circuit with said rows of keys, means in said receiving circuit to compare each digit as received with the digit set up on the corresponding row of keys, means to advance said receiving circuit if the same digit is received and set up, means to render said receiving circuit effective to compare the digits received with the proper rows of keys, means to transmit a designation to said sender in response to which the sender normally causes a translation to be performed resulting in sending out a different designation, means to make two successive tests on each sender, means operated during the first of said tests to cause said sender to send out the designation as registered, means operated during the second of said tests to cause said sender to send out the translated designation, and means also operated during said second test to alter the connections between said receiving circuit and said rows of keys to cause said receiving circuit to compare the digits received with the digits set up on other rows of keys.

13. In a testing circuit for testing register senders of a telephone system, means for connecting said testing circuit with a sender, a plurality of rows of keys including one row for each possible digit of telephone designations, a transmitting circuit for transmitting digits to the connected sender, a receiving circuit comprising a register for receiving digits from said sender, and a digit distributing switch for connecting said register and said rows of keys, means to transmit a designation to said sender in response to which the sender normally causes a translation to be performed resulting in sending out only a part of the digits transmitted to the sender, means to make two successive tests on each sender, means operated during the first of said tests to cause said sender to send out the designation as registered, means operated during the second of said tests to cause said sender to send out the translated designation, means operated during said first test to preset the digit distributing switch of said receiving circuit in connection with the first row of keys on which said designation is set up, and means operated during said second test to preset the digit distributing switch of said receiving circuit in connection with the row of keys on which the first digit to be transmitted by the sender is set up.

14. In a testing circuit for testing register senders in a telephone system, means for connecting said testing device with a sender, a plurality of rows of keys including one row for each possible digit of telephone designations, means for transmitting designations to a connected sender, a receiving circuit for receiving digits as received from said sender in accordance with a code which comprises two out of a plurality of alternating-current frequencies, means for connecting said receiving circuit with said rows of keys, means to register the identity of the two frequencies received, means to indicate that the two frequencies received correspond to the digit set up on the connected row of keys, means to indicate that no less than two frequencies are received, means to indicate that no more than two frequencies are received, and means under the control of all of said indicating means to advance said receiving circuit only if the digit received comprises the correct two frequencies no more and no less.

15. In a testing circuit for testing register senders in a telephone system, means for connecting said testing device with a sender, a plurality of rows of keys including one row for each possible digit of telephone designations, means for transmitting designations to a connected sender, a receiving circuit for receiving digits as received from said sender in accordance with a code which comprises two out of a plurality of alternating-current frequencies, means for connecting said receiving circuit with said rows of keys, means to register the identity of the two frequencies received, means to indicate that the two frequencies received correspond to the digit set up on the connected row of keys, means to indicate that no less than two frequencies are received, means to indicate that no more than two frequencies are received, and means to advance said receiving circuit only if the digit received comprises the correct two frequencies no more and no less comprising a relay, an operating circuit for said relay extending to battery through a plurality of asymmetric conducting devices, and means to connect ground between said relay and each of said asymmetric conducting devices under the control of said indicating means.

16. In a testing circuit for testing register senders in a telephone system, means for connecting said testing device with a sender, a plurality of rows of keys including one row for each possible digit of telephone designations, means for transmitting designations to a connected sender, a receiving circuit for receiving digits as received from said sender in accordance with a code which comprises two out of a plurality of alternating-current frequencies, means for connecting said receiving circuit with said rows of keys, means to register the identity of the two frequencies received, separate circuits for indicating that the two frequencies received correspond to the digit set up on the connected row of keys, a circuit for indicating that no less than two frequencies are received, a circuit for indicating that no more than two frequencies are received, and means to advance said receiving circuit only if the digit received comprises the correct two frequencies no more and no less comprising a relay, an operating circuit for said relay extending to battery through four asymmetric conducting devices and means to connect ground between said relay and each of said asymmetric conducting devices over said indicating circuits.

17. In a testing circuit for testing register senders in a telephone system, means for connecting said testing device with a sender, a plurality of rows of keys including one row for each possible digit of telephone designations, means for transmitting designations to a connected sender, a receiving circuit for receiving digits as received from said sender in accordance with a code which comprises two out of a plurality of alternating-current frequencies, means for connecting said receiving circuit with said rows of keys, means to register the identity of the two frequencies received, separate circuits for indicating that the two frequencies received correspond to the digit set up on the connected row of keys, a circuit for indicating that no less than two frequencies are received, a circuit for indicating that no more than two frequencies are received, and means to advance said receiving circuit only if the digit received comprises the correct two frequencies no more and no less, comprising a relay, an operating circuit for said relay extending to battery through four rectifiers, and means to connect ground between said relay and each of said rectifiers over said indicating circuits.

CHARLES O. PARKS.

REFERENCES CITED

The following references are of record in the file of this patent:

UNITED STATES PATENTS

| Number | Name | Date |
| --- | --- | --- |
| 1,575,128 | Reeves | Mar. 7, 1926 |
| 1,745,039 | Simpson | Jan. 28, 1930 |
| 1,958,635 | Myers | May 15, 1934 |
| 2,004,607 | Hersey | June 11, 1935 |
| 2,225,688 | Dehn | Dec. 24, 1940 |